US011954962B2

(12) United States Patent
Tanaka et al.

(10) Patent No.: US 11,954,962 B2
(45) Date of Patent: Apr. 9, 2024

(54) CASSETTE HANDLING APPARATUS AND DRUG HANDLING APPARATUS

(71) Applicant: YUYAMA MFG. CO., LTD., Osaka (JP)

(72) Inventors: Akifumi Tanaka, Osaka (JP); Hidenori Tsuji, Osaka (JP); Satoshi Gotou, Osaka (JP); Hiroshi Ieda, Osaka (JP)

(73) Assignee: YUYAMA MFG. CO., LTD., Osaka (JP)

( * ) Notice: Subject to any disclaimer, the term of this patent is extended or adjusted under 35 U.S.C. 154(b) by 370 days.

(21) Appl. No.: 17/058,649

(22) PCT Filed: Jan. 23, 2020

(86) PCT No.: PCT/JP2020/002398
§ 371 (c)(1),
(2) Date: Nov. 24, 2020

(87) PCT Pub. No.: WO2020/158579
PCT Pub. Date: Aug. 6, 2020

(65) Prior Publication Data
US 2021/0201617 A1    Jul. 1, 2021

(30) Foreign Application Priority Data

Jan. 31, 2019 (JP) .................................. 2019-015421
Oct. 16, 2019 (JP) .................................. 2019-189578
Dec. 27, 2019 (JP) .................................. 2019-238859

(51) Int. Cl.
*G07F 17/00* (2006.01)
*B65B 5/10* (2006.01)
*G07F 11/16* (2006.01)

(52) U.S. Cl.
CPC .......... *G07F 17/0092* (2013.01); *B65B 5/105* (2013.01); *G07F 11/165* (2013.01)

(58) Field of Classification Search
CPC .... G07F 11/62; G07F 11/165; G07F 11/1657; G07F 17/0092; G16H 20/13; G16H 40/20
See application file for complete search history.

(56) References Cited

U.S. PATENT DOCUMENTS 11,267,651 B2 *   3/2022   Fosnight ............... B65G 1/0464
2004/0031574 A1   2/2004   Gambarelli et al.
(Continued)

FOREIGN PATENT DOCUMENTS

CN          1938204 A      3/2007
CN        102159171 A      8/2011
(Continued)

OTHER PUBLICATIONS

Written Opinion in PCT/JP2020/002398, dated Mar. 24, 2020, 15pp.
(Continued)

*Primary Examiner* — Timothy R Waggoner
(74) *Attorney, Agent, or Firm* — HAUPTMAN HAM, LLP

(57) ABSTRACT

A main unit includes a cassette shelf, at least one transporting cassette holder that temporarily holds a cassette removed from the cassette shelf and to be transported to a drug receiver, at least one returning cassette holder that temporarily holds the cassette received from the drug receiver and to be returned to the cassette shelf, and a main cassette transporter that transports the cassette between the cassette shelf and the at least one transporting cassette holder, and between the cassette shelf and the at least one returning cassette holder.

8 Claims, 53 Drawing Sheets

(56) References Cited

U.S. PATENT DOCUMENTS

| | | |
|---|---|---|
| 2007/0157551 A1 | 7/2007 | Yuyama et al. |
| 2007/0212202 A1 | 9/2007 | Koike et al. |
| 2008/0264967 A1* | 10/2008 | Schifman ............ G07F 17/0092 221/133 |
| 2011/0173926 A1 | 7/2011 | Yuyama et al. |
| 2013/0092702 A1* | 4/2013 | Holmes .................. G07F 11/60 221/191 |
| 2015/0190312 A1 | 7/2015 | Yuyama et al. |
| 2015/0225101 A1 | 8/2015 | Van Wijngaarden |
| 2016/0214796 A1 | 7/2016 | Stefani et al. |
| 2016/0367443 A1 | 12/2016 | Hellenbrand |
| 2019/0047736 A1 | 2/2019 | Van Wijngaarden |
| 2019/0210802 A1 | 7/2019 | Ueda et al. |
| 2019/0254929 A1 | 8/2019 | Hellenbrand |
| 2021/0024237 A1 | 1/2021 | Van Wijngaarden |
| 2021/0201617 A1 | 7/2021 | Tanaka et al. |

FOREIGN PATENT DOCUMENTS

| | | | |
|---|---|---|---|
| CN | 104955732 A | 9/2015 | |
| CN | 105188638 A | 12/2015 | |
| CN | 109204902 A | 1/2019 | |
| EP | 1400932 A1 * | 3/2004 | ............ G07F 11/165 |
| JP | H480105 A | 3/1992 | |
| JP | 2001258996 A | 9/2001 | |
| JP | 2005211540 A | 8/2005 | |
| JP | 2007215575 A | 8/2007 | |
| JP | 201178599 A | 4/2011 | |
| JP | 201179642 A | 4/2011 | |
| JP | 2013173580 A | 9/2013 | |
| JP | 5725373 B2 | 5/2015 | |
| JP | 2016536236 A | 11/2016 | |
| JP | 2018143769 A | 9/2018 | |
| JP | 6424217 B2 | 11/2018 | |
| WO | 2011049167 A1 | 4/2011 | |
| WO | 2014112221 A1 | 7/2014 | |
| WO | 2016047487 A1 | 3/2016 | |
| WO | 2017141951 A1 | 8/2017 | |
| WO | 2020158579 A1 | 8/2020 | |

OTHER PUBLICATIONS

International Search Report in PCT/JP2020/002398, dated Mar. 24, 2020. 5pp.
Office Action in JP Application No. 2021-120999, dated May 10, 2022, 8pp.
Office Action in TW Application No. 109102421, dated Dec. 20, 2022, 17pp.
Office Action in CN Application No. 202080003493.8 dated Dec. 26, 2022, 15 pp.
Office Action in JP Application No. 2023-062281 dated Dec. 5, 2023, 4pp.
Office Action in JP Application No. 2023-173826, dated Oct. 31, 2023, 7pp.
Office Action in JP Application No. 2023-173827, dated Oct. 31, 2023, 5pp.

* cited by examiner

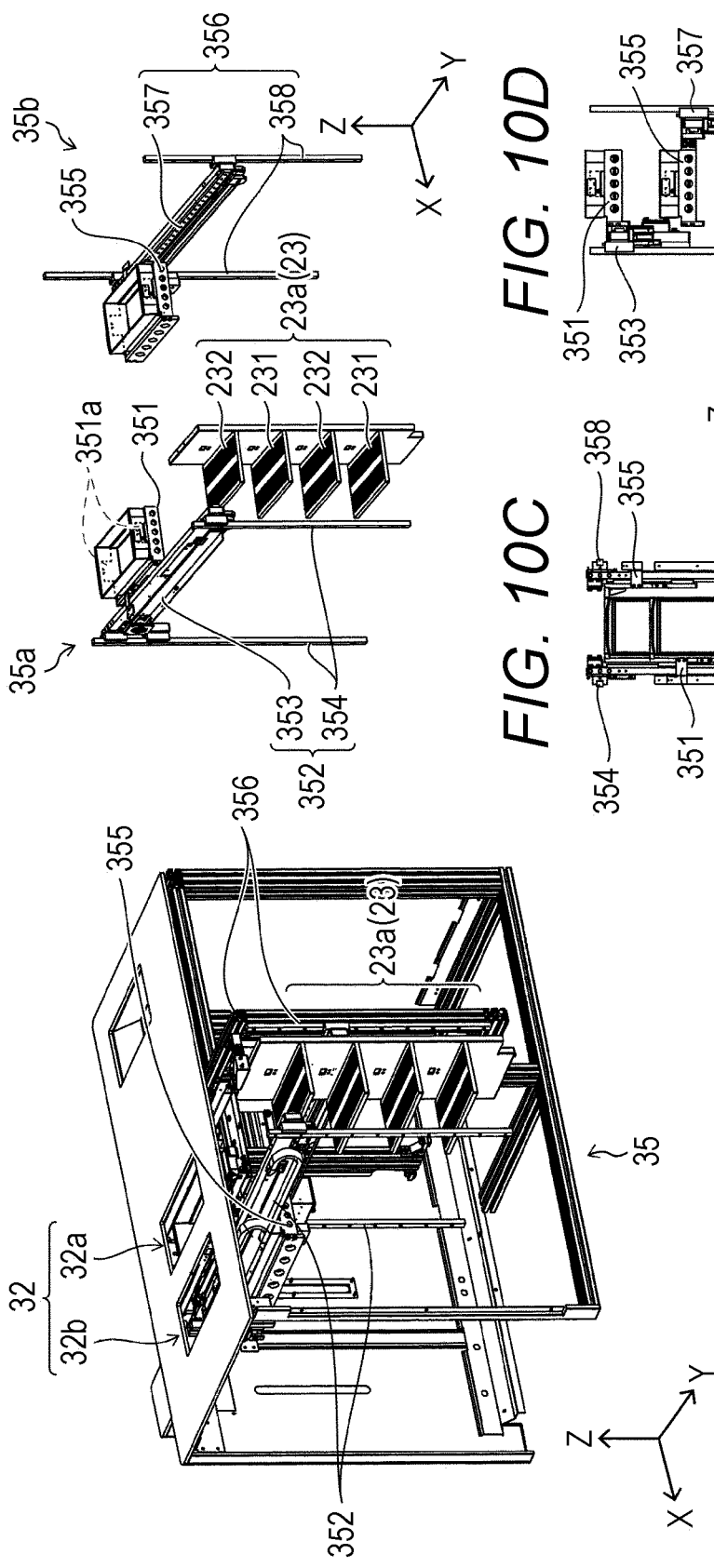
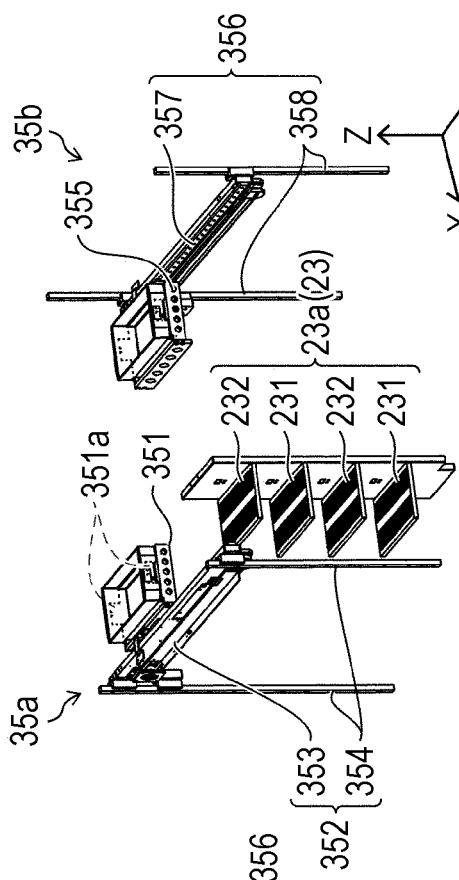
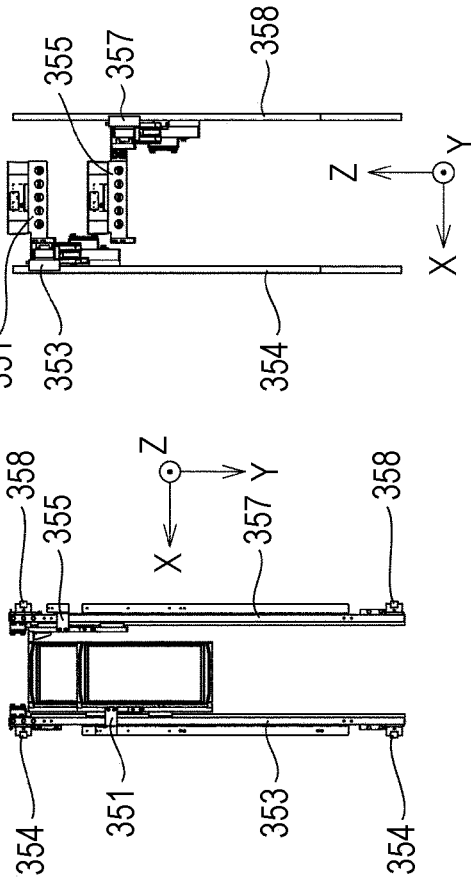

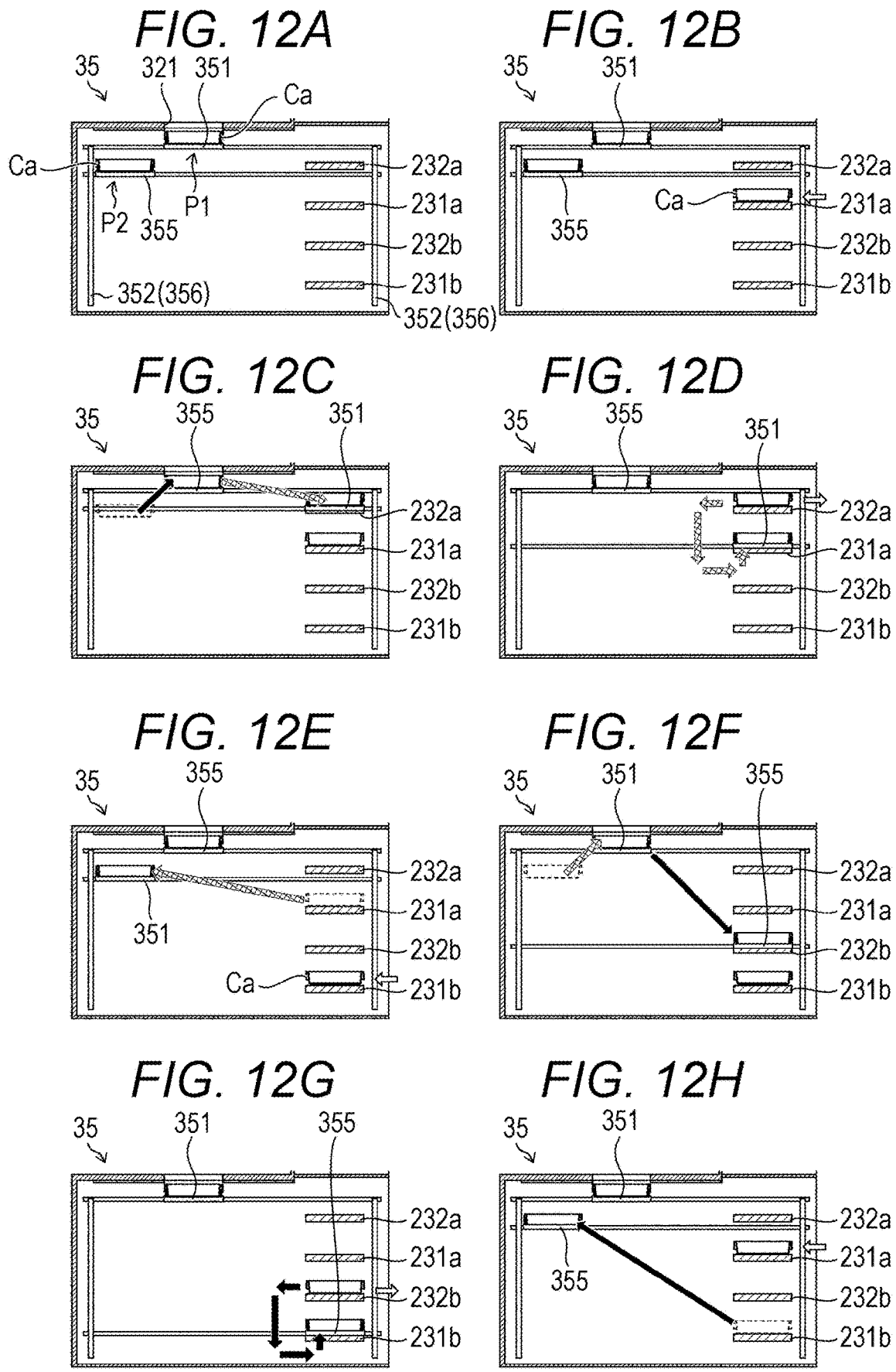

FIG. 18

| Call No. | Drug | Drug form | Total quantity | Patient | Completion time (min:sec) | Status |
|---|---|---|---|---|---|---|
| 10 | Tablet XXX | Tablet | 120 | | 9:30 | |
| 9 | Cream XX | Cream | 10 | | 9:00 | |
| 8 | Tablet YYY | Tablet | 180 | | 7:00 | |
| 7 | Tablet ZZZ | Tablet | 90 | | 6:30 | |
| 6 | Granular YY | Powder | 21 | | 6:00 | |
| 5 | Powder XX | Powder | 21 | | 5:30 | Interrupt |
| 4 | Tablet WWW | Tablet | 12 | | 4:00 | |
| 3 | Cream WWW | Cream | 3 | | 3:50 | |
| 2 | XX | Tablet | 42 | | 3:00 | Out of stock |
| Next | Tablet XXY 2.5 mg | Tablet | 42 | | 1:00 | |

To be picked 50    Picked 21

Dispensing list    Picking list

Next drug: Tablet XXY 2.5 mg
Next cassette: 100   Inventory 5
Family cassette
Inventory in shelf  600
Cassette No. | Inventory
100 | 50
101 | 100
102 | 150
103 | 200

Automated dispensing — Prescribed drugs will be dispensed automatically.

A111 Automated dispensing
A112 Selected dispensing
A113 Loading
A114 View statistics/log
A115 Master profile

○ Log view  Log can be viewed.

📄 Loading indication.

🔍 Search by | Section: all | Patient: XXX | Operator: YYY | ↻ Dispensing | (R) test name ▼ | ⚙ Settings | ⏻ End Show search conditions ▶

| Date/time | Section | Dispense No. | Cassette No. | Sub-No. | Drug | Picking/loading | Patient | Action | Operator | |
|---|---|---|---|---|---|---|---|---|---|---|
| 19/05/05 | Dispense | 201912150001 | 202 | 1 | | | | | | |
| 19/05/05 | Dispense | 201912150001 | 202 | 1 | Drug B | 500 | | Dispensing cancelled | x x x   x x x | Details |
| 19/05/05 | Dispense | 201912150001 | 202 | 1 | Drug B | 500 | | Dispensing cancelled | x x x   x x x | Details |
| 19/05/05 | Dispense | 201912150001 | 202 | 1 | Drug B | 500 | | Dispensing cancelled | x x x   x x x | Details |
| 19/05/05 | Dispense | 201912150001 | 202 | 1 | Drug B | 500 | | Dispensing cancelled | x x x   x x x | Details |
| 19/05/05 | Dispense | 201912150001 | 202 | 1 | Drug B | 500 | | Dispensing cancelled | x x x   x x x | Details |
| 19/05/05 | Dispense | 201912150001 | 202 | 1 | Drug B | 500 | | | | |

Generate list

- Automated dispensing
- Selected dispensing
- Loading
- View statistics/log
- Master profile FIG. 23
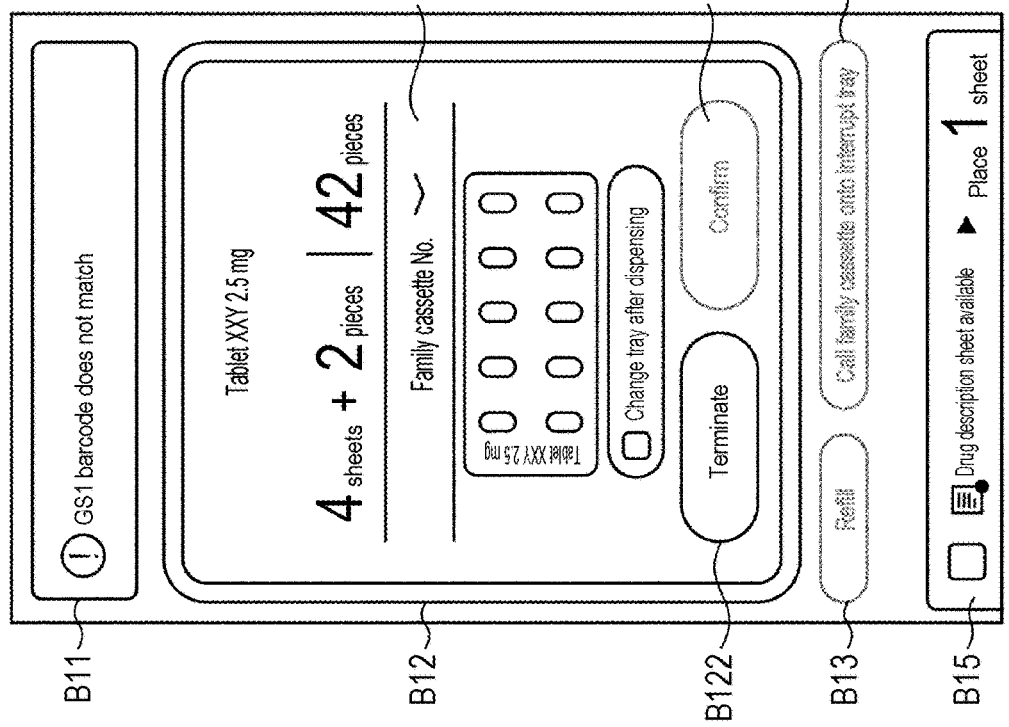
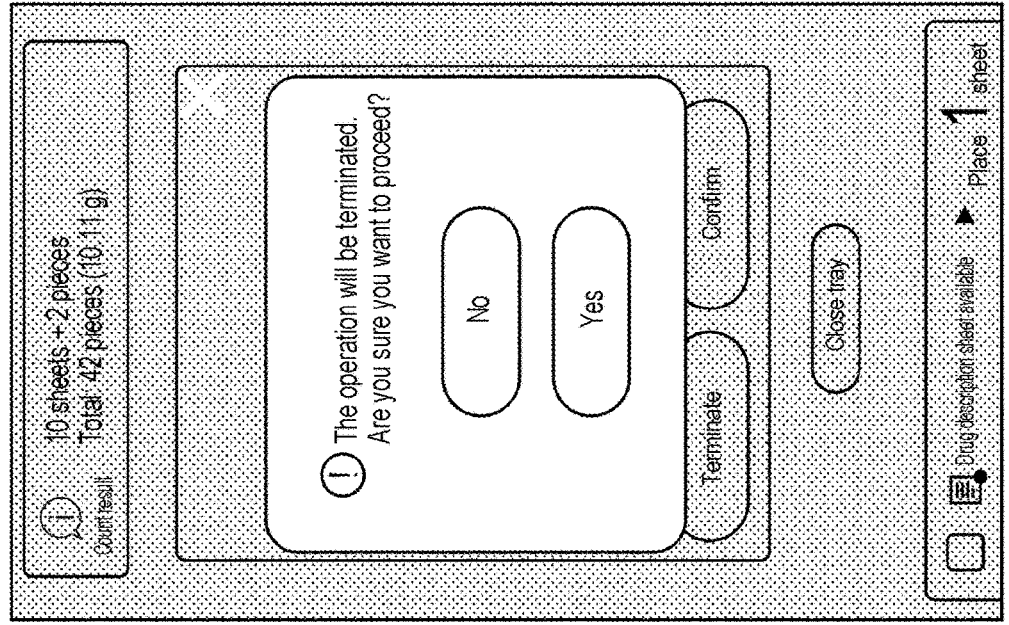

◉ Emergency dispensing

ⓘ Select drug(s) and press add button to add to and create dispensing list

C111 — All
C112 — 🔍 Enter drug name for search
         A  B  C  D  E  F  G  H  I  J  ...

C113 —
| Cassette No. | Sub-No. | Drug | Reference inventory value | Inventory | Inventory in shelf | Lot / Expiry date |
|---|---|---|---|---|---|---|
| 100 | 1 | Tablet XXX | 100 | 24 | 200 | 1234567890 / '19/10/20 |
| 101 | 1 | Tablet YYY | 100 | 24 | 200 | 1234567890 / '19/10/20 |
| 102 | 1 | Granular YY | 100 | 24 | 200 | 1234567890 / '19/10/20 |
| 103 | 1 | Tablet XXY 2.5 mg | 100 | 24 | 200 | 1234567890 / '19/10/20 |
| 104 | 1 | Tablet WWW | 100 | 24 | 200 | 1234567890 / '19/10/20 |
| 105 | 1 | XX | 100 | 24 | 200 | 1234567890 / '19/10/20 |
| 106 | 1 | YZX | 100 | 24 | 200 | 1234567890 / '19/10/20 |

C114 — ( Add to dispensing list )

C11

C12 — Dispensing List
C121 —
| Cassette No. | Sub-No. | Drug | Quantity | |
|---|---|---|---|---|
| 100 | 1 | Tablet XXX | 42 | ⊗ |
| 101 | 1 | Tablet YYY | Undefined | ⊗ |
| 102 | 1 | Granular YY | Undefined | ⊗ |
| 103 | 1 | Tablet XXY 2.5 mg | Undefined | ⊗ |
| 104 | 1 | Tablet WWW | Undefined | ⊗ |
| 105 | 1 | XX | Undefined | ⊗ |
| 106 | 1 | YZX | Undefined | ⊗ |
| 107 | 1 | Tablet ZWZ | Undefined | ⊗ |
| 108 | 1 | Tablet YZZ | Undefined | ⊗ |

Total quantity ( 42 )    ( Set ) C123
( Clear all ) C124        ( Output journal ) A125
C122

End ⏻

FIG. 39
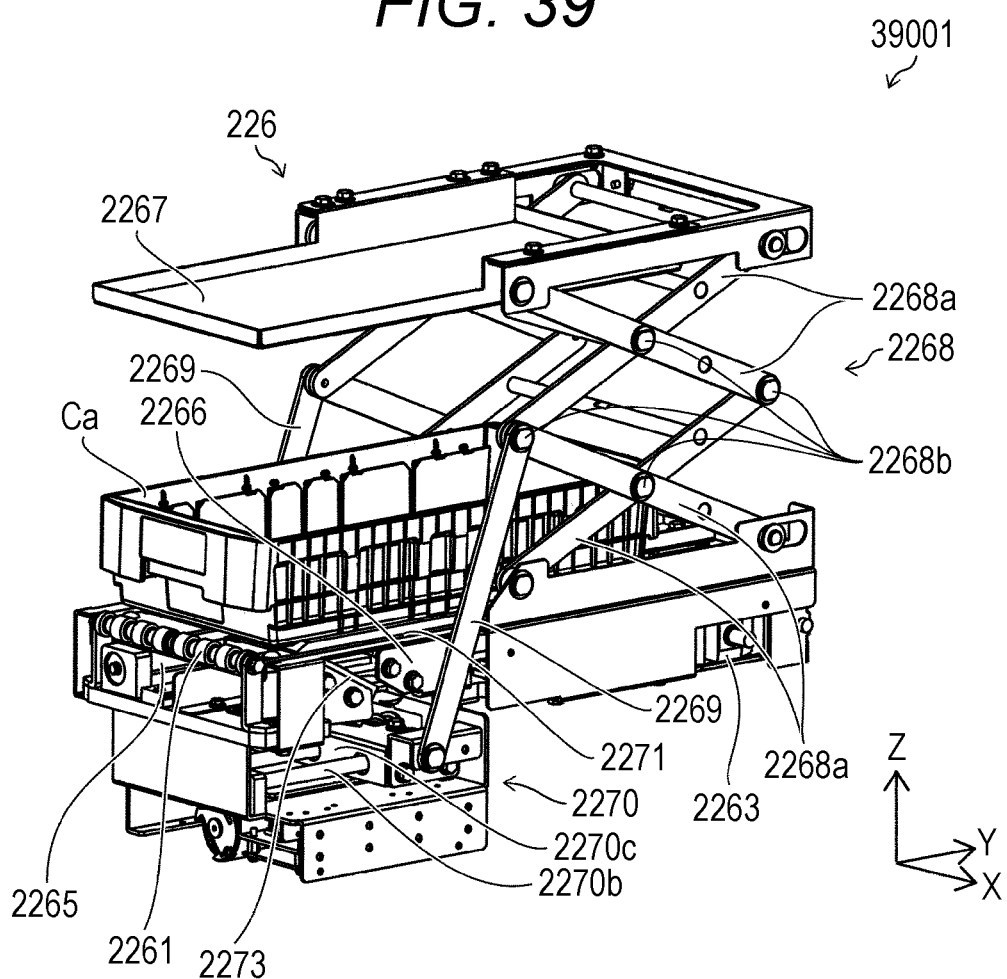
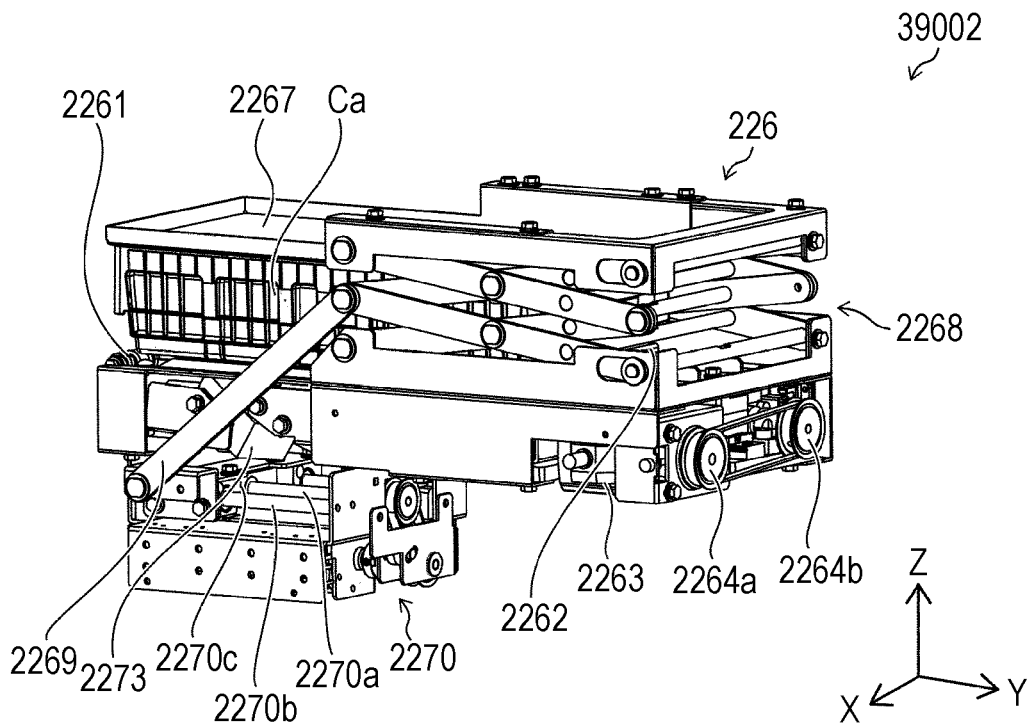

FIG. 40
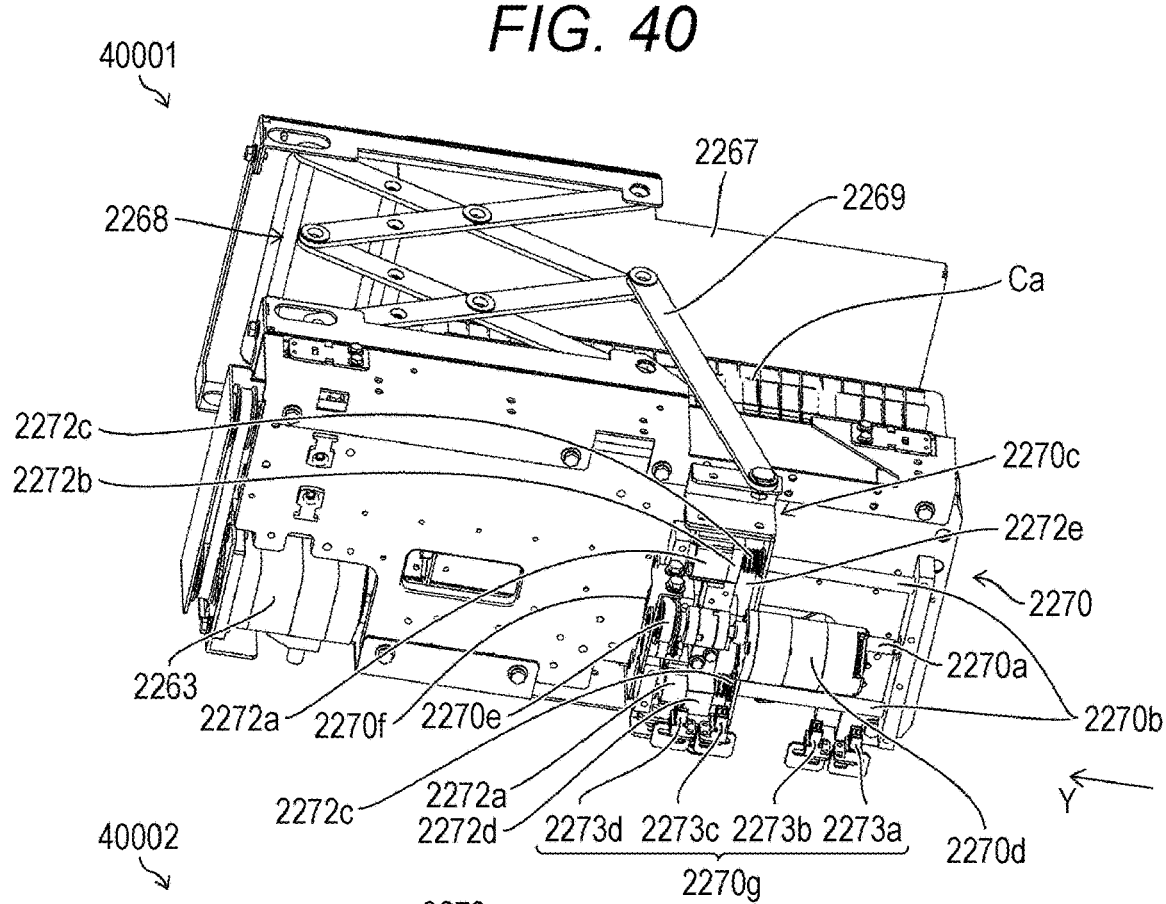
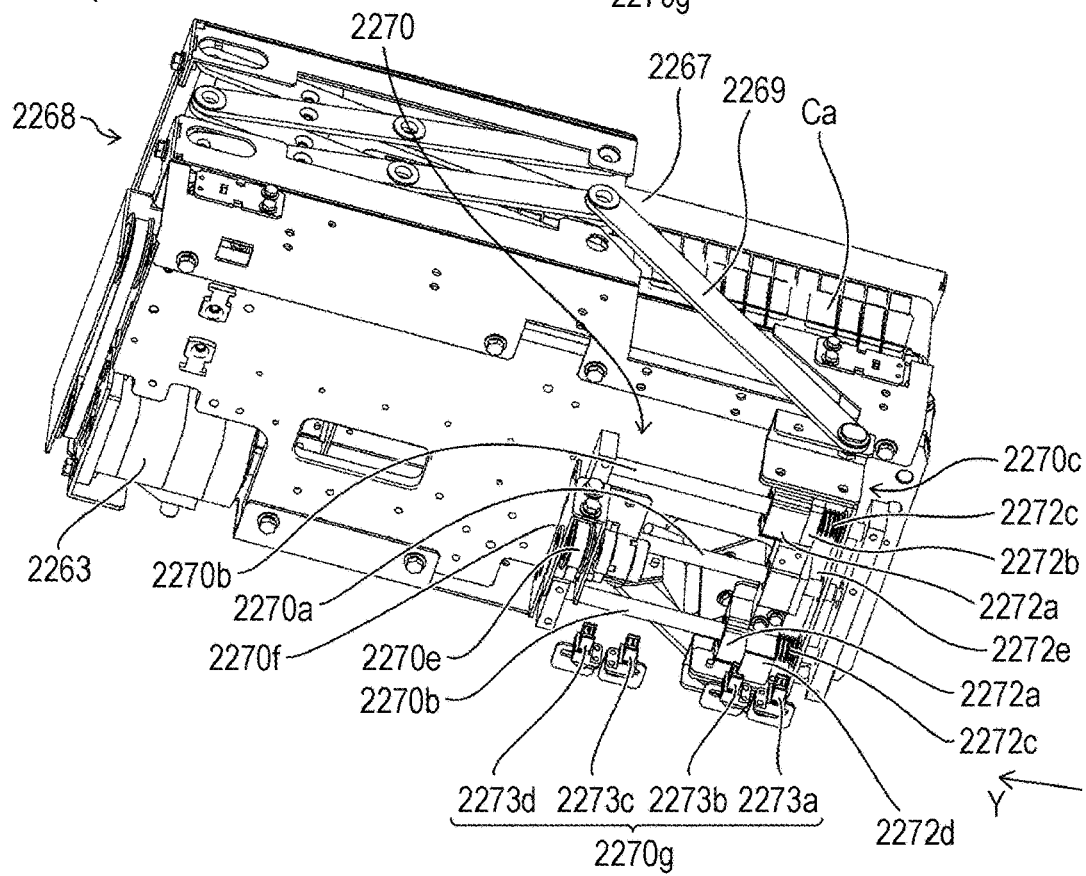

FIG. 41
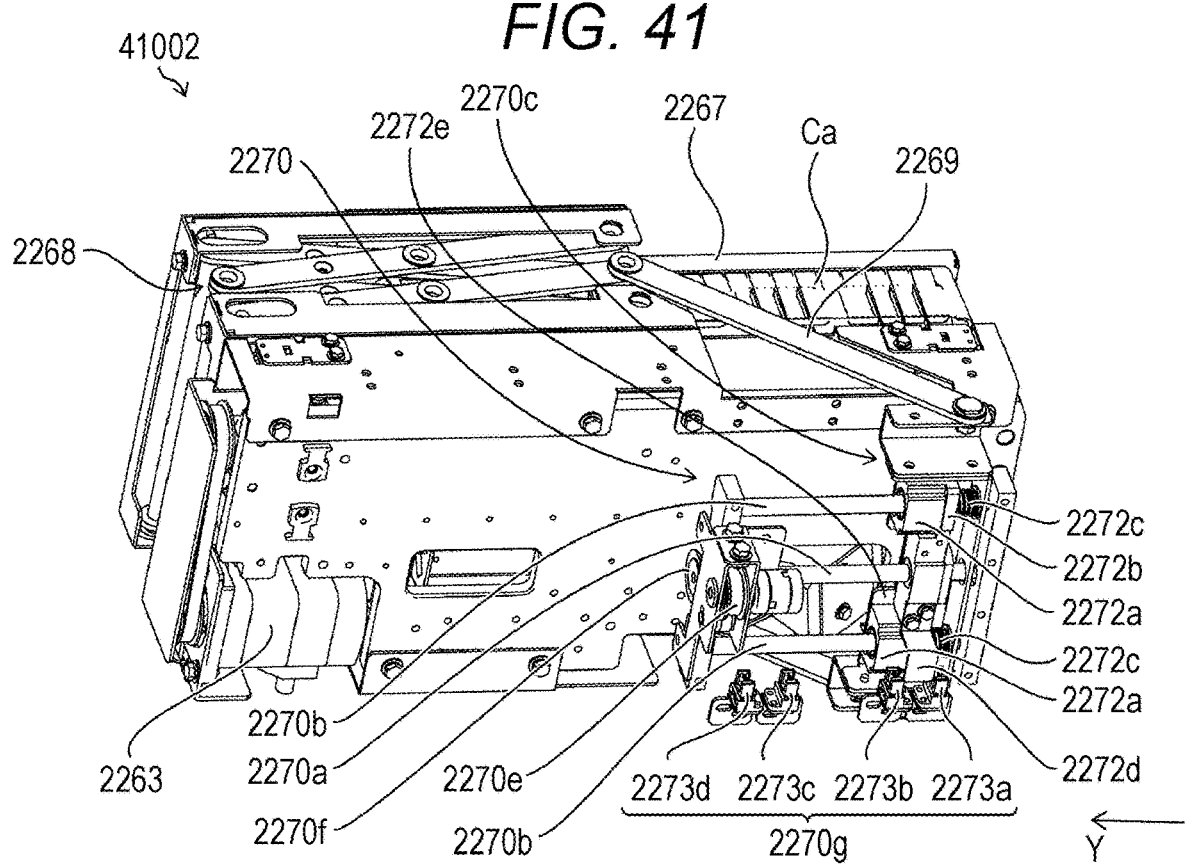
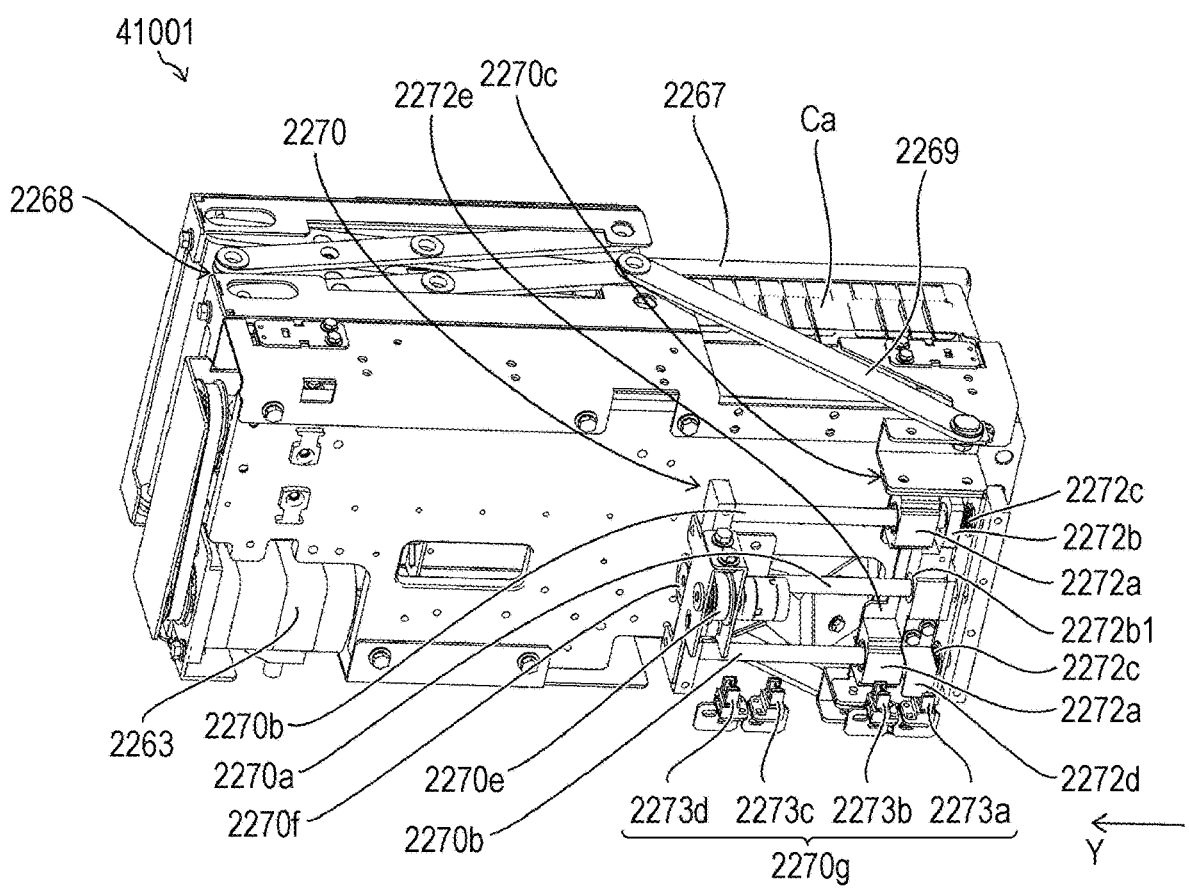

FIG. 42
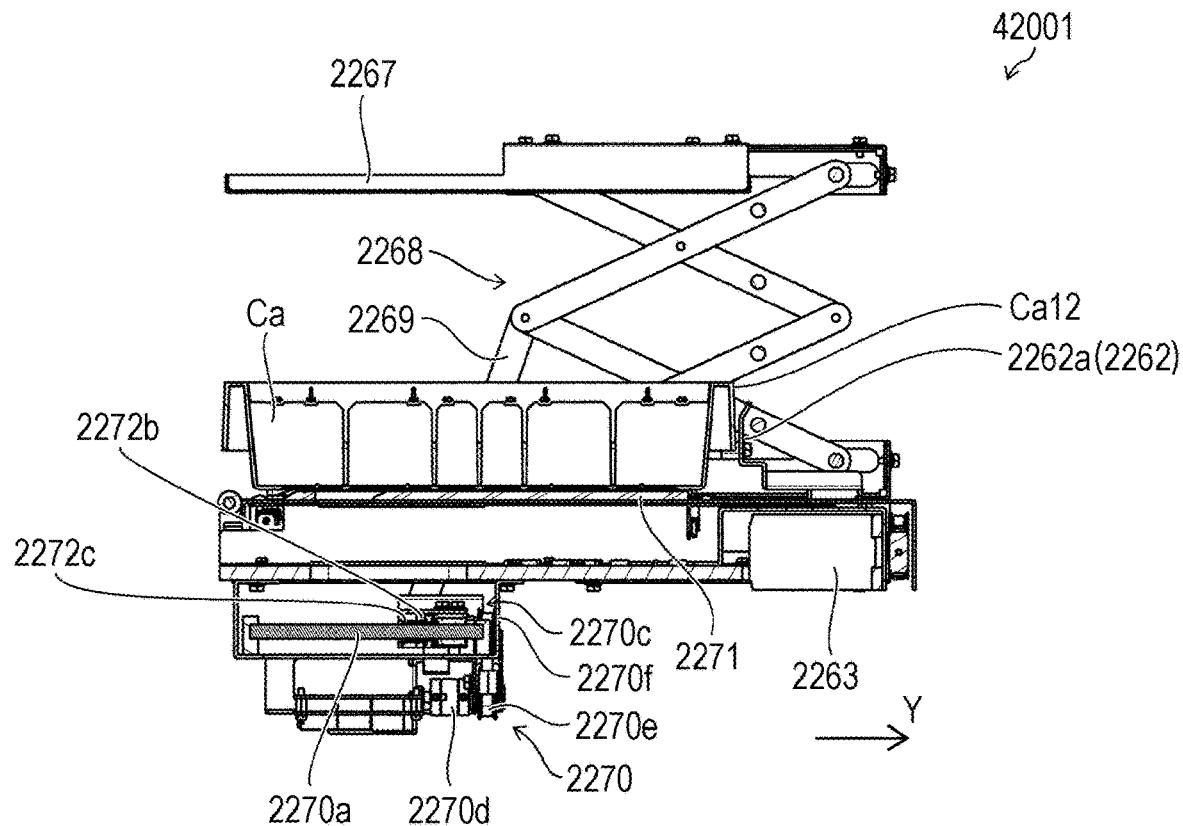
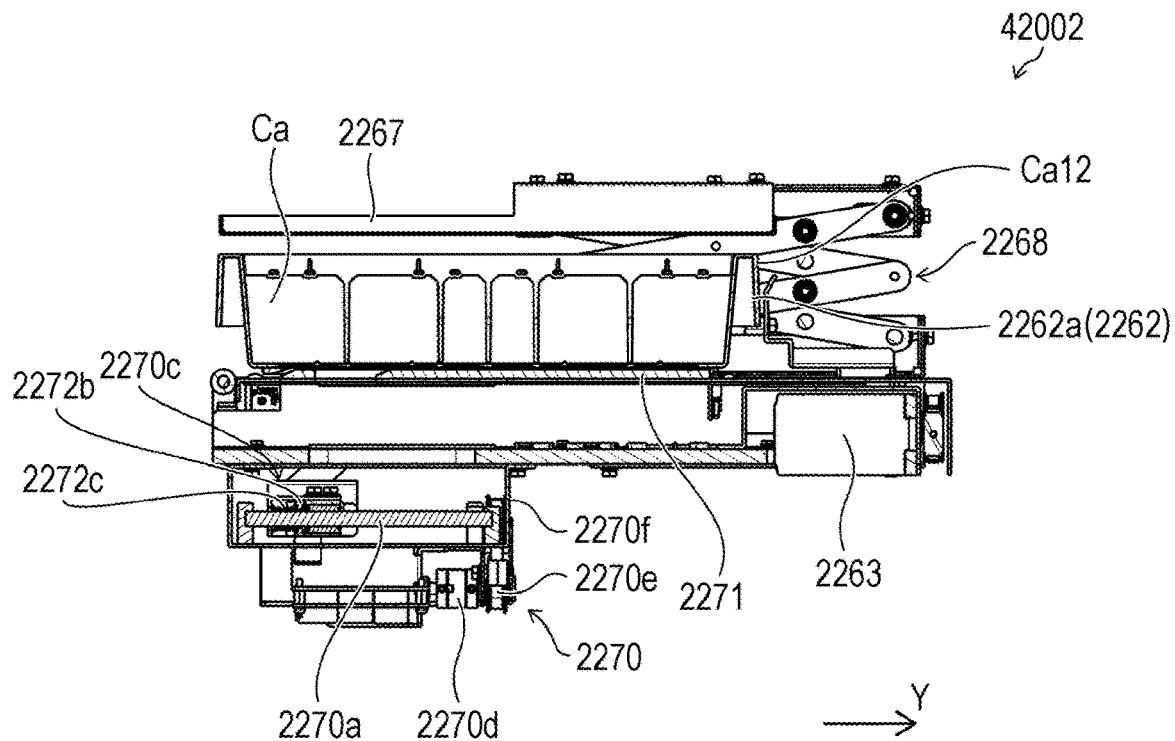

FIG. 43
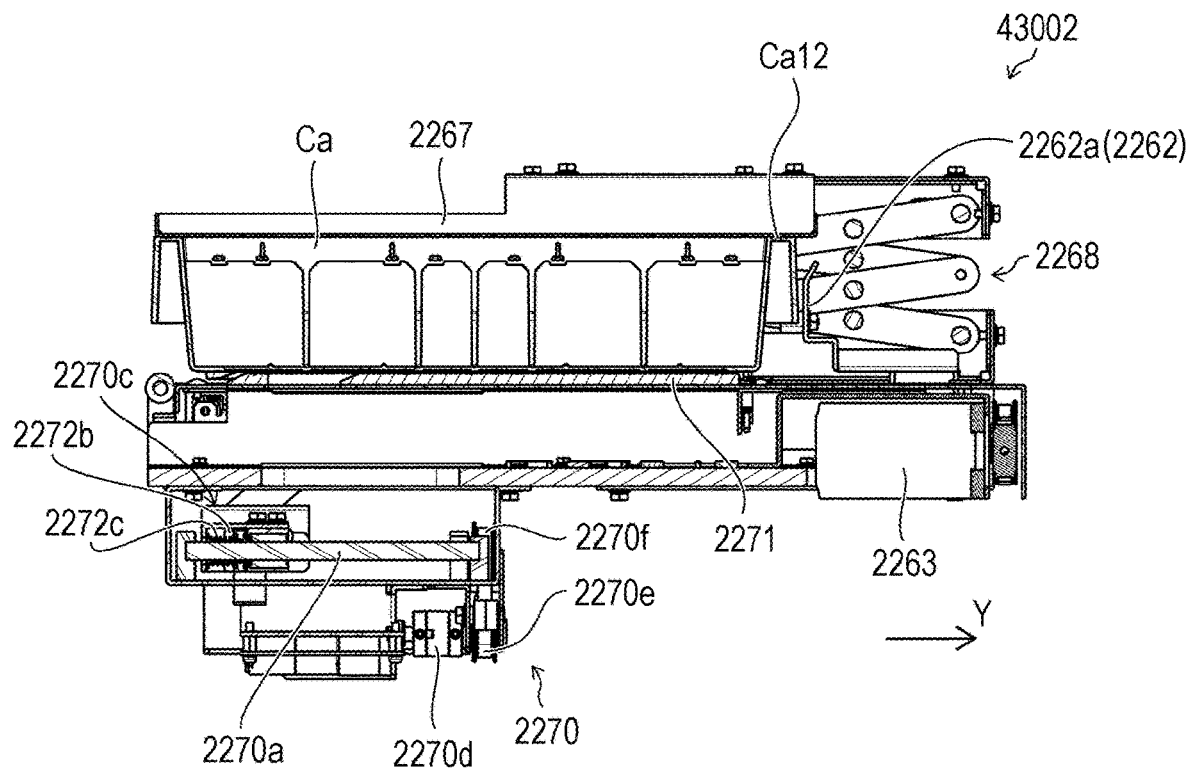
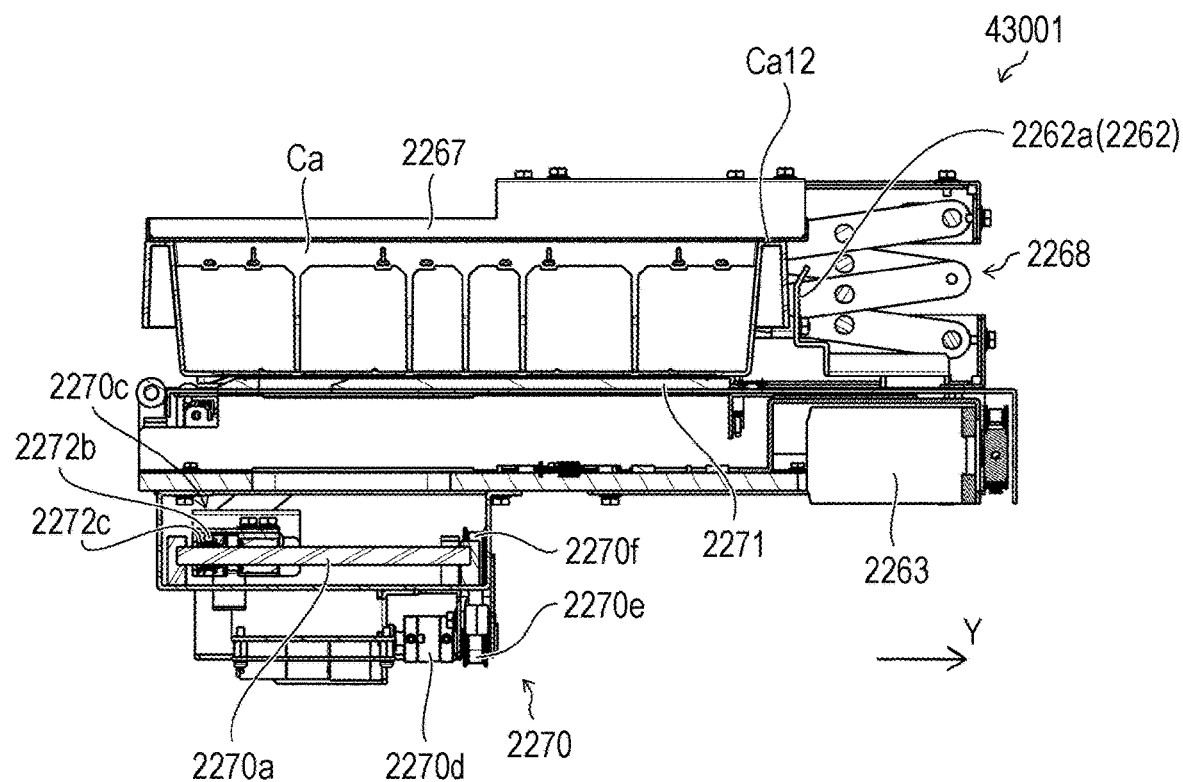

FIG. 50

| Call No. | Patient | Status | Waiting time | Drug number | Other machine preparation |
|---|---|---|---|---|---|
| 10 | Mr./Ms. | Entry received | 30 min | 1 | |
| 9 | Mr./Ms. | Entry received | 30 min | 1 | |
| 8 | Mr./Ms. | Entry received | 24 min | 1 | |
| 7 | Mr./Ms. | Call No. changed | 23 min | 1 | |
| 6 | Mr./Ms. | Entry received | 22 min | 1 | |
| 5 | Mr./Ms. | Cancelled | 20 min | 2 | Narc × |
| 4 | Mr./Ms. | To be dispensed | 15 min | 1 | Packed ○ Powder × |
| 3 | Mr./Ms. | To be dispensed | 15 min | 2 | |
| 2 | Mr./Ms. | Dispensing | 10 min | 1 | Liquid ○ |
| 1 | Mr./Ms. | | | | |

FIG. 53

CASSETTE HANDLING APPARATUS AND DRUG HANDLING APPARATUS

RELATED APPLICATIONS

The present application is a National Phase of International Application No. PCT/JP2020/002398 filed Jan. 23, 2020, which claims priority to Japanese Application Nos. 2019-015421 filed Jan. 31, 2019, 2019-189578 filed Oct. 16, 2019 and 2019-238859 filed Dec. 27, 2019.

FIELD

The present invention relates to, for example, a cassette handling apparatus and a drug handling apparatus.

BACKGROUND

Drug dispensers for dispensing drugs have been developed, including those described in Patent Literatures 1 and 2.

A drug dispenser described in Patent Literature 1 removes one or more drug sheets from a drug storage cassette transported from a cassette shelf to a transporter, and moves a drug tray to a position to receive the drug sheets. This drug dispenser shortens the total time taken to dispense drug sheets.

An automated drug feeder described in Patent Literature 2 includes a drug picking unit with multiple receptacles for drug storage cassettes transported from a cassette shelf. Each receptacle has a drug slot through which a drug is removed or placed, and a cover to open and close the drug slot. This automated drug feeder is controlled to open the cover of any receptacle receiving a drug storage cassette, thus allowing an intended drug to be removed correctly from multiple storage cassettes received in the drug picking unit.

Patent Literature 3 describes a method for transporting a medication package from a first receiving place within an area accessible to an operator unit to a dispensing place within an area accessible to an operator, and also for transporting the medication package from a refilling place within the area accessible to the operator to a second receiving place within the area accessible to the operator unit.

CITATION LIST

Patent Literature

Patent Literature 1: WO 2016/047487
Patent Literature 2: Japanese Unexamined Patent Application Publication No. 2011-79642
Patent Literature 3: Japanese Patent No. 6424217

BRIEF SUMMARY

Technical Problem

The drug dispenser described in Patent Literature 1 allows operations from removing a drug storage cassette through dispensing drug sheets onto a drug tray without involving manual operations. The drug dispenser described in Patent Literature 1 thus cannot respond to manual operations for dispensing drug sheets. The automated drug feeder described in Patent Literature 2 is not directed to placing a drug storage cassette efficiently in a single receptacle for preventing erroneous removal of a drug. The method described in Patent Literature 3 is used for transporting a medication package, rather than for transporting a cassette to store a medication package.

One or more aspects of the present invention are directed to a cassette handling apparatus or a drug handling apparatus that delivers a cassette efficiently to a user who removes or loads a drug from or into the cassette.

Solution to Problem

In response to the above issue, a cassette handling apparatus according to one aspect of the present invention transports and receives a cassette to and from a drug handling apparatus including a drug receiver that removes a drug from a cassette or loads a drug into the cassette. The cassette handling apparatus includes a cassette shelf that stores a plurality of cassettes, at least one transporting cassette holder that temporarily holds a cassette removed from the cassette shelf and to be transported to the drug receiver, at least one returning cassette holder that temporarily holds the cassette received from the drug receiver and to be returned to the cassette shelf, and a cassette transporter that transports the cassette between the cassette shelf and the at least one transporting cassette holder, and between the cassette shelf and the at least one returning cassette holder.

A drug handling apparatus according to another aspect of the present invention includes a drug receiver that removes a drug from a cassette or loads a drug into the cassette, and a cassette transporter that transports, to the drug receiver, a first cassette from which a drug is to be removed or into which a drug is to be loaded, and transports, in response to the first cassette being transported to the drug receiver, a second cassette from which a drug is to be removed or into which a drug is to be loaded following the first cassette to a standby position adjacent to the drug receiver at which the second cassette is to be on standby.

Advantageous Effects

The cassette handling apparatus and the drug handling apparatus according to the aspects of the present invention deliver a cassette efficiently to a user who removes or places a drug from or onto the cassette.

BRIEF DESCRIPTION OF DRAWINGS

FIG. 10A is a perspective view of an example picking cassette transporter as viewed from the main unit, FIG. 10B is a perspective view of an example first picking cassette transporter and an example second picking cassette transporter included in the picking cassette transporter, FIG. 10C is a plan view of the example first picking cassette transporter and the example second picking cassette transporter as viewed from a worktable, and FIG. 10D is a view of the example first picking cassette transporter and the example second picking cassette transporter as viewed from the main unit.

FIGS. 12A to 12H are diagrams each describing an example operation of the first picking cassette transporter and an example operation of the second picking cassette transporter.

FIG. 18 is a diagram of another example automated dispensing screen image.

FIG. 21 is a diagram of an example log view screen image.

FIG. 23 is a diagram of example screen images appearing on the second touchscreen.

FIG. 30 is a diagram of an example screen image appearing on the tablet terminal.

FIG. 39 is a perspective view of an example cassette gripper.

FIG. 40 is a perspective view of an example drive for the cassette gripper viewed from below.

FIG. 41 is a perspective view of the example drive for the cassette gripper viewed from below.

FIG. 42 is a cross-sectional view of the cassette gripper describing an example operation of a lid for the cassette gripper.

FIG. 43 is a cross-sectional view of the cassette gripper describing an example operation of the lid for the cassette gripper.

FIG. 50 is a diagram of another example automated dispensing screen image.

FIG. 53 is a diagram of still another example first confirmation screen image and still another example description screen image.

DETAILED DESCRIPTION

First Embodiment

Structure of Drug Station 1

Figure 1:
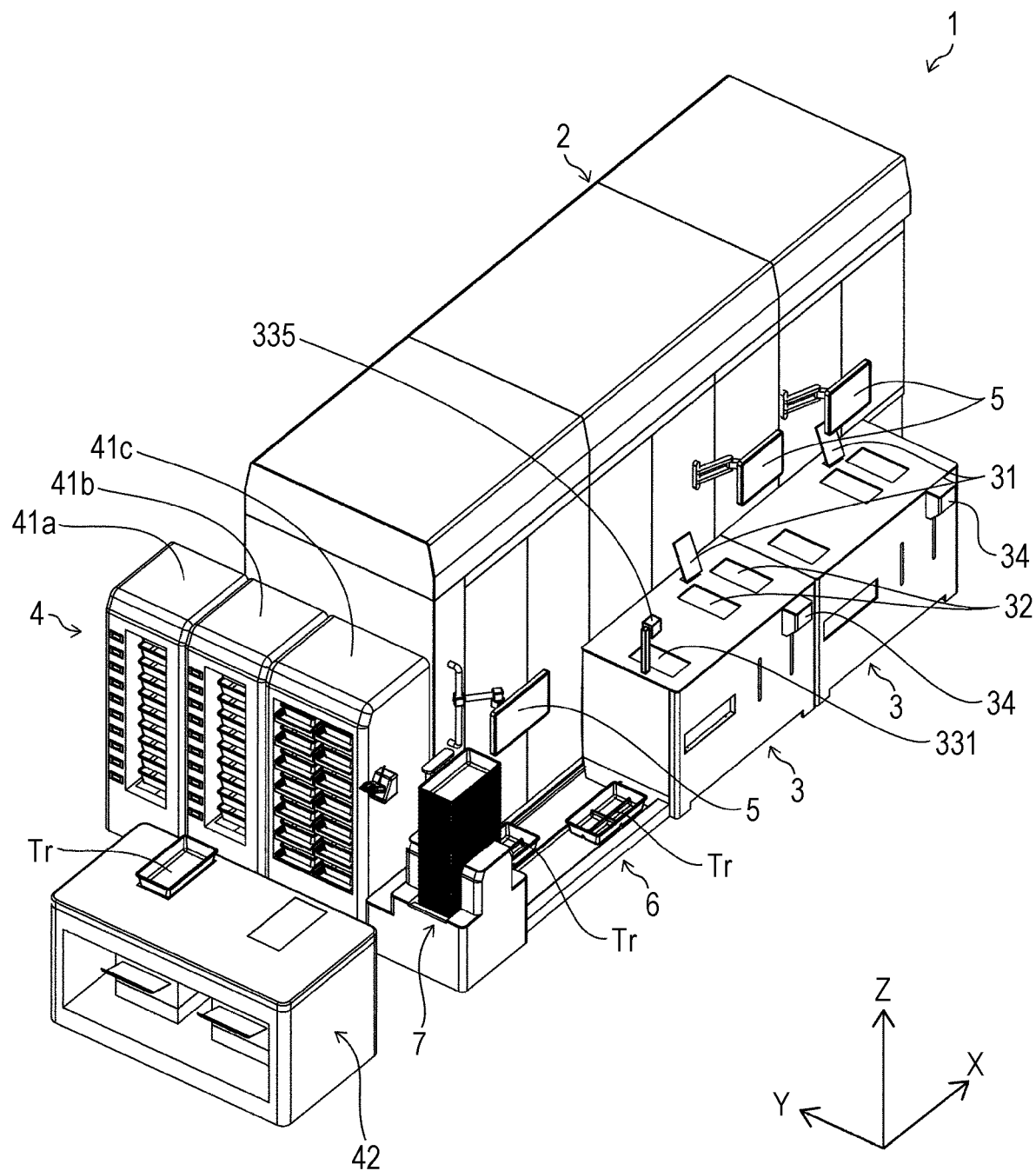
FIG. 1 is a perspective view of a drug station showing its example structure.

The structure of a drug station 1 according to one embodiment will now be described with reference to FIG. 1. FIG. 1 is a perspective view of a drug station 1 according to the present embodiment showing its example structure.

The drug station 1 is a drug management system for storing drug sheets, loading and dispensing drug sheets, and inspecting the dispensed drug sheets. As shown in FIG. 1, the drug station 1 includes a main unit 2, picking units 3, an inspection unit 4, a first touchscreen 5, a tray transporter 6, and a tray storage 7.

The main unit 2 stores drug sheets. More specifically, the main unit 2 functions as a drug shelf for storing multiple cassettes Ca containing drug sheets (refer to FIGS. 3A to 3D). The main unit 2 includes a main cassette transporter 22 (cassette transporters 22a and 22b in FIG. 4B) that transports stored cassettes Ca to each picking unit 3 and also transports cassettes Ca received from each picking unit 3 to their previous storage positions. In other words, the main unit 2 functions as a cassette handling apparatus that transports and receives cassettes Ca to and from each picking unit 3.

The main unit 2 can store as many different types of drug sheets as expected to be used in a single facility, such as a hospital or a pharmacy (e.g., about 1,500 to 2,000 different types of drug sheets). In the present embodiment, the main unit 2 stores drugs in drug sheets (e.g., press through packs or PTP sheets) but may store drugs in other forms. The main unit 2 may store drugs in any other forms storable in the main unit 2, such as creams or eyedrops.

The picking units 3 dispense drug sheets stored in the main unit 2. For dispensing drug sheets, each picking unit 3 allows a user to perform a picking operation of picking drug sheets. Each picking unit 3 also allows a user to perform a loading operation of loading drug sheets into the main unit 2. In other words, each picking unit 3 functions as an apparatus for allowing a user to remove drug sheets from cassettes Ca stored in the main unit 2 or to load drug sheets into cassettes Ca (or a drug handling apparatus that allows a user to handle drug sheets).

Each picking unit 3 includes a second touchscreen 31, drug receivers 32, a drug port 331, and an image sensor 335. Each picking unit 3 transports a cassette Ca transported from the main unit 2 to the drug receiver 32 using a picking cassette transporter 35 (cassette transporter; refer to FIGS. 10A to 10D). The user removes a drug sheet from the cassette Ca transported to the drug receiver 32 while checking the information on the second touchscreen 31, and then places the drug sheet into the drug port 331. The placed drug sheet then undergoes image capturing performed by the image sensor 335, and then is dispensed (or placed) onto a transportation tray Tr, which is then transported to the inspection unit 4 by the tray transporter 6.

Each picking unit 3 also includes a barcode reader 34. The barcode reader 34 reads a barcode (e.g., a GS1 barcode) on a drug sheet during a loading operation. Each picking unit 3 has the barcode reader 34 on its side wall to avoid interfering with an operation performed by a user at a worktable 36 (refer to FIG. 9). Each picking unit 3 may include any reader that can read drug identification information for identifying a drug sheet.

The inspection unit 4 allows a user (a qualified user such as a pharmacist) to conduct a final inspection on drug sheets dispensed from the main unit 2. The inspection unit 4 includes a first storage shelf 41a, a second storage shelf 41b, a third storage shelf 41c, and an inspection base 42. A transportation tray Tr transported from the tray transporter 6 is stored into the first storage shelf 41a or into the second storage shelf 41b.

The first storage shelf 41a receives and stores, for prescription data prescribing drugs to be administered to a single patient (hereafter simply referred to as prescription data), a transportation tray Tr onto which all the drug sheets indicated by the prescription data have been dispensed from the main unit 2. The second storage shelf 41b receives and stores a transportation tray Tr onto which some of the drug sheets indicated by prescription data have been dispensed from the main unit 2 (for the prescription data prescribing other drugs not stored in the main unit 2). A user separately places drugs not stored in the main unit 2 (e.g., powdered drugs or liquid drugs) onto a transportation tray Tr. The transportation tray Tr is then stored into the third storage shelf 41c. More specifically, the third storage shelf 41c receives and stores a transportation tray Tr receiving drugs other than the drug sheets stored in the main unit 2.

The prescription data prescribing drugs to be administered to a single patient herein may refer to any of the data sets (1) to (3) below.
  (1) Data associated with drugs to be administered to a single patient (prescription data for a single patient).
  (2) Data associated with drugs of a single dose to be administered to a single patient (prescription data for a single dose).
  (3) Data associated with a classification allocated to a drug(s) of a single dose to be administered to a single patient (prescription data for a single recipe).

The inspection base 42 allows a user to conduct a final inspection of drug sheets placed onto the transportation tray Tr after the drug sheets are dispensed from the first storage shelf 41a, the second storage shelf 41b, or the third storage shelf 41c. As described above, the transportation tray Tr stored in the first storage shelf 41a has received all drug sheets indicated by prescription data. The user removes the transportation tray Tr from the first storage shelf 41a onto the inspection base 42 and conducts a final inspection on the transportation tray Tr. In contrast, the transportation tray Tr stored in the second storage shelf 41b does not contain all the drug sheets indicated by prescription data. The other drugs indicated by the prescription data are stored in the third storage shelf 41c. The user removes the transportation trays Tr receiving drugs prescribed for the patient from the second storage shelf 41b and from the third storage shelf 41c onto the inspection base 42, and conducts a final inspection on these transportation trays Tr.

The first touchscreen 5 is a display for displaying various items of information associated with the drug station 1, and also functions as an input unit for receiving a user input. In some embodiments, the first touchscreen 5 may function as a display alone. The tray transporter 6 transports transportation trays Tr receiving drug sheets dispensed from each picking unit 3 to the first storage shelf 41a and the second storage shelf 41b in the inspection unit 4. The tray transporter 6 has a protective sheet (e.g., an acrylic sheet) on its top for protecting transportation trays Tr to be transported. The tray storage 7 stores transportation trays Tr.

Example Operation of Drug Station 1

An example operation of the drug station 1 according to the present embodiment will now be described.

Drug Dispensing Operation

Figure 4A:
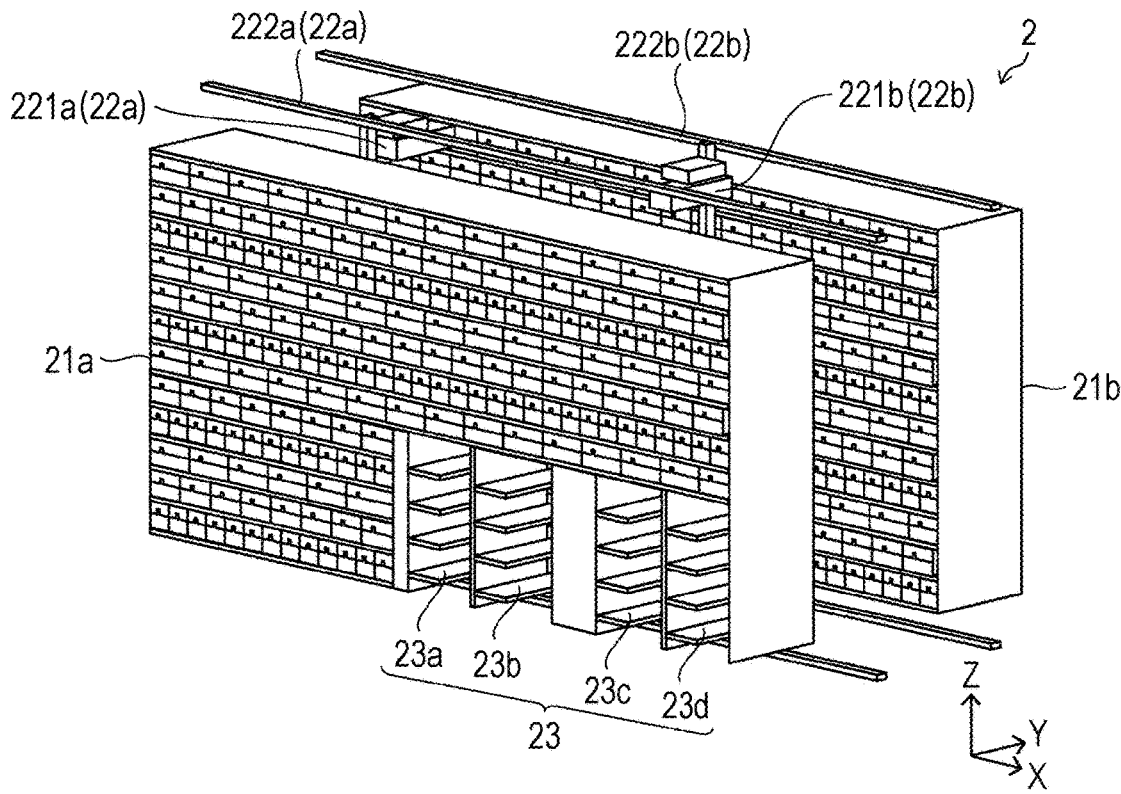
FIG. 4A is a perspective view of an example main unit.

In response to prescription data read into the drug station 1, the main cassette transporter 22 in the main unit 2 grips, selectively from cassettes Ca stored in the main unit 2, a cassette Ca containing drug sheets to be handled (to be dispensed), and places the cassette Ca onto a cassette holder 23 (refer to FIG. 4A).

The cassette Ca placed on the cassette holder 23 is transported by the picking cassette transporter 35 to the drug receiver 32. A user views the second touchscreen 31 and removes a predetermined quantity of drug sheets from the cassette Ca at the drug receiver 32. The user performing this picking operation may not be a qualified user such as a pharmacist.

The user ties the removed drug sheets into a predetermined shape and places the tied drug sheets into the drug port 331. A control unit 10 (refer to FIG. 2) then determines whether the predetermined quantity of drug sheets has been placed based on an image captured by the image sensor 335. More specifically, the control unit 10 determines this based on a count of the drug sheets obtained by a measuring unit 336 (described later) (refer to FIG. 9), in addition to the image captured by the image sensor 335.

The predetermined shape may be, for example, any of the shapes described below. The predetermined shape may not be limited to the examples below, but may be any shape that allows the drug quantity to be determined correctly based on the captured image.
  (1) For a single drug sheet or for multiple drug sheets, the predetermined shape is the planar shape of the single drug sheet or the multiple drug sheets.

(2) For separate drug pieces alone, the predetermined shape is the planar shape of the separate drug pieces (e.g., two drug pieces).

(3) For a single drug sheet or multiple drug sheets to be tied with separate drug pieces, the predetermined shape is the planar shape of the single drug sheet or the multiple drug sheets on which the separate drug pieces are stacked. To dispense, for example, 22 drug pieces in total from drug sheets each containing 10 drug pieces, the predetermined shape is the shape of a stack of two of these drug sheets on which separate two drug pieces are stacked.

In response to determining that a predetermined quantity of drug sheets has been placed, the picking unit 3 dispenses the drug sheets onto a transportation tray Tr. For the transportation tray Tr onto which all the drug sheets indicated by the prescription data are dispensed, the tray transporter 6 transports the transportation tray Tr to the first storage shelf 41a or the second storage shelf 41b in the inspection unit 4.

The user then transports the transportation tray Tr stored in the first storage shelf 41a, the second storage shelf 41b, or the third storage shelf 41c to the inspection base 42. A qualified user such as a pharmacist then conducts a final inspection on the transportation tray Tr.

Drug Loading Operation

A user first inputs, into the drug station 1, drug identification information for identifying drug sheets to be loaded into the main unit 2 using the barcode reader 34. In response to the input drug identification information, the main cassette transporter 22 in the main unit 2 transports, to the cassette holder 23, a loading target cassette Ca based on the drug identification information.

The picking cassette transporter 35 in the picking unit 3 transports the cassette Ca placed on the cassette holder 23 to the drug receiver 32. The user places drug sheets into the cassette Ca transported to the drug receiver 32. In response to completion of the drug sheets placed into the cassette Ca (e.g., the second touchscreen 31 receiving an operation indicating the completion), the picking cassette transporter 35 transports the cassette Ca to the cassette holder 23. The main cassette transporter 22 in the main unit 2 then returns the cassette Ca on the cassette holder 23 to a cassette shelf 21.

A qualified user such as a pharmacist performs this operation of loading drug sheets.

Main Components of Drug Station

Figure 2:
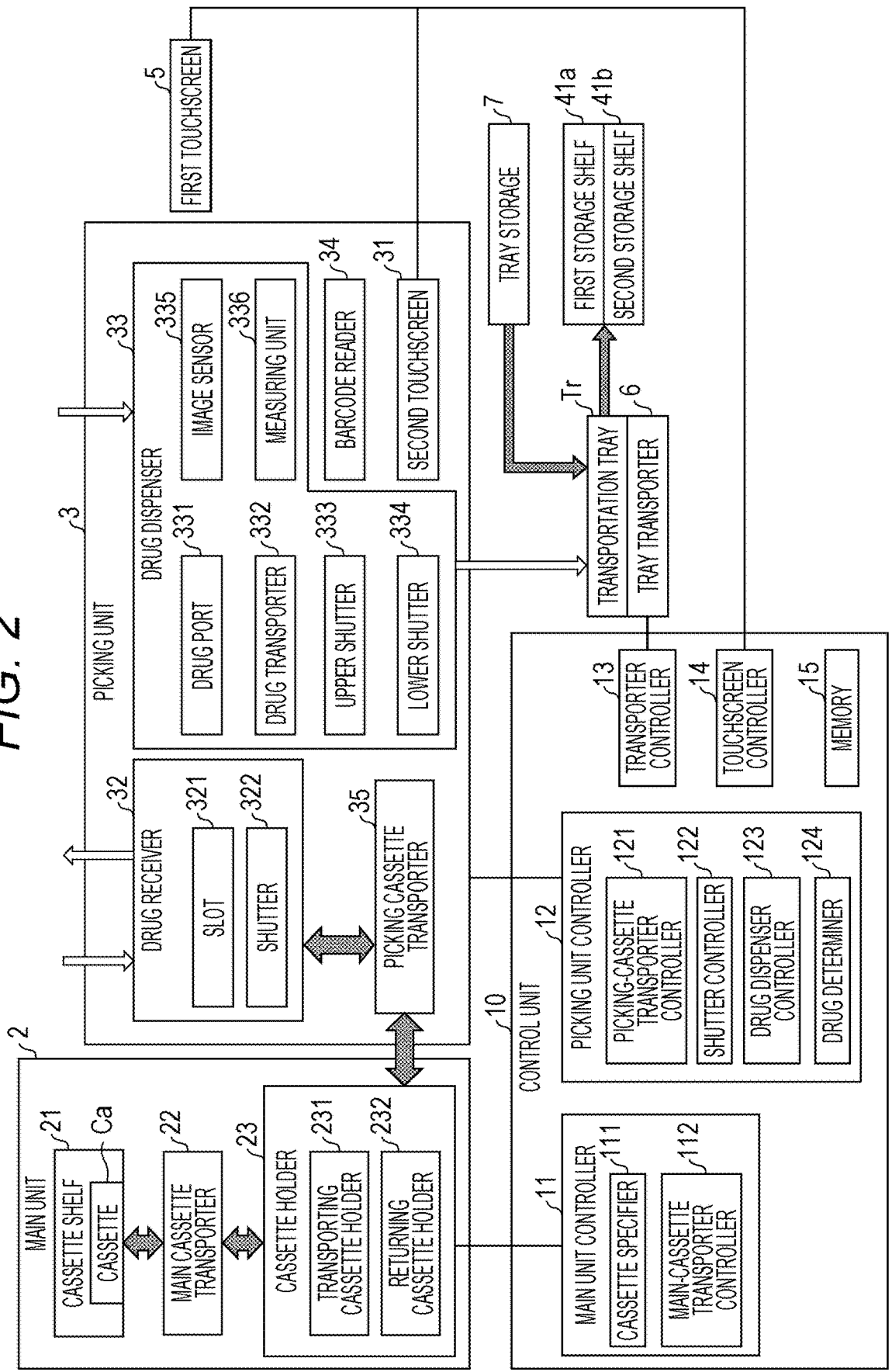
FIG. 2 is a block diagram of the drug station showing its example main components.

The main components of the drug station 1 will now be described with reference to FIG. 2. FIG. 2 is a block diagram of the drug station 1 showing its example main components. The components described above with reference to FIG. 1 will not be described.

The main unit 2 includes the cassette shelf 21, the main cassette transporter 22, and the cassette holder 23.

Figure 3A:
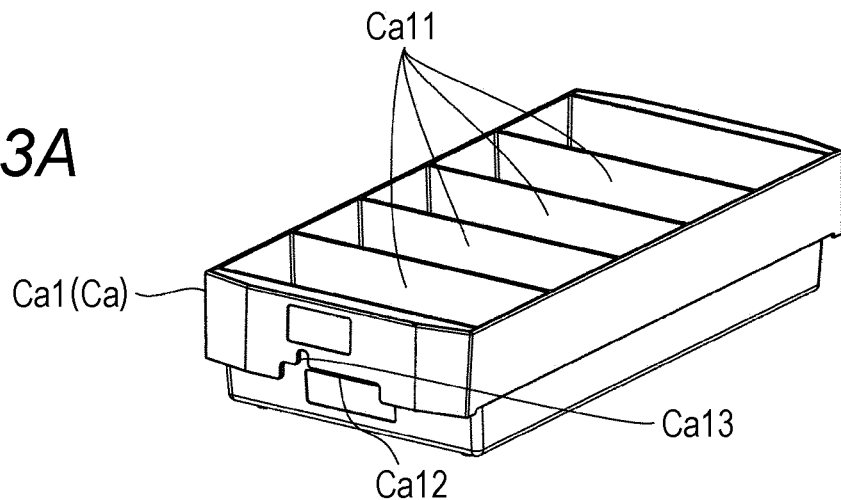
FIG. 3A is a perspective view of an example large cassette storable in a cassette shelf.
Figure 3B:
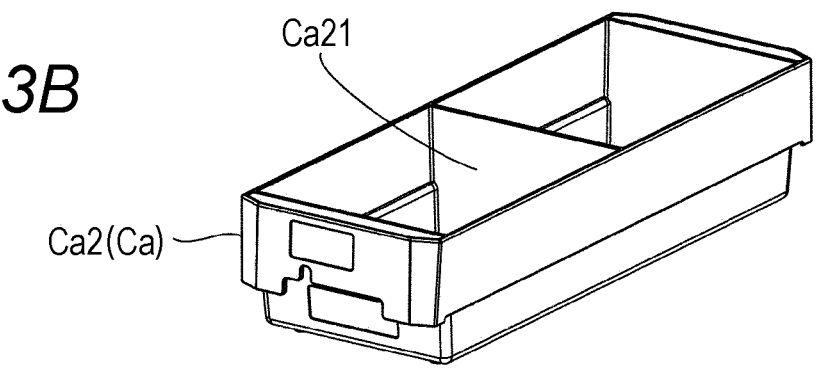
FIG. 3B is a perspective view of an example medium-sized cassette storable in the cassette shelf.
Figure 3C:
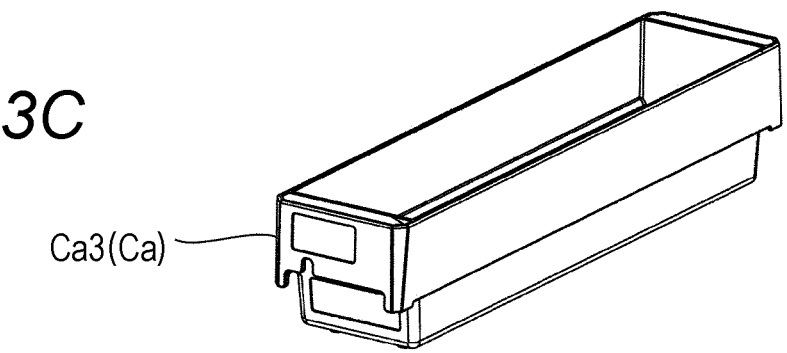
FIG. 3C is a perspective view of an example small cassette storable in the cassette shelf.
Figure 3D:
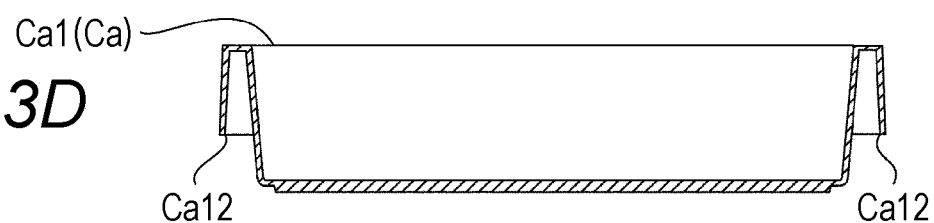
FIG. 3D is a cross-sectional view of the example large cassette.

The cassette shelf 21 is a drug shelf that can store multiple cassettes Ca. The cassette shelf 21 in the present embodiment can store cassettes Ca of different sizes (or of different types). FIG. 3A is a perspective view of an example large cassette Ca1 storable in the cassette shelf 21. FIG. 3B is a perspective view of an example medium-sized cassette Ca2 storable in the cassette shelf 21. FIG. 3C is a perspective view of an example small cassette Ca3 storable in the cassette shelf 21. FIG. 3D is a cross-sectional view of the example large cassette Ca1.

The large cassette Ca1 includes partitions Ca11 that define multiple compartments for drug sheets. The single large cassette Ca1 can contain multiple different types of drug sheets. In the present embodiment, the large cassette Ca1 includes four partitions Ca11 that define five compartments (storage positions) for drug sheets. The medium-sized cassette Ca2 has a smaller width (lateral dimension) than the large cassette Ca1, and has a larger width than the small cassette Ca3. The medium-sized cassette Ca2 also includes a partition Ca21 (defining two compartments in the present embodiment).

The small cassette Ca3 may also include one or more partitions that define multiple compartments. The large cassette Ca1 and the medium-sized cassette Ca2 may include no partition, and may function as cassettes that can each contain drug sheets of a single type. The cassettes Ca may not be of these three different types, but may be of two different types or four or more different types with different widths or may be of one type.

The large cassette Ca1 further has tab receivers Ca12 on its laterally extending side walls (longitudinal ends). Each tab receiver Ca12 receives a tab 2212 on the main cassette transporter 22 (refer to FIG. 6), and receives a protrusion 351a on the picking cassette transporter 35 (refer to FIG. 10B). Each tab receiver Ca12 receives the tab 2212 or the protrusion 351a to allow the main cassette transporter 22 and the picking cassette transporter 35 to remove or place a cassette Ca from or into the cassette shelf 21 or the cassette holder 23.

Each tab receiver Ca12 further has a cut Ca13. With the position of the cut Ca13 detected by a position sensor 2214 (refer to FIG. 6), the main cassette transporter 22 can transport a cassette gripper 221 (cassette gripper; refer to FIG. 6) to immediately in front of the large cassette Ca1 to be transported. The large cassette Ca1 can thus be removed in a reliable manner.

The two tab receivers Ca12 on the two longitudinal ends of the large cassette Ca1 each include a radio frequency identifier (RFID) tag (not shown). Each RFID tag stores tab receiver identification information for identifying the corresponding tab receiver Ca12.

The cassette Ca removed with its front end having one tab receiver Ca12 is oriented on the drug receiver 32 differently from when being removed with its front end having the other tab receiver Ca12. A single cassette Ca containing different types of drug sheets, like a large cassette Ca1, may be oriented differently to have their drug sheets positioned differently with respect to the drug receiver 32. The control unit 10 that cannot determine the orientation of the cassette Ca may not control a shutter 322 to be open for the storage position of drug sheets to be removed.

Figure 6:
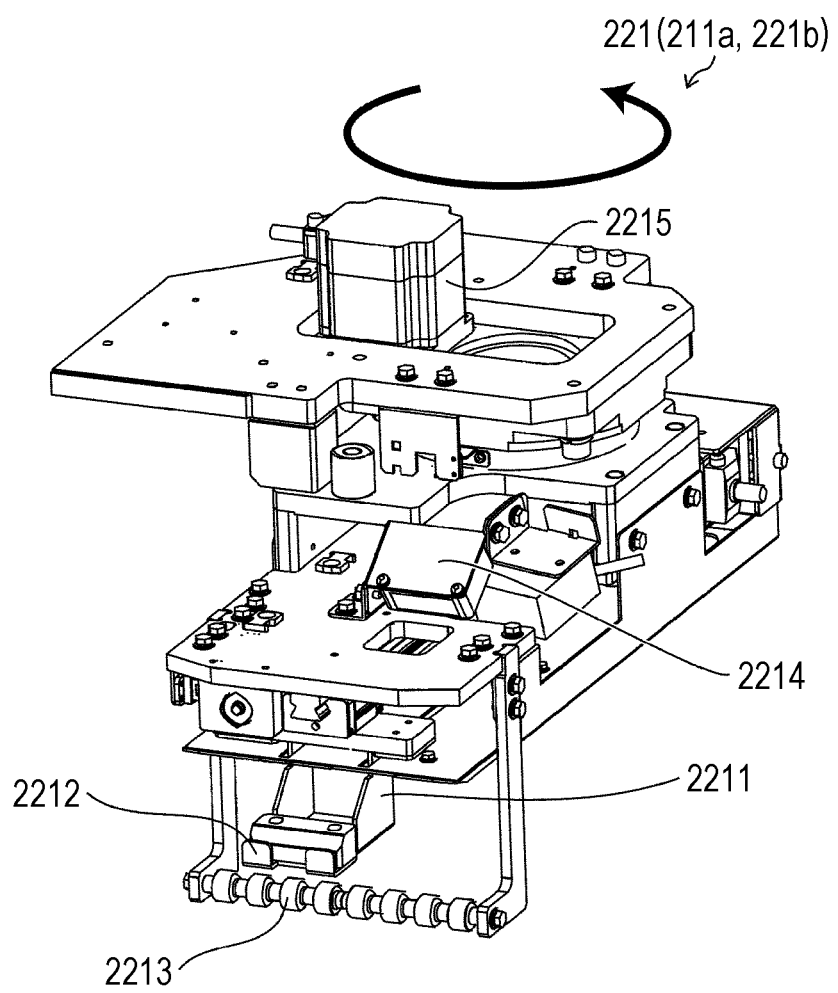
FIG. 6 is a perspective view of a cassette gripper showing its example structure.

As described above, the tab receiver identification information is prestored for the RFID reader (not shown) in the main cassette transporter 22 (e.g., a cassette drawer 2211; refer to FIG. 6). The control unit 10 can thus determine the orientation of the cassette Ca based on tab receiver identification information read from the RFID tag with the RFID reader when the cassette Ca is removed from the cassette shelf 21. Thus, the control unit 10 can control the shutter 322 to be open at the storage position of drug sheets to be removed in the drug receiver 32.

Each of the medium-sized cassette Ca2 and the small cassette Ca3 also includes the tab receivers Ca12, the cuts Ca13, and the RFID tags. In other words, all the cassettes Ca stored in the cassette shelf 21 include the tab receivers Ca12, the cuts Ca13, and the RFID tags.

The picking cassette transporter 35 (e.g., the protrusion 351a; refer to FIG. 10B) may also include an RFID reader. In this case, the control unit 10 can also determine the orientation of the cassette Ca in the same manner as described above based on tab receiver identification information read from the RFID tag with the RFID reader when the cassette Ca is removed from a transporting cassette holder 231 (in the state shown in FIG. 11C).

The main cassette transporter 22 transports cassettes Ca between the cassette shelf 21 and the cassette holder 23. For dispensing drug sheets, the main cassette transporter 22 removes, for example, a cassette Ca containing drug sheets indicated by prescription data from the cassette shelf 21 and transports the cassette Ca to the cassette holder 23. The main cassette transporter 22 then transports the cassette Ca placed on the cassette holder 23 (the cassette Ca returned from the picking unit 3 after a predetermined quantity of drug sheets has been removed by the picking unit 3) to the cassette shelf 21. For loading drug sheets, the main cassette transporter 22 removes, from the cassette shelf 21, a cassette Ca into which drug sheets identified by drug identification information read by the barcode reader 34 are to be loaded, and transports the cassette Ca to the cassette holder 23. The main cassette transporter 22 then transports the cassette Ca placed on the cassette holder 23 (the cassette Ca returned from the picking unit 3 after the drug sheets have been loaded by the picking unit 3) to the cassette shelf 21.

The main cassette transporter 22 can remove a cassette Ca from the cassette shelf 21 and transports the cassette Ca to the picking unit 3, and can also return the cassette Ca to the cassette shelf 21.

The cassette holder 23 is a temporary holder (buffer) for holding a cassette Ca transported from either the cassette shelf 21 or each picking unit 3. The cassette holder 23 includes the transporting cassette holder 231 and a returning cassette holder 232. The transporting cassette holder 231 temporarily holds a cassette Ca removed from the cassette shelf 21 and to be transported to the drug receiver 32 included in the picking unit 3. The returning cassette holder 232 temporarily holds a cassette Ca received from the drug receiver 32 and to be returned to the cassette shelf 21. In other words, the transporting cassette holder 231 and the returning cassette holder 232 each function as a support for temporarily receiving such cassettes Ca.

The cassette shelf 21 may store cassettes Ca containing drug sheets with higher frequencies of use at positions nearer the cassette holder 23. This allows cassettes Ca containing drug sheets with higher frequencies of use to be removed and returned more quickly.

Each picking unit 3 includes the second touchscreen 31, the drug receivers 32, a drug dispenser 33, the barcode reader 34, and the picking cassette transporter 35.

Similarly to the first touchscreen 5, the second touchscreen 31 can display various items of information associated with the drug station 1 and can also receive a user input. For dispensing drug sheets, the second touchscreen 31 displays, for example, the type and the quantity of drug sheets to be removed from the drug receiver 32. For loading drug sheets, the second touchscreen 31 receives an input operation for specifying the type of drug sheets to be loaded or an input operation for specifying a cassette Ca containing drug sheets to be loaded.

The drug receiver 32 allows a user to remove drug sheets from a cassette Ca or to place drug sheets into a cassette Ca (allows a user to place and receive drug sheets). In the present embodiment, the drug receiver 32 includes a slot 321 and the shutter 322.

The slot 321 allows a user access to (removal or loading of) a cassette Ca transported to the drug receiver 32. The shutter 322 is located at the slot 321 to control a user access to the cassette Ca. The shutter 322 is normally closed. The shutter 322 is open for the cassette Ca transported to the drug receiver 32. The shutter 322 may be open with a varying degree of opening for each cassette Ca from which or into which drug sheets are to be removed or loaded (or placed).

In the present embodiment, the user directly accesses the cassette Ca transported to the drug receiver 32. In some embodiments, the user may indirectly access the cassette Ca. For example, the picking unit 3 may include a drug handler that is controlled by the control unit 10 to remove a drug sheet from a cassette Ca transported to the drug receiver 32 and place the drug sheet onto the worktable 36, or place a drug sheet received from the user into the cassette Ca. In this case, the user accesses a cassette Ca transported to the drug receiver 32 with the drug handler.

In the present embodiment, the drug receiver 32 may both remove and place drug sheets from and into a cassette Ca. In some embodiments, the drug receiver 32 may simply remove drug sheets from a cassette Ca or simply load drug sheets into a cassette Ca. More specifically, the drug receiver 32 may function as a drug sheet remover that can simply remove drug sheets from a cassette Ca, or may function as a drug sheet placer that can simply place drug sheets into a cassette Ca. The picking unit 3 including the drug receiver 32 as a drug sheet remover functions as a drug sheet removing device that simply removes drug sheets from a cassette Ca. The picking unit 3 including the drug receiver 32 as a drug sheet placer functions as a drug sheet placing device that simply places drug sheets into a cassette Ca.

The drug dispenser 33 dispenses drug sheets removed from the drug receiver 32 onto a transportation tray Tr. The drug dispenser 33 includes the drug port 331, a drug transporter 332, an upper shutter 333, a lower shutter 334, the image sensor 335, and the measuring unit 336.

The drug port 331 receives drug sheets removed from the drug receiver 32. The drug transporter 332 transports drugs placed into the drug port 331 to a transportation tray Tr.

The upper shutter 333 is closed to temporarily hold drug sheets transported from the drug transporter 332, and is open to cause such drug sheets to drop onto the lower shutter 334. The lower shutter 334 is closed to temporarily hold drug sheets that drop from the upper shutter 333. The lower shutter 334 is open to cause such drug sheets to drop onto the transportation tray Tr. The upper shutter 333 and the lower shutter 334 are each open and closed at timing adjusted to cause drug sheets to drop to a predetermined position on the transportation tray Tr.

The image sensor 335 captures an image of drug sheets placed onto the drug transporter 332 through the drug port 331. The measuring unit 336 measures the weight of the drug sheets placed onto the drug transporter 332 through the drug port 331. The measuring unit 336 may be, for example, a load cell. The measuring unit 336 may include multiple load cells. In this case, the control unit 10 may compare the measurement values obtained by the multiple load cells and may detect a failed load cell when determining any of the measurement values differ from other measurement values by at least a predetermined value. The control unit 10 may then display an error message on the second touchscreen 31.

The picking cassette transporter 35 transports a cassette Ca between the main unit 2 and the picking unit 3 (specifically between the cassette holder 23 and the drug receiver 32). The cassette Ca can thus be removed from the main unit 2 and transported to the drug receiver 32, and then returned to the main unit 2.

For dispensing drug sheets, for example, the picking cassette transporter 35 transports a cassette Ca from which or into which a drug is to be removed or loaded at the drug receiver 32 (a cassette Ca placed on the transporting cassette holder 231) to a drug receiving position P1 (refer to FIGS. 11A to 11E) in the drug receiver 32. When a first cassette Ca is at the drug receiving position P1, the picking cassette transporter 35 transports a second cassette Ca from which or into which a drug is to be removed or loaded following the first cassette Ca to a standby position P2 (refer to FIGS. 11A to 11E) adjacent to the drug receiver 32 at which the second cassette Ca is to be on standby. The picking cassette transporter 35 can also transport a cassette Ca from which drug sheets have been removed at the drug receiver 32 to the returning cassette holder 232.

The control unit 10 centrally controls the individual units of the drug station 1. The control unit 10 includes a main unit controller 11, a picking unit controller 12, a transporter controller 13, a touchscreen controller 14, and a memory 15.

The main unit controller 11 centrally controls the components of the main unit 2. The main unit controller 11 includes a cassette specifier 111 and a main-cassette transporter controller 112.

The cassette specifier 111 specifies a cassette Ca to be removed from the cassette shelf 21 based on prescription data, a user input, or a reading by the barcode reader 34. The cassette specifier 111 also specifies the orientation of the cassette Ca based on tab receiver identification information read by the RFID reader.

The main-cassette transporter controller 112 controls driving of the main cassette transporter 22. More specifically, the main-cassette transporter controller 112 controls the main cassette transporter 22 to transport a cassette Ca specified by the cassette specifier 111 to the transporting cassette holder 231. The main-cassette transporter controller 112 also transports a cassette Ca placed on the returning cassette holder 232 to the storage position (previous position) of the cassette Ca.

When controlling the main cassette transporter 22 based on prescription data, the main-cassette transporter controller 112 transports, to the transporting cassette holder 231, a cassette Ca specified by the cassette specifier 111 and containing drug sheets indicated by the prescription data. Subsequently, the main-cassette transporter controller 112 transports, to the storage position of the cassette Ca, the cassette Ca transported by the picking cassette transporter 35 in the picking unit 3 from the drug receiver 32 to the returning cassette holder 232.

The picking unit controller 12 centrally controls the components of the picking unit 3. The picking unit controller 12 includes a picking-cassette transporter controller 121, a shutter controller 122, a drug dispenser controller 123, and a drug determiner 124.

The picking-cassette transporter controller 121 controls driving of the picking cassette transporter 35 based on prescription data, a user input, or a reading by the barcode reader 34. When controlling the picking cassette transporter 35 based on prescription data, the picking-cassette transporter controller 121 transports, to either the drug receiving position P1 or the standby position P2, a cassette Ca from which drug sheets indicated by the prescription data are to be removed.

The shutter controller 122 controls the shutter 322 to be open and closed. The drug dispenser controller 123 controls driving of the components of the drug dispenser 33 (specifically, the drug transporter 332, the upper shutter 333, the lower shutter 334, and the image sensor 335).

The drug determiner 124 determines whether the quantity of drug sheets specified by prescription data has been correctly placed into the drug port 331 based on an image of the drug sheets captured by the image sensor 335 and the weight of the drug sheets measured by the measuring unit 336. The drug determiner 124 analyzes the image and determines the shape of the drug sheets placed on the drug transporter 332 to specify any separate drug pieces. The memory 15 prestores the shape of a drug sheet of a different drug type. The drug determiner 124 thus compares the shape of one or more drug sheets specified through the image analysis with each of the prestored shape and calculates the number of separate drug pieces. The memory 15 also prestores the weight of a single drug sheet of a different drug type. The drug determiner 124 thus calculates the number of drug pieces placed into the drug port 331 based on the measured weight of one or more drug sheets.

The transporter controller 13 controls driving of the tray transporter 6. The touchscreen controller 14 controls information appearing on the first touchscreen 5 and the second touchscreen 31.

The memory 15 stores various sets of data to be used by the control unit 10. The memory 15 stores data indicating, for example, the shape of each drug sheet of a different drug type and the weight of each single drug sheet.

The memory 15 may also store the data described below.
  (1) Data associating cassette identification information about each cassette Ca and the storage position of each cassette Ca in the cassette shelf 21.
  (2) Data associating cassette identification information about each cassette Ca (or storage position information indicating the storage position in each cassette Ca) and drug identification information for each drug sheet.
  (3) Type information indicating the type of each cassette Ca.

The type information may be, for example, information indicating a large cassette Ca1, a medium-sized cassette Ca2, or a small cassette Ca3. The storage position information may be, for example, information indicating the storage position relative to one end of the cassette Ca (using, for example, a distance from the end).

The memory 15 accumulates images captured by the image sensor 335. This information can serve as evidence information for the picking operation.

Structure of Main Unit

Figure 4B:
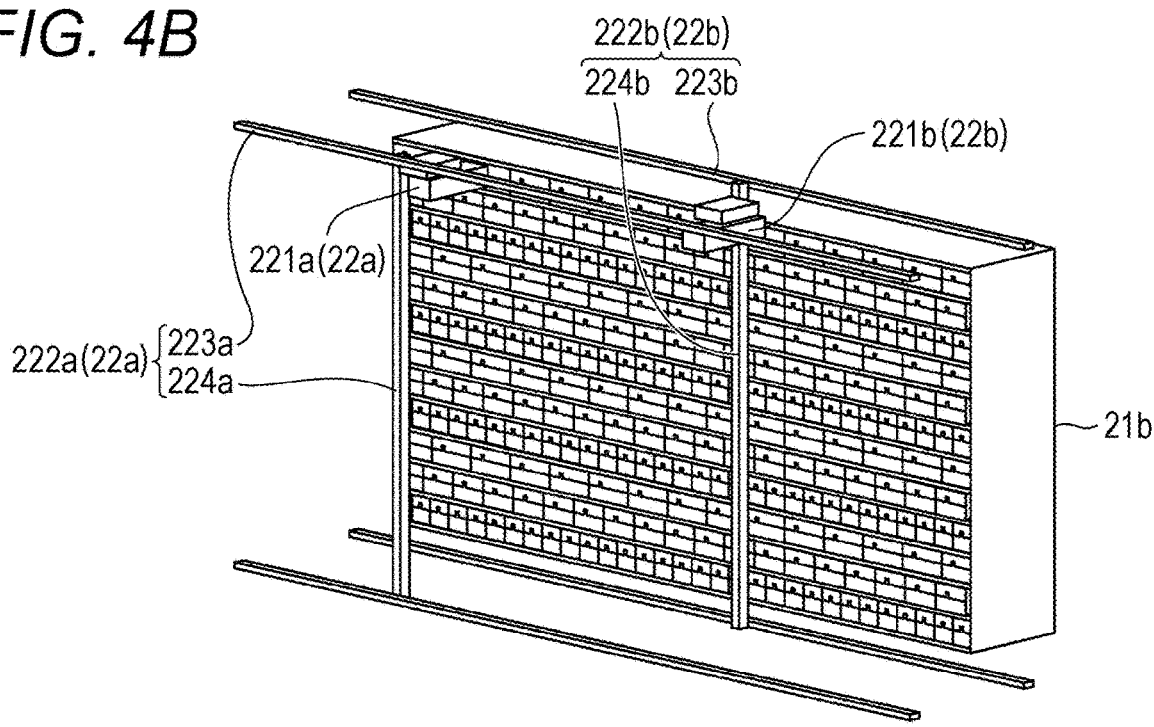
FIG. 4B is a schematic diagram of an example main cassette transporter.
Figure 5:
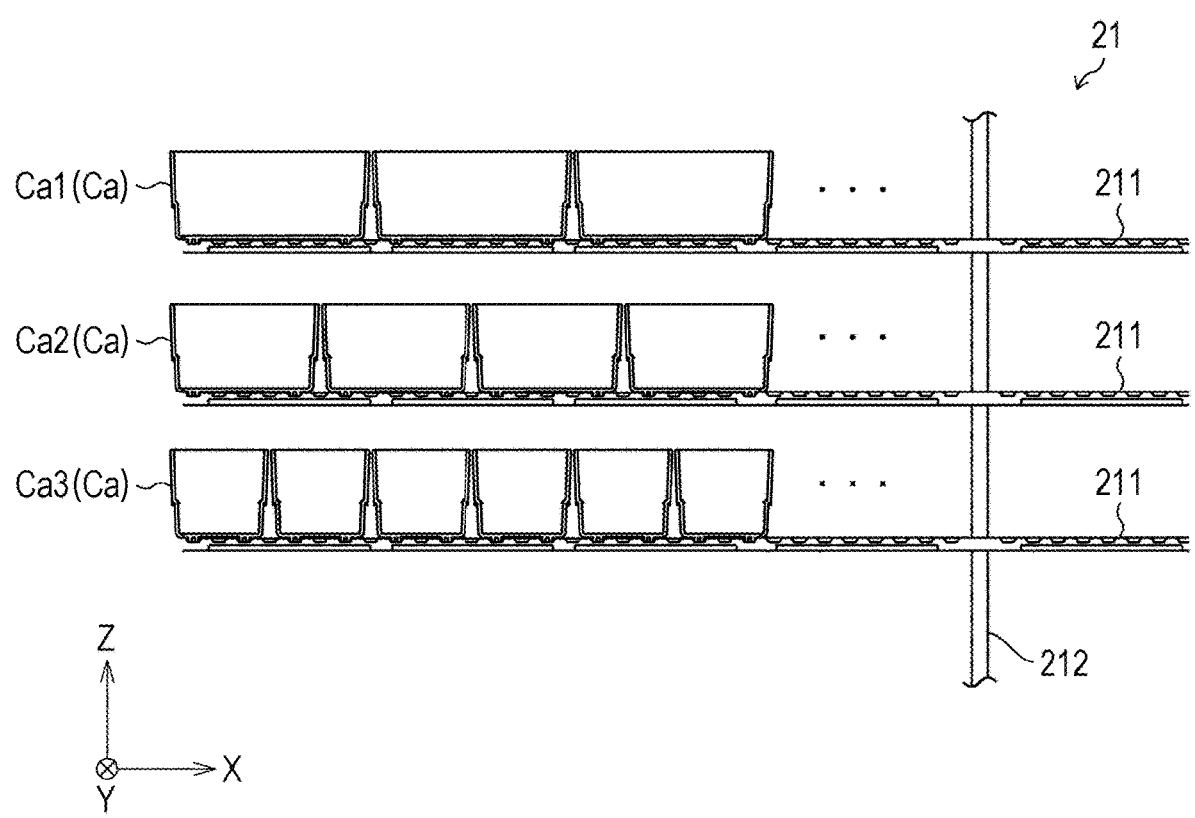
FIG. 5 is a view of example cassettes being stored.

The structure of the main unit 2 will now be described in detail with reference to FIGS. 4A to 8. FIG. 4A is a perspective view of an example main unit 2. FIG. 4B is a schematic diagram of an example main cassette transporter 22. FIG. 5 is a view of example cassettes Ca being stored.

Cassette Shelf and Cassette Transporter

As shown in FIGS. 4A and 4B, the cassette shelf 21 can store cassettes Ca in a matrix along a vertical plane. In the present embodiment, as shown in FIG. 5, the cassette shelf 21 includes cassette shelf plates 211 to receive cassettes Ca and shelf plate supports 212 supporting the cassette shelf plates 211.

In the present embodiment, as shown in FIG. 5, each cassette shelf plate 211 receives cassettes Ca of the same type. More specifically, the width (dimension in X-direction) of each cassette shelf plate 211 and the widths of the large cassette Ca1, the medium-sized cassette Ca2, and the small cassette Ca3 are defined to allow each cassette shelf plate 211 to receive cassettes Ca of the same type. In the example shown in FIG. 5, each cassette shelf plate 211 receives cassettes Ca of the same type. In some embodiments, the width of each cassette shelf plate 211 and the widths of the cassettes Ca of the different types may be defined to allow each cassette shelf plate 211 to receive cassettes Ca of different types.

Also, as shown in FIG. 4A, the cassette shelf 21 includes a first cassette shelf 21a and a second cassette shelf 21b facing each other, between which the main cassette transporter 22 is located. As shown in the figure, the main cassette transporter 22 includes a first main cassette transporter 22a and a second main cassette transporter 22b.

The main cassette transporter 22 first draws a cassette Ca stored in the first cassette shelf 21a or the second cassette shelf 21b, and places the cassette Ca onto the cassette holder 23 (specifically, the transporting cassette holder 231), as controlled by the main-cassette transporter controller 112. The main cassette transporter 22 first removes a cassette Ca placed on the cassette holder 23 (specifically, the returning cassette holder 232), and returns the cassette Ca to the first cassette shelf 21a or to the second cassette shelf 21b. This allows removal or return of the cassette Ca from or to the cassette shelf 21 storing cassettes Ca in a matrix along the vertical plane. The main-cassette transporter controller 112 controls the first main cassette transporter 22a and the second main cassette transporter 22b independently of each other.

Also, as shown in FIGS. 4A and 4B, the first main cassette transporter 22a includes a first cassette gripper 221a (cassette gripper) and a first cassette transporter 222a. Similarly, the second main cassette transporter 22b includes a second cassette gripper 221b (cassette gripper) and a second cassette transporter 222b.

The first cassette gripper 221a or the second cassette gripper 221b removes a cassette Ca from the cassette shelf 21 or the cassette holder 23 (specifically, the returning cassette holder 232) and grips the cassette Ca, as controlled by the main-cassette transporter controller 112. The first cassette gripper 221a and the second cassette gripper 221b move either vertically or horizontally or both vertically and horizontally to transport the gripped cassette Ca to the cassette shelf 21 or the cassette holder 23 (specifically, the transporting cassette holder 231), and place the cassette Ca onto the cassette shelf 21 or onto the transporting cassette holder 231.

Figure 7A:
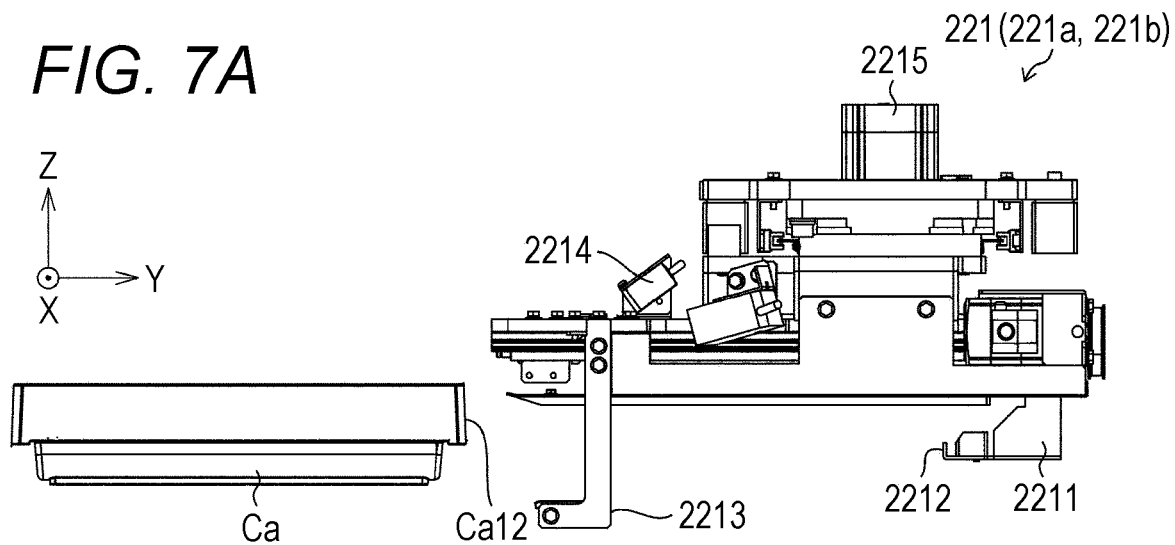
FIGS. 7A to 7C are diagrams each describing an example operation of the cassette gripper.
Figure 7B:
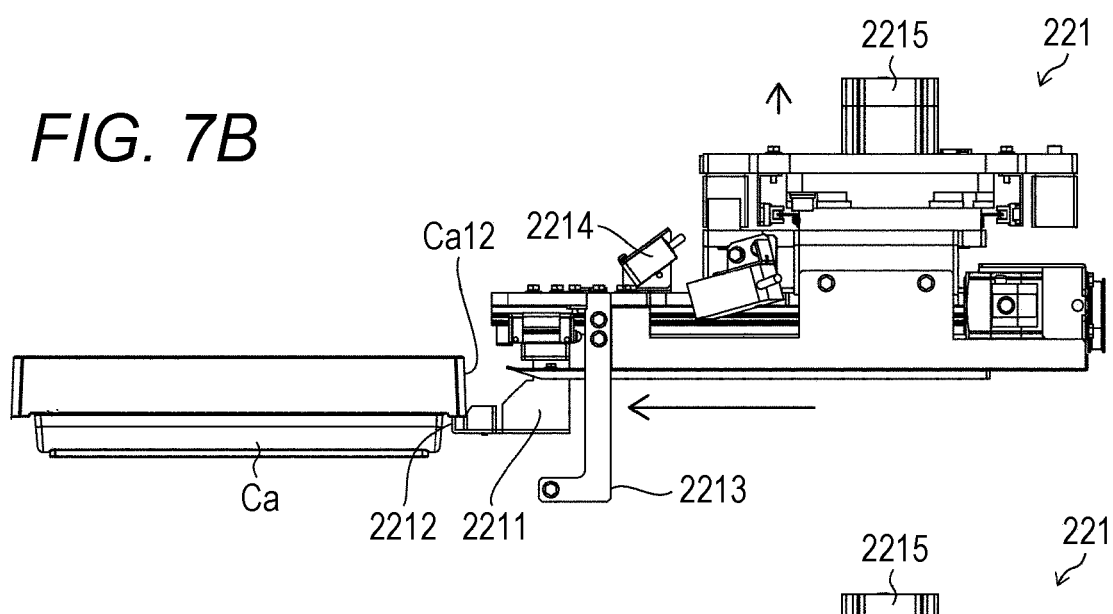
Figure 7C:
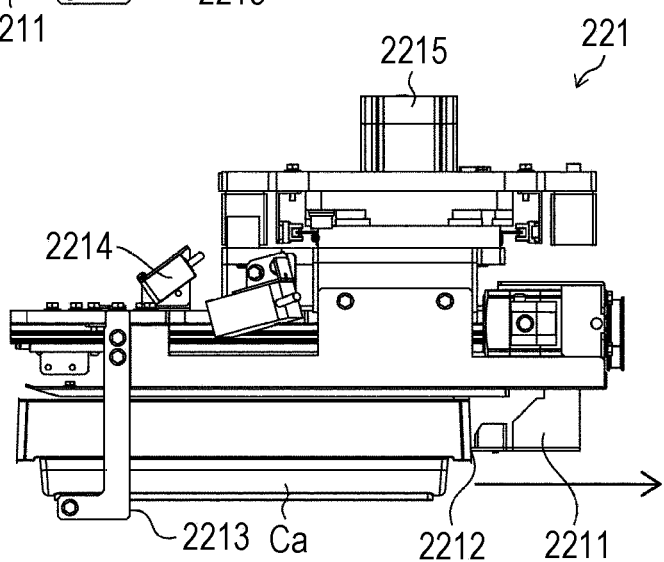

FIG. 6 is a perspective view of the cassette gripper 221 (a first cassette gripper 221a and a second cassette gripper 221b) showing its example structure. FIGS. 7A to 7C are diagrams each describing an example operation of the cassette gripper 221. As shown in FIG. 6, the cassette gripper 221 includes the cassette drawer 2211, the tab 2212, a cassette support 2213, the position sensor 2214, and a rotary drive 2215.

As shown in FIG. 6, the cassette drawer 2211 draws a cassette Ca placed on the cassette shelf 21 or on the cassette holder 23 into the cassette gripper 221, as controlled by the main-cassette transporter controller 112. The cassette drawer 2211 is slidable on a rail (not shown) extending along the depth of the cassette gripper 221 below the cassette gripper 221 and is thus movable along the depth of the cassette gripper 221. The cassette Ca can thus be drawn from the cassette shelf 21 or from the cassette holder 23 or be placed onto the cassette shelf 21 or onto the cassette holder 23.

The tab 2212 can be engaged in the tab receiver Ca12 in the cassette Ca. As shown in FIG. 7A, when the cassette gripper 221 is placed in front of a cassette Ca to be transported, the main-cassette transporter controller 112 moves the cassette drawer 2211 to have the tab 2212 below the tab receiver Ca12 as shown in FIG. 7B. Subsequently, the main-cassette transporter controller 112 raises the cassette gripper 221. This causes the tab 2212 to be temporarily engaged in the tab receiver Ca12. In this state, the main-cassette transporter controller 112 moves the cassette drawer 2211 to its previous position to draw the cassette Ca into the cassette gripper 221 as shown in FIG. 7C.

To place the gripped cassette Ca onto the cassette shelf 21 or the cassette holder 23, the operation reverse to the operation of drawing the cassette Ca is performed. More specifically, the main-cassette transporter controller 112 in the state shown in FIG. 7C first moves the cassette gripper 221 to the position at which the cassette Ca is to be placed, and moves the cassette drawer 2211 to the front of the cassette gripper 221 as shown in FIG. 7B. Subsequently, the main-cassette transporter controller 112 lowers the cassette gripper 221 to disengage the temporary engagement between the tab 2212 and the tab receiver Ca12. Subsequently, the main-cassette transporter controller 112 moves the cassette drawer 2211 to the previous position as shown in FIG. 7A.

Referring back to FIG. 6, the cassette support 2213 supports the cassette Ca drawn by the cassette drawer 2211.

The position sensor 2214 detects the cassette gripper 221 located immediately in front of the cassette Ca to be moved. The position sensor 2214 includes, for example, a light emitter that emits light and a light receiver that receives the light. As described above, the cassette Ca includes the cuts Ca13. The stop position of the cassette gripper 221 and the storage position (or placement position) of the cassette Ca are determined to direct light emitted from the position sensor 2214 toward the cut Ca13 when the cassette gripper 221 is located immediately in front of the cassette Ca to be moved.

When the cassette gripper 221 is immediately in front of the cassette Ca, the light is directed toward the cut Ca13. The light receiver does not receive light. In this case, the position sensor 2214 detects the cassette Ca located immediately in front of the cassette gripper 221. When the cassette gripper 221 is offset from the immediate front of the cassette Ca, the light is not directed toward the cut Ca13 but travels to and is reflected on the wall surface of the tab receiver Ca12. The light is then received by the light receiver. In this case, the position sensor 2214 cannot detect the cassette Ca located immediately in front of the cassette gripper 221. Thus, the main-cassette transporter controller 112 moves the cassette gripper 221 to cause the position sensor 2214 to detect the cassette Ca located immediately in front of the cassette gripper 221. More specifically, the main-cassette transporter controller 112 finely adjusts the position of the cassette gripper 221 to direct light from the position sensor 2214 toward the cut Ca13 without being received by the light receiver. The cassette gripper 221 can thus draw the cassette Ca in a reliable manner.

The rotary drive 2215 rotates the cassette gripper 221 about the rotation axis in the vertical direction to allow the cassette gripper 221 (specifically, the cassette drawer 2211) to be movable to the first cassette shelf 21a, the second cassette shelf 21b, or the cassette holder 23.

More specifically, the rotary drive 2215 rotates the cassette gripper 221 to cause the cassette drawer 2211 to face the position to remove or place the cassette Ca either during or after the movement of the cassette gripper 221 to the position to remove or place the cassette Ca, as controlled by the main-cassette transporter controller 112. The cassette gripper 221 can thus remove or place the cassette Ca at such positions.

For example, the cassette gripper 221 is rotated by the rotary drive 2215 to cause the cassette drawer 2211 to face the storage position of the cassette Ca to be removed from the first cassette shelf 21a or the second cassette shelf 21b. The cassette gripper 221 then draws the cassette Ca from the storage position. This allows removal of cassettes Ca from both the first cassette shelf 21a and the second cassette shelf 21b that are arranged on different vertical planes.

Referring back to FIGS. 4A and 4B, the first cassette transporter 222a includes a first beam 223a and a first post 224a. Similarly, the second cassette transporter 222b includes a second beam 223b and a second post 224b.

The first beam 223a and the second beam 223b extend along the width of the cassette shelf 21 (in X direction), and support the first post 224a and the second post 224b in a slidable manner. The first post 224a and the second post 224b extend along the height of the cassette shelf 21 (in Z-direction), and support the first cassette gripper 221a and the second cassette gripper 221b in a slidable manner.

Also, the first beam 223a and the second beam 223b are spaced at a predetermined distance between them. The predetermined distance allows the first cassette gripper 221a and the second cassette gripper 221b to be movable along the width of the cassette shelf 21. The predetermined distance also allows the first cassette gripper 221a and the second cassette gripper 221b to be rotatable about the rotation axis in the vertical direction without hitting the first cassette shelf 21a and the second cassette shelf 21b. The predetermined distance is minimized to downsize the main unit 2.

The main-cassette transporter controller 112 moves the first post 224a along the first beam 223a and the first cassette gripper 221a along the first post 224a (the same applies to the second cassette transporter 222b). This allows a selected cassette Ca to be transported between the cassette shelf 21 and the cassette holder 23.

Also, the main-cassette transporter controller 112 controls the first cassette gripper 221a and the second cassette gripper 221b to be moved (or positioned) to avoid hitting each other.

More specifically, the first cassette gripper 221a and the second cassette gripper 221b are both cantilevered on the first beam 223a and the second beam 223b, which are spaced at the predetermined distance as described above. The first cassette transporter 222a and the second cassette transporter 222b are controlled to avoid interfering with each other over the movable ranges of the first cassette gripper 221a and the second cassette gripper 221b (the area between the first beam 223a and the second beam 223b). Thus, the first cassette gripper 221a and the second cassette gripper 221b are movable to avoid hitting each other between the cassette shelf 21 (the storage positions of cassettes Ca) and the cassette holder 23.

The multiple cassette grippers 221 can thus be used to transport cassettes Ca between the cassette shelf 21 and the cassette holder 23, thus improving the efficiency of transporting the cassettes Ca.

The first cassette shelf 21a and the second cassette shelf 21b may not face each other but may be in any arrangement to have different vertical faces for storing cassettes Ca. This arrangement uses less space to store many cassettes Ca. However, the first cassette shelf 21a and the second cassette shelf 21b facing each other can be more space-efficient and can store cassettes Ca more densely. The cassette shelf 21 may include a single cassette shelf, or three or more cassette shelves.

Also, the main cassette transporter 22 may include a single main cassette transporter or three or more main cassette transporters, rather than including two main cassette transporters. The first main cassette transporter 22a and the second main cassette transporter 22b are controlled to move the first cassette gripper 221a and the second cassette gripper 221b without hitting each other. This allows efficient transportation of cassettes Ca in the main unit 2 that is compact and has large capacity.

Cassette Holder

As shown in FIG. 4A, the cassette holder 23 in the present embodiment includes a first cassette holder 23a, a second cassette holder 23b, a third cassette holder 23c, and a fourth cassette holder 23d. In the present embodiment, as shown in FIG. 1, the main unit 2 includes the two picking units 3. Each picking unit 3 includes two drug receivers 32 (four in total). The first cassette holder 23a, the second cassette holder 23b, the third cassette holder 23c, and the fourth cassette holder 23d are provided for each of the four drug receivers 32. In this manner, the single cassette holder 23 corresponds to the single drug receiver 32.

Figure 8:
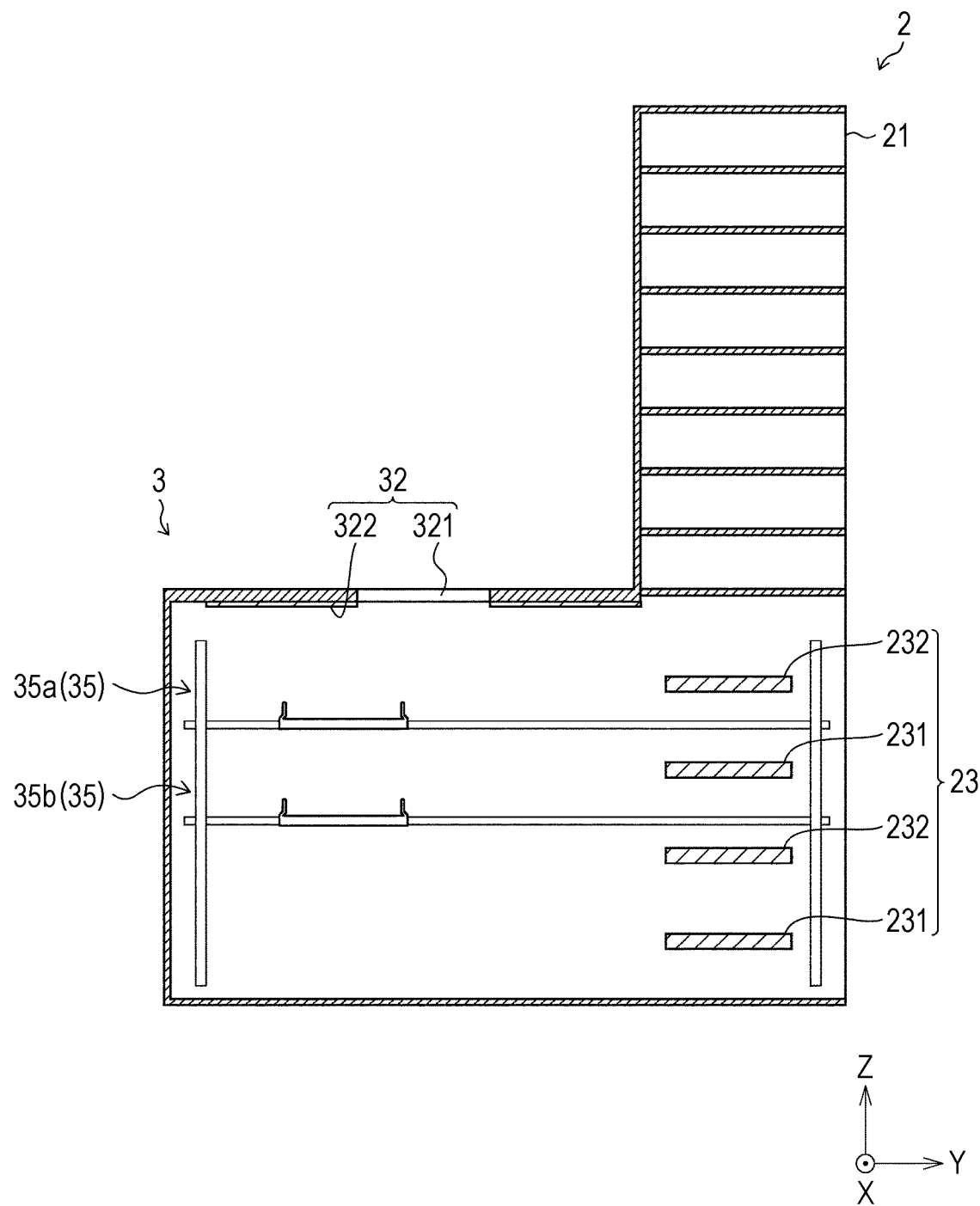
FIG. 8 is a schematic cross-sectional view of the main unit and a picking unit.

Also, as shown in FIG. 8, the cassette holder 23 corresponds to the picking cassette transporter 35 included in the picking unit 3 to allow transportation of cassettes Ca to and from the drug receiver 32. More specifically, the single picking cassette transporter 35 is provided for each of the first cassette holder 23a, the second cassette holder 23b, the third cassette holder 23c, and the fourth cassette holder 23d. FIG. 8 is a schematic cross-sectional view of the main unit 2 and the picking unit 3.

As shown in FIG. 8, each of the first cassette holder 23a, the second cassette holder 23b, the third cassette holder 23c, and the fourth cassette holder 23d includes the transporting cassette holder 231 and the returning cassette holder 232. In the example shown in FIG. 8, the single cassette holder 23 corresponding to the single drug receiver 32 includes two transporting cassette holders 231 and two returning cassette holders 232 that are arranged alternately in the vertical direction. The single cassette holder 23 may include three or more transporting cassette holders 231 and three or more returning cassette holders 232.

In this manner, the multiple transporting cassette holders 231 and the multiple returning cassette holders 232 may correspond to the single drug receiver 32. Such multiple transporting cassette holders 231 and multiple returning cassette holders 232 corresponding to the drug receiver 32 can store more cassettes Ca at positions nearer the drug receiver 32 to which these cassettes Ca are to be transported. This structure allows efficient transportation of cassettes Ca to the drug receiver 32. In some embodiments, a single transporting cassette holder 231 and a single returning cassette holder 232 may be provided for the single drug receiver 32.

Overview

In this manner, the main unit 2 includes the cassette shelf 21, one or more transporting cassette holders 231, one or more returning cassette holders 232, and the main cassette transporter 22.

This structure allows transportation of cassettes Ca from which or into which drug sheets are to be removed or loaded at the drug receiver 32 from the cassette shelf 21 to the transporting cassette holder 231 and from the returning cassette holder 232 to the cassette shelf 21.

During a user operation of picking or loading drug sheets from or into a cassette Ca at the drug receiver 32, the transporting cassette holder 231 can hold another cassette Ca to be handled following a current cassette Ca at the drug receiver 32. This structure allows the next cassette Ca can be removed from the cassette shelf 21 before the above operation is compete.

Also, the returning cassette holder 232 can hold the cassette Ca at the drug receiver 32 after the above operation is complete. The returning cassette holder 232 can hold the cassette Ca while the main cassette transporter 22 is returning the previous cassette Ca. This allows the next cassette Ca to be transported to the drug receiver 32.

The main unit 2 can thus efficiently deliver a cassette Ca to a user who removes or loads drug sheets from or into the cassette Ca.

The cassette holder 23 herein is included in the main unit 2, but may be included in the picking unit 3. When the cassette holder 23 is included in the picking unit 3, the cassette holder 23 is received in a receptacle portion of the picking unit 3 that replaces the portion of the main unit 2 receiving the cassette holder 23 shown in FIG. 4A. In other words, the cassette handling apparatus described above may basically include the cassette shelf 21, the main cassette transporter 22, and the cassette holder 23.

Structure of Picking Unit

Figure 9:
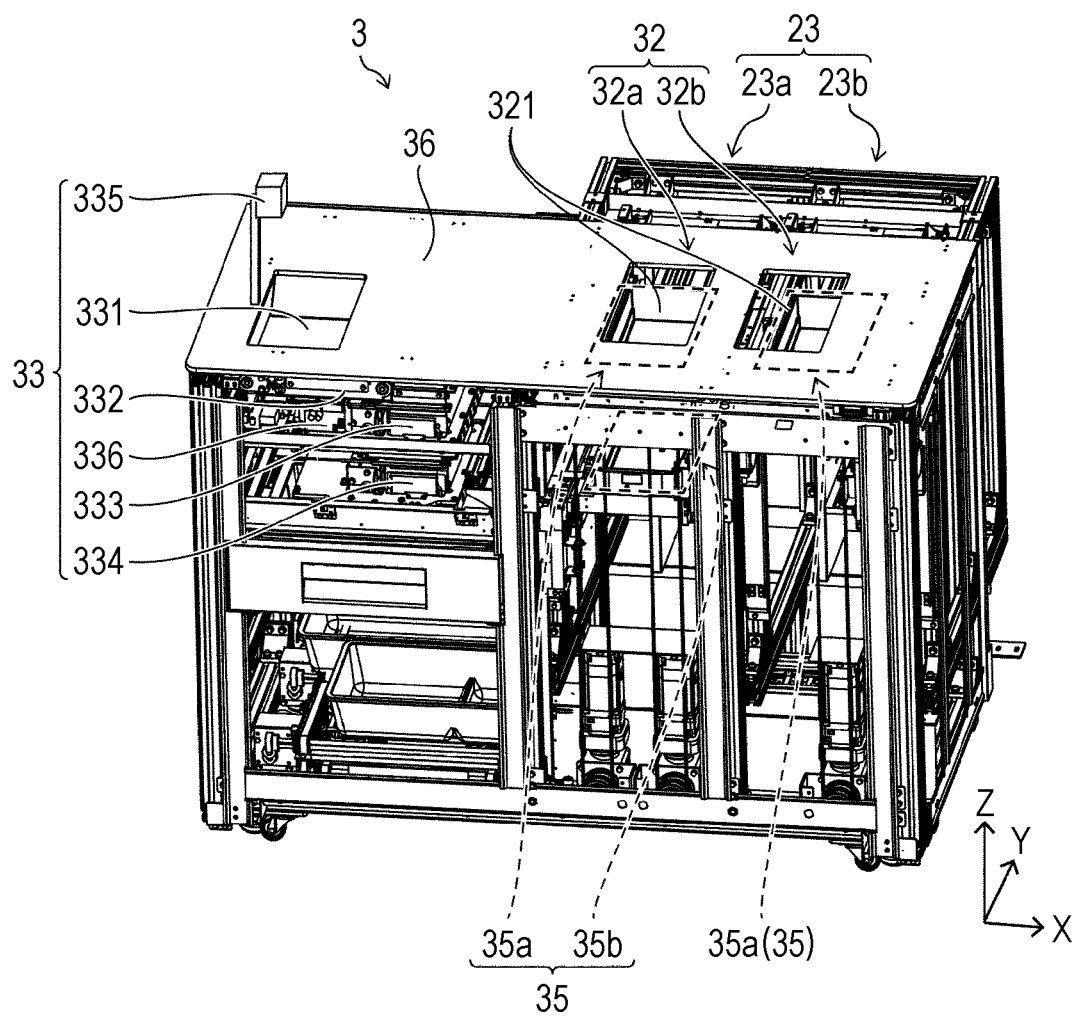
FIG. 9 is a perspective view of the picking unit showing its example structure.

The structure of the picking unit 3 will now be described in detail with reference to FIGS. 9 to 14. FIG. 9 is a perspective view of the example picking unit 3 showing its example structure.

As shown in FIG. 9, the picking unit 3 includes the worktable 36 at which a user handles drug sheets. The worktable 36 includes the drug receiver 32 with the slots 321 through which drug sheets are to be removed or loaded, and the drug port 331 into which drug sheets removed through the slot 321 are to be placed. The worktable 36 further includes the picking cassette transporter 35 below the drug receiver 32. More specifically, the single picking cassette transporter 35 corresponds to the single drug receiver 32 (or the single slot 321, and the shutter 322 corresponding to the slot 321; refer to FIG. 8).

In the present embodiment, each picking unit 3 includes the drug receivers 32 including a first drug receiver 32*a* and a second drug receiver 32*b*. The picking unit 3 includes, below the first drug receiver 32*a*, the picking cassette transporter 35 including a first picking cassette transporter 35*a* and a second picking cassette transporter 35*b*. The picking unit 3 includes, below the second drug receiver 32*b*, the picking cassette transporter 35 including a first picking cassette transporter 35*a*.

In the present embodiment, for example, drug sheets are dispensed based on prescription data using the first drug receiver 32*a* and the picking cassette transporter 35 below the first drug receiver 32*a* in the picking unit 3, and using the first cassette holder 23*a* corresponding to the picking cassette transporter 35 in the main unit 2.

As described above, the picking cassette transporter 35 includes the first picking cassette transporter 35*a* and the second picking cassette transporter 35*b*. The first picking cassette transporter 35*a* and the second picking cassette transporter 35*b* are controlled independently of each other by the picking-cassette transporter controller 121 to allow a first cassette gripper 351 and a second cassette gripper 355 to move to avoid hitting each other (refer to FIGS. 10A to 10D). This structure allows more efficient dispensing of drug sheets based on prescription data than the structure including a single picking cassette transporter that functions as the picking cassette transporter 35.

In contrast, other drug sheets that are not indicated by prescription data are dispensed using the second drug receiver 32*b*, the picking cassette transporter 35 below the second drug receiver 32*b*, and the second cassette holder 23*b*. Thus, the second drug receiver 32*b* may simply include the first picking cassette transporter 35*a* for dispensing such selected drug sheets (e.g., for performing an interrupt process during a drug dispensing operation based on prescription data).

The second drug receiver 32*b* may be used for dispensing drug sheets based on prescription data. The first drug receiver 32*a* may be used for dispensing selected drug sheets. In some embodiments, the second drug receiver 32*b* may include the first picking cassette transporter 35*a* and the second picking cassette transporter 35*b*, and the first drug receiver 32*a* may include the first picking cassette transporter 35*a* alone. The multiple picking cassette transporters provided for the single drug receiver 32 allow more efficient removal of drug sheets.

A drug loading operation is performed by the first drug receiver 32*a* at default, but may be performed by the second drug receiver 32*b*.

Also, each picking unit 3 may include a single drug receiver 32, instead of including multiple drug receivers 32. The main unit 2 may include a single picking unit 3, instead of including multiple picking units 3. In this case, the main unit 2 may simply include the cassette holder 23 corresponding to the single picking unit 3.

As shown in FIG. 9, the worktable 36 may have the image sensor 335 above the drug port 331 for capturing images of drug sheets placed into the drug port 331. The worktable 36 may further have the drug transporter 332, the upper shutter 333, the lower shutter 334, and the measuring unit 336 below the drug port 331.

The worktable 36 is installed substantially horizontal, but may slope with respect to the horizontal plane. For example, the worktable 36 may slope to have a lower portion adjacent to the standing position of the user and a higher portion adjacent to the main unit 2. In this case, the picking cassette transporter 35 may operate its cassette gripper to cause the opening of the angled slot 321 to be substantially parallel to the upper surface of a cassette Ca gripped by the cassette gripper. For example, the picking cassette transporter 35 may include a raising and lowering assembly for raising or lowering the cassette gripper at the drug receiver 32. As shown in FIGS. 10A to 10D, the cassette gripper may include the first cassette gripper 351 and the second cassette gripper 355.

Picking Cassette Transporter Structure

The structure of the picking cassette transporter 35 will now be described in detail with reference to FIGS. 10A to 10D. FIGS. 10A to 10D are views of an example picking cassette transporter 35. FIG. 10A is a perspective view of the example picking cassette transporter 35 as viewed from the main unit 2. FIG. 10B is a perspective view of an example first picking cassette transporter 35*a* and an example second picking cassette transporter 35*b* included in the picking cassette transporter 35. FIG. 10C is a plan view of the example first picking cassette transporter 35*a* and the example second picking cassette transporter 35*b* as viewed from the worktable 36. FIG. 10D is a view of the example first picking cassette transporter 35*a* and the example second picking cassette transporter 35*b* as viewed from the main unit 2. For ease of explanation, FIGS. 10A to 10D simply show the picking cassette transporter 35 corresponding to the first drug receiver 32*a*.

As shown in FIGS. 10A and 10B, the picking cassette transporter 35 corresponding to the first drug receiver 32*a* includes the first picking cassette transporter 35*a* and the second picking cassette transporter 35*b*.

The first picking cassette transporter 35*a* and the second picking cassette transporter 35*b* each receive a cassette Ca placed on the transporting cassette holder 231 and transport the received cassette Ca to the first drug receiver 32*a*. The first picking cassette transporter 35*a* and the second picking cassette transporter 35b also transport a cassette Ca at the first drug receiver 32a to the returning cassette holder 232.

As shown in FIG. 10B, the first picking cassette transporter 35a includes the first cassette gripper 351 and a first cassette transporter 352.

The first cassette gripper 351 grips a cassette Ca. In the present embodiment, the first cassette gripper 351 includes a frame having, on each of its laterally extending side walls (extending in X-direction) or its longitudinal ends, a protrusion 351a to be received in the tab receiver Ca12 in a cassette Ca (refer to FIGS. 3A to 3D). The frame has a hollow to receive the bottom of a cassette Ca and the cassette holder 23 (the first cassette holder 23a herein) to pass through it when the first cassette gripper 351 moves vertically. The frame has the hollow sized to be engageable with the protrusion 351a. When the first cassette gripper 351 moves vertically in the cassette holder 23, the protrusion 351a is received in the tab receiver Ca12 on the cassette holder 23, allowing the first cassette gripper 351 to grip the cassette Ca.

The first cassette transporter 352 moves the first cassette gripper 351. The first cassette transporter 352 includes a first beam 353 and first posts 354. The first beam 353 extends in the depth direction (Y-direction) of the picking unit 3, and supports the first cassette gripper 351 in a slidable manner. The first posts 354 extend in the height direction (Z-direction) of the picking unit 3, and supports the first beam 353 in a slidable manner. The picking-cassette transporter controller 121 moves the first beam 353 along the first posts 354, and moves the first cassette gripper 351 along the first beam 353. This allows selected cassettes Ca to be transported between the cassette holder 23 and the drug receiver 32.

As shown in FIG. 10B, the second picking cassette transporter 35b includes the second cassette gripper 355 and a second cassette transporter 356. Similarly to the first cassette gripper 351, the second cassette gripper 355 has, on each of its lateral side walls, a protrusion to be received in the tab receiver Ca12 in a cassette Ca. The second cassette transporter 356 includes a second beam 357 and second posts 358. The second cassette gripper 355 and the second cassette transporter 356 have the same structure and the same functions as the first cassette gripper 351 and the first cassette transporter 352.

As shown in FIGS. 10C and 10D, the first beam 353 and the second beam 357 are spaced apart to allow the first cassette gripper 351 and the second cassette gripper 355 to be movable in the depth direction of the picking unit 3.

The picking-cassette transporter controller 121 controls the first cassette gripper 351 and the second cassette gripper 355 to be moved (or positioned) to avoid hitting each other.

More specifically, the first cassette gripper 351 and the second cassette gripper 355 are both cantilevered on the first beam 353 and the second beam 357, which are spaced apart as described above. The first cassette transporter 352 and the second cassette transporter 356 are controlled to avoid interfering with each other over their respective movable ranges (the area between the first beam 353 and the second beam 357). Thus, the first cassette gripper 351 and the second cassette gripper 355 are movable to avoid hitting each other between the cassette holder 23 and the drug receiver 32.

This structure allows cassettes Ca to be transported with the multiple cassette grippers between the cassette holder 23 and the drug receiver 32 and improves the efficiency of transporting cassettes Ca.

An operation of the first picking cassette transporter 35a for gripping a cassette Ca will now be described with reference to FIGS. 11A to 11E. FIGS. 11A to 11E are diagrams each describing the operation of the first picking cassette transporter 35a for gripping a cassette Ca.

Figure 11A:
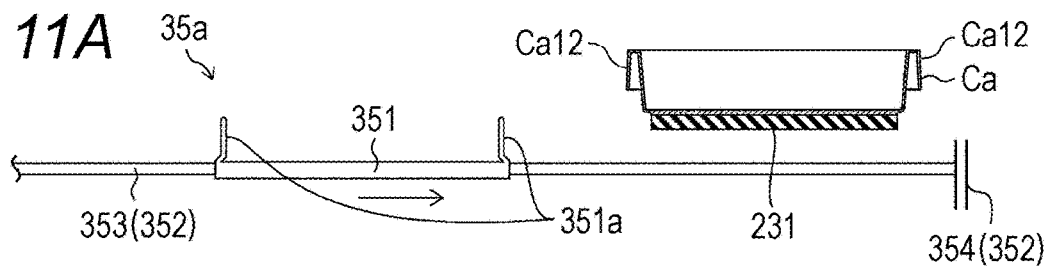
FIGS. 11A to 11E are diagrams each describing an operation of the first picking cassette transporter for gripping a cassette.
Figure 11B:
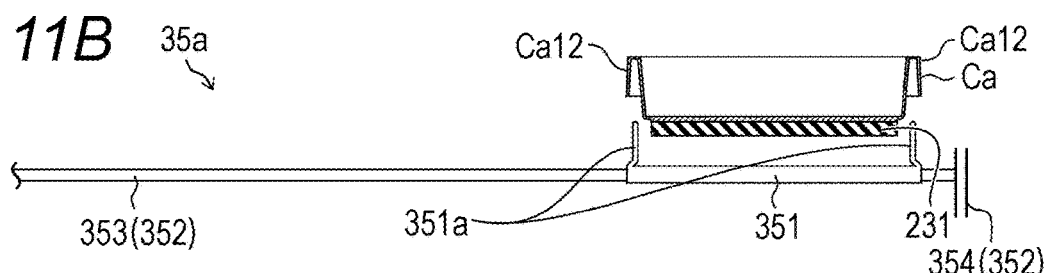

With the cassette Ca placed on the transporting cassette holder 231, the first beam 353 first moves vertically along the first posts 354 to move the first cassette gripper 351 to immediately below the transporting cassette holder 231. Subsequently, as shown in FIG. 11A, the first cassette gripper 351 moves horizontally toward the transporting cassette holder 231, and then stops at a position immediately below the transporting cassette holder 231 as shown in FIG. 11B.

Figure 11C:
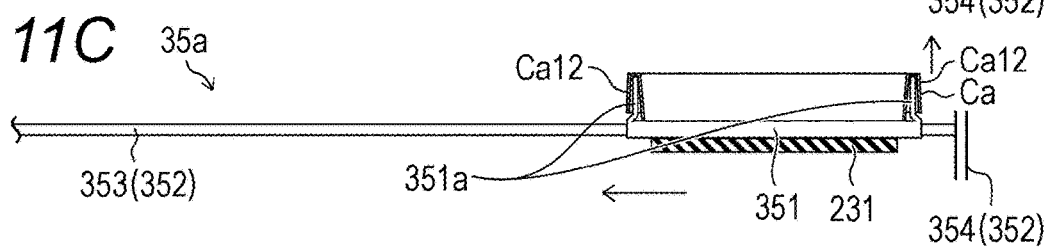

As shown in FIG. 11C, the first beam 353 moves vertically upward along the first posts 354 to cause the transporting cassette holder 231 to pass through the hollow of the first cassette gripper 351 and the protrusion 351a in the first cassette gripper 351 to be received and temporarily engaged in the tab receiver Ca12 in the cassette Ca. The first cassette gripper 351 can thus grip the cassette Ca.

Figure 11D:
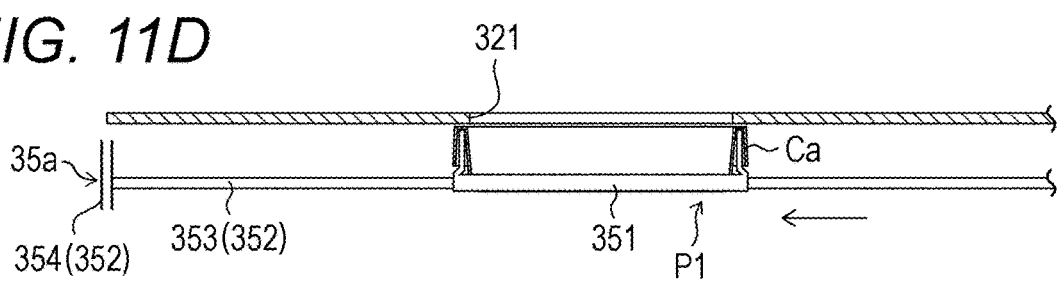

The first cassette gripper 351 gripping the cassette Ca moves along the first beam 353 to below the slot 321, while the first beam 353 is moving vertically upward along the first posts 354 to move the first cassette gripper 351 to immediately below the slot 321. As shown in FIG. 11D, the first cassette gripper 351 can transport the cassette Ca to immediately below the slot 321, allowing the user to remove or load drug sheets from or into the cassette Ca gripped by the first cassette gripper 351.

The position immediately below the slot 321 (specifically, the position at which the user can remove or load drug sheets from or into the cassette Ca) is referred to as a drug receiving position P1.

After the user completes an operation at the drug receiving position P1, the first beam 353 moves vertically downward along the first posts 354 to move the first cassette gripper 351 to immediately above the returning cassette holder 232. Also, the first cassette gripper 351 moves along the first beam 353 toward the returning cassette holder 232. Subsequently, the operation reverse to the operation shown in FIG. 11C is performed. More specifically, the first beam 353 moves vertically downward along the first posts 354 to place the cassette Ca onto the transporting cassette holder 231. In this state, the protrusion 351a is separated from the tab receiver Ca12, disengaging the temporary engagement between the protrusion 351a and the tab receiver Ca12. Subsequently, the first cassette gripper 351 allows the returning cassette holder 232 to pass through the hollow and moves to the transporting cassette holder 231.

The second picking cassette transporter 35b moves in the same manner as the first picking cassette transporter 35a. For example, the second picking cassette transporter 35b grips a second cassette Ca containing drug sheets to be removed or loaded following the cassette Ca gripped by the first cassette gripper 351, and transports the second cassette Ca to the drug receiving position P1.

Figure 11E:
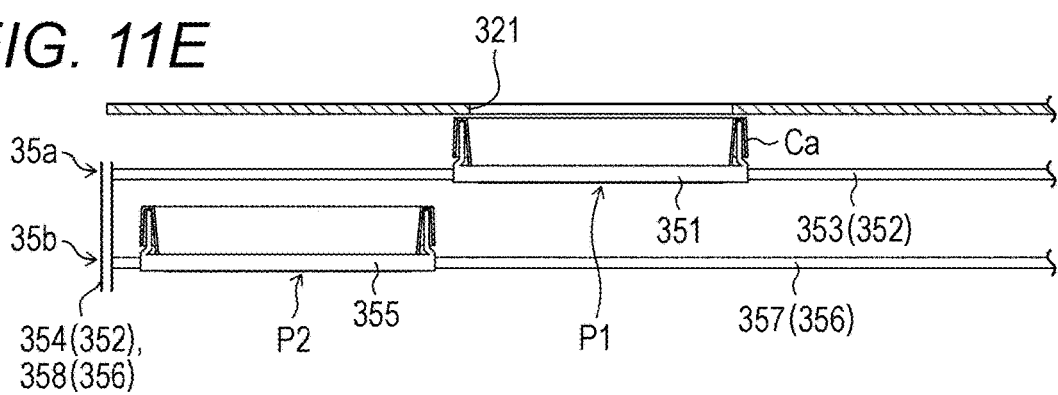

As shown in FIG. 11E, when the first cassette gripper 351 is at the drug receiving position P1, the second cassette gripper 355 moves to the standby position P2 adjacent to the drug receiver 32 (specifically, adjacent to the drug receiving position P1). Subsequently, after the first cassette gripper 351 moves toward the returning cassette holder 232, the second cassette gripper 355 moves to the drug receiving position P1. The first cassette gripper 351 returns the cassette Ca to the returning cassette holder 232, and then grips another cassette Ca placed on the transporting cassette holder 231 and moves the cassette Ca to the standby position P2. This operation is repeated.

In the present embodiment, as shown in FIG. 11E, the standby position P2 is below the drug receiving position P1, and is more away from the main unit 2 than the drug receiving position P1 in the depth direction of the picking unit 3. This allows the cassette gripper at the drug receiving position P1 to move toward the returning cassette holder 232 without hitting the cassette gripper at the standby position P2.

Example Operation of Picking Cassette Transporter

An example operation of the picking cassette transporter 35 will now be described with reference to FIGS. 12A to 12H. FIGS. 12A to 12H are diagrams each describing an example operation of the first picking cassette transporter 35a and an example operation the second picking cassette transporter 35b. In FIGS. 12A to 12H, each hatched arrow indicates the movement of the first cassette gripper 351, each solid arrow indicates the movement of the second cassette gripper 355, and each outline arrow indicates the movement of a cassette Ca transported by the main cassette transporter 22. At the start of the example operation described below, the first cassette gripper 351 gripping a cassette Ca is at the drug receiving position P1, and the second cassette gripper 355 gripping a cassette Ca is at the standby position P2, as illustrated.

In the present embodiment, as shown in FIGS. 12C to 12F, the first picking cassette transporter 35a (the first cassette gripper 351 and the first cassette transporter 352) can access the transporting cassette holder 231 and the returning cassette holder 232 in the upper shelf. Also, as shown in FIGS. 12C and 12F to 12H, the second picking cassette transporter 35b (the second cassette gripper 355 and the second cassette transporter 356) can access the transporting cassette holder 231 and the returning cassette holder 232 in the lower shelf. In FIGS. 12A to 12H, the transporting cassette holder 231 and the returning cassette holder 232 in the upper shelf are a transporting cassette holder 231a and a returning cassette holder 232a. Similarly, the transporting cassette holder 231 and the returning cassette holder 232 in the lower shelf are a transporting cassette holder 231b and a returning cassette holder 232b.

The transporting cassette holder 231 and the returning cassette holder 232 in the cassette holder 23 may be at any positions. In other words, the portion of the cassette holder 23 to function as the transporting cassette holder 231 or as the returning cassette holder 232 may be set as appropriate. The setting may be changed by the control unit 10 in accordance with the operating state of the drug station 1 including the main unit 2 (e.g., depending on the dispensing situations of drug sheets).

More specifically, the receptacle for a cassette Ca included in the cassette holder 23 may function as the transporting cassette holder 231 or as the returning cassette holder 232 in a switchable manner in accordance with the operating state, as controlled by the control unit 10. The cassette receptacle can thus function as the transporting cassette holder 231 or as the returning cassette holder 232 in accordance with the operating state. The cassette holder 23 can hold a cassette Ca efficiently in accordance with the operating state. In some embodiments, the cassette receptacle may function as the transporting cassette holder 231 or as the returning cassette holder 232 in a switchable manner independently of the operating state (in response to, for example, a user input).

Also, the positions of the cassette holder 23 to be accessed by the first picking cassette transporter 35a and the second picking cassette transporter 35b may be set as appropriate. The setting may be switched as appropriate as controlled by the control unit 10 in accordance with the operating state.

As shown in FIG. 12A, as described above, the first cassette transporter 352 in the first picking cassette transporter 35a may transport the first cassette gripper 351 gripping the cassette Ca to the drug receiving position P1. In this state, the shutter 322 is open to allow a picking operation to be performed on the cassette Ca gripped by the first cassette gripper 351. The second cassette transporter 356 in the second picking cassette transporter 35b may transport the second cassette gripper 355 gripping the cassette Ca to the standby position P2. More specifically, the second cassette gripper 355 gripping the cassette Ca may be on standby at the standby position P2.

During the picking operation, the main cassette transporter 22 may place another cassette Ca onto the transporting cassette holder 231a as shown in FIG. 12B.

In response to completion of the picking operation on the cassette Ca gripped by the first cassette gripper 351 and the drug determiner 124 determining that the type and the quantity of drug sheets placed into the drug port 331 are correct, the shutter 322 is closed. In response to the shutter 322 being closed, as shown in FIG. 12C, the first cassette transporter 352 first moves the first cassette gripper 351 to the returning cassette holder 232a, and then places the cassette Ca gripped by the first cassette gripper 351 onto the returning cassette holder 232a. The second cassette transporter 356 then moves the second cassette gripper 355 to the drug receiving position P1, which is unoccupied after the first cassette gripper 351 has moved away. In this state, the shutter 322 is open to allow a picking operation to be performed on the gripped cassette Ca gripped by the second cassette gripper 355.

As shown in FIG. 12D, the main cassette transporter 22 returns the cassette Ca that has been placed onto the returning cassette holder 232a by the first cassette transporter 352 to the storage position of the cassette Ca in the cassette shelf 21. Also, the first cassette transporter 352 moves the first cassette gripper 351 from the returning cassette holder 232a to the transporting cassette holder 231a. Subsequently, the first cassette transporter 352 causes the first cassette gripper 351 to grip the cassette Ca placed on the transporting cassette holder 231a.

Subsequently, as shown in FIG. 12E, the first cassette transporter 352 moves the first cassette gripper 351 gripping the cassette Ca to the standby position P2, and waits until the picking operation on the gripped cassette Ca gripped by the second cassette gripper 355 is complete. Also, during the picking operation on the cassette Ca gripped by the second cassette gripper 355, the main cassette transporter 22 places another cassette Ca onto the transporting cassette holder 231b.

In response to completion of the picking operation on the cassette Ca gripped by the second cassette gripper 355 and the drug determiner 124 determining that the type and the quantity of drug sheets placed into the drug port 331 are correct, the shutter 322 is closed. In response to the shutter 322 being closed, as shown in FIG. 12F, the second cassette transporter 356 first moves the second cassette gripper 355 to the returning cassette holder 232b, and places the cassette Ca gripped by the second cassette gripper 355 onto the returning cassette holder 232b. Also, the first cassette transporter 352 moves the first cassette gripper 351 to the drug receiving position P1, which is unoccupied after the second cassette gripper 355 has moved away. In this state, the shutter 322 is open to allow a picking operation to be performed on the cassette Ca gripped by the first cassette gripper 351.

As shown in FIG. 12G, the main cassette transporter 22 returns the cassette Ca that has been placed onto the returning cassette holder 232b by the second cassette transporter 356 to the storage position of the cassette Ca in the cassette shelf 21. Also, the second cassette transporter 356 moves the second cassette gripper 355 from the returning cassette holder 232b to the transporting cassette holder 231b. Subsequently, the second cassette transporter 356 causes the second cassette gripper 355 to grip the cassette Ca placed on the transporting cassette holder 231b.

Subsequently, as shown in FIG. 12H, the second cassette transporter 356 moves the second cassette gripper 355 gripping the cassette Ca to the standby position P2, and waits until the picking operation on the cassette Ca gripped by the first cassette gripper 351 is complete.

During transportation of a cassette Ca based on prescription data, the above operation is repeated until a picking operation is complete for each of all drug sheets indicated by the prescription data. For loading drug sheets sequentially, the above operation is also repeated until a loading operation may also be complete for all the drug sheets.

In FIGS. 12E and 12F, when the second cassette gripper 355 is not at the drug receiving position P1, the first cassette transporter 352 may transport the first cassette gripper 351 directly to the drug receiving position P1. Similarly, when the first cassette gripper 351 is not at the drug receiving position P1, in FIGS. 12G and 12H, the second cassette transporter 356 may transport the second cassette gripper 355 directly to the drug receiving position P1.

In this manner, the first picking cassette transporter 35a and the second picking cassette transporter 35b transport a cassette Ca from which or into which drug sheets are to be removed or loaded to the drug receiving position P1. Also, when another cassette Ca is at the drug receiving position P1, the first picking cassette transporter 35a and the second picking cassette transporter 35b transport a cassette Ca from which or into which drug sheets are to be removed or loaded following the other cassette Ca to the standby position P2 at which the cassette Ca is to be on standby.

More specifically, the first cassette gripper 351 and the second cassette gripper 355 grip a cassette Ca drawn from the cassette holder 23, and transport the cassette Ca between the cassette holder 23, the drug receiving position P1, and the standby position P2. The first cassette gripper 351 and the second cassette gripper 355 move to avoid hitting each other.

This allows an operation on a cassette Ca at the drug receiving position P1, and also allows another cassette Ca to be handled following the current cassette Ca to be on standby at the standby position P2 adjacent to the drug receiving position P1. Thus, the operation on the cassette Ca complete at the drug receiving position P1 is followed by the cassette Ca at the standby position P2 transported to the drug receiving position P1. This allows the user to perform operations on multiple cassettes Ca more efficiently.

Thus, the picking unit 3 can efficiently deliver a cassette Ca to a user who removes or loads drug sheets from or into the cassette Ca.

Example Operation of Shutter 322

Figure 13A:
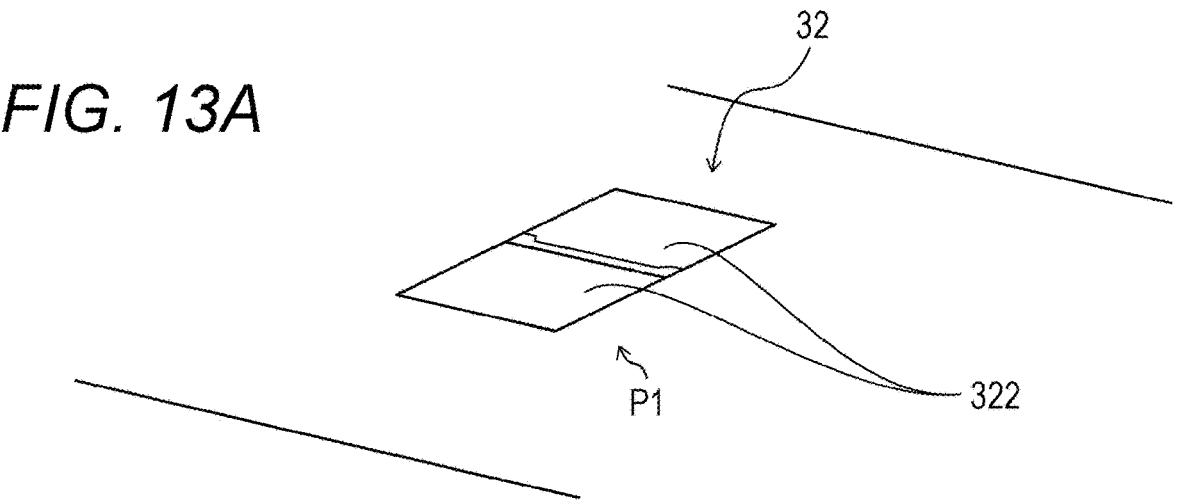
FIGS. 13A to 13C are diagrams each describing an example operation of a shutter.
Figure 13B:
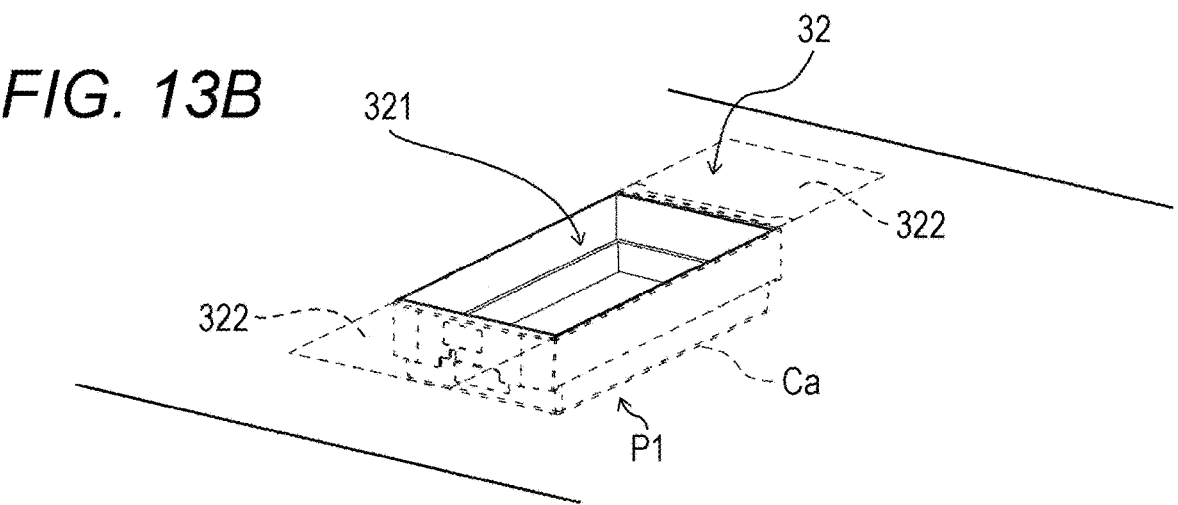
Figure 13C:
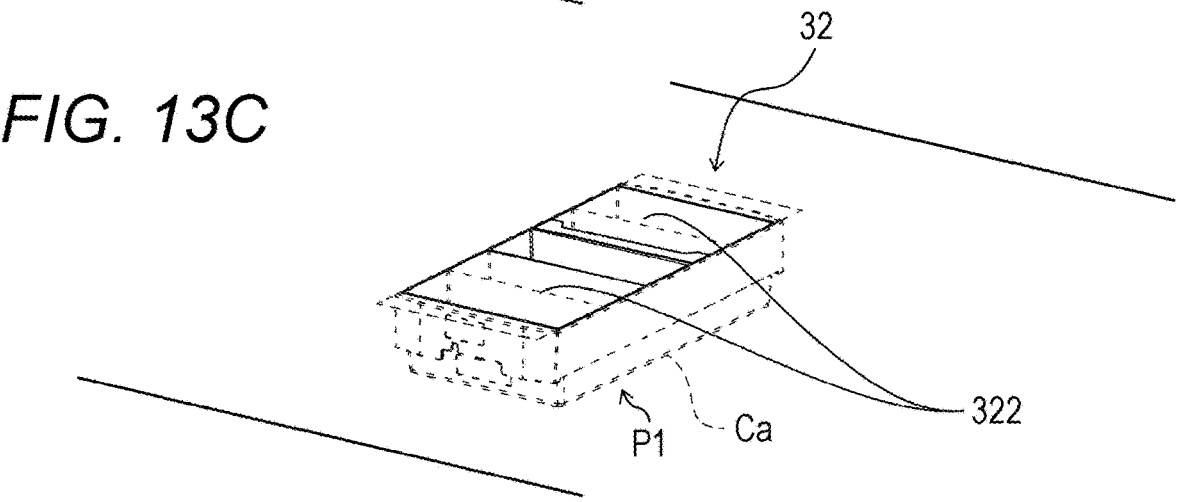

An example operation of the shutter 322 will now be described with reference to FIGS. 13A to 13C. FIGS. 13A to 13C are diagrams describing an example operation of the shutter 322.

As described above, the shutter 322 is open and closed as controlled by the shutter controller 122. More specifically, as shown in FIG. 13A, the shutter controller 122 controls the shutter 322 to be closed when no cassette Ca is at the drug receiver 32 (specifically, the drug receiving position P1). As shown in FIGS. 13B and 13C, the shutter controller 122 opens the shutter 322 after the picking cassette transporter 35 stops transporting the cassette Ca at the drug receiving position P1. This allows the user to perform a drug sheet picking or loading operation on the cassette Ca.

The picking-cassette transporter controller 121 and the shutter controller 122 can specify the type of each cassette Ca, and the correspondence between each storage position in the cassette Ca and the type of drug sheets to be stored at each storage position in the cassette Ca. For a cassette Ca with no partition (e.g., a small cassette Ca3), the picking-cassette transporter controller 121 and the shutter controller 122 specify the cassette Ca to store drug sheets of a single type alone. The picking-cassette transporter controller 121 first moves the cassette Ca to cause its middle portion to be in substantially the middle of the slot 321. The shutter controller 122 then fully opens the shutter 322 as shown in FIG. 13B.

For a cassette Ca with one or more partitions (e.g., a large cassette Ca1 or a medium-sized cassette Ca2), the picking-cassette transporter controller 121 transports the cassette Ca to have the storage position of drug sheets to be dispensed or loaded in substantially the middle of the slot 321. Subsequently, the shutter controller 122 opens the shutter 322 by the degree corresponding to the width of the compartment storing drug sheets as shown in FIG. 13C.

In this manner, the opening degree of the shutter 322 can be varied in accordance with the type of the cassette Ca transported to the drug receiving position P1.

When drug sheets to be dispensed or loaded next are contained in the same cassette Ca as the drug sheets currently being dispensed or loaded, the position of the current cassette Ca is simply to be changed, without the cassette Ca being replaced with another cassette Ca. In this case, the shutter controller 122 closes the shutter 322 after the drug sheets are dispensed from or loaded into the current cassette Ca. The picking-cassette transporter controller 121 then moves the cassette Ca to cause the storage position of drug sheets to be dispensed or loaded next to be in substantially the middle of the slot 321. The shutter controller 122 then opens the shutter 322 by the degree corresponding to the width of the compartment for storing the drug sheets to be dispensed or loaded next.

Drug sheets that are likely to be dispensed at a time may be contained in the same cassette Ca having one or more partitions to allow such drug sheets to be dispensed more efficiently.

In the example described above, the cassette Ca is transported to cause the storage position accessed by the user to be in substantially the middle of the slot 321, and the shutter 322 is then open in substantially the middle of the slot 321. In some embodiments, a cassette Ca having one or more partitions may be transported to cause its middle portion to be in substantially the middle of the slot 321, and the shutter 322 may then be open in a stepwise manner at the storage position in the cassette Ca accessed by the user.

Structure of Drug Dispenser

Figure 14:
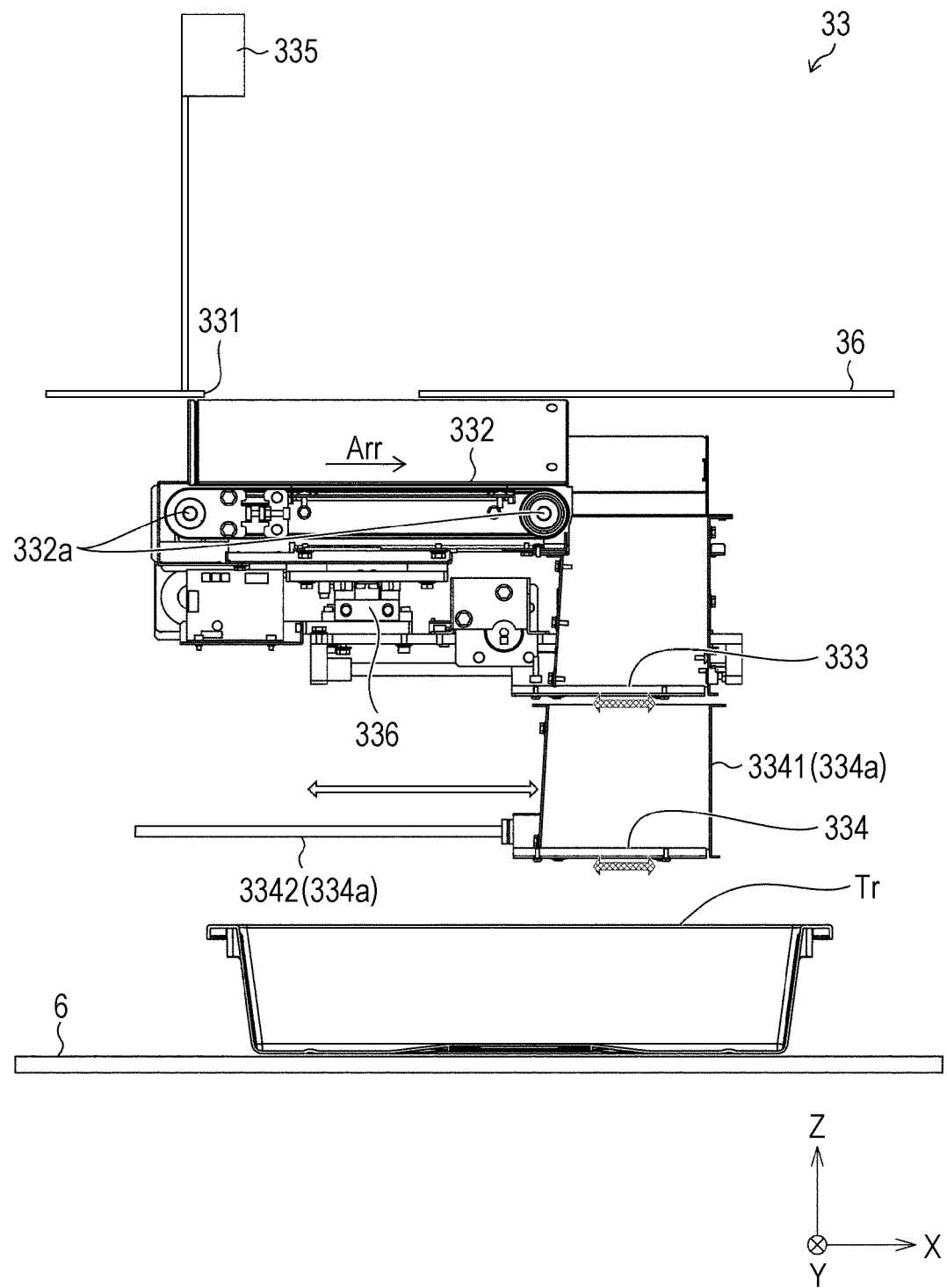
FIG. 14 is a cross-sectional view of a drug dispenser showing its example structure.

An example structure of the drug dispenser 33 will now be described with reference to FIG. 14. FIG. 14 is a cross-sectional view of the drug dispenser 33 showing its example structure.

As shown in FIG. 14, the worktable 36 has the drug port 331, above which the image sensor 335 is placed. The drug transporter 332 is located below the drug port 331.

The drug transporter 332 operates to cause drug sheets placed through the drug port 331 to drop toward the upper shutter 333. In the present embodiment, the drug transporter 332 includes a belt conveyor that rotates with rotational shafts 332a in the direction indicated by arrow Arr shown in FIG. 14. Also, the measuring unit 336 (load cell) is immediately below the drug transporter 332, allowing the measurement of drug sheets placed on the drug transporter 332.

The upper shutter 333 is located below the drug transporter 332 to receive drug sheets that drop from the drug transporter 332. The upper shutter 333 is open and closed in the horizontal direction (in the width direction of the picking unit 3 in the present embodiment, or X-direction). The lower shutter 334 is located below the upper shutter 333 to receive drug sheets that drop from the upper shutter 333. The lower shutter 334 is open and closed in the horizontal direction (in X-direction in the present embodiment). In this structure, the upper shutter 333 and the lower shutter 334 that are closed can temporarily hold drug sheets. The upper shutter 333 is open to cause drug sheets to drop onto the lower shutter 334. The lower shutter 334 is open to cause drug sheets to drop onto the transportation tray Tr.

In the initial state, the upper shutter 333 is open, and the lower shutter 334 is closed.

The drug dispenser 33 includes a lower shutter drive 334a that moves the lower shutter 334 in the horizontal direction (X-direction). More specifically, the lower shutter drive 334a includes a compartment 3341 having the lower shutter 334 on the bottom, and a beam 3342 that allows the compartment 3341 to be slidable in X-direction. The compartment 3341 is movable in X-direction to allow drug sheets received immediately below the upper shutter 333 to drop at a position on the transportation tray Tr different from the position at which the drug sheets have been received.

More specifically, the lower shutter drive 334a can adjust the relative positions of the lower shutter 334 and the transportation tray Tr in X-direction. This allows drug sheets to drop at an intended position on the transportation tray Tr. The above relative positions may also be adjusted by the tray transporter 6 moving the transportation tray Tr.

The drug dispenser controller 123 controls the image sensor 335 in response to, for example, drug sheets placed into the drug port 331 and the measuring unit 336 starting to measure the drug sheet quantity. The image sensor 335 then captures an image of the drug sheets. The drug determiner 124 determines, based on the image of the drug sheets captured by the image sensor 335 and the weight of the drug sheets measured by the measuring unit 336, as well as prescription data, whether the drug sheets placed into the drug port 331 are the correct drug sheets to be dispensed based on the prescription data.

When determining that the drug sheets placed into the drug port 331 are correct, the drug determiner 124 determines whether any drugs contained in any of the drug sheets are prone to damage (e.g., prone to dents) based on the type of each drug sheet. When the drug determiner 124 finds any drug sheet containing a drug prone to damage, the drug dispenser controller 123 closes the upper shutter 333 and then operates the drug transporter 332 to cause the drug sheets to drop onto the upper shutter 333 that is closed. After a predetermined time (the time enough to allow the drug sheets placed on the drug transporter 332 to drop completely), the drug dispenser controller 123 opens the upper shutter 333 to cause the drug sheets to drop onto the lower shutter 334 that is closed.

When the drug determiner 124 finds no such drug sheets containing a drug prone to damage, the drug dispenser controller 123 maintains the upper shutter 333 to be open and operates the drug transporter 332 to cause the drug sheets to drop onto the lower shutter 334 that is closed.

In this manner, the upper shutter 333 reduces damage to a drug prone to damage that may result from dropping from the drug transporter 332. Drug sheets containing no drug prone to damage are dropped from the drug transporter 332 directly onto the lower shutter 334. This saves time to be taken by the upper shutter 333 to temporarily hold such drug sheets.

The transportation tray Tr onto which drug sheets are to be dispensed as indicated by prescription data is transported by the tray transporter 6 and is located below the lower shutter 334. In this state, the drug dispenser controller 123 controls the lower shutter drive 334a. This moves the lower shutter 334 to above the transportation tray Tr to receive drug sheets. The drug dispenser controller 123 then opens the lower shutter 334 to allow the drug sheets to drop onto the transportation tray Tr.

The drug dispenser controller 123 and the transporter controller 13 control the positions of the lower shutter 334 and the transportation tray Tr to allow different types of drug sheets to be received at different positions on the transportation tray Tr. For example, the drug dispenser controller 123 positions the lower shutter 334 in X-direction, whereas the transporter controller 13 positions the transportation tray Tr in Y-direction. The control unit 10 determines the positions to which the drug sheets drop to align the drug sheets in the order of being dispensed as indicated by prescription data.

Processing in Main Unit and Picking Unit

Figure 15:
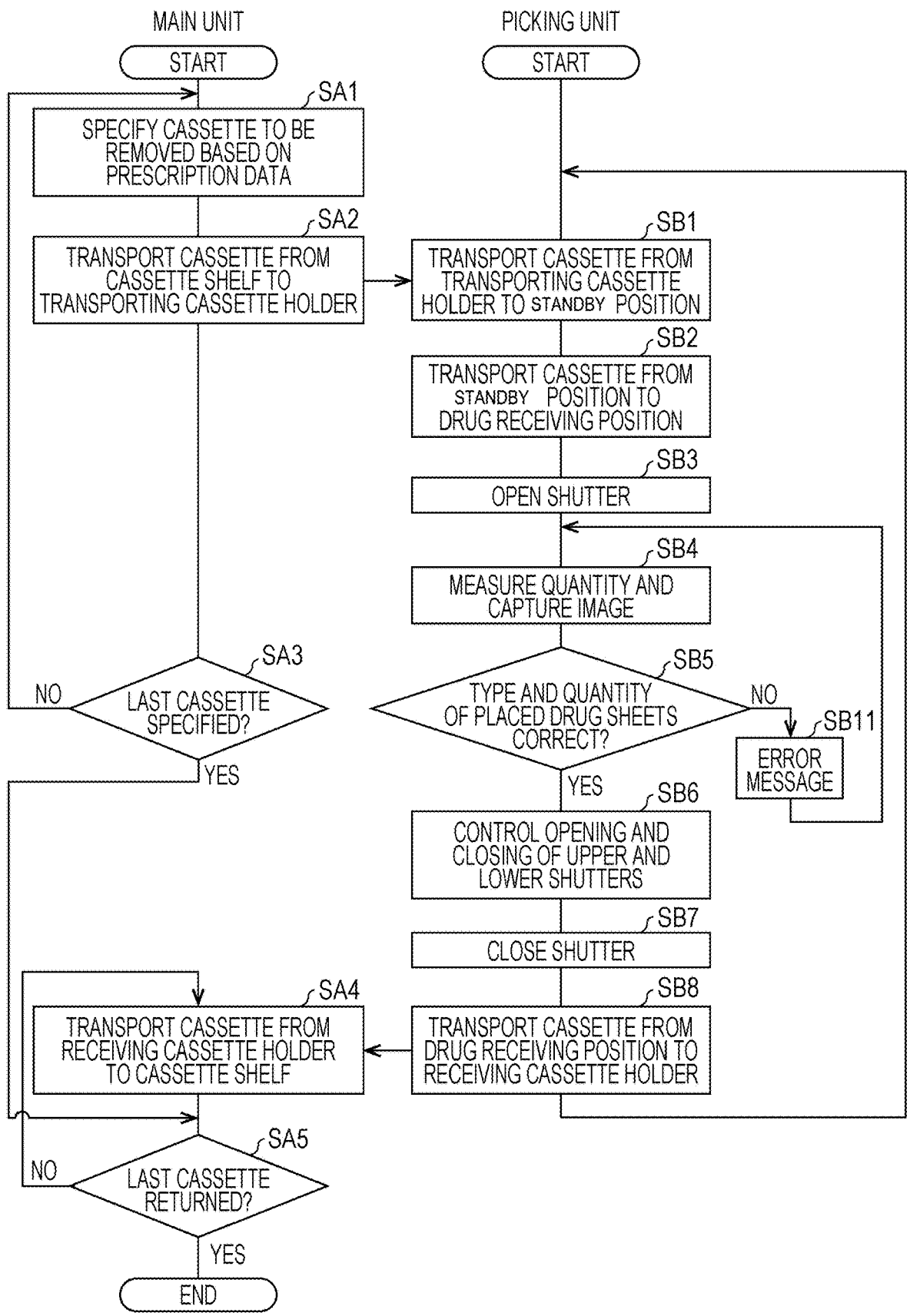
FIG. 15 is a flowchart showing an example process performed by the main unit and the picking unit for dispensing drug sheets onto a transportation tray.
Figure 16:
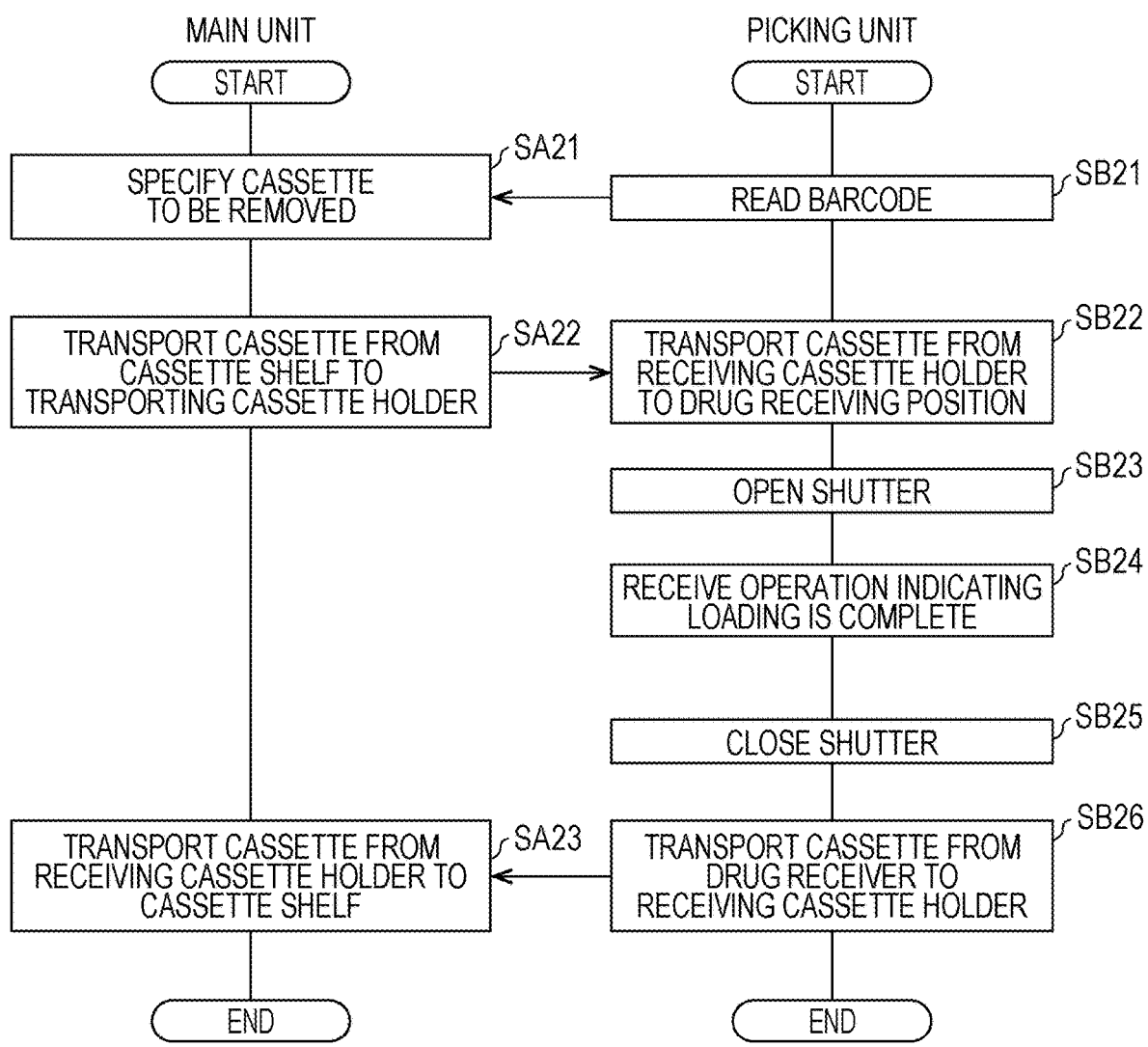
FIG. 16 is a flowchart showing an example process performed by the main unit and the picking unit for loading drug sheets into a cassette.

The processing performed in the main unit 2 and the picking unit 3 will now be described with reference to FIGS. 15 and 16. FIG. 15 is a flowchart showing an example process performed by the main unit 2 and the picking unit 3 for dispensing drug sheets onto the transportation tray Tr. FIG. 16 is a flowchart showing an example process performed by the main unit 2 and the picking unit 3 for loading drug sheets into the cassette Ca.

Dispensing Drug Sheets

For dispensing drug sheets onto the transportation tray Tr, as shown in FIG. 15, the control unit 10 first receives input prescription data (or a user input). In the main unit 2, the cassette specifier 111 refers to the memory 15 to specify a cassette Ca containing drug sheets indicated by the prescription data (SA1). The cassette specifier 111 also specifies the storage position of the cassette Ca in the cassette shelf 21.

The main-cassette transporter controller 112 controls the first main cassette transporter 22a to move the first cassette gripper 221a to the storage position specified by the cassette specifier 111. When determining that the first cassette gripper 221a is located immediately in front of the cassette Ca specified by the cassette specifier 111 based on the detection result obtained by the position sensor 2214, the main-cassette transporter controller 112 removes the cassette Ca from the cassette shelf 21. The main-cassette transporter controller 112 then transports the removed cassette Ca to the transporting cassette holder 231 (SA2). In this state, the RFID reader reads the tab receiver identification information from the RFID tag included in the cassette Ca, and transmits the tab receiver identification information to the picking unit controller 12.

Also, the cassette specifier 111 determines whether the specified cassette Ca is a last cassette containing a last drug sheet indicated by the prescription data (SA3). In response to the cassette specifier 111 determining that the current cassette Ca is not the last cassette (No in SA3), the processing returns to step SAL In this state, the main-cassette transporter controller 112 controls the second main cassette transporter 22b to move the second cassette gripper 221b to the storage position specified by the cassette specifier 111. In this manner, in response to every cassette Ca specified by the cassette specifier 111, the first main cassette transporter 22a and the second main cassette transporter 22b are driven alternately for efficient removal of the cassette Ca. In response to the cassette specifier 111 determining that the current cassette Ca is the last cassette (Yes in SA3), the processing advances to step SA5.

In the main unit 2, when the cassette Ca is returned to the returning cassette holder 232 by the picking-cassette transporter controller 121, the main-cassette transporter controller 112 controls the first cassette gripper 221a or the second cassette gripper 221b to remove the cassette Ca from the returning cassette holder 232.

For example, the main-cassette transporter controller 112 first transports the cassette Ca to the transporting cassette holder 231, and then moves the first cassette gripper 221a or the second cassette gripper 221b to the returning cassette holder 232. After the cassette Ca is placed onto the returning cassette holder 232 and then the picking cassette transporter 35 moves away from the returning cassette holder 232, the main-cassette transporter controller 112 removes the cassette Ca from the returning cassette holder 232.

The main-cassette transporter controller 112 specifies the storage position of the cassette Ca removed from the returning cassette holder 232 by referring to the memory 15, and controls the first main cassette transporter 22a or the second main cassette transporter 22b to return the cassette Ca to the storage position (SA4).

Also, the cassette specifier 111 determines whether the cassette Ca to be returned to the cassette shelf 21 is the last cassette (SA5). In response to the cassette specifier 111 determining that the cassette Ca is not the last cassette (No in SA5), the processing returns to step SA4. In response to the cassette specifier 111 determining that the cassette Ca is the last cassette (Yes in SA5), the process ends.

After the cassette Ca is placed onto the transporting cassette holder 231 and then the main cassette transporter 22 moves away from the transporting cassette holder 231 through the processing in step SA2, the picking-cassette transporter controller 121 in the picking unit 3 controls the first picking cassette transporter 35a or the second picking cassette transporter 35b to transport the cassette Ca placed on the transporting cassette holder 231 to the standby position P2 (SB1), and then to the drug receiving position P1 (SB2).

When another cassette Ca is already at the drug receiving position P1, the picking-cassette transporter controller 121 transports the current cassette Ca to the standby position P2. In other words, when no other cassette Ca is at the drug receiving position P1, the picking-cassette transporter controller 121 may transport the cassette Ca directly from the transporting cassette holder 231 to the drug receiving position P1.

In response to the current cassette Ca being placed at the drug receiving position P1, the shutter controller 122 opens the shutter 322 (SB3).

When drug sheets are to be dispensed from any cassette Ca having one or more partitions, the picking-cassette transporter controller 121 specifies the orientation of the cassette Ca at the drug receiving position P1 based on (1) the tab receiver identification information read by the RFID reader and (2) data associating the storage position information and the drug identification information stored in the memory 15. In other words, the picking-cassette transporter controller 121 specifies the storage position of each type of drug sheet in the cassette Ca when the cassette Ca is at the drug receiving position P1. Subsequently, the picking-cassette transporter controller 121 moves the cassette Ca to cause the storage position of drug sheets to be dispensed to be in substantially the middle of the slot 321 based on the specified storage position. The shutter controller 122 then controls the shutter 322 to open partially at the storage position.

While the shutter 322 is open, the user removes drug sheets in the quantity appearing on the second touchscreen 31, and places the removed drug sheets into the drug port 331. The measuring unit 336 starts measuring the drug sheet quantity. The drug dispenser controller 123 controls the image sensor 335 to capture an image of the drug sheets placed into the drug port 331 (SB4). In some embodiments, the image sensor 335 may start capturing an image and the measuring unit 336 may start measuring the drug sheet quantity in response to a user input received on the second touchscreen 31 indicating completion of the drug sheet placement into the drug port 331.

The drug determiner 124 determines whether the type and the quantity of the drug sheets placed into the drug port 331 match the type and the quantity indicated by the prescription data based on the image captured by the image sensor 335 and the quantity measured by the measuring unit 336 (SB5). When a mismatch is found (No in SB5), the touchscreen controller 14 causes an error message to appear on the second touchscreen 31 indicating that the type or the quantity of drug sheets placed is incorrect (SB11). This may include a message to prompt placement of drug sheets again.

When a match is found (Yes in SB5), the drug dispenser controller 123 controls the opening and closing operation of the upper shutter 333 and the lower shutter 334 (SB6).

More specifically, in response to the drug determiner 124 determining that the drug sheets are prone to damage, the drug dispenser controller 123 closes the upper shutter 333 and then operates the drug transporter 332 to cause the drug sheets to drop onto the upper shutter 333 that is closed. Subsequently, the drug dispenser controller 123 opens the upper shutter 333 and then opens the lower shutter 334 to allow the drug sheets to drop onto the transportation tray Tr. The drug dispenser controller 123 opens the lower shutter 334 after the relative positions of the lower shutter 334 and the transportation tray Tr are adjusted.

In response to the drug determiner 124 determining that the drug sheets are not prone to damage, the drug dispenser controller 123 maintains the upper shutter 333 to be open and operates the drug transporter 332 to cause the drug sheets to drop onto the lower shutter 334 that is closed. After the relative positions of the lower shutter 334 and the transportation tray Tr are adjusted, the drug dispenser controller 123 opens the lower shutter 334 to allow the drug sheets to drop onto the transportation tray Tr.

When a match is found (or Yes) in step SB5, the shutter controller 122 closes the shutter 322 (SB7). The picking-cassette transporter controller 121 controls the first picking cassette transporter 35a or the second picking cassette transporter 35b to transport the cassette Ca at the drug receiving position P1 to the returning cassette holder 232 (SB8).

Subsequently, the picking-cassette transporter controller 121 returns to the processing in steps SB1 and SB2. More specifically, the picking-cassette transporter controller 121 controls the picking cassette transporter 35 that has returned the cassette Ca to the returning cassette holder 232 to transport the cassette Ca placed on the transporting cassette holder 231 to the standby position P2. Also, the picking-cassette transporter controller 121 controls the picking cassette transporter 35 that has placed the cassette Ca to be on standby at the standby position P2 to transport the cassette Ca to the drug receiving position P1.

Also, when the cassette Ca from which drug sheets have been dispensed also contains drug sheets to be dispensed next, the picking-cassette transporter controller 121 moves the cassette Ca to cause the storage position of the drug sheets to be in substantially the middle of the slot 321 after the processing in step SB7. The processing then returns to step SB3.

The picking unit controller 12 repeats the above processing until the last cassette is transported to the returning cassette holder 232.

Loading of Drug Sheets

For loading drug sheets into a cassette Ca, as shown in FIG. 16, the barcode reader 34 in the picking unit 3 reads drug identification information for drug sheets to be loaded (SB21). In the main unit 2, the cassette specifier 111 specifies a cassette Ca into which drug sheets are to be loaded by referring to the memory 15 based on prescription data (SA21). The cassette specifier 111 also specifies the storage position of the cassette Ca in the cassette shelf 21.

In the same manner as in step SA2, the main-cassette transporter controller 112 controls the main cassette transporter 22 to remove the cassette Ca specified by the cassette specifier 111 from the cassette shelf 21 and to transport the cassette Ca to the transporting cassette holder 231 (SA22).

After the cassette Ca is placed onto the transporting cassette holder 231 and then the main cassette transporter 22 moves away from the transporting cassette holder 231, the picking-cassette transporter controller 121 in the picking unit 3 controls the picking cassette transporter 35 to transport the cassette Ca placed on the transporting cassette holder 231 to the drug receiving position P1 (SB22).

In response to the current cassette Ca being placed at the drug receiving position P1, the shutter controller 122 opens the shutter 322 (SB23). When drug sheets to be loaded are to be stored in any cassette Ca having one or more partitions, the cassette Ca is positioned and the opening operation of the shutter 322 is controlled to cause the shutter 322 to be open partially at the storage position of the drug sheets.

Subsequently, in response to a user input on the second touchscreen 31 indicating that the loading is complete (SB24), the shutter controller 122 closes the shutter 322 (SB25). Subsequently, the picking-cassette transporter controller 121 controls the main cassette transporter 22 to transport the cassette Ca at the drug receiving position P1 to the returning cassette holder 232 (SB26).

The main-cassette transporter controller 112 in the main unit 2 then returns the cassette Ca to its storage position in the same manner as in step SA4 (SA23).

SUMMARY

As described above, the picking unit 3 transports a cassette Ca to the drug receiver 32 based on prescription data (or a user input) and the determination result obtained by the drug determiner 124 and opens or closes the shutter 322. The user working at the picking unit 3 can thus simply remove drug sheets from the cassette Ca when the shutter 322 is open, and then simply place the drug sheets into the drug port 331 without inspecting the drug sheets (without checking the drug sheet type).

Thus, the operations at the picking unit 3 can be allocated to an uncertified user, rather than to a qualified user, allowing other operations to be allocated to a qualified user who is freed from the picking operation.

As described above, a qualified user conducts a final inspection at the inspection unit 4 downstream from the picking unit 3. This increases the reliability and accuracy of the operations at the picking unit 3.

Second Embodiment

A second embodiment of the present disclosure will now be described mainly with reference to FIGS. 17 to 30. For ease of explanation, the components having the same functions as the components described in the above embodiment are given the same reference numerals as those components, and will not be described. The same applies to other embodiments.

In the present embodiment, screen images to appear in the procedures taken at the drug station herein will be described. In the present embodiment, example screen images to appear in the procedures taken at a drug station 1 (or a drug station 1A in a third embodiment) will be described.

Similarly to the second touchscreen 31, the first touchscreen 5 is provided for each picking unit 3 (or the picking unit 3A in the third embodiment). The first touchscreen 5 displays various items of information about the entire drug station 1 as well as various items of information about the corresponding picking unit 3. Also, the first touchscreen 5 receives various input operations associated with the overall processes performed at the drug station 1 as well as with processes performed at the corresponding picking unit 3. The second touchscreen 31 displays various screen images or receives input operations associated with the operations for removing or loading drugs at the corresponding picking unit 3.

More specifically, the first touchscreen 5 and the second touchscreen 31 each function as a touchscreen including a display device (display unit) for displaying the above items of information or screen images and an input device (operation unit) for receiving the above input operations. In the above example, the display screen of the display device included in the first touchscreen 5 functions as a main screen, whereas the display screen of the display device included in the second touchscreen 31 functions as a sub-screen.

Example screen images to appear on the first touchscreen 5 and the second touchscreen 31 included in one picking unit 3 will be described below. In the examples described below, the functions of the control unit 10 are implemented by a personal computer (PC) 301 (refer to FIG. 28) included in each picking unit 3.

For automated drug dispensing, or dispensing drugs in the order indicated by prescription data received by the control unit 10, the first drug receiver 32a, and the picking cassette transporter 35 below the first drug receiver 32a are used as in the first embodiment (refer to FIG. 9). The second drug receiver 32b, and the picking cassette transporter 35 below the second drug receiver 32b are used for selected drug dispensing, or dispensing selected drugs as an interrupt during the automated drug dispensing operation performed in the order of reception of prescription data. The same applies to the third embodiment.

Example Screen Images on First Touchscreen

Example screen images to appear on the first touchscreen 5 will now be described. FIGS. 17 to 21 are diagrams of example screen images to appear on the first touchscreen 5.

At Activation of Drug Station

In response to the drug station 1 being activated, the touchscreen controller 14 causes a login screen image to appear on the first touchscreen 5. In response to an input of a user ID (operator ID) and a password on the login screen image and an input operation on a login button on the login screen image, the touchscreen controller 14 performs matching using the operator ID and the password. In response to successful matching, the touchscreen controller 14 causes a main screen image shown in FIG. 17 to appear on the first touchscreen 5.

Screen Image for Automated Dispensing (Dispensing List)

Figure 17:
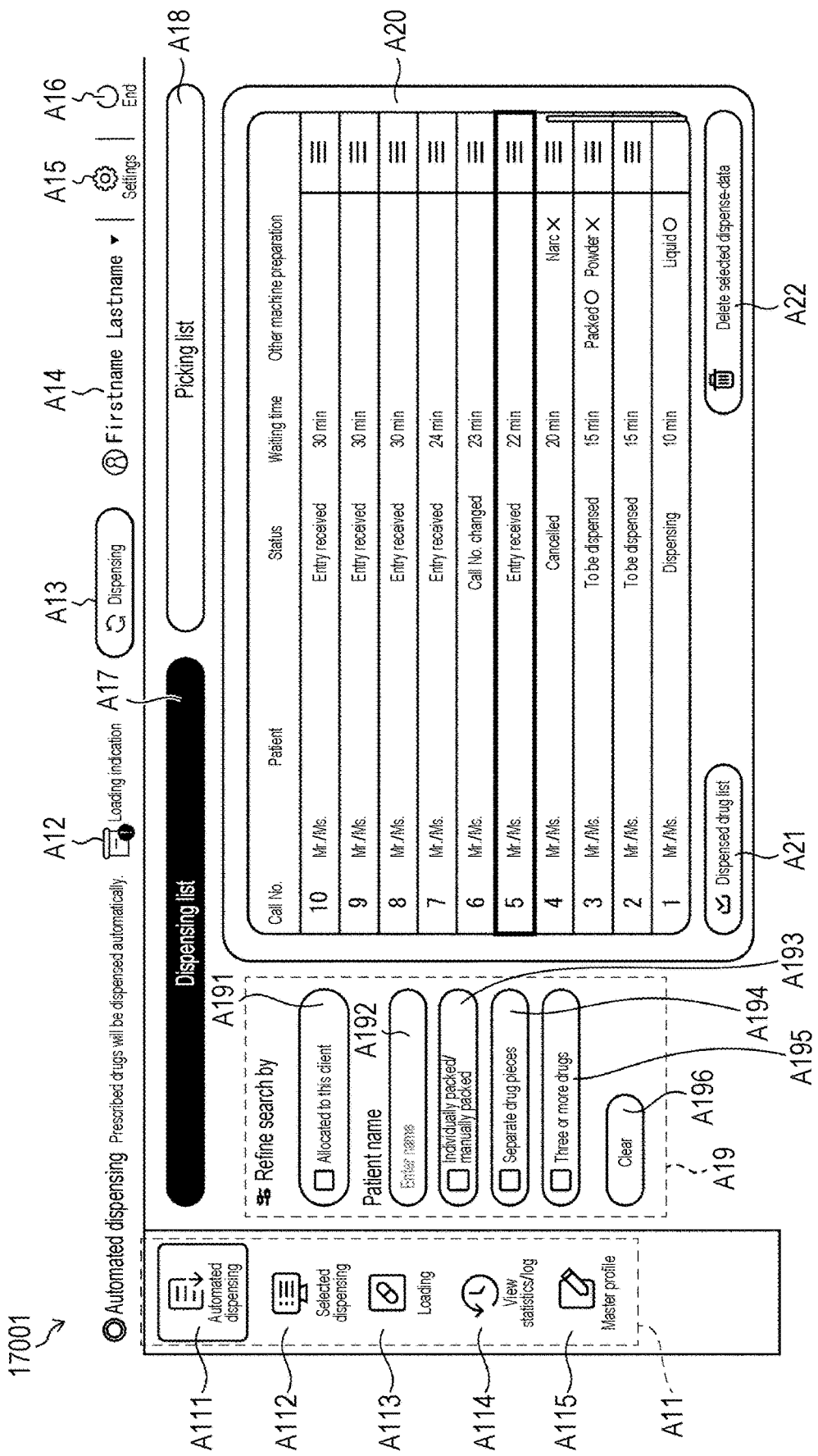
FIG. 17 is a diagram of an example automated dispensing screen image.

FIG. 17 is a diagram of an example main screen image. In the present embodiment, the touchscreen controller 14 causes an automated dispensing screen image (automated dispensing screen image 17001) to appear as its main screen image.

The automated dispensing screen image 17001 includes, for example, a menu area A11, a loading indication area A12, a dispensing cancel button A13, a logout button A14, a settings button A15, and an end button A16. These areas and buttons are also included in an automated dispensing screen image 18001, a selected dispensing screen image 19001, a loading screen image 20001, and a log view screen image 21001. During loading of drugs in forms such as drug sheets, creams, or eyedrops, no drug dispensing operation is performed. The loading screen image 20001 thus does not include the dispensing cancel button A13.

The menu area A11 displays various menu buttons. In this example, the menu area A11 displays an automated dispense button A111, a selected dispense button A112, a load button A113, a statistics/log view button A114, and a master profile button A115. The touchscreen controller 14 displays a screen image in response to a selected button.

In response to the automated dispense button A111 being selected, for example, the automated dispensing screen image 17001 shown in FIG. 17 or the automated dispensing screen image 18001 shown in FIG. 18 appears. In response to the selected dispense button A112 being selected, for example, the selected dispensing screen image 19001 shown in FIG. 19 appears. In response to the load button A113 being selected, for example, the loading screen image 20001 shown in FIG. 20 appears. In response to the statistics/log view button A114 being selected, for example, the log view screen image 21001 shown in FIG. 21 appears. In response to the master profile button A115 being selected, a screen image for entry of the drug type, the user name, and other information appears.

The loading indication area A12 indicates whether any cassette Ca is to receive drug loading. The memory 15 may manage drug identification information identifying information about one or more drugs contained in each cassette Ca and drug quantity information indicating the quantity of drugs contained in each cassette Ca in a manner associated with cassette identification information (or storage position information) about each cassette Ca in the main unit 2. When finding any cassette Ca with the drug quantity of 0 or less than a reference value (a predetermined reference inventory value) by referring to the drug quantity information, the touchscreen controller 14 causes an indication about the cassette Ca to appear in the loading indication area A12. When finding no such cassette Ca, the touchscreen controller 14 causes no indication to appear in the loading indication area A12.

The dispensing cancel button A13 appears during dispensing of drugs to receive an input operation for canceling the drug dispensing operation. The logout button A14 receives an input operation for logging out. During any drug dispensing operation, the logout button A14 displays the name of the user who has logged in. The settings button A15 receives an input operation for various settings. The end button A16 receives an input operation for either ending the application for implementing various processes at the drug station 1 or for shutting down the control unit 10.

The automated dispensing screen image 17001 further includes a dispensing list select button A17, a picking list select button A18, a search item input area A19, a dispensing list display area A20, a dispensed-drug display button A21, and a delete button A22.

In response to an input operation on the dispensing list select button A17, the touchscreen controller 14 causes the automated dispensing screen image 17001 including the dispensing list display area A20 to appear. In response to an input operation on the picking list select button A18, the touchscreen controller 14 causes the automated dispensing screen image 18001 (refer to FIG. 18) including a picking list display area A31 to appear.

The search item input area A19 receives an input operation for retrieving information to appear in the dispensing list display area A20.

A first refine search area A191 receives an input operation for displaying, in the dispensing list display area A20, the dispensing status (status) of drugs indicated by prescription data allocated to the picking unit 3 including the first touchscreen 5. The control unit 10 manages, for each picking unit 3, the names of patients allocated, their prescription data, the order of reception of the prescription data, and the dispensing status of their drugs.

In response to the above input operation, the touchscreen controller 14 places a checkmark in the checkbox for the first refine search area A191. The touchscreen controller 14 also displays, in the dispensing list display area A20, the dispensing status of drugs indicated by the prescription data allocated to the picking unit 3 including the first touchscreen 5.

A second refine search area A192 can receive an input of a patient name. In response to an input of characters in the second refine search area A192, the touchscreen controller 14 searches a patient including the input characters and displays the dispensing status of drugs for the patient in the dispensing list display area A20.

A third refine search area A193 receives an input operation for retrieving, from sets of prescription data received by the control unit 10, one or more sets of prescription data indicating drugs to be individually packed or drugs to be manually packed, and displaying, in the dispensing list display area A20, information about the retrieved sets of data. Such drugs are to be individually packed by a drug packer or to be packed manually after being dispensed from the drug station 1. The prescription data includes information about such drugs.

In response to the above input operation, the touchscreen controller 14 places a checkmark in the checkbox for the third refine search area A193. Also, the touchscreen controller 14 displays the dispensing status of drugs to be individually packed or drugs to be packed manually in a subsequent process in the dispensing list display area A20.

A fourth refine search area A194 receives an input operation for retrieving, from sets of prescription data received by the control unit 10, one or more sets of prescription data indicating any drug with a quantity including separate drug pieces, and displaying, in the dispensing list display area A20, information about the retrieved sets of data.

In response to the above input operation, the touchscreen controller 14 places a checkmark in the checkbox for the fourth refine search area A194. Also, the touchscreen controller 14 displays the dispensing status of a drug with a quantity including separate drug pieces in the dispensing list display area A20. More specifically, the touchscreen controller 14 displays, in the dispensing list display area A20, a drug list of drugs to be dispensed based on sets of prescription data (patients) including separate drug pieces.

A fifth refine search area A195 receives an input operation for retrieving, from sets of prescription data received by the control unit 10, one or more sets of prescription data indicating three or more types of drugs, and displaying, in the dispensing list display area A20, information about the retrieved sets of data.

In response to the above input operation, the touchscreen controller 14 places a checkmark in the checkbox for the fifth refine search area A195. Also, the touchscreen controller 14 displays the dispensing status of drugs for patients for which three or more types of drugs are to be dispensed in the dispensing list display area A20. More specifically, the touchscreen controller 14 displays, in the dispensing list display area A20, a list of drugs to be dispensed for sets of prescription data (patients) indicating three or more types of drugs.

A clear button A196 receives an input operation for clearing the input search conditions in the first to fifth refine search areas A191 to A195.

In the example shown in FIG. 17, none of the first to fifth refine search areas A191 to A195 has received an input operation. Thus, in the example shown in FIG. 17, the touchscreen controller 14 has not places a checkmark in the checkbox for any of these refine search areas, and instead displays the dispensing status of drugs based on all sets of prescription data received by the drug station 1.

The touchscreen controller 14 also uses the other machine preparation field in the dispensing list display area A20. The other machine preparation field displays the type of any drug to be prepared by a preparation machine other than the drug station 1 (e.g., a drug packer). The other machine preparation field also displays whether the drug preparation has been complete. The memory 15 manages information about whether any drug is to be prepared and whether the drug preparation has been complete for each type of drug. In FIG. 17, Narc represents narcotics, Liquid represents liquid drugs, and Packed represents drugs to be individually packed. Further, the circle sign means that the drug has been already prepared at another dispensing machine, and the cross sign means that the drug has not yet been prepared at another dispensing machine.

The dispensing list display area A20 displays information indicating the dispensing status of drugs (dispense-data) for each patient. In the example shown in FIG. 17, the dispensing list display area A20 displays the dispensing status of drugs for each patient in the order of patients to receive dispensed drugs. The dispensing list display area A20 includes, for example, an entry number field indicating the turn for each patient for which drugs are to be dispensed, a patient name field indicating the name of each patient, and a status field indicating the dispensing status of drugs. The dispensing list display area A20 further includes a waiting time field indicating a waiting time expected after prescription data is entered, as managed by the control unit 10. The dispensing list display area A20 further displays a list of drugs to be dispensed based on the search conditions depending on whether an input operation has been performed in the first to fifth refine search areas A191 to A195.

Also, the dispensed-drug display button A21 receives an input operation for displaying information for each patient for which the drug dispensing has been complete. In response to an input operation on the dispensed-drug display button A21, the touchscreen controller 14 displays information for each patient for which the drug dispensing has been complete in the dispensing list display area A20. Also, the delete button A22 receives an input operation for deleting dispense-data for any patient appearing in the dispensing list display area A20. In response to an input operation on the delete button A22 with information for a patient appearing in the dispensing list display area A20 is selected (entry number 5 is selected in FIG. 17), the touchscreen controller 14 deletes dispense-data for the selected patient from the dispensing list display area A20.

Screen Image for Automated Dispensing (Picking List)

FIG. 18 is a diagram of an example automated dispensing screen image 18001. The automated dispensing screen image 18001 includes the picking list display area A31 and a next dispensing information display area A32. The picking list display area A31 displays information about each type of drug to be dispensed. In the example shown in FIG. 18, the picking list display area A31 displays information about each type of drug to be dispensed in the order of drugs to be dispensed.

The picking list display area A31 includes, for example, an entry number field indicating the turn for each drug to be dispensed, a drug name field indicating the name of each drug, a drug form field indicating the form of each drug, and a total quantity field indicating the total quantity of each drug to be dispensed. The picking list display area A31 includes, for example, a recipient field indicating the name of each patient for which the drug is to be dispensed, the completion time field indicating an expected time to be taken before the drug dispensing is complete, and a status field indicating various relevant situations.

The memory 15 stores information about the form of each drug in a manner associated with, for example, drug identification information. The completion time field displays, for example, a time calculated by the control unit 10 based on an expected time to be taken to dispense each type of drug stored in the memory 15. The status field displays, for example, information indicating a drug expected to be out of stock when being dispensed from a cassette Ca, and information indicating a drug to be dispensed as an interrupt during an automated drug dispensing operation performed in the order of reception of prescription data. The status field displays information based on relevant information managed by the control unit 10 including information about the quantity of each drug contained in a cassette Ca and information about reception of a request for selectively dispensing each drug.

Information indicating a drug expected to be out of stock is obtained and displayed in the manner described below. The control unit 10 subtracts, for the same single type of drug indicated by each received set of prescription data, the quantity of the drug to be dispensed (appearing in the total quantity field) from the total quantity of the drug stored in the main unit 2 in the order of dispensing. The control unit 10 displays information indicating the drug expected to be out of stock (Out of stock in the figure) for dispense-data with the resultant difference being 0 or less in the order of drug dispensing. More specifically, the touchscreen controller 14 displays information indicating the drug to be out of stock for dispense-data about the drug expected to be out of stock when being dispensed based on the order of drug dispensing.

The control unit 10 manages the dispensing status of each drug to allow the touchscreen controller 14 to display, for example, the remaining number of drugs to be dispensed (To be picked in the figure) and the number of drugs already dispensed (Picked in the figure). This display allows the user (operator) to view the dispensing status of drugs (progress) at the entire drug station 1.

The next dispensing information display area A32 displays information about a drug to be dispensed next to the drug currently being dispensed (or being picked). The next dispensing information display area A32 displays, for example, the name and the image of the drug to be dispensed next, the cassette number for a cassette Ca containing the drug, and the quantity of the drug (inventory value) contained in the cassette Ca. For any family cassettes available for the drug, the next dispensing information display area A32 displays the cassette number for any cassette Ca to be a family cassette and the quantity of the drug contained in the cassette Ca. The family cassettes refer to a group of cassettes Ca containing the drug of the same type. In this example, the next dispensing information display area A32 further displays the inventory value in the shelf for the drug of the same type as the drug contained in the family cassette. The inventory in the shelf indicates the quantity of the drug of the same type managed in, for example, a drug shelf other than the drug shelf included in the main unit 2 at, for example, the pharmacy at which the drug station 1 is installed.

The cassette number of the family cassette appears for the user to determine, when finding a cassette Ca containing any drug to be out of stock during drug dispensing, whether another cassette Ca containing the same drug can be called and used to load the cassette Ca with the drug out of stock. The same applies to the quantity of the drug contained in each cassette Ca to be a family cassette. The inventory value in the shelf appears for the user to determine, when finding a cassette Ca containing any drug to be out of stock during drug dispensing, whether the cassette Ca can be loaded from the inventory in the shelf.

The memory 15 stores an image of each drug in a manner associated with drug identification information. For each drug type, cassettes Ca containing the same type of drug have information (flag) indicating that the cassettes Ca are family cassettes. Also, the touchscreen controller 14 obtains information about each drug to be managed in the inventory in the shelf (e.g., the drug type, the storage position, or the quantity) from a storage management system (not shown) that manages information about each drug to be delivered to, for example, a pharmacy.

Selected Dispensing Screen Image

Figure 19:
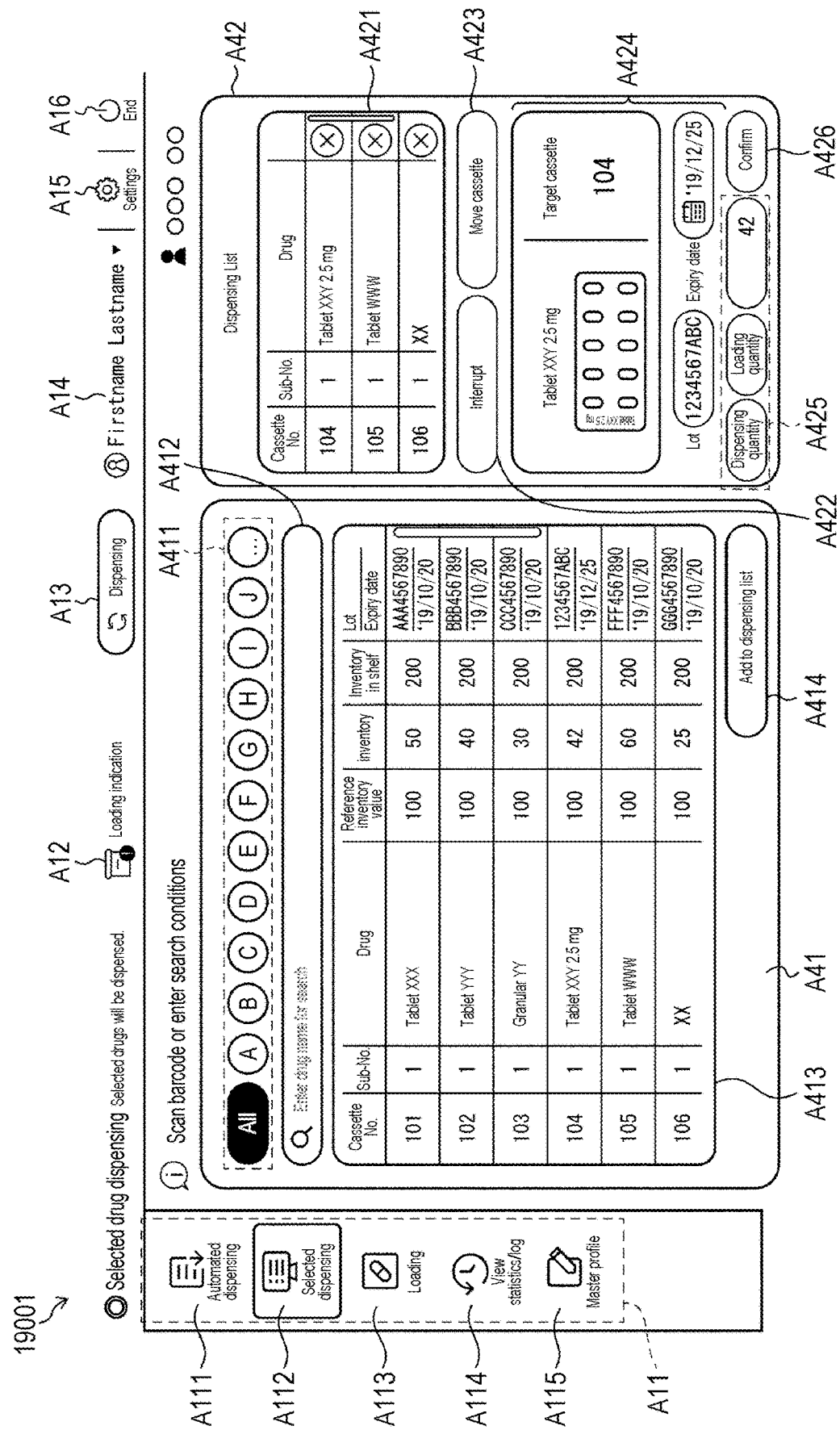
FIG. 19 is a diagram of an example selected dispensing screen image.

FIG. 19 is a diagram of an example selected dispensing screen image 19001. The selected dispensing screen image 19001 receives an input operation for dispensing selected drugs separately from an automated dispensing operation.

In response to the selected dispense button A112 being selected, the touchscreen controller 14 first displays a login screen image. A user who intends to dispense selected drugs as an interrupt during any automated dispensing operation may be different from a user performing a picking operation in the automated dispensing operation. In response to successful user authentication, the touchscreen controller 14 displays, for example, the selected dispensing screen image 19001 shown in FIG. 19.

The selected dispensing screen image 19001 includes a drug list display area A41 and a dispensing drug display area A42.

The drug list display area A41 receives an input operation for retrieving information about drugs stored in the main unit 2, and displays information about the retrieved drugs. The drug list display area A41 includes a first retrieval area A411, a second retrieval area A412, a retrieval result display area A413, and a dispensing list add button A414.

The first retrieval area A411 and the second retrieval area A412 receive an input operation for retrieving information about cassettes Ca (drugs) to appear in the retrieval result display area A413. With no search conditions being input, the retrieval result display area A413 displays a list of sets of information about all drugs stored in the main unit 2 (drug list).

In response to an input operation on All in the first retrieval area A411, the touchscreen controller 14 displays information associated with all sets of drug identification information in the retrieval result display area A413. In response to an input operation on letter A, the touchscreen controller 14 retrieves and displays information associated with drug identification information about drugs with names starting from letter A in the retrieval result display area A413. The same applies to letter B and other letters. The second retrieval area A412 can receive an input of a drug name. The touchscreen controller 14 retrieves information associated with drug identification information including characters input in the second retrieval area A412, and displays the retrieved information in the retrieval result display area A413.

The retrieval result display area A413 displays, in addition to the retrieved drug name, for example, the cassette number (Cassette No. in the figure), sub-number (Sub-No. in the figure), the reference inventory value, the inventory value, the inventory value in the shelf, the lot number, and the expiry date. The sub-number indicates a storage position in a cassette Ca having one or more partitions. More specifically, the sub-number indicates storage position information. The reference inventory value is a reference value indicating a minimum quantity of drug contained in the cassette Ca. The inventory value is the quantity of each drug contained in the cassette Ca. The inventory value in the shelf is the quantity of the drug managed in, for example, a drug shelf other than the drug shelf included in the main unit 2 at, for example, a pharmacy at which the drug station 1 is installed.

The dispensing list add button A414 receives an input operation for adding, to a dispensing list area A421, information about a drug selected from drugs appearing in the retrieval result display area A413.

The dispensing drug display area A42 displays information about drugs to be dispensed separately from an automated dispensing operation of drugs based on prescription data. The dispensing drug display area A42 includes, for example, the dispensing list area A421, an interrupt button A422, a cassette move button A423, a transportation drug display area A424, a dispensing quantity input area A425, and a confirm button A426.

The dispensing list area A421 displays information about each drug selected by the user to be dispensed selectively from the drugs appearing in the retrieval result display area A413. In this example, the dispensing list area A421 displays, together with the name of each selected drug, the cassette number and the sub-number of the cassette Ca containing each selected drug. The dispensing list area A421 includes a cross sign button to be a delete button for receiving an input operation for deleting information about each selected drug.

In response to an input operation on the dispensing list add button A414 with information about a drug being selected in the retrieval result display area A413, the touchscreen controller 14 displays, for example, the information about the drug in the dispensing list area A421. In response to a dragging operation on the dispensing list area A421 for information about a drug being selected in the retrieval result display area A413, the touchscreen controller 14 may display the information about the drug in the dispensing list area A421.

The interrupt button A422 receives an input operation for interrupting transportation (movement) of a cassette Ca appearing in the dispensing list area A421. The cassette move button A423 receives an input operation for starting transportation of a cassette Ca appearing in the dispensing list area A421.

The transportation drug display area A424 displays information about the cassette Ca transported to the drug receiver 32 in the picking unit 3 and information about the drug contained in the cassette Ca. In this example, the transportation drug display area A424 displays the cassette number of the cassette Ca, an image of the drug contained in the cassette Ca, the lot number, and the expiry date. The user may add a drug (cassette) to the dispensing list area A421 (dispensing list) by referring to the lot number or the expiry date.

The dispensing quantity input area A425 can receive an input of the quantity of the drug removed from the cassette Ca transported to the drug receiver 32 or the quantity of the drug loaded into the cassette Ca. In response to an input operation in the numerical input area, the touchscreen controller 14 displays, for example, a numerical keypad. In response to a numerical value being input with the dispense button (Dispensing quantity in the figure) being selected, the numerical number appearing in the dispensing quantity input area A425 indicates the quantity of the drug removed (dispensed) from the cassette Ca. In response to a numerical value being input with the load button (Loading quantity in the figure) being selected, the numerical value appearing in the dispensing quantity input area A425 indicates the quantity of the drug loaded into the cassette Ca.

To dispense a selected drug, the dispense button is selected to remove the drug from the cassette Ca. At the timing of dispensing the drug, the drug can also be loaded into the cassette Ca. The load button is thus also selectable.

In response to an input operation on the confirm button A426 after the quantity of the drug is input in the dispensing quantity input area A425, the main unit controller 11 and the picking unit controller 12 return the cassette Ca transported to the drug receiver 32 to the main unit 2. Also, the main unit controller 11 and the picking unit controller 12 transport a cassette Ca containing a drug to be dispensed next from the main unit 2 to the drug receiver 32. Without an input operation on the interrupt button A422, this operation is repeated until all the drugs appearing in the dispensing list area A421 are dispensed.

Also, the control unit 10 subtracts the numerical value input into the dispensing quantity input area A425 from (or add the value to) the quantity of the drug contained in the cassette Ca transported to the drug receiver 32. The control unit 10 can thus update the quantity of the drug contained in the cassette Ca.

Loading Screen Image

Figure 20:
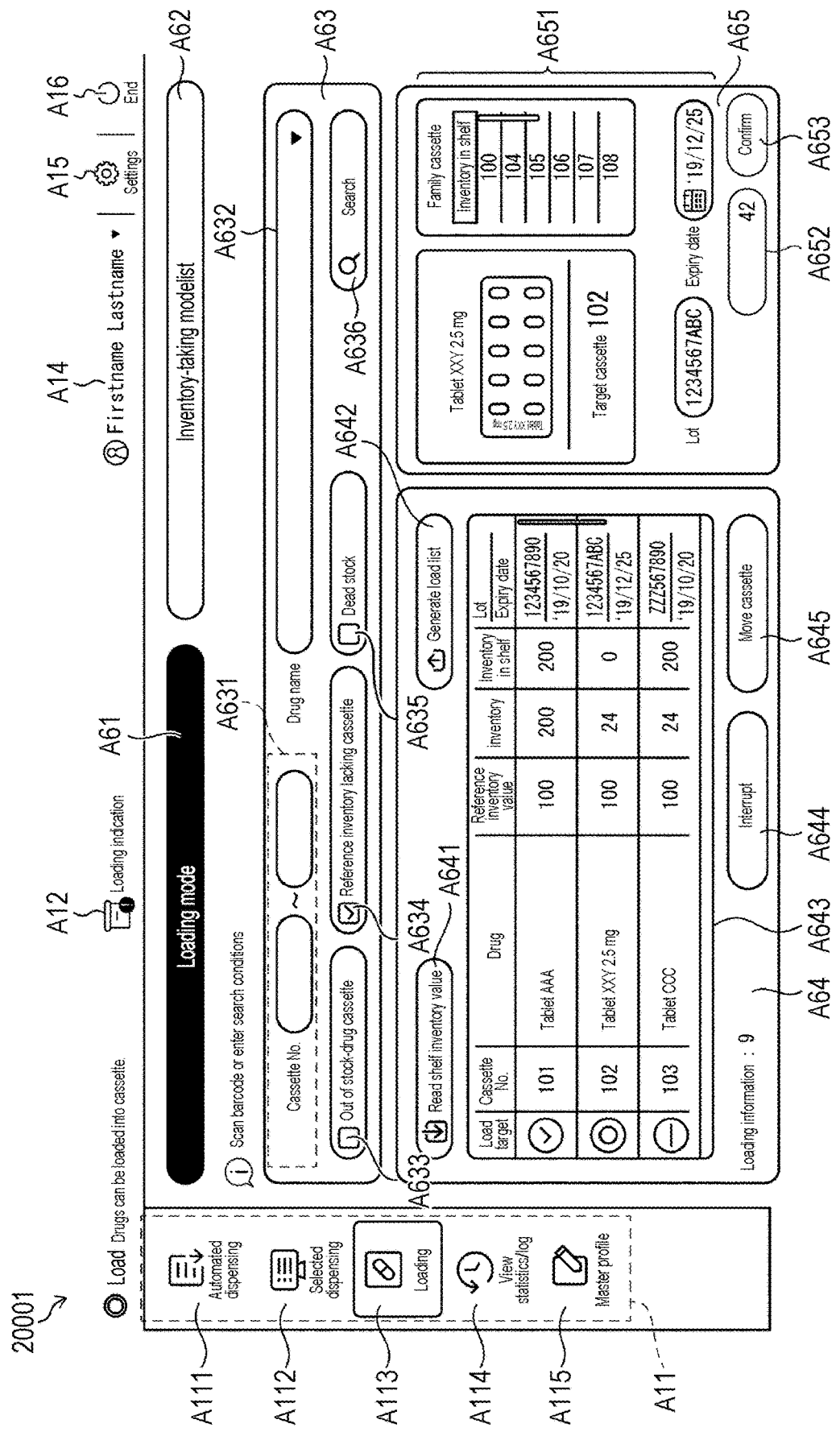
FIG. 20 is a diagram of an example loading screen image.

FIG. 20 is a diagram of an example loading screen image 20001. The loading screen image 20001 receives an input operation for loading any drug into the cassette Ca. In response to the load button A113 being selected, the touchscreen controller 14 displays, for example, the loading screen image 20001 shown in FIG. 20. In response to the load button A113 being selected, the control unit 10 avoids allocating, to the picking unit 3 including the first touchscreen 5 that has received the input operation, a drug dispensing operation to be performed based on prescription data. In this case, the control unit 10 uses this picking unit 3 dedicated to a drug loading operation.

The loading screen image 20001 includes a loading mode select button A61 and an inventory-taking mode select button A62. In response to an input operation on the loading mode select button A61, the touchscreen controller 14 displays, as a loading screen image 20001, an image including a retrieval area A63, a first display area A64, and a second display area A65. To load a drug into a cassette Ca, the user selects the loading mode select button A61.

In response to an input operation on the inventory-taking mode select button A62, the touchscreen controller 14 displays information about all cassettes Ca stored in the main unit 2 (e.g., the types, numbers, and storage positions of drugs contained in all cassettes Ca). The touchscreen controller 14 may display information about the types, numbers, and storage positions of all drugs managed in, for example, drug shelves in the main unit 2 installed at the pharmacy with the drug station 1, as well as in drug shelves other than the drug shelves in the main unit 2.

The retrieval area A63 is used to retrieve drugs to be loaded. A range specification area A631 is used to specify a range of cassette numbers. In response to an input operation on the range specification area A631, the touchscreen controller 14 displays information about a cassette Ca with its cassette number within the specified range in a retrieval result display area A643. A drug name specification area A632 is used to specify a drug name. In response to an input of characters in the drug name specification area A632, the touchscreen controller 14 displays information about a cassette Ca containing a drug with a name including the input characters in the retrieval result display area A643.

An out of stock-drug retrieval area A633 receives an input operation for displaying information about cassettes containing drugs out of stock in the retrieval result display area A643. An out of stock-cassette retrieval area A634 receives an input operation for displaying information about cassettes each lacking a reference inventory value in the retrieval result display area A643. A dead stock cassette retrieval area A635 receives an input operation for displaying information about dead stock cassettes in the retrieval result display area A643.

An out of stock-cassette refers to a cassette Ca that is out of stock (with an inventory value of 0). A reference inventory lacking cassette refers to a cassette Ca containing a drug with a quantity less than a reference inventory value. A dead stock cassette refers to a cassette Ca that has not been transported for a predetermined duration (e.g., a duration of several months from the activation of the drug station 1). The control unit 10 can identify a dead stock cassette by storing, for example, an immediately preceding date and time at which each cassette Ca is transported.

A retrieve button (search button) A636 receives an input operation for retrieving a cassette Ca within a range specified by the buttons A631 to A635. In response to an input operation on any of the buttons A631 to A635, the touchscreen controller 14 causes the retrieve button A636 to be ready for an input operation (active). In response to an input operation on the retrieve button A636, the touchscreen controller 14 displays retrieval results in a range specified with the buttons A631 to A635 in the retrieval result display area A643.

The first display area A64 includes a shelf inventory value read button A641, a loading list generation button A642, the retrieval result display area A643, an interrupt button A644, and a cassette move button A645.

The shelf inventory value read button A641 receives an input operation for retrieving information about drugs stored in the main unit 2 from drugs managed by the storage management system, and displaying the information in the retrieval result display area A643. The loading list generation button A642 receives an input operation for printing the retrieval result appearing in the retrieval result display area A643. The drug station 1 may be connected to a printer 1013 (refer to FIG. 28).

The retrieval result display area A643 displays a result of retrieval (loading list) obtained in the retrieval area A63. The touchscreen controller 14 displays, as the retrieval result, the same items of information as appearing in the retrieval result display area A413 shown in FIG. 19. The retrieval result display area A643 includes a load target field for selecting whether each drug is to be loaded. In this example, in response to every input operation on the load target field, either the circle sign or the minus sign appears selectively. The circle sign indicates that the drug has been selected to be loaded. The minus sign indicates that the drug has been selected not to be loaded. The checkmark indicates the completion of loading into the cassette Ca.

The interrupt button A644 receives an input operation for interrupting transportation of a cassette Ca containing a drug to be selected for loading. The cassette move button A645 receives an input operation for starting to transport the cassette Ca.

The second display area A65 displays information about a drug selected to be loaded. The second display area A65 includes, for example, a drug information display area A651, a loading number input area A652, and a confirm button A653.

The drug information display area A651 displays information about a drug selected to be loaded and a cassette Ca containing the drug. In this example, the drug information display area A651 displays an image of the drug, the cassette number of the cassette Ca containing the drug transported to the drug receiver 32, and the lot number and the expiry date of the drug. The drug information display area A651 further displays the cassette number of any family cassette.

The loading number input area A652 can receive an input of the quantity of the drug loaded into the cassette Ca transported to the drug receiver 32. In response to an input operation in the numerical input area, the touchscreen controller 14 displays, for example, a numerical keypad.

In response to an input operation on the confirm button A653 after the quantity of the drug is input in the loading number input area A652, the main unit controller 11 and the picking unit controller 12 return the cassette Ca transported to the drug receiver 32 to the main unit 2. Also, the main unit controller 11 and the picking unit controller 12 transport a cassette Ca containing a drug to be loaded next from the main unit 2 to the drug receiver 32. Without an input operation on the interrupt button A644, this operation is repeated until all the drugs selected to be loaded in the retrieval result display area A643 are loaded into their corresponding cassettes Ca. Also, the control unit 10 can update the quantity of the drug contained in the cassette Ca based on the numerical value input into the loading number input area A652.

Log View Screen Image

FIG. 21 is a diagram of an example log view screen image 21001. The log view screen image 21001 displays a log of processes (operations) performed by the drug station 1.

Example Screen Image on Second Touchscreen

An example screen image to appear on the second touchscreen 31 will now be described. FIGS. 22 to 27 are diagrams of example screen images to appear on the second touchscreen 31.

Example Screen Image Before Determination about Quantity of Drug to be Dispensed In response to the drug station 1 being activated, the touchscreen controller 14 causes an initial screen image to appear on the second touchscreen 31. The initial image may be, for example, a black display image. When any cassette Ca is transported to the drug receiver 32 for automated dispensing or selected dispensing of drugs, the touchscreen controller 14 displays, for example, a first confirmation screen image 22001 shown in FIG. 22.

The first confirmation screen image 22001 displays information used by the user when removing a drug from the cassette Ca. The first confirmation screen image 22001 includes, for example, a first display area B11, a second display area B12, a refill button B13, a family cassette call button B14, and a supplementary information display area B15.

The first display area B11 displays, for example, a prompt message for the user or a count result. In the first confirmation screen image 22001, the touchscreen controller 14 displays, in the first display area B11, a message prompting the user to read information about a barcode (e.g., a GS1 barcode) added to a drug removed from the cassette Ca with the barcode reader 34.

The second display area B12 displays information about the drug to be removed from the cassette Ca. The second display area B12 displays, for example, the name of the drug to be dispensed (to be removed), the prescribed drug quantity (the quantity of the drug to be removed), and the image of the drug. For dispensing drug sheets, the touchscreen controller 14 displays, for example, the number of drug sheets, the number of drug pieces (separate drug pieces), and the total quantity of the drug as the prescribed drug quantity.

In the second display area B12, in particular, the prescribed quantity of the drug to be dispensed (target value for the quantity of the drug to be dispensed) appears larger than the other information. The control unit 10 transports the cassette Ca containing the drug to be dispensed to the drug receiver 32 based on the prescription data, and opens the shutter 322 to allow the user to access the storage position of the drug. The user is thus unlikely to remove any drug other than the drug to be dispensed. The user manually removes the drug from the cassette Ca. Thus, the user may mistakenly remove the drug in the quantity different from the prescribed drug quantity (incorrect quantity). Any uncertified user without a qualification of, for example, a pharmacist may perform a picking operation and may mistakenly remove a drug in an incorrect quantity. The prescribed quantity of the drug to be dispensed appearing large as described above can aid the user in performing a picking operation, thus allowing the user to easily remove the drug in the prescribed quantity.

Although the opening and closing control of the shutter 322 alone will be referred to in the present embodiment, the drug station 1 according to the third embodiment also opens and closes shutters 322a, similarly to the shutter 322.

The second display area B12 further includes a family cassette display area B121, a terminate button B122, and a confirm button B123.

The family cassette display area B121 displays the cassette number of any cassette Ca associated with a family cassette on the drug receiver 32. In response to every input operation in the family cassette display area B121, the touchscreen controller 14 switches the screen image between displaying and hiding the cassette number of the cassette Ca. At default, the cassette number of the cassette Ca may be hidden.

The family cassette display area B121 appears for any cassette Ca associated with a family cassette. In other words, the family cassette display area B121 does not appear when a cassette Ca called is not associated with any family cassette.

The terminate button B122 receives an input operation for interrupting a drug picking operation. In response to an input operation on the terminate button B122, the touchscreen controller 14 displays, for example, a termination accept screen image 23001 shown in FIG. 23. In response to an input operation for accepting a forced termination on the termination accept screen image 23001, the main unit controller 11 and the picking unit controller 12 close the shutter 322 and return the cassette Ca placed on the drug receiver 32 to the main unit 2. Also, the main unit controller 11 and the picking unit controller 12 transport a cassette Ca containing a drug to be dispensed next from the main unit 2 to the drug receiver 32.

The confirm button B123 receives an input operation performed by the user confirming that the prescribed quantity of the drug has been removed from the cassette Ca.

Figure 24:
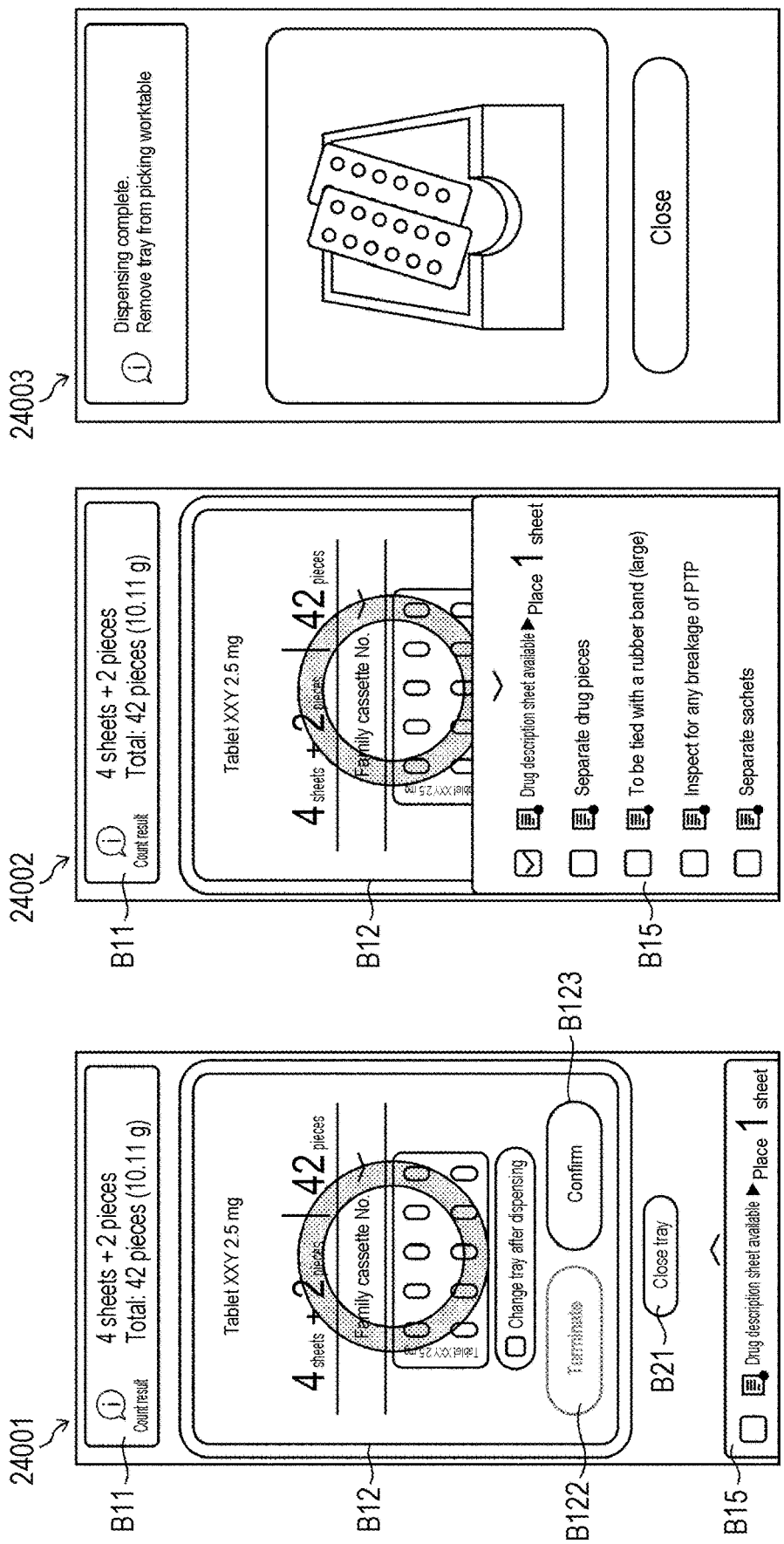
FIG. 24 is a diagram of example screen images appearing on the second touchscreen.
Figure 25:
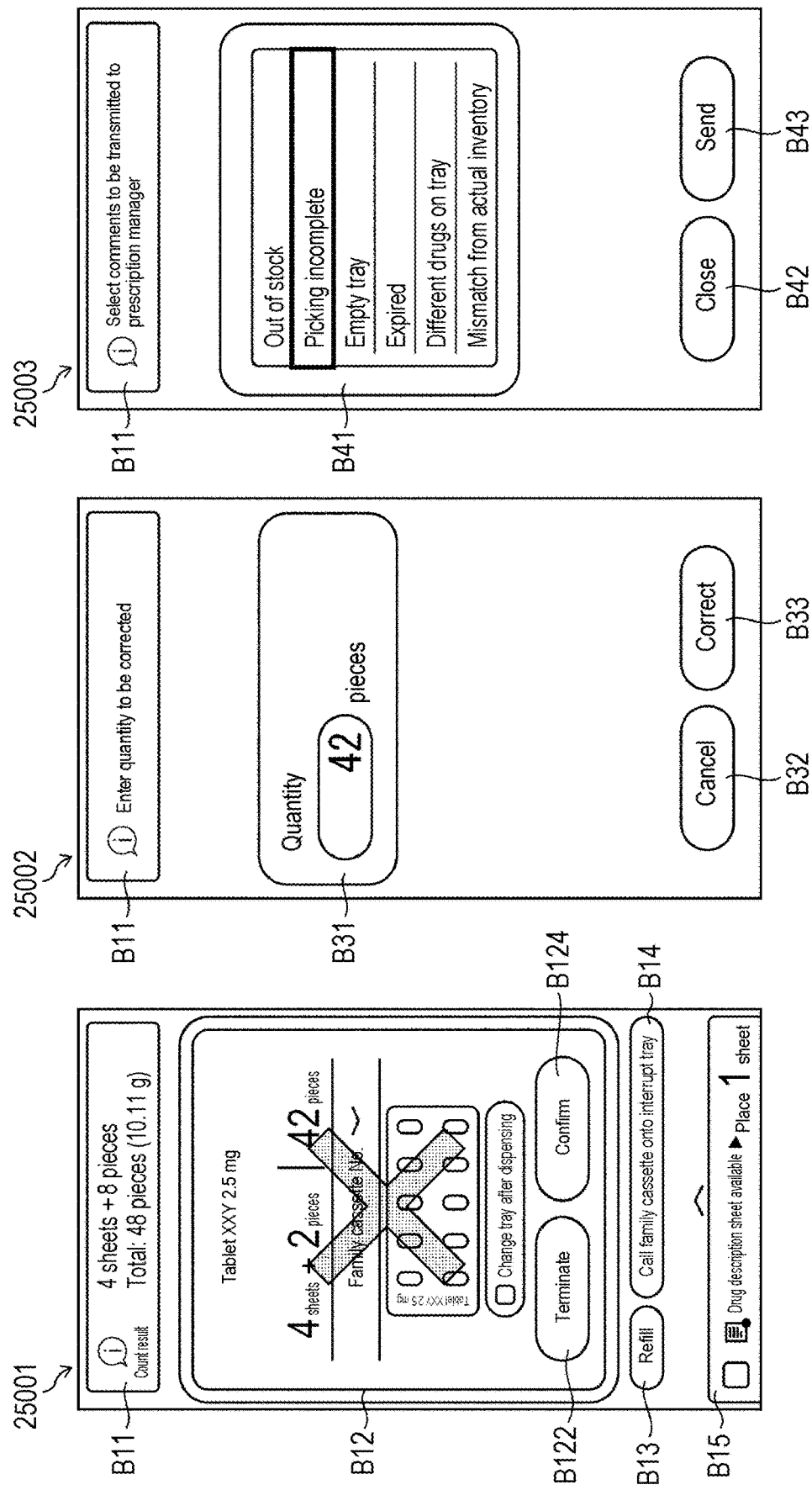
FIG. 25 is a diagram of example screen images appearing on the second touchscreen.

The touchscreen controller 14 activates the terminate button B122 when displaying the first confirmation screen image 22001, a second confirmation screen image 22002, a third confirmation screen image 23002, or a second confirmation screen image 25001 (refer to FIG. 25). The touchscreen controller 14 activates the confirm button B123 when displaying a first determination screen image 24001 (refer to FIG. 24). The touchscreen controller 14 activates a confirm button B53 to cause a dispensing quantity input screen image 26001 to appear (refer to FIG. 26).

The refill button B13 receives an input operation for enabling a loading operation of a drug into a cassette Ca when removing the drug from the cassette Ca. The family cassette call button B14 receives an input operation for transporting, to the second drug receiver 32b, a cassette Ca containing a drug to be dispensed or an associated cassette Ca to be a family cassette (also referred to as an interrupt tray).

The supplementary information display area B15 displays any item of supplementary information associated with a drug to be dispensed. The supplementary information indicates one or more check items to be checked by the user in a picking operation. More specifically, the supplementary information display area B15 displays a checklist for a picking operation. The supplementary information includes, for example, information indicating whether any object is to be placed on the transportation tray Tr together with a drug, such as a description sheet describing the dosage of the drug. An example description screen image 24002 shown in FIG. 24 displays such supplementary information. The memory 15 stores such supplementary information in a manner associated with, for example, drug identification information.

The supplementary information display area B15 has checkboxes for supplementary information. The user can perform an input operation on the checkbox when, for example, reviewing the check item indicated by the supplementary information. In response to an input operation on the checkbox, the touchscreen controller 14 can display a checkmark in the checkbox.

In response to every input operation in the supplementary information display area B15, the touchscreen controller 14 resize the supplementary information display area B15. At default, the supplementary information display area B15 has a minimum size (e.g., a size to accommodate a single item of supplementary information viewable as shown in FIG. 22).

In response to the control unit 10 determining that information read by the barcode reader 34 (e.g., a GS1 barcode) indicates a drug to be dispensed while the first confirmation screen image 22001 is appearing, the touchscreen controller 14 switches the screen image to displaying the second confirmation screen image 22002.

Figure 22:
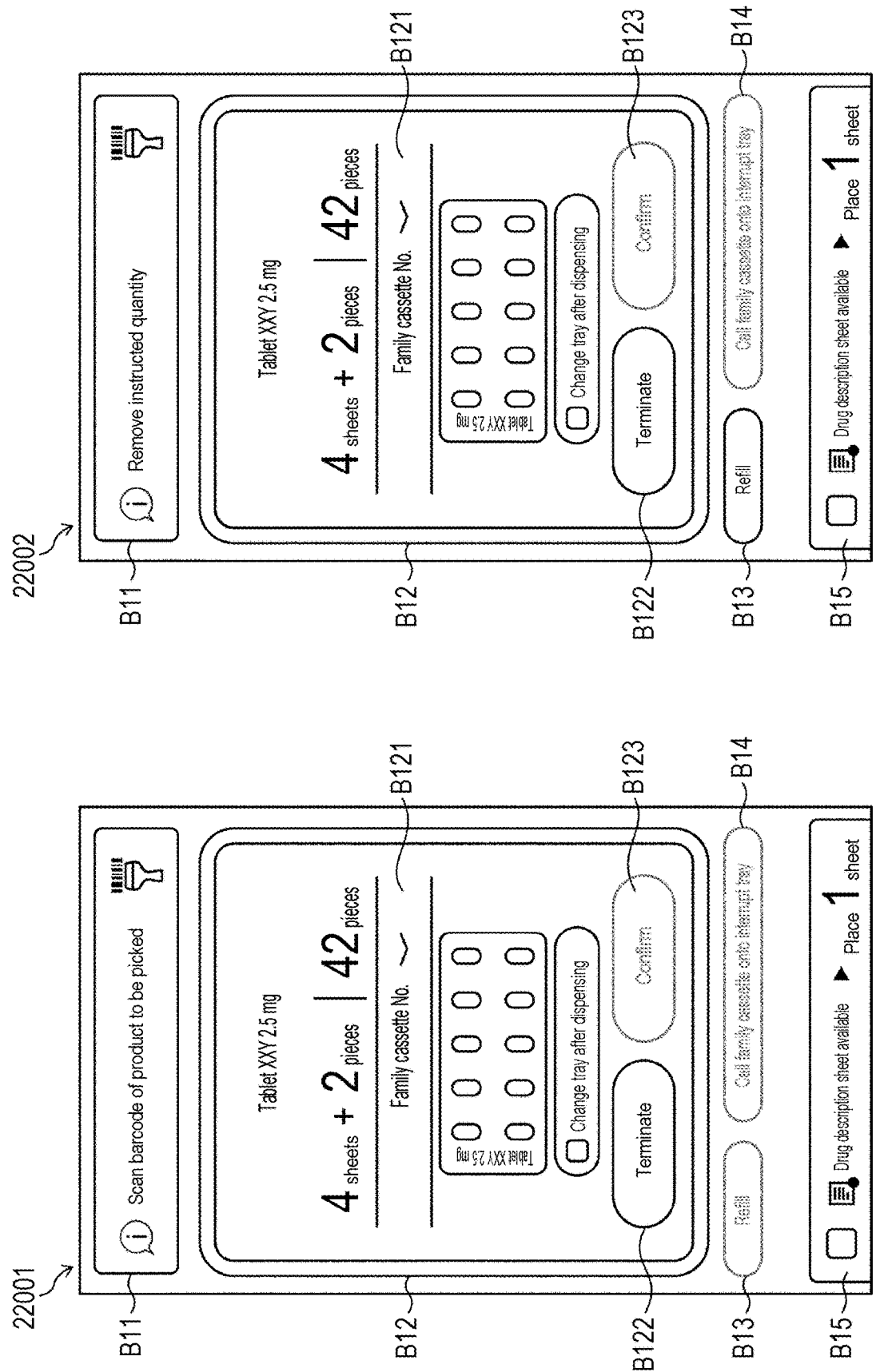
FIG. 22 is a diagram of example screen images appearing on a second touchscreen.

Similarly to the first confirmation screen image 22001, the second confirmation screen image 22002 shown in FIG. 22 displays information to be used for drug dispensing. For the second confirmation screen image 22002, the touchscreen controller 14 displays, in the first display area B11, a message prompting the user to remove the drug in the prescribed quantity from the cassette Ca. In response to the appearing message, the user removes the drug in the quantity appearing in the second display area B12 from the cassette Ca.

In response to the control unit 10 determining that information read by the barcode reader 34 does not indicate a drug to be dispensed while the first confirmation screen image 22001 is appearing, the touchscreen controller 14 switches the screen image to displaying the third confirmation screen image 23002. The third confirmation screen image 23002 shown in FIG. 23 displays, in, for example, the first display area B11, information about a mismatch between information read by the barcode reader 34 and drug identification information about a drug to be dispensed.

In response to the cassette Ca being transported to the drug receiver 32 in the present embodiment, the touchscreen controller 14 displays the first confirmation screen image 22001 to prompt the user to read information about the barcode with the barcode reader 34. However, the barcode information may not be read. Without the user reading the information, the touchscreen controller 14 displays the second confirmation screen image 22002 instead of the first confirmation screen image 22001 in response to the cassette Ca being transported to the drug receiver 32. Without the user reading the information, the touchscreen controller 14 does not display the third confirmation screen image 23002. As appropriate, the user may or may not be prompted to read the information.

Example Screen Image after Determination about Quantity of Drug to be Dispensed

When Determination is Affirmative

As described in the first embodiment, the drug determiner 124 determines whether the prescribed quantity of drug has been removed from the cassette Ca based on an image of the drug captured by the image sensor 335 and the weight of the drug measured by the measuring unit 336. In response to the drug determiner 124 determining that the prescribed quantity of the drug has been removed, the touchscreen controller 14 displays, for example, the first determination screen image 24001 shown in FIG. 24.

The touchscreen controller 14 displays, in the first display area B11, the captured image of the drug and the count result based on the weight of the drug on the first determination screen image 24001. More specifically, the first determination screen image 24001 can display, in the single screen image, the count result, together with the indexes for the drug to be dispensed, such as the drug name, the prescribed quantity of the drug to be dispensed, and the image of the drug appearing in the second display area B12. This allows the user to view the count result together with the indexes for the drug to be dispensed.

The first determination screen image 24001 displays, as the count result, the same quantity as the prescribed drug quantity (target value) appearing in the second display area B12. For dispensing drug sheets, as shown in FIG. 24, the first determination screen image 24001 displays, for example, the number of drug sheets, the number of drug pieces (separate drug pieces), and the total quantity of the drug, as shown in the second display area B12.

The touchscreen controller 14 displays the first determination screen image 24001 indicating that the prescribed quantity of the drug has been removed from the cassette Ca. In this example, as shown in FIG. 24, the touchscreen controller 14 displays the circle sign image as an image indicating the determination result (determination result image) in substantially the middle of the first determination screen image 24001. Thus, the user can view the determination result indicating whether the prescribed quantity of the drug has been removed.

Also, the touchscreen controller 14 displays the determination result image in a relatively enlarged manner to improve visibility for the user. Also, the touchscreen controller 14 displays the determination result image to allow the underlying image to be still viewable. In this example, the touchscreen controller 14 displays, as the determination result image, a semi-transparent circle image superimposed on the prescribed quantity of the drug to be dispensed, the image of the drug, and the other information in the second display area B12. This allows the user to view the determination result together with, for example, the count result, the drug name, the prescribed quantity of the drug to be dispensed, and the drug image.

Also, in response to an input operation (e.g., an upward swipe operation) in the supplementary information display area B15, the touchscreen controller 14 displays, for example, the description screen image 24002 shown in FIG. 24. The description screen image 24002 includes the supplementary information display area B15 maximized by the touchscreen controller 14 to show multiple items of supplementary information. The touchscreen controller 14 displays the supplementary information display area B15 in an enlarged manner to cause the supplementary information display area B15 to be superposed on, for example, the activated confirm button B123 (to cause the confirm button B123 to be invisible). This prompts the user to perform an input operation on the checkbox(es) for the supplementary information display area B15. This can also prevent the user from erroneously performing an input operation on the confirm button B123 during the display of the enlarged supplementary information display area B15 (specifically, while the user is viewing the supplementary information).

A tray removal screen image 24003 prompts the user to remove the transportation tray Tr from the picking unit 3. As described in the third embodiment, the tray removal screen image 24003 appears when the transportation tray Tr is to be replaced manually for each patient, instead of being automatically replaced for each patient as described in the first embodiment. This allows the user to place the transportation tray Tr to receive drugs to be dispensed for the next patient based on prescription data onto the picking unit 3. Thus, the user can dispense drugs based on prescription data for each patient onto a different transportation tray Tr.

Also, the first determination screen image 24001 includes a tray close button B21. The tray close button B21 receives an input operation for closing the open shutter 322.

After the user completes an input operation on the checkbox(es) for the supplementary information display area B15, and then performs an input operation in the supplementary information display area B15 (e.g., a downward swipe operation), the touchscreen controller 14 displays the supplementary information display area B15 in a reduced manner. More specifically, the touchscreen controller 14 displays the first determination screen image 24001.

In this state, in response to an input operation on the confirm button B123, the main unit controller 11 and the picking unit controller 12 close the shutter 322 and return the cassette Ca placed on the drug receiver 32 to the main unit 2. In response to an input operation on the confirm button B123 and an input operation on the tray close button B21 or a tray close button 39 (refer to FIG. 33), the main unit controller 11 and the picking unit controller 12 may close the shutter 322. Also, in response to the above input operation, the main unit controller 11 and the picking unit controller 12 transport a cassette Ca containing a drug to be dispensed next from the main unit 2 to the drug receiver 32. In response to the cassette Ca being placed on the drug receiver 32, the touchscreen controller 14 displays the first confirmation screen image 22001 or the second confirmation screen image 22002 including information about the drug to be dispensed next. When the last drug indicated by the prescription data is dispensed, the touchscreen controller 14 displays, for example, either the initial screen image or the tray removal screen image 24003 shown in FIG. 24.

In the present embodiment, the touchscreen controller 14 displays the confirm button B123 in each of the screen images shown in FIGS. 22 to 24. In some embodiments, the touchscreen controller 14 may not display the confirm button B123. In this case, in response to an input operation on the tray close button B21 on the first determination screen image 24001 or on the tray close button 39, the main unit controller 11 and the picking unit controller 12 close the shutter 322. Subsequently, the main unit controller 11 and the picking unit controller 12 return the cassette Ca placed on the drug receiver 32 to the main unit 2. Also, in response to the above input operation, the main unit controller 11 and the picking unit controller 12 transport a cassette Ca containing a drug to be dispensed next from the main unit 2 to the drug receiver 32. When neither the confirm button B123 nor the tray close button B21 appears on the first determination screen image 24001, the above operation may be performed in response to an input operation on the tray close button 39.

The touchscreen controller 14 displays, on the description screen image 24002 in FIG. 24, the supplementary information display area B15 in an enlarged manner to cause the supplementary information display area B15 to be superposed on the tray close button B21 (to cause the tray close button B21 to be invisible). This can also prevent the user from erroneously performing an input operation on the tray close button B21 during the display of the enlarged supplementary information display area B15 (specifically, while the user is viewing the supplementary information).

When Determination is Negative

In response to the drug determiner 124 determining that the drug in the quantity different from the prescribed drug quantity has been removed from the cassette Ca, the touchscreen controller 14 displays, for example, the second determination screen image 25001 shown in FIG. 25. Similarly to the first determination screen image 24001, the second determination screen image 25001 can also display, in a single image, the count result together with the indexes for the drug to be dispensed. The second determination screen image 25001 displays, as the count result, the quantity of drug different from the prescribed drug quantity appearing in the second display area B12.

The touchscreen controller 14 displays the second determination screen image 25001 indicating that the drug in the quantity different from the prescribed drug quantity has been removed from the cassette Ca. In this example, as shown in FIG. 25, the touchscreen controller 14 displays the cross sign image in substantially the middle of the second determination screen image 25001 as the determination result image. Also, the touchscreen controller 14 displays the determination result image in a relatively enlarged manner to improve visibility, similarly to the first determination screen image 24001. Also, the touchscreen controller 14 displays the determination result image (e.g., a transparent cross sign image) to allow the underlying image to be still viewable.

The drug determiner 124 may determine that the drug in the quantity different from the prescribed drug quantity has been removed from the cassette Ca in any of the cases below. (1) The quantity of the drug removed from the cassette Ca actually differs from the prescribed quantity of the drug to be dispensed; more specifically, the user has removed a larger quantity or smaller quantity of drug than the prescribed drug quantity. (2) The quantity of the drug removed from the cassette Ca is equal to the prescribed drug quantity, but the measurement by the image sensor 335 or by the measuring unit 336 is erroneous.

Also, the second determination screen image 25001 displays a correction button B124. When the first determination screen image 24001 displays the confirm button B123, the second determination screen image 25001 displays the correction button B124 replacing the confirm button B123. The correction button B124 receives an input operation for correcting the count result. In response to an input operation on the correction button B124, the touchscreen controller 14 displays, for example, a quantity correction screen image 25002 shown in FIG. 25.

In response to the second determination screen image 25001 appearing, the user removes the drug from the transportation tray Tr, and determines the quantity of the drug on the transportation tray Tr. In the case (1) above, the user places the prescribed quantity of drug to be dispensed onto the transportation tray Tr again, and then performs an input operation on the correction button B124. In the case (2) above, the user returns, onto the transportation tray Tr, the drug removed from the transportation tray Tr without changing the quantity of the drug, and then performs an input operation on the correction button B124. More specifically, the correction button B124 allows the user to correct the count result in any of the cases (1) and (2).

The quantity correction screen image 25002 is used to correct the count result. The quantity correction screen image 25002 includes the first display area B11, a quantity input area B31, a cancel button B32, and a correction button B33. The touchscreen controller 14 displays a message in the first display area B11 prompting the user to correct the count result. The quantity input area B31 can receive an input of a numerical value. In response to an input operation in the quantity input area B31, the touchscreen controller 14 displays, for example, a numerical keypad.

The cancel button B32 receives an input operation for redisplaying the second determination screen image 25001. The correction button B33 is used to enter the correction, and receives an input operation for displaying, for example, a transmission screen image 25003 shown in FIG. 25. When the drug determiner 124 finds a mismatch between the correction and the prescribed quantity of the drug to be dispensed, the touchscreen controller 14 may continue to display the quantity correction screen image 25002 without displaying the transmission screen image 25003 in response to an input operation on the correction button B33.

The transmission screen image 25003 displays, in a selectable manner, various comments to be transmitted to a prescription manager 1011 (refer to FIG. 28) connected to the drug station 1. The transmission screen image 25003 includes the first display area B11, a comment area B41, a close button B42, and a transmission button B43.

The touchscreen controller 14 displays, in the first display area B11, a message prompting the user to select and transmit a comment. The comment area B41 displays various comments in a selectable manner. The comments are prepared in advance to provide information noticed by the user during a picking operation to the prescription manager 1011. The comments are stored in, for example, the memory 15.

The close button B42 receives an input operation for closing the transmission screen image 25003. In this case, no comment is transmitted to the prescription manager 1011. The transmission button B43 receives an input operation for transmitting a comment to the prescription manager 1011. More specifically, in response to an input operation on the transmission button B43, the control unit 10 transmits a comment selected by the user to the prescription manager 1011.

In response to an input operation on the close button B42 or the transmission button B43, the touchscreen controller 14 displays the first confirmation screen image 22001 displaying information about a drug to be dispensed next when the cassette Ca containing the drug is placed on the drug receiver 32. The touchscreen controller 14 may display the second confirmation screen image 22002 displaying information about the drug instead. When the last drug indicated by the prescription data is dispensed, the touchscreen controller 14 either returns to the initial screen image or displays, for example, the tray removal screen image 24003 shown in FIG. 24.

The second determination screen image 25001 may not display the correction button B124. In this case, the terminate button B122 has the same function as the correction button B124. More specifically, in response to an input operation on the terminate button B122 on the second determination screen image 25001, the touchscreen controller 14 displays the quantity correction screen image 25002, instead of displaying the termination accept screen image 23001 shown in FIG. 23.

Correction by Displaying Dispensing Quantity Input Screen Image 26001

Figure 26:
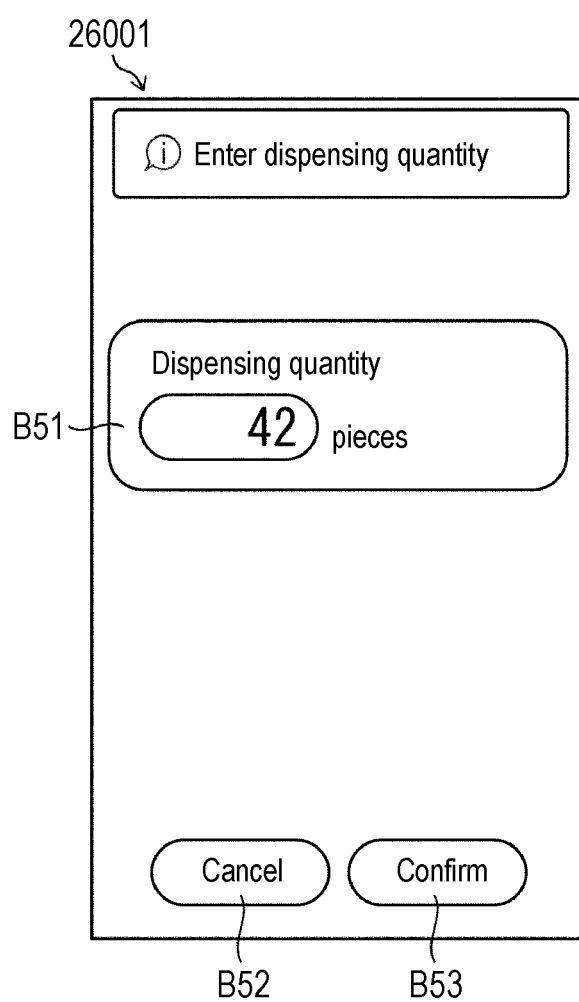
FIG. 26 is a diagram of an example screen image appearing on the second touchscreen.
Figure 27:
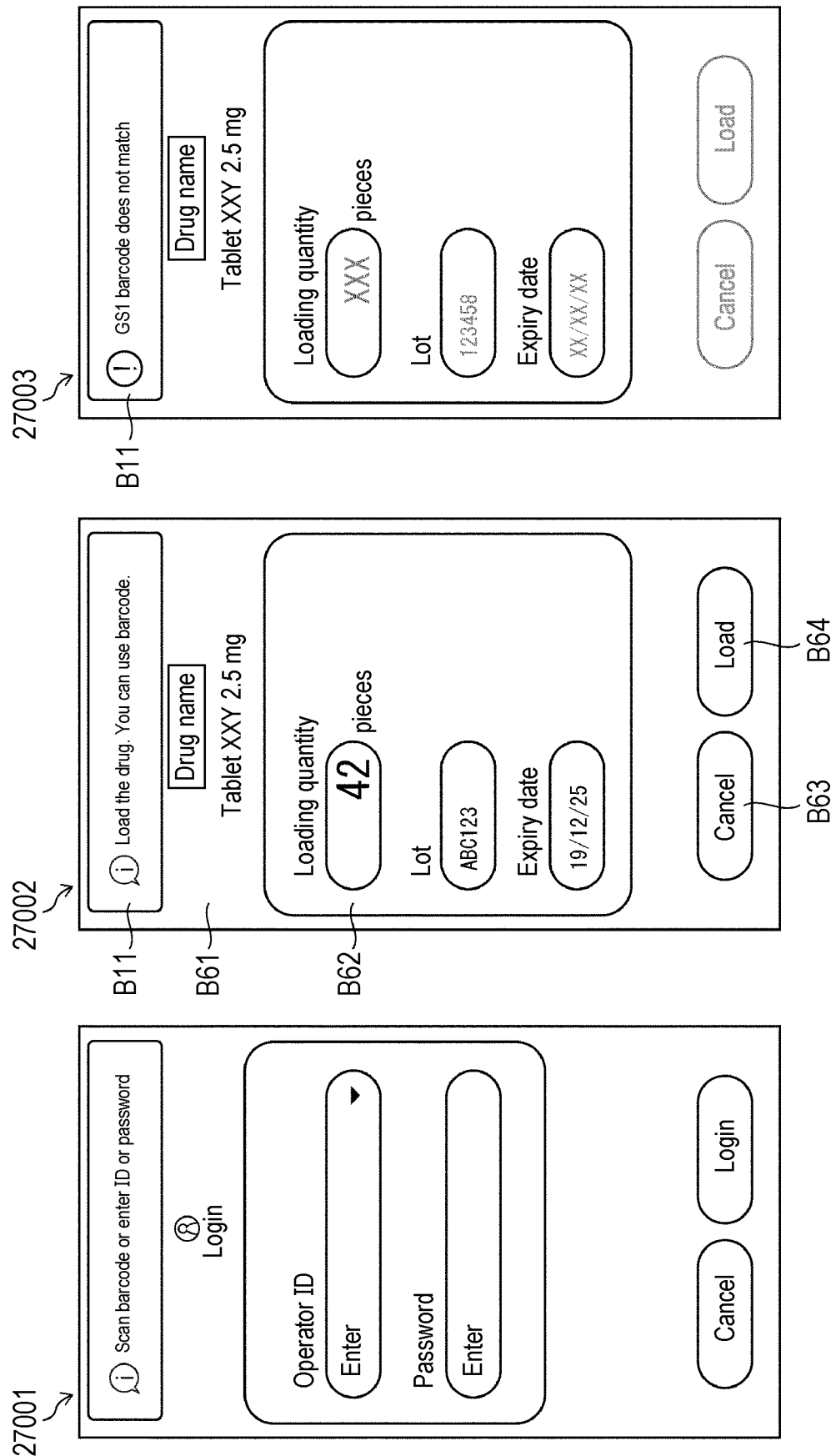
FIG. 27 is a diagram of example screen images appearing on the second touchscreen.

In response to an input operation on the family cassette call button B14 on the second determination screen image 25001, the touchscreen controller 14 displays, for example, the dispensing quantity input screen image 26001 shown in FIG. 26.

The dispensing quantity input screen image 26001 can receive an input of the quantity of a drug to be dispensed.

The dispensing quantity input screen image 26001 includes, for example, a dispensing quantity input area B51, a cancel button B52, and the confirm button B53.

The dispensing quantity input area B51 can receive an input of the total quantity of the drug (dispensing quantity) removed from the cassette Ca. In response to an input operation in the dispensing quantity input area B51, the touchscreen controller 14 displays, for example, a numerical keypad. The cancel button B52 receives an input operation for redisplaying the second determination screen image 25001. The confirm button B53 receives an input operation performed by the user confirming that the prescribed quantity of the drug has been removed from the cassette Ca.

In response to an input operation on the confirm button B53, the main unit controller 11 and the picking unit controller 12 return the cassette Ca placed on the drug receiver 32 to the main unit 2. Also, the main unit controller 11 and the picking unit controller 12 transport a cassette Ca containing a drug to be dispensed next from the main unit 2 to the drug receiver 32. In response to the cassette Ca being placed on the drug receiver 32, the touchscreen controller 14 displays the first confirmation screen image 22001 or the second confirmation screen image 22002 including information about the drug to be dispensed next.

For any family cassette available, the user can remove the prescribed quantity of the drug by removing the drug from another cassette Ca different from the cassette Ca containing the drug to be dispensed. The user can thus correct the count result.

The touchscreen controller 14 may display a tray close button having the same function as the tray close button B21 in the dispensing quantity input screen image 26001. The touchscreen controller 14 may not display the confirm button B53 in the dispensing quantity input screen image 26001. In this case, the above process is performed in response to the tray close button appearing in the dispensing quantity input screen image 26001 or an input operation on the tray close button 39. When the dispensing quantity input screen image 26001 displays neither the confirm button B53 nor the tray close button, the above process is performed in response to an input operation on the tray close button 39.

Loading Drug During Picking Operation

The touchscreen controller 14 activates the refill button B13 when displaying the second confirmation screen image 22002 shown in FIG. 22. In response to an input operation on the refill button B13, the touchscreen controller 14 displays, for example, a login screen image 27001 shown in FIG. 27. In response to successful user authentication with an operator ID and a password input on the login screen image 27001, the touchscreen controller 14 displays a loading operation screen image 27002.

The loading operation screen image 27002 is used to perform a loading operation of a drug into a cassette Ca during a picking operation on the cassette Ca placed on the drug receiver 32. The loading operation screen image 27002 includes the first display area B11, a drug name display area B61, a loading quantity display area B62, a cancel button B63, and a load button B64. The touchscreen controller 14 displays a message prompting the user to load the drug into the cassette Ca in the first display area B11.

The drug name display area B61 displays the name of the drug contained in the cassette Ca placed on the drug receiver 32. The loading quantity display area B62 displays the drug loading quantity for the cassette Ca, the lot number, and the expiry date. In response to an input operation in the loading quantity display area B62, the touchscreen controller 14 displays, for example, a keypad. The touchscreen controller 14 may display the lot number and the expiry date read using the barcode reader 34 from the barcode added to the drug.

The cancel button B63 receives an input operation for redisplaying the second confirmation screen image 22002. The load button B64 receives an input operation for entering the information appearing in the loading quantity display area B62. In response to an input operation in the loading quantity display area B62, the control unit 10 stores the information into the memory 15 in a manner associated with the cassette identification information about the cassette Ca placed on the drug receiver 32. Also, the touchscreen controller 14 redisplays the second confirmation screen image 22002.

When finding a mismatch between the information (e.g., the GS1 barcode) read by the barcode reader 34 and the drug identification information about the drug contained in the cassette Ca placed on the drug receiver 32, the touchscreen controller 14 displays a screen image informing the user of the mismatch. One such example is a notification screen image 27003 shown in FIG. 27.

Example Screen Images on Tablet Terminal

Figure 28:
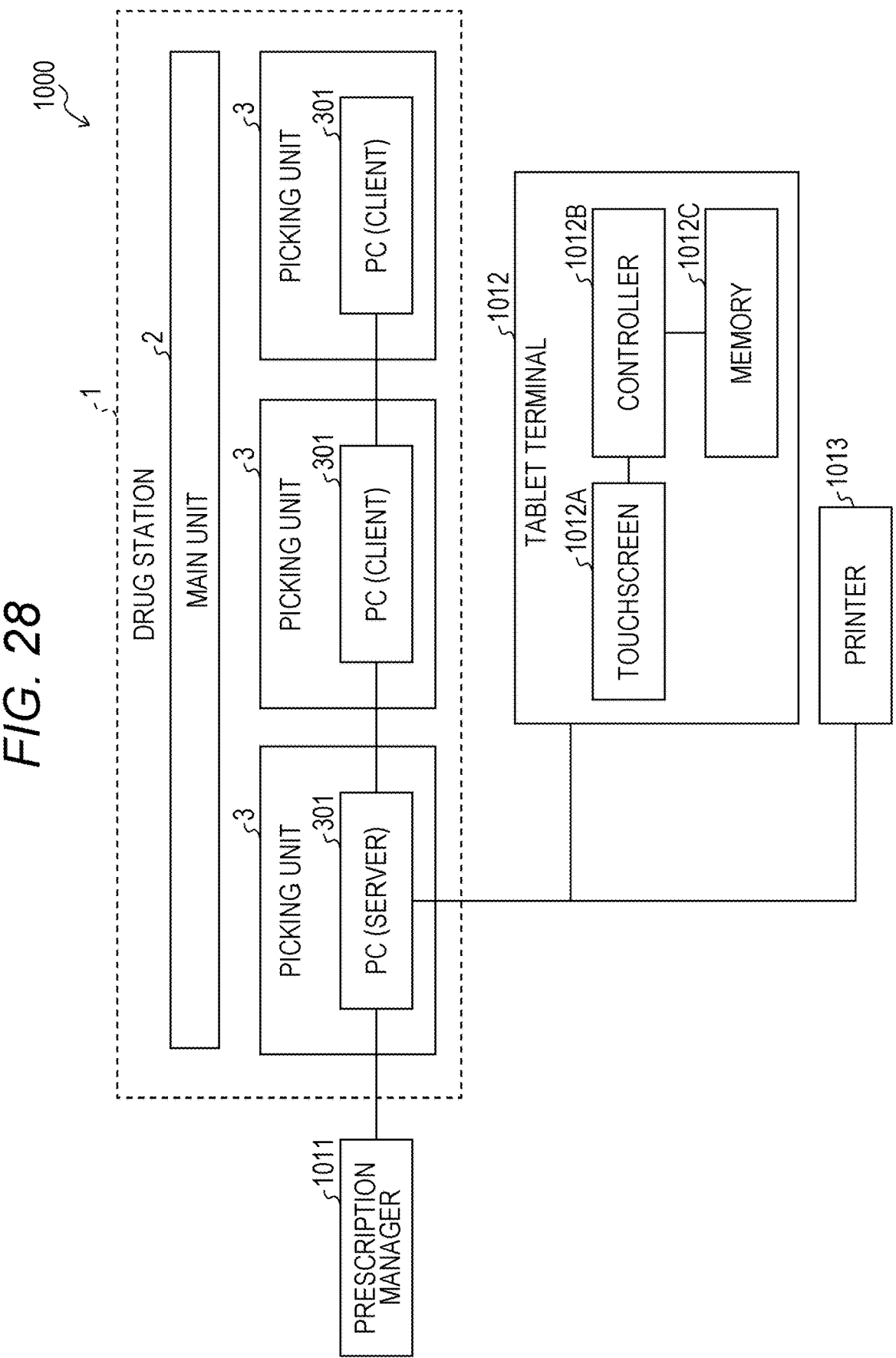
FIG. 28 is a diagram of an example drug preparation system.
Figure 29:
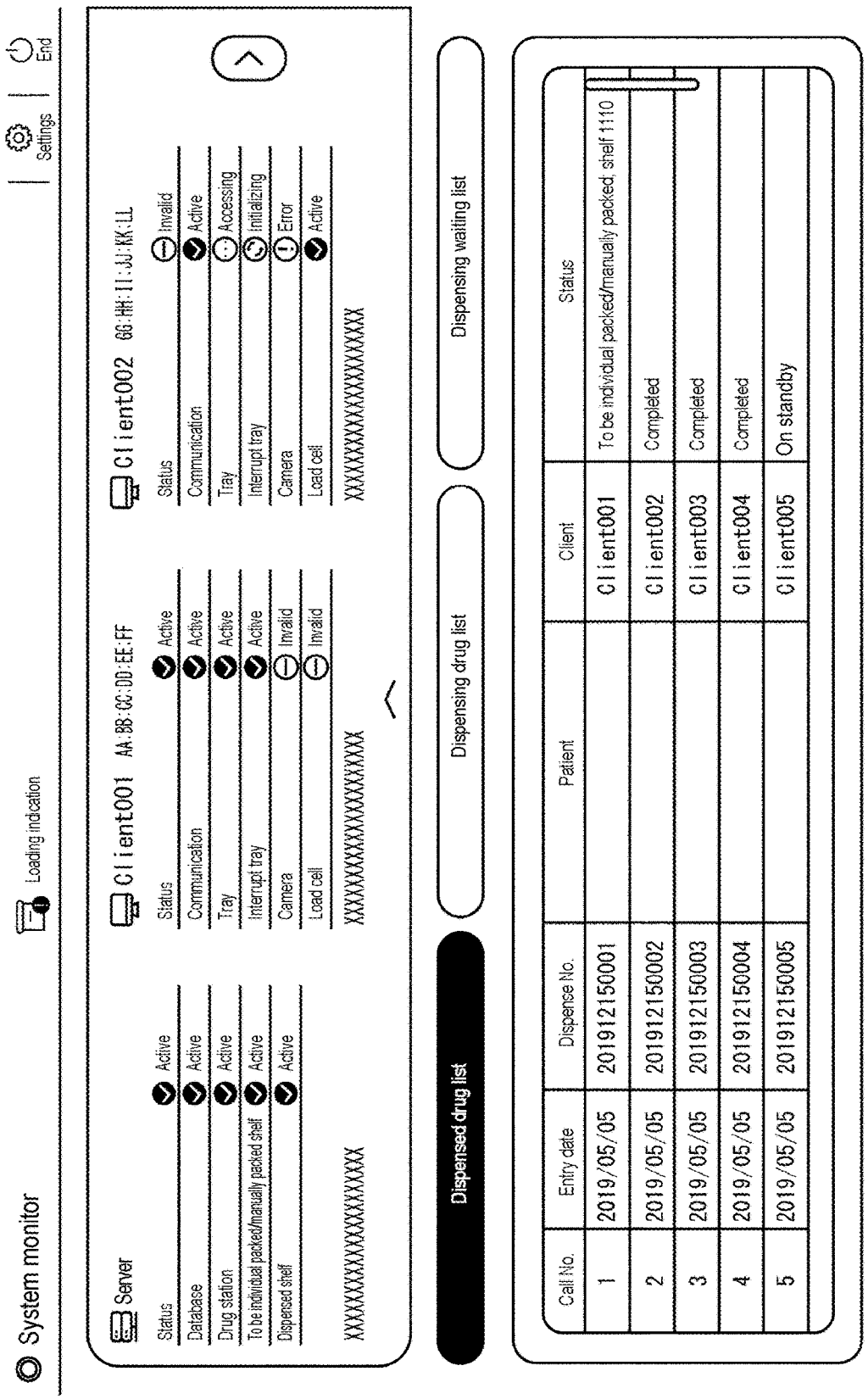
FIG. 29 is a diagram of an example screen image appearing on a tablet terminal.

Example screen images to appear on a tablet terminal 1012 will be described below. FIG. 28 is a diagram of an example drug preparation system 1000. FIGS. 29 and 30 are diagrams of example screen images appearing on the tablet terminal 1012. The drug preparation system 1000 will first be described to facilitate understanding of such example screen images appearing on the tablet terminal 1012. FIG. 28 is a diagram of an example drug preparation system 1000.

Drug Preparation System

As shown in FIG. 28, the drug preparation system 1000 mainly includes the drug station 1 (or drug station 1A) including the main unit 2 and the picking units 3, the prescription manager 1011, the tablet terminal 1012, and the printer 1013.

The prescription manager 1011 serves as a host system for various devices used for drug preparation (including the drug station 1) at, for example, a pharmacy at which the drug station 1 is installed. The prescription manager 1011 transmits, for example, sets of prescription data for individual patients to the various devices. The prescription manager 1011 also transmits, for each set of prescription data, information identifying drugs to be dispensed at the various devices.

Each picking unit 3 includes a PC 3. One PC 301 operates as a server, whereas the other PCs 301 operate as clients.

The PC 301 operating as the server centrally controls the entire drug station 1. The PC 301 operating as the server implements, for example, all the functions of the control unit 10. Also, the PC 301 selects a picking unit 3 to be assigned to dispensing drugs based on received prescription data. The PC 301 is connected to the prescription manager 1011, the tablet terminal 1012, and the printer 1013.

Each PC 301 operating as a client controls at least the picking unit 3 including the PC 301. Each PC 301 operating as a client implements, for example, the functions of the picking unit controller 12 and the touchscreen controller 14 in the control unit 10.

The tablet terminal 1012 can display various items of information about the drug station 1 and can receive various input operations. The tablet terminal 1012 includes a touchscreen 1012A, a controller 1012B, and a memory 1012C. The touchscreen 1012A can display those various items of information and can receive those various input operations. The controller 1012B controls the components of the tablet terminal 1012. The memory 1012C stores information used for the processing performed by the controller 1012B.

In response to an instruction from each PC 301 or from the tablet terminal 1012, the printer 1013 outputs printed matter such as journal data printed on a sheet.

The PC 301 operating as the server is connected to the tablet terminal 1012 and the printer 1013 when the drug station 1 is operating normally. The PC 301 is disconnected from the tablet terminal 1012 and the printer 1013 in response to any abnormality (failure) in the drug station 1. In other words, in response to any abnormality in the drug station 1, the tablet terminal 1012 and the printer 1013 are disconnected and can operate independently of the drug station 1.

When connected to the tablet terminal 1012, the PC 301 operating as the server transmits various items of information stored in the memory 15 to the tablet terminal 1012 in a timely manner (e.g., every thirty minutes or every one hour). The items of information include information about a drug associated with cassette identification information about each cassette Ca and storage position information about the drug.

The tablet terminal 1012 to receive such various items of information may be replaced by any other device that is connected to the PC 301 during normal operation of the drug station 1 and is disconnected from the PC 301 in response to any abnormality in the drug station 1. More specifically, the items of information may at least be managed by another device that can be disconnected from the PC 301 in response to any abnormality in the drug station 1.

The controller 1012B determines that the drug station 1 has an abnormality when, for example, receiving no response from the PC 301 operating as the server or failing to receive the items of information. In this case, the controller 1012B switches the screen image from a screen image to appear during normal operation of the drug station 1 (e.g., a status image) to a screen image to appear during an abnormal operation (e.g., an emergency dispensing image).

The controller 1012B may determine that the drug station 1 has an abnormality in response to any report from the PC 301 about a faulty component in the drug station 1. Also, the user of the drug station 1 may switch the screen image from the screen image to appear during normal operation to the screen image to appear during abnormal operation by operating the touchscreen 1012A in response to determining that the drug station 1 has an abnormality.

Screen Image on Tablet Terminal: Normal Operation

The controller 1012B displays, for example, a status image 29001 shown in FIG. 29 on the touchscreen 1012A as the screen image to appear during normal operation of the drug station 1. The status image 29001 displays information about the status of the drug station 1, such as the operating status of each component of the drug station 1 and the dispensing status of each drug at the drug station 1. The controller 1012B updates the status image 29001 in response to every update of the information about the drug station 1 that is transmitted as appropriate.

Screen Image on Tablet Terminal: Abnormal Operation

The controller 1012B either automatically or manually displays, for example, an emergency dispensing image 30001 shown in FIG. 30 in response to any abnormality in the drug station 1. The emergency dispensing image 30001 allows the user to manually generate a list of drugs to be dispensed based on prescription data in response to any abnormality in the drug station 1.

The controller 1012B disconnects the PC 301 operating as the server in response to any abnormality in the drug station 1. After such disconnection, the controller 1012B reads information associated with the cassette identification information (cassette-associated information) stored in the memory 1012C. When the cassette-associated information is managed by the other device, the controller 1012B obtains the cassette-associated information from the other device. The controller 1012B generates the emergency dispensing image 30001 based on the obtained cassette-associated information.

The emergency dispensing image 30001 includes a drug list display area C11 and a dispensing drug display area C12.

The drug list display area C11 receives an input operation for retrieving information from the obtained cassette-associated information and displays the retrieval result. The drug list display area C11 includes a first retrieval area C111, a second retrieval area C112, a retrieval result display area C113, and a dispensing list add button C114.

The first retrieval area C111 and the second retrieval area C112 receive an input operation for retrieving drugs to appear in the retrieval result display area C113. The first retrieval area C111 and the second retrieval area C112 have the same functions as the first retrieval area A411 and the second retrieval area A412 included in the selected dispensing screen image 19001 shown in FIG. 19.

The retrieval result display area C113 displays a retrieval result for the obtained cassette-associated information. The retrieval result display area C113 has the same display items as in the retrieval result display area A413 included in the selected dispensing screen image 19001 shown in FIG. 19.

The dispensing list add button C114 receives an input operation for adding, to a dispensing list area C121, information about one or more drugs selected from the drugs appearing in the retrieval result display area C113.

The dispensing drug display area C12 displays drugs to be dispensed based on prescription data. In this example, the dispensing drug area C121 includes the dispensing list area C121, a dispensing quantity input area C122, a settings button C123, a clear button C124, and a journal data output button C125.

The dispensing list area C121 displays information about one or more drugs selected by the user from the drugs appearing in the retrieval result display area C113. In this example, the dispensing list area C121 displays the names of the selected drugs as well as the cassette number and the sub-number of the cassette Ca containing each of the drugs. Also, the quantity field in the dispensing list area C121 reflects the numerical value input in the dispensing quantity input area C122. The dispensing list area C121 includes a cross sign button to be a delete button for receiving an input operation for deleting information about each selected drug.

In response to an input operation on the dispensing list add button C114 with, for example, the information about one or more drugs being selected in the retrieval result display area C113, the controller 1012B displays the information about the drugs in the dispensing list area C121. The controller 1012B may display the information in the dispensing list area C121 by receiving a drag operation in the dispensing list area C121 for the information about one or more drugs selected in the retrieval result display area C113.

The dispensing quantity input area C122 can receive an input of the quantity of the drug to be dispensed from the cassette Ca. In response to an input operation in the dispensing quantity input area C122, the controller 1012B displays, for example, a numerical keypad. With one of the drugs appearing in the dispensing list area C121 being selected, the dispensing quantity input area C122 can receive an input of a numerical number.

The settings button C123 receives an input operation for determining the quantity of the drug to be dispensed selected in the dispensing list area C121 to be the quantity input in the dispensing quantity input area C122 and reflecting the quantity in the quantity field in the dispensing list area C121.

The clear button C124 receives an input operation for deleting all the information appearing in the dispensing list area C121. The journal data output button C125 receives an input operation for causing the printer 1013 to output, as journal data, the information appearing in the dispensing list area C121.

As described above, the PC 301 as the server is disconnected from the tablet terminal 1012 in response to any abnormality in the drug station 1. In this case, the controller 1012B cannot receive various items of information from the PC 301. However, the controller 1012B can read various items of information managed either by the tablet terminal 1012 disconnected from the drug station 1 or by the above other device. The various items of information are obtained as appropriate by the tablet terminal 1012 or by the other device during normal operation of the drug station 1 (specifically, while the drug station 1 is connected to the tablet terminal 1012 or the other device). Thus, the controller 1012B can display, in the retrieval result display area C113, information about one or more drugs managed by the drug station 1 either at the time when or immediately before the abnormality occurs.

The user selects information included in the prescription data from sets of information about drugs appearing in the retrieval result display area C113 to display the list of drugs to be dispensed based on the prescription data in the dispensing list area C121. Thus, at the drug station 1 having an abnormality, the user can manually remove drugs indicated by prescription data from the main unit 2 by viewing the touchscreen 1012A.

Also, the user can output, from the printer 1013, the information (the dispensing list) appearing in the dispensing list area C121. The user can thus remove drugs indicated by prescription data from the main unit 2 by viewing the journal data, without viewing the touchscreen 1012A. In this case, the user who has the tablet terminal 1012 and the user who has the journal data (in other words, the multiple users) can remove the drugs from the main unit 2.

The drug preparation system 1000 may include multiple tablet terminals 1012. In this case, in response to any abnormality in the drug station 1, multiple users who have the tablet terminals 1012 can work separately to remove the drugs indicated by prescription data from the main unit 2.

Third Embodiment

A drug station 1A according to the present embodiment will be described mainly with reference to FIGS. 31 to 46. The drug station 1A will be described focusing on its components different from the corresponding components of the drug station 1 according to the first embodiment. In the present embodiment described below, drugs to be dispensed are drug sheets. The components of the drug station 1A are controlled by the control unit 10 shown in FIG. 1.

Figure 31:
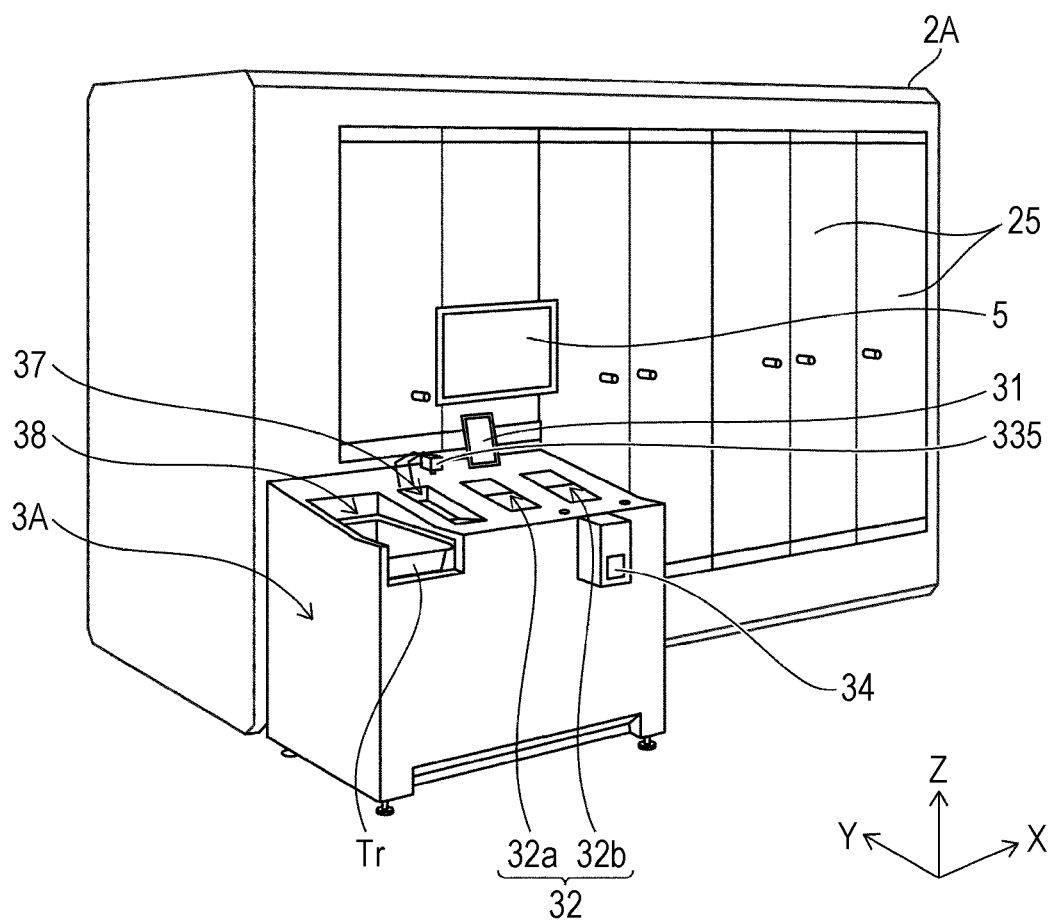
FIG. 31 is a perspective view of an example main unit.
Figure 32:
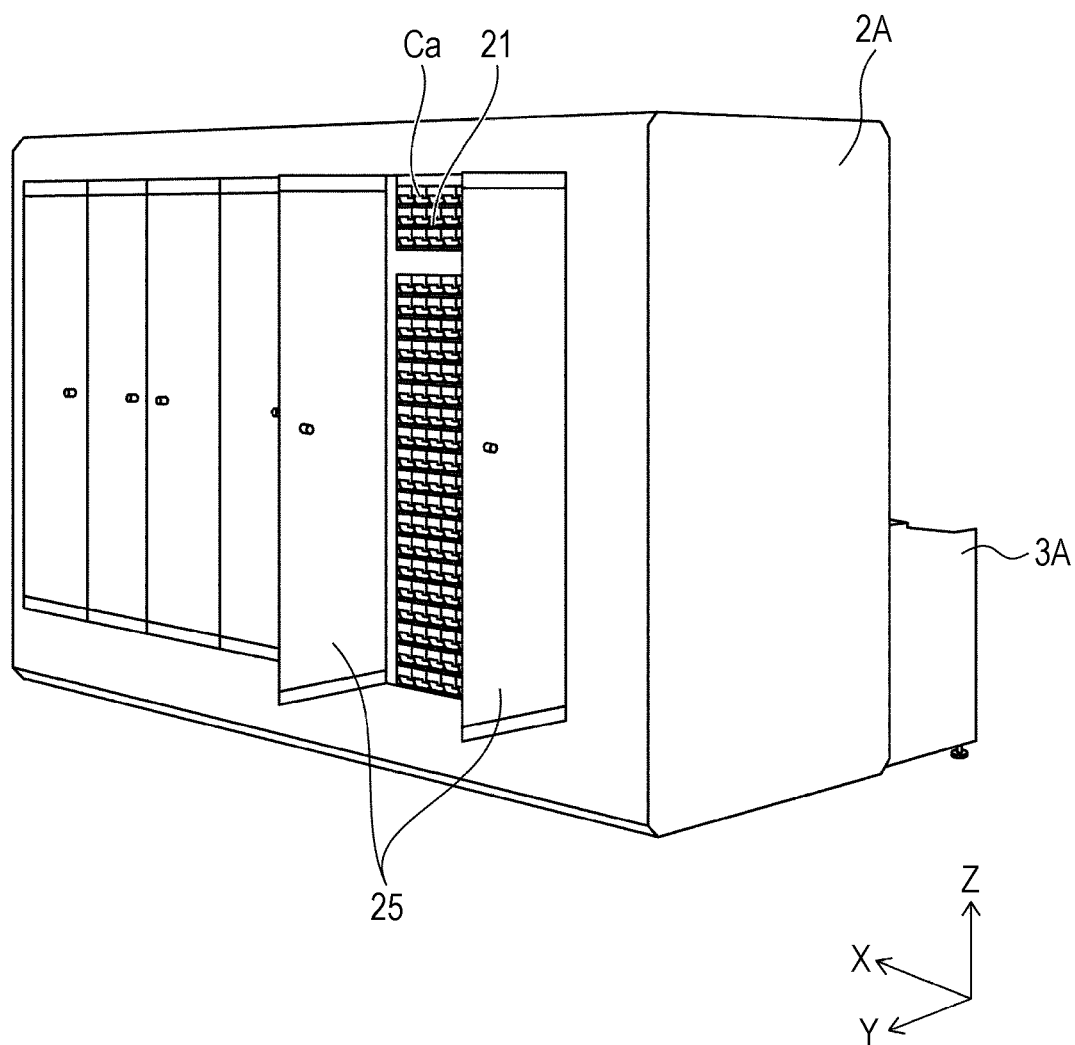
FIG. 32 is a perspective view of the example main unit.
Figure 33:
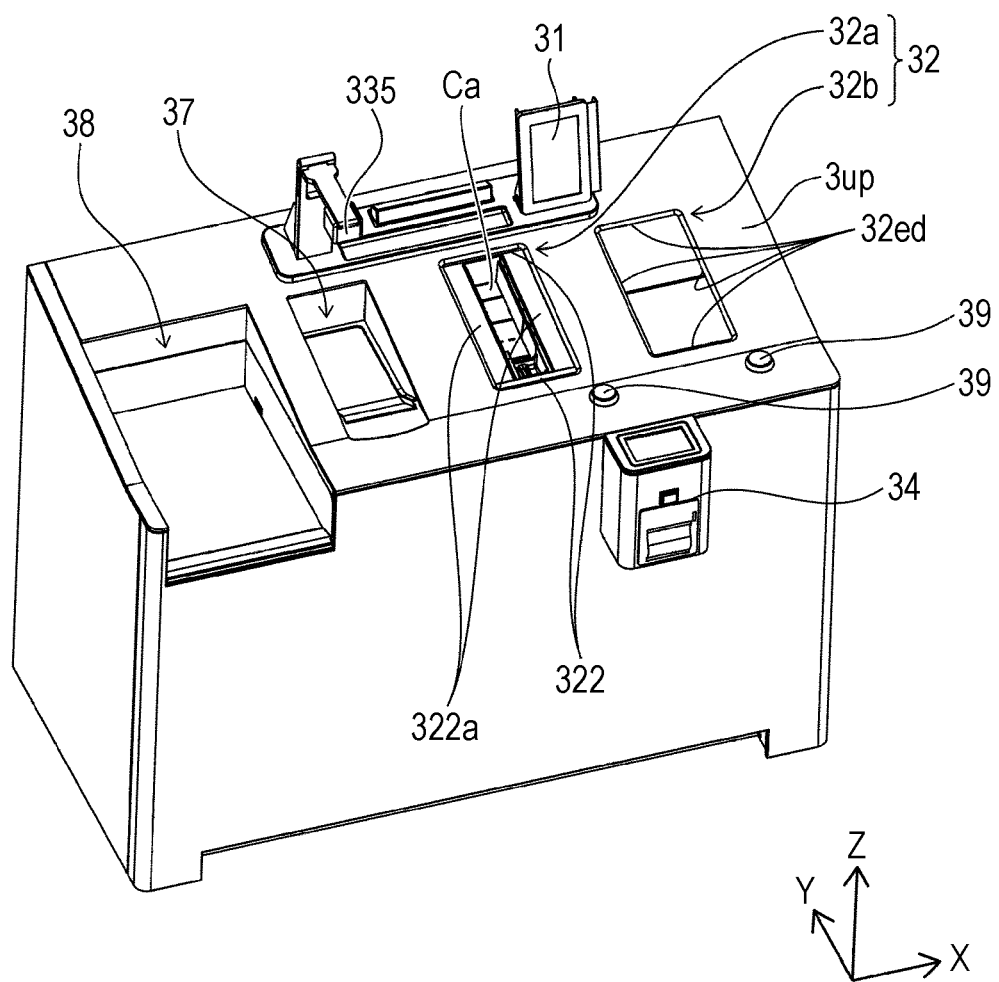
FIG. 33 is a perspective view of an example picking unit.
Figure 34:
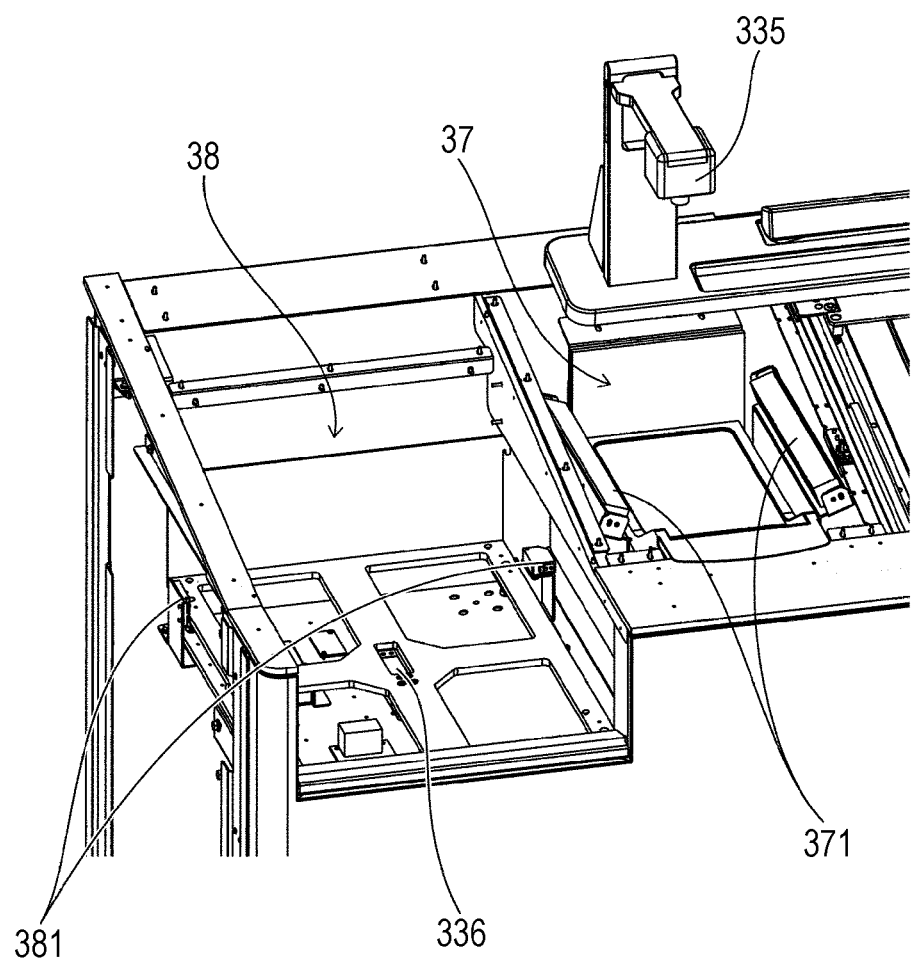
FIG. 34 is a diagram of an example drug receptacle and an example tray support included in the picking unit.
Figure 35:
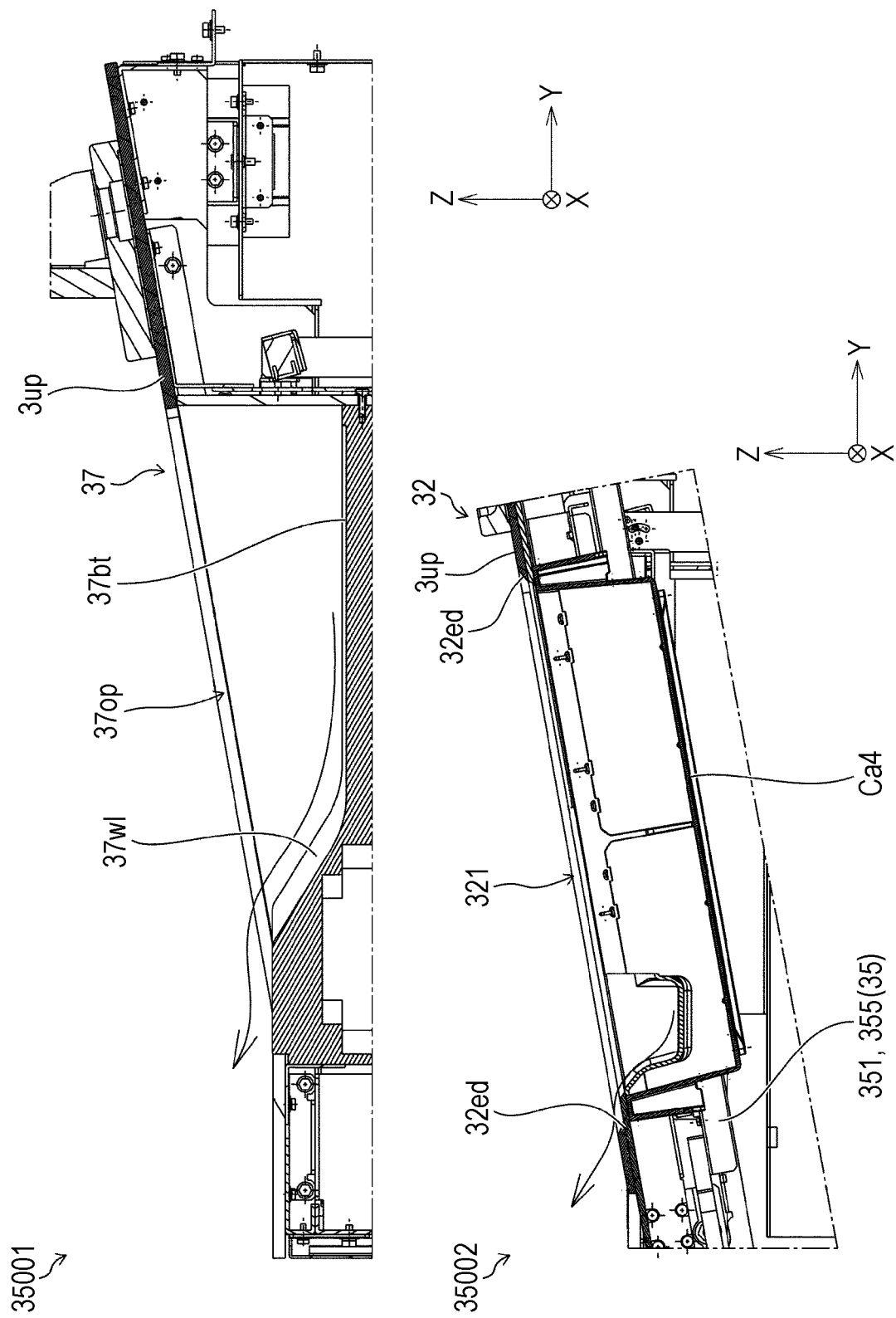
FIG. 35 is a diagram describing removal of a drug sheet from the drug receptacle and removal of a drug sheet from a cassette.

The drug station 1A includes a main unit 2A, a picking unit 3A, and the inspection unit 4. FIGS. 31 and 32 are perspective views of an example main unit 2A. FIG. 31 shows the main unit 2A as viewed from the front surface. FIG. 32 shows the main unit 2A as viewed from the back surface. FIG. 33 is a perspective view of an example picking unit 3A. FIG. 34 is a diagram of an example drug receptacle 37 and an example tray support 38 included in the picking unit 3A. To simplify the drawing, FIG. 34 shows the picking unit 3A without the upper surface and the side walls, the drug receptacle 37 without the side walls, and the tray support 38 without the side walls and the bottom. In FIG. 35, the portion 35001 shows removal of a drug sheet from the drug receptacle 37 in a cross section, and the portion 35002 shows removal of a drug sheet from a cassette Ca4 (refer to FIGS. 36 to 38) in a cross section.

Appearance of Main Unit

As shown in FIGS. 31 and 32, the main unit 2A includes multiple doors 25 on both the front surface and the back surface. The user can open the doors 25 to directly access the cassette shelf 21. FIG. 32 shows the main unit 2A with selected doors 25 open on the back surface. The doors 25 may be transparent or semi-transparent to allow viewing the inside of the cassette shelf 21 from outside the main unit 2A.

FIG. 31 shows the main unit 2A having the single picking unit 3A adjacent to its front surface. In some embodiments, the main unit 2A may have multiple picking units 3A adjacent to its front surface.

Also, the main unit 2A differs from the main unit 2 in including a cassette gripper 226 that replaces the cassette gripper 221 and a cassette holder 230 that replaces the cassette holder 23. The cassette gripper 226 and the cassette holder 230 will be described later.

Appearance of Picking Unit

As shown in FIG. 1, the tray transporter 6 in the drug station 1 transports a transportation tray Tr stored in the tray storage 7 into the picking unit 3. The tray transporter 6 also transports the transportation tray Tr receiving one or more drug sheets dispensed by the picking unit 3 toward the inspection unit 4. More specifically, the tray transporter 6 automatically transports a transportation tray Tr to and from the picking unit 3.

The drug station 1A in the present embodiment does not include the tray transporter 6. The user places a transportation tray Tr onto the picking unit 3A and delivers a transportation tray Tr removed from the picking unit 3A to the inspection unit 4. To enable such user operations, as shown in FIGS. 31 and 33, the picking unit 3A includes the drug receptacle 37 and the tray support 38 on an upper surface 3*up* in which the receivers 32 (the first drug receiver 32*a* and the second drug receiver 32*b*) are located.

The drug receptacle 37 receives any separate drug pieces. In the present embodiment, the image sensor 335 is located adjacent to the drug receptacle 37 for capturing an image of separate drug pieces placed on the drug receptacle 37. As shown in FIG. 34, the drug receptacle 37 has two side walls on which light sources 371 are placed. In response to, for example, an input operation from a user, the picking unit controller 12 emits light from the light sources 371 and captures an image of any separate drug pieces placed on the drug receptacle 37. The picking unit controller 12 recognizes the shape of a drug in the captured image, and compares the shape with each of various drug shapes stored in the memory 15 to determine the quantity of the drug. The memory 15 stores such various drug shapes in a manner associated with information indicating the quantity of the drug.

Also, as shown in the portion 35001 of FIG. 35, a side wall 37*w*1 of the drug receptacle 37 adjacent to the standing position of the user slopes from its portion adjacent to the main unit 2 toward the user (in −Y-direction). When the drug receptacle 37 is viewed from above, the side wall 37*w*1 slopes to cause a port 37*op* of the drug receptacle 37 to be larger than a bottom 37*bt* of the drug receptacle 37. This structure allows one or more drug sheets imaged by the image sensor 335 to slide along the sloping side wall 37*w*1 and be taken out when being removed from the drug receptacle 37 as shown in the portion 35001 (in the arrow direction in the figure).

The tray support 38 supports a transportation tray Tr. As shown in FIG. 34, the tray support 38 includes the measuring unit 336 and a sensor 381.

The measuring unit 336 measures the weight of the transportation tray Tr on the tray support 38 and the weight of any drug sheet on the transportation tray Tr. The memory 15 prestores the weight of the transportation tray Tr and the weight of each drug sheet containing a different type of drug. Thus, the drug determiner 124 can determine the quantity of a drug on the transportation tray Tr based on the measurement result obtained by the measuring unit 336, the imaging result obtained by the image sensor 335, or both the measurement result and the imaging result. The measuring unit 336 is located below the bottom of the tray support 38.

In some embodiments, the memory 15 may not store the weight of a transportation tray Tr. The measuring unit 336 may determine the weight of any drug sheet by subtracting the tare weight. More specifically, after the transportation tray Tr is placed on the tray support 38, the measuring unit 336 subtracts the tare weight. The user may then place a drug sheet on the transportation tray Tr. The measuring unit 336 can then measure the net weight of the drug sheet.

The sensor 381 detects the transportation tray Tr on the tray support 38. In the present embodiment, the sensor 381 is a light transmissive sensor including two elements, or a light source for emitting light and a light detector for detecting the emitted light. The light transmissive sensor can precisely detect the presence of the transportation tray Tr. In the present embodiment, the sensor 381 includes the two elements located on the two side walls of the tray support 38. The sensor 381 may be located on the bottom of the tray support 38. However, the sensor 381 on the bottom emits light upward, which may annoy the user. The sensor 381 on the bottom may also collect dust. Further, the sensor 381 on the bottom is to be a reflective sensor, which may detect the transportation tray Tr with lower precision. The sensor 381 on the side walls is less likely to emit light that may annoy the user, collect dust, or reduce the precision in detecting the transportation tray Tr.

The user removes a drug in the quantity to be dispensed (one or more drug sheets and/or one or more separate drug pieces) from the cassette Ca placed on the drug receiver 32 based on information appearing on the second touchscreen 31. For dispensing any separate drug pieces, the user places the drug pieces onto the drug receptacle 37. The picking unit controller 12 controls the image sensor 335 to capture an image of the drug pieces placed on the drug receptacle 37. Subsequently, the user removes the drug pieces from the drug receptacle 37 and places them onto the transportation tray Tr on the tray support 38. For dispensing any drug sheets, the user ties the drug pieces removed from the drug receptacle 37 and the drug sheets removed from the cassette Ca into a predetermined shape with, for example, a rubber band, and places the drug sheets and the drug pieces onto the transportation tray Tr on the tray support 38. For dispensing a drug sheets alone, the user places the drug sheet onto the transportation tray Tr on the tray support 38. For dispensing multiple drug sheets, the user ties the drug sheets with, for example, a rubber band, into a predetermined shape for efficient handling in subsequent processes (e.g., drug inspection or drug administration). The user then places the tied drug sheets onto the transportation tray Tr on the tray support 38. The picking unit controller 12 controls the measuring unit 336 to measure the weight of drug sheets and/or any separate drug pieces on the transportation tray Tr. The picking unit controller 12 (the drug determiner 124) determines, based on the measurement result obtained by the measuring unit 336 and/or the imaging result obtained by the image sensor 335, the quantity of the drug placed, and determines whether the drug quantity matches the predetermined quantity indicated by prescription data. The touchscreen controller 14 displays the determination result on the second touchscreen 31.

Also, as shown in FIG. 33, the drug receiver 32 includes the shutter 322 as described in the first embodiment. The shutter 322 is open and closed in Y-direction. The drug receiver 32 additionally includes the shutters 322a. The shutters 322a are open and closed in a direction (X-direction) substantially perpendicular to the operating direction of the shutter 322, as controlled by the shutter controller 122. The shutters 322a can thus be open and closed in correspondence with the size of each cassette Ca with a varying width (e.g., a large cassette Ca1, a medium-sized cassette Ca2, a small cassette Ca3, or a cassette Ca4 with a container Ca41 or Ca42). The shutter 322 is open in Y-direction, and the shutters 322a are closed in X-direction in accordance with the width of the cassette Ca. This reduces the likelihood that drug sheets or separate drug pieces drop from the cassette Ca. The shutter 322 and the shutters 322a may be open and closed at the same time or in the order of one after the other.

Also, the picking unit 3A includes the tray close buttons 39, which are mechanical buttons corresponding to each shutter 322 in the first drug receiver 32a and the second drug receiver 32b. When the shutter 322 is open and the tray close button 39 corresponding to the shutter 322 is pressed, the shutter controller 122 controls the shutter 322 to be closed.

Also, as shown in FIG. 33, the picking unit 3A has the upper surface 3up having the drug receivers 32 and the drug receptacle 37. The upper surface 3up slopes with respect to a horizontal plane. The upper surface 3up slopes from its portion adjacent to the main unit 2 to be lower toward a portion adjacent to the standing position of the user (in −Y-direction).

As shown in the portion 35002 of FIG. 35, the picking cassette transporter 35 moves a cassette gripper to cause the sloping opening of the slot 321 to be substantially parallel to the upper surface of the cassette Ca4 gripped by the cassette gripper. The cassette gripper may be either the first cassette gripper 351 or the second cassette gripper 355. For example, the picking cassette transporter 35 may include a device for raising or lowering the first cassette gripper 351 (or the second cassette gripper 355) at the drug receiver 32. The cassette Ca4 is tilted at the drug receiver 32 in correspondence with the upper surface 3up that slopes as described above to allow the user to more easily view the inside of the cassette Ca4.

As shown in FIG. 33 and the portion 35002 of FIG. 35, each drug receiver 32 includes a periphery 32ed. The periphery 32ed slopes from its portion adjacent to the bottom of the drug receiver 32 (adjacent to the picking cassette transporter 35) toward the slot 321 (in +Z-direction) outwardly in the drug receiver 32. As shown in the portion 35001 of FIG. 35, drug sheets can slide along the sloping periphery 32ed and be taken out when being removed from the cassette Ca4 placed on the drug receiver 32 (in the arrow direction in the figure).

The single first touchscreen 5 and the single second touchscreen 31 are provided for the picking unit 3A. Similarly to each picking unit 3 in the first embodiment, the picking unit 3A includes the picking cassette transporter 35 for each of the first drug receiver 32a and the second drug receiver 32b as shown in FIG. 9.

Cassette

Example cassettes Ca that can be used at the drug station herein, or specifically cassettes Ca4, will now be described with reference to FIGS. 36 to 38. Each cassette Ca4 has substantially the same profile as the large cassette Ca1 shown in FIGS. 3A to 3D.

Figure 36:
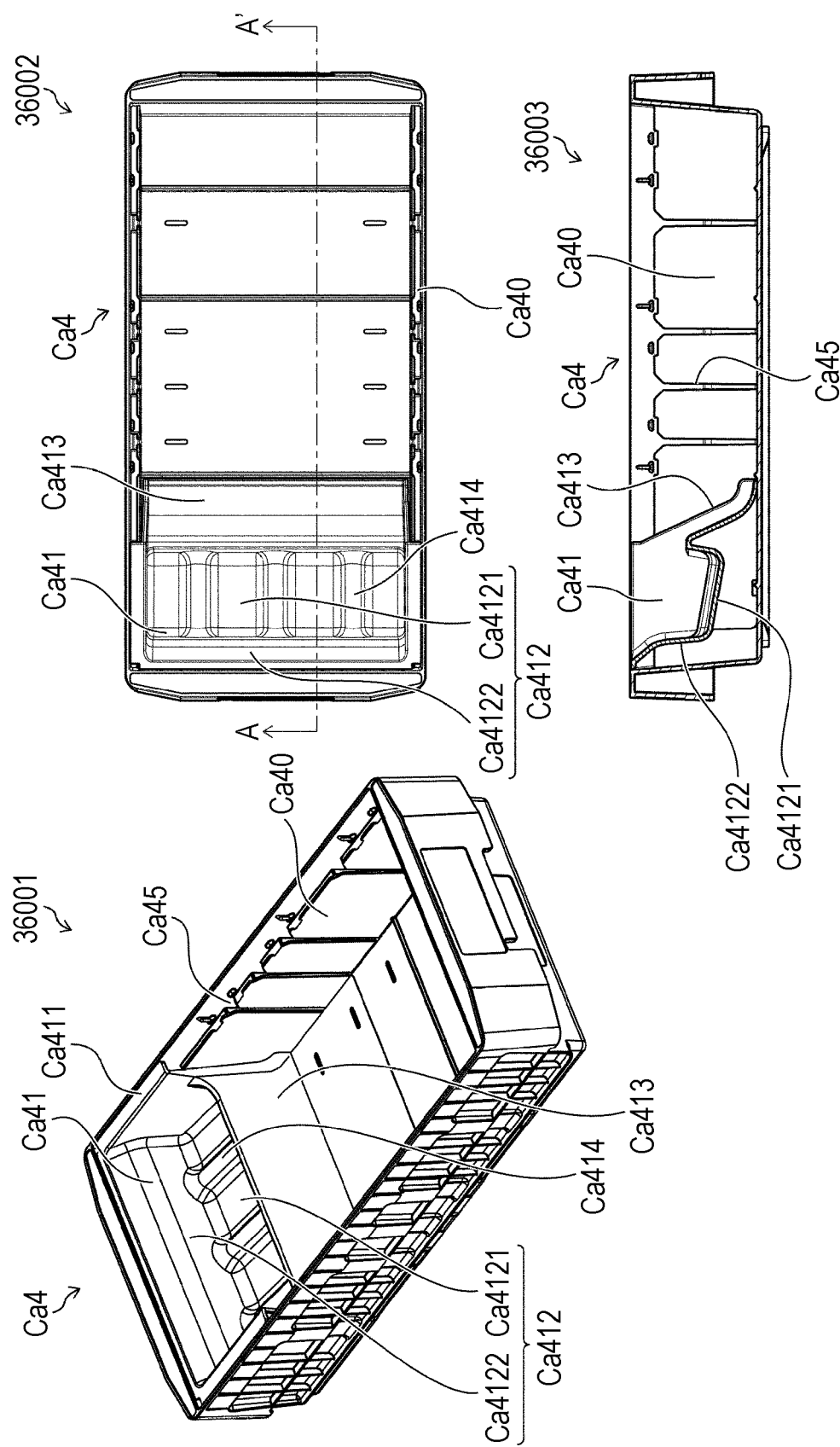
FIG. 36 is a view of a cassette showing its example structure.

FIG. 36 is a view of a cassette Ca4 showing its example structure. In FIG. 36, the portion 36001 shows an example cassette Ca4 including a container Ca41 in a perspective view, and the portion 36002 shows the cassette Ca4 including the container Ca41 in a plan view. In FIG. 36, the portion 36003 shows the cassette Ca4 including the container Ca41 in a cross section taken along line A-A'. FIG. 37 is a perspective view of an example cassette Ca4 including a container Ca42. The portion 37002 of FIG. 37 shows the cassette Ca4 including the container Ca42 in a plan view. The portion 37003 of FIG. 37 shows the cassette Ca4 including the container Ca42 in a cross section taken along line B-B'. The portion 37004 of FIG. 37 shows the cassette Ca4 with the container Ca42 that has slid in a perspective view. The portion 37004 of FIG. 37 also shows the container Ca42 in the cassette Ca4 showing its example structure. Also, FIG. 38 is a perspective view of an example cassette Ca4 including a container Ca41 and a container Ca42.

Figure 37:
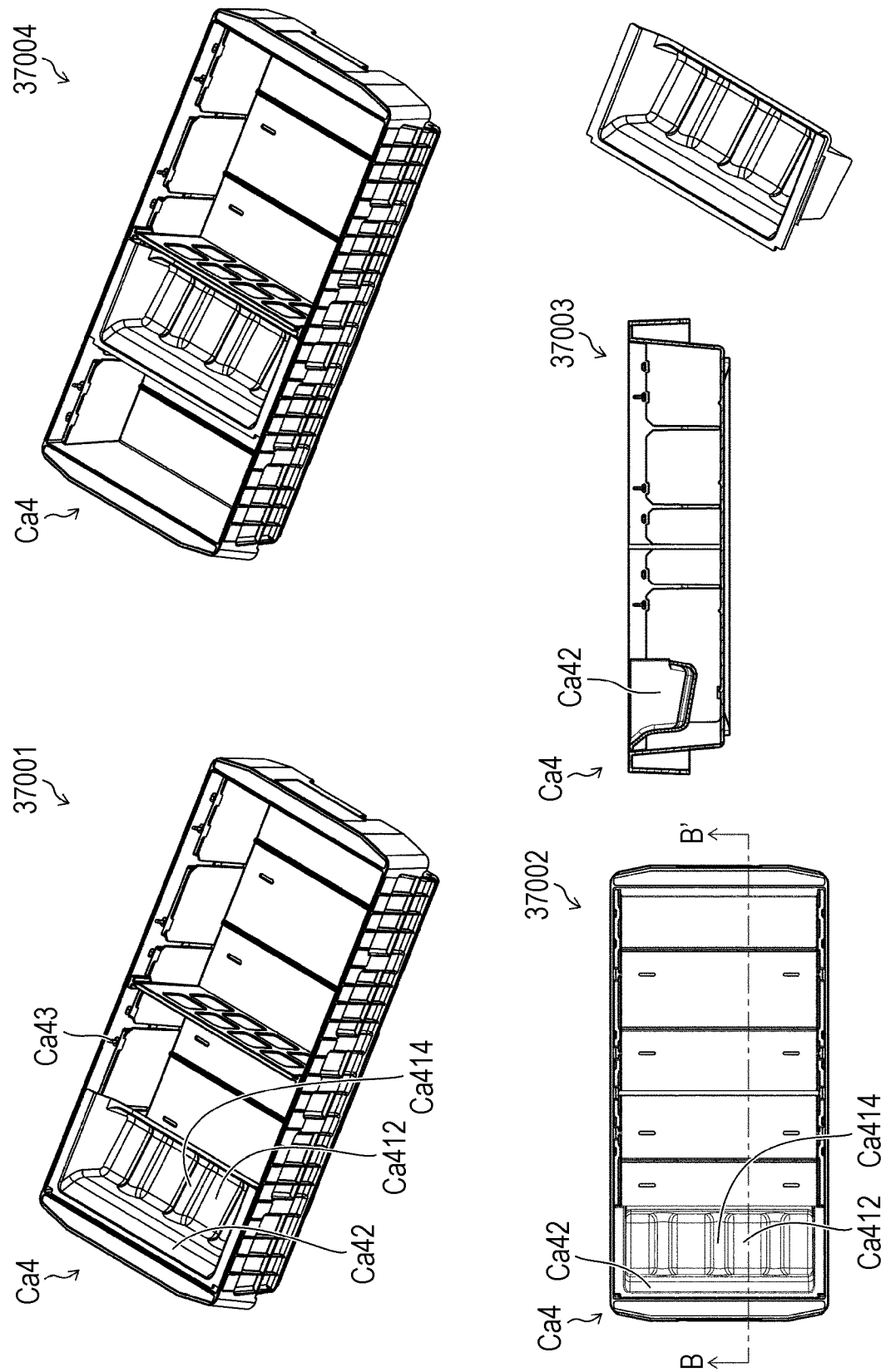
FIG. 37 is a view of another example cassette.

As shown in FIGS. 36 and 37, each cassette Ca4 differs from the large cassette Ca1 in including protrusions Ca40, the container Ca41, and/or the container Ca42. The protrusions Ca40 protrude on the longer side surfaces of each cassette Ca4. A single protrusion Ca40 may be on each of the two longer sides of each cassette Ca4, or two or more protrusions Ca40 may be on each of the two loner sides of each cassette Ca4.

As shown in FIG. 36, the cassette Ca4 includes multiple protrusions Ca40 on each of the two side surfaces. Adjacent protrusions Ca40 are separated by slits Ca45. The slits Ca45 receive one or more partitions Ca44 inside the cassette Ca4 as shown in FIGS. 37 and 38. The cassette Ca4 may have multiple internal compartments for storing drug sheets, as described with reference to FIGS. 3A to 3D. Each partition Ca11 in FIGS. 3A to 3D may have the same shape as the partition Ca44.

The container Ca41 stores any separate drug pieces. As shown in FIG. 36, the container Ca41 includes peripheral walls Ca411, at least one compartment Ca412, and a slope Ca413. The container Ca41 may be secured to one shorter side of the cassette Ca4 or may be removable. When the user removes separate drug pieces, the container Ca41 may have one of its longer sides in contact with one lateral end of the cassette Ca4.

The peripheral walls Ca411 are plates along the shorter sides of the container Ca41. A removable container Ca41 has its peripheral walls Ca411 on protrusions Ca40 on a cassette Ca4. This supports the container Ca41 on the cassette Ca4.

The compartment Ca412 can store any separate drug pieces. The compartment Ca412 may be sized to contain such separate drug pieces. Also, the compartment Ca412 is tilted in the lateral direction. More specifically, the compartment Ca412 has a bottom Ca4121 tilted in the lateral direction, and a side wall Ca4122 to contact one of the shorter sides of the cassette Ca4 tilted in the lateral direction.

When the cassette Ca4 is to be used by the user, the container Ca41 with the sloping bottom Ca4121 and the sloping side wall Ca4122 is located in the cassette Ca4 to have a shallower portion nearer the user. The cassette Ca4 may contain one or more drug sheets in its body (portion without the container Ca41) and may contain any separate drug pieces in the cassette Ca41. This allows the user to easily determine the quantity of the drug and remove the drug. Also, when the user removes separate drug pieces, the separate drug pieces can slide along the sloping bottom Ca4121 and the sloping side wall Ca4122 to allow the user to easily take out the separate drug pieces.

The side wall Ca4122 and the periphery 32ed of the drug receiver 32 may have substantially the same slope angle to allow the user to more easily take the drugs out of the container Ca41.

The slope Ca413 is adjacent to one longer side of the container Ca41 not in contact with one of the shorter sides of the cassette Ca4. The slope Ca413 is located between the above longer side of container Ca41 and the bottom Ca4121 of the container Ca41 and slopes in the lateral direction. When the user removes one or more drug sheets, the drug sheets can slide along the slope Ca413 and be removed from the body of the cassette Ca, allowing the user to easily take out the drug sheets.

The container Ca41 may have, on the bottom Ca4121, any number of ribs Ca414, which extend in the lateral direction (in which the drug is to be taken out). The ribs Ca414 located in this manner can divide the compartment Ca412 into multiple areas that each can contain any separate drug pieces. The ribs Ca414 function as guides for the user to take out the drug stored in each of the different areas. This structure allows the user to more easily take out the drug.

Also, the cassette Ca4 may include the container Ca42 instead of the container Ca41. As shown in FIG. 37, the container Ca42 differs from the container Ca41 in that it does not include the slope Ca413 but includes rails Ca421 along its shorter sides. Also, the protrusions Ca40 in the cassette Ca4 include grooves Ca400. Also, the cassette Ca4 further includes one or more protrusion Ca43.

The container Ca42 is supported with its rails Ca421 placed on the protrusions Ca40. The rails Ca421 of the container Ca42 are engaged in the grooves Ca400 on the container Ca4. The container Ca42 is thus slidable along the grooves Ca400. In the container Ca42 attached in the cassette Ca4, the rails Ca421 are sandwiched between the grooves Ca400 and the protrusions Ca40. The container Ca42 is thus less likely to separate from the cassette Ca4 when the container Ca42 slides.

With the container Ca42 including no slope Ca413, the cassette Ca4 can contain one or more drug sheets under the container Ca42 and thus contain more drug sheets. Also, when the user removes any separate drug pieces, the container Ca42 is placed in contact with one of the shorter sides of the cassette Ca4 to place such separate drug pieces nearer the user. When the user removes drug sheets, the container Ca42 can be slid to allow the user to remove the drug sheets from the positions nearer the user.

The drug receiver 32 slopes. When the cassette Ca4 has the container Ca42 nearer the user, drug sheets are easily placed between the bottom surface of the container Ca42 and the bottom surface of the cassette Ca4. During a picking operation, the container Ca42 may obstruct the user removing drug sheets. However, the container Ca42 is slidable, and can thus be moved to allow the user to easily remove drug sheets from the cassette Ca4.

Figure 38:
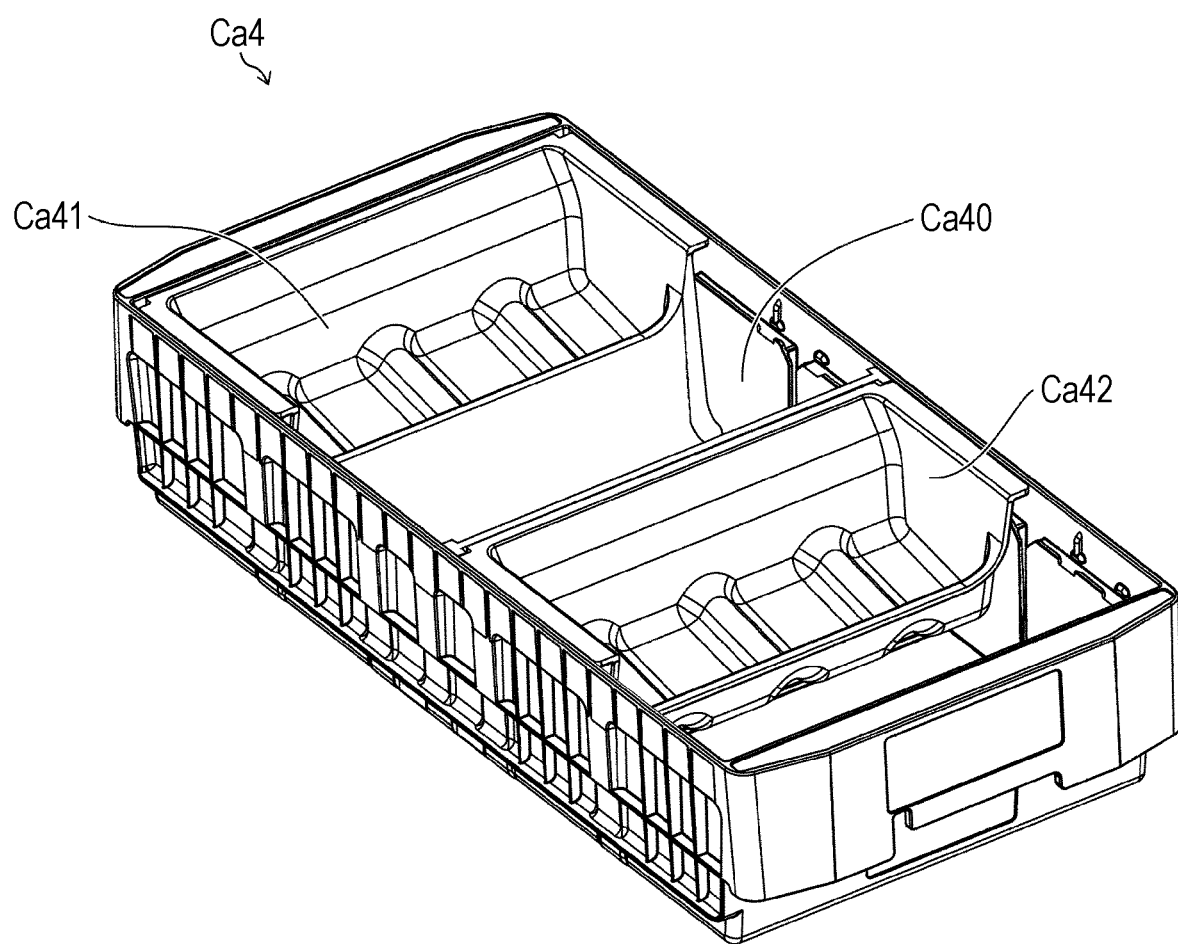
FIG. 38 is a perspective view of an example cassette including multiple containers.

Also, as shown in FIG. 38, the cassette Ca4 may include one or more partitions Ca44 to define multiple compartments for containing drug sheets. The partitions Ca44 are removable and are received in the slits Ca45 to define multiple compartments.

Also, the cassette Ca4 may include the container Ca41 or the container Ca42 in each compartment. The container Ca41 or the container Ca42 may be located in any manner easily usable by the user in the compartments. The cassette Ca4 may include containers that are all containers Ca41, or all containers Ca42, or a combination of one or more containers Ca41 and one or more containers Ca42. At least one of the multiple compartments may not include any container.

The cassette Ca4 may have a profile other than the profile of the large cassette Ca1 shown in FIGS. 3A to 3D, and may have the profile of the medium-sized cassette Ca2 or of the small cassette Ca3. In this case, the containers Ca41 and Ca42 have other shapes in accordance with the dimensions of the medium-sized cassette Ca2 or the small cassette Ca3.

Cassette Gripper

Referring now to FIGS. 39 to 43, an example structure of the cassette gripper 226 included in the main unit 2A in the present embodiment will be described. FIG. 39 is a perspective view of an example cassette gripper 226. In FIG. 39, the portion 39001 shows the cassette gripper 226 with a lid 2267 at the uppermost position, and the portion 39002 shows the cassette gripper 226 with the lid 2267 at a position to come in contact with an upper surface of a cassette Ca (contact position).

FIGS. 40 and 41 are perspective views of an example drive 2270 for the cassette gripper 226 viewed from below. FIGS. 42 and 43 are cross-sectional views of the cassette gripper 226 describing an example operation of the lid 2267 for the cassette gripper 226. The lid 2267 is at the uppermost position in the portion 40001 of FIG. 40 and in the portion 42001 of FIG. 42. The lid 2267 is at the standby position in the portion 40002 of FIG. 40 and in the portion 42002 of FIG. 42. A second moving unit 2272b (described later) is at a retracted position in the portion 41001 of FIG. 41 and in the portion 43001 of FIG. 43. The lid 2267 is at the contact position in the portion 41002 of FIG. 41 and in the portion 43002 of FIG. 43. To simplify the drawing, FIGS. 40 and 41 do not show some components of the drive 2270 including a bottom plate.

Structure of Cassette Gripper

The cassette gripper 226 has the same functions as the cassette gripper 221 in the first embodiment (refer to FIGS. 4A, 4B and 6). More specifically, the cassette gripper 226 draws a cassette Ca from the cassette shelf 21 (refer to FIGS. 4A and 4B) or from the cassette holder 230 (refer to FIG. 44), and grips the cassette Ca, as controlled by the main-cassette transporter controller 112. The cassette gripper 226 also places the gripped cassette Ca onto the cassette shelf 21 or the cassette holder 230 for storage of the cassette Ca. Instead of the first cassette gripper 221a and the second cassette gripper 221b (refer to FIGS. 4A, 4B and 6) in the first embodiment, the cassette gripper 226 is supported on the first post 224a and the second post 224b (refer to FIGS. 4A and 4B) in a slidable manner.

As shown in FIG. 39, the cassette gripper 226 mainly includes a cassette support 2261, a cassette drawer 2262, a first drive 2263, a first pulley 2264a, a second pulley 2264b, a first guide rail 2265, and a position sensor 2266. The cassette gripper 226 also includes a barcode sensor 2273. Similarly to the cassette gripper 221, the cassette gripper 226 further includes a rotary drive (not shown) that allows access to multiple cassette shelves 21 (e.g., two facing cassette shelves 21).

The cassette support 2261 supports a cassette Ca when the cassette Ca is drawn by the cassette drawer 2262.

Similarly to the cassette drawer 2211 (refer to FIG. 6), the cassette drawer 2262 draws a cassette Ca placed on the cassette shelf 21 or the cassette holder 230 into the cassette gripper 226. FIG. 39 shows the cassette Ca that has been drawn into the cassette gripper 226.

As shown in the portion 42001 of FIG. 42, the cassette drawer 2262 includes a tab 2262a to be engaged in a tab receiver Ca12 in a cassette Ca. The cassette drawer 2262 draws a cassette Ca and places a cassette Ca onto the cassette shelf 21 or the cassette holder 230 in the same manner as the cassette gripper 226 described in the first embodiment. In FIGS. 42 and 43, the tab 2262a is not engaged in the tab receiver Ca12 in the cassette Ca.

The first drive 2263 moves the cassette drawer 2262 in the depth direction of the cassette gripper 226 (Y-direction). The first drive 2263 is, for example, a motor. The first pulley 2264a and the second pulley 2264b transmit a driving force generated by the first drive 2263 to the first guide rail 2265. The rotational shaft of the first pulley 2264a is connected to the rotational shaft in the first drive 2263. The rotational shaft of the second pulley 2264b is connected to one end of the first guide rail 2265. The first pulley 2264a and the second pulley 2264b are connected to each other with a belt.

The first guide rail 2265 extends in the depth direction to allow the cassette drawer 2262 to be slidable. The first guide rail 2265 is connected to an underlying component of the cassette drawer 2262 (not shown) and axially rotates with a rotational force from the second pulley 2264b to move the cassette drawer 2262 in the depth direction.

Similarly to the position sensor 2214 (refer to FIG. 6), the position sensor 2266 detects a cassette Ca located immediately in front of the cassette gripper 226 to be moved.

The barcode sensor 2273 reads a barcode on the cassette Ca to detect the identification and the orientation of the cassette Ca.

The cassette gripper 226 further includes the lid 2267, a lifter 2268, movable units 2269, and the drive 2270. The drive 2270 also operates as controlled by the main-cassette transporter controller 112.

The lid 2267 functions as the lid of the cassette Ca. The lid 2267 is located above a cassette receptacle 2271 in the cassette gripper 226 in a manner movable in a direction (Z-direction) substantially perpendicular to the cassette receptacle 2271 for receiving the cassette Ca. With the lid 2267, drug sheets and separate drug pieces are less likely to be shaken out of the cassette Ca during transportation of the cassette Ca.

The lifter 2268 is connected to the lid 2267 and to the cassette receptacle 2271 to move the lid 2267 in Z-direction with respect to the cassette receptacle 2271. The lifter 2268 extends or retracts in Z-direction. To extend and retract in Z-direction, the lifter 2268 in the present embodiment includes a link assembly including multiple links 2268a and multiple joints 2268b. In the present embodiment, the lifter 2268 includes the link assembly located between the two sides of the lid 2267 and the two sides of the cassette receptacle 2271.

The movable units 2269 are supports connected to the lifter 2268 and the drive 2270 to allow movement of the lifter 2268 in Z-direction. In the present embodiment, each movable unit 2269 has one end connected to a single joint 2268b and the other end connected to a moving unit 2270c included in the drive 2270. This allows the moving unit 2270c to move in the depth direction in cooperation with the movement of the movable units 2269. For example, the moving unit 2270c moves to cause the lifter 2268 to extend or retract in Z-direction, and thus causes the lid 2267 to move in Z-direction. The moving unit 2270c may also move with the weight of the lid 2267 as it is moved by the lifter 2268 and the movable units 2269.

Structure of Drive

The drive 2270 controls an extracting and retracting operation of the lifter 2268. As shown in FIGS. 39 to 41, the drive 2270 mainly includes a second guide rail 2270a, third guide rails 2270b, the moving unit 2270c, a second drive 2270d, a third pulley 2270e, a fourth pulley 2270f, and a position sensor 2270g. To simplify the drawing in FIGS. 40 and 41, the second drive 2270d is shown in the portion 40001 of FIG. 40 alone.

The second guide rail 2270a and the third guide rails 2270b extend in the depth direction (Y-direction). This sliding assembly allows sliding of the moving unit 2270c on a screw on the second guide rail 2270a. In the present embodiment, the second guide rail 2270a including a screwed shaft is located in a middle portion of the drive 2270 and is sandwiched by the two third guide rails 2270b including shafts.

The second guide rail 2270a and the third guide rails 2270b are connected to the moving unit 2270c. The second guide rail 2270a axially rotates with a rotational force from the fourth pulley 2270f to move the moving unit 2270c in the depth direction. The lengths of the second guide rail 2270a and the third guide rails 2270b may be determined to allow the lid 2267 to move between the uppermost position and the contact position.

The moving unit 2270c moves along the second guide rail 2270a and the third guide rails 2270b to move the lifter 2268 in Z-direction through the movable units 2269.

The second drive 2270d moves the moving unit 2270c in the depth direction. The second drive 2270d is, for example, a motor. The third pulley 2270e and the fourth pulley 2270f transmit a driving force generated by the second drive 2270d to the second guide rail 2270a. The rotational shaft of the third pulley 2270e is connected to the rotational shaft of the second drive 2270d. The rotational shaft of the fourth pulley 2270f is connected to one end of the second guide rail 2270a. The third pulley 2270e and the fourth pulley 2270f are connected to each other with a belt.

The position sensor 2270g detects a fixture 2272d (described later) to detect the positions of first moving units 2272a (described later), or in other words, the position of the moving unit 2270c. The main-cassette transporter controller 112 receives the detection result from the position sensor 2270g to determine the position of the lid 2267.

In the present embodiment, the position sensor 2270g includes a first position sensor 2273a, a second position sensor 2273b, a third position sensor 2273c, and a fourth position sensor 2273d. The first the position sensor 2273a detects the second moving unit 2272b at the retracted position. The second position sensor 2273b detects the lid 2267 at the standby position.

The third position sensor 2273c detects the lid 2267 at a standby position set for the height of a cassette (a cassette with height h1) that is taller than the cassette Ca. The fourth position sensor 2273d detects the lid 2267 at a standby position set for a cassette taller than the cassette with the height h1, or specifically a cassette with a height h2 (>h1).

At least one of the second position sensor 2273b, the third position sensor 2273c, and the fourth position sensor 2273d is to be located in accordance with the height of a cassette. In the present embodiment, the second position sensor 2273b may be located to detect the lid 2267 at the standby position at the height of the cassette Ca.

As shown in FIGS. 40 and 41, the moving unit 2270c mainly includes the first moving units 2272a, the second moving unit 2272b, springs 2272c, and the fixture 2272d.

The first moving units 2272a are connected to the third guide rails 2270b with bushes (not shown) and to a housing 2272e for the moving unit 2270c, but are not connected to the second guide rail 2270a. The second moving unit 2272b is connected to the second guide rail 2270a with a guide (nut) 2272b1 for receiving the screw on the second guide rail 2270a. The second moving unit 2272b is connected to the third guide rail 2270b with a bush (not shown), but is not connected to the housing 2272e. Also, the first moving unit 2272a and the second moving unit 2272b are not connected to each other.

The second moving unit 2272b, which is connected to the second guide rail 2270a, moves in the depth direction with a driving force received from the second drive 2270d. The first moving units 2272a, which are not connected to the second guide rail 2270a, are not driven directly by a driving force from the second drive 2270d. The first moving unit 2272a moves along the third guide rail 2270b in cooperation with the second moving unit 2272b while being in contact with the second moving unit 2272b.

The first moving units 2272a, which are connected to the housing 2272e, move together with the housing 2272e. The housing 2272e is connected to the movable units 2269. The movable units 2269 are connected to the lifter 2268, which is connected to the lid 2267. Thus, the movement of the first moving units 2272a is interrelated with the raising and lowering of the lid 2267. The second moving unit 2272b is not connected to the housing 2272e and thus may move independently of the housing 2272e, or specifically independently of the raising and lowering of the lid 2267.

The springs 2272c are restricting members that restrict the raising of the lid 2267 at the contact position. The restricting members may be other elastic members that have the same functions as the springs 2272c. In the present embodiment, one spring 2272c is located on each of the two third guide rails 2270b.

The fixture 2272d is connected to each first moving unit 2272a. The fixture 2272d is detected by the position sensor 2270g.

Example Operation of Moving Unit

As shown in the portion 40001 of FIG. 40 and in the portion 42001 of FIG. 42, the lid 2267 is up at the uppermost position when the moving unit 2270c is at a first end of the drive 2270 (an end in the +Y-direction). The uppermost position is the position of the lid 2267 spaced most apart from the cassette receptacle 2271.

The second guide rail 2270a (sliding screw) rotates with a driving force from the second drive 2270d. The rotation is then transmitted to the guide 2272b1 in the second moving unit 2272b. The guide 2272b1 converts the rotation to linear movement, causing the second moving unit 2272b to move linearly along the second guide rail 2270a. The second moving unit 2272b presses the first moving unit 2272a while being in contact with the first moving unit 2272a to move the first moving unit 2272a in +Y-direction. The moving unit 2270c thus moves in +Y-direction. This movement lifts the lid 2267 upward through the housing 2272e, the movable units 2269, and the lifter 2268. More specifically, the lid 2267 is lifted to the uppermost position when the moving unit 2270c reaches the first end.

As shown in the portion 40002 of FIG. 40 and in the portion 42002 of FIG. 42, the lid 2267 is at the standby position when the second position sensor 2273b detects the fixture 2272d. The standby position is the position of the lid 2267 to be on standby when the cassette Ca is placed from the cassette gripper 226 onto the cassette shelf 21 or onto the cassette holder 230, or when the cassette Ca is drawn from the cassette shelf 21 or the cassette holder 230 into the cassette gripper 226. The standby position is the position of the lid 2267 to be on standby during the placement or drawing of the cassette Ca. More specifically, the standby position may be relatively near but remain spaced from the cassette Ca being placed or drawn and may not interfere with the movement of the cassette Ca.

To move the lid 2267 from the uppermost position to the standby position, the main-cassette transporter controller 112 controls the second drive 2270d to stop holding the lid 2267 at the uppermost position. This causes the lid 2267 to be lowered, for example, by its weight from the uppermost position. As the lid 2267 is lowered, the lifter 2268 retracts to move the housing 2272e in −Y-direction through the movable units 2269. In cooperation with the movement of the housing 2272e, the first moving units 2272a move in −Y-direction. The first moving unit 2272a thus press the second moving unit 2272b while being in contact with the second moving unit 2272b to move the second moving unit 2272b in −Y-direction. The moving unit 2270c thus moves in −Y-direction. Subsequently, in response to the second position sensor 2273b detecting the fixture 2272d, the main-cassette transporter controller 112 drives the second drive 2270d to stop the lid 2267 at the standby position.

The second drive 2270d stops holding the lid 2267 at the standby position. This causes the lid 2267 to be lowered, for example, by its weight from the standby position. For example, when the cassette Ca is drawn into the cassette gripper 226, the main-cassette transporter controller 112 lowers the lid 2267 from the standby position and places the lid 2267 in contact with the upper surface of the cassette Ca (the periphery of the cassette Ca).

The moving unit 2270c may move without relying on the weight of the lid 2267. For example, the second drive 2270d may be driven to move the second moving unit 2272b in −Y-direction to move the moving unit 2270c. In this case, the second drive 2270d may be driven to move the second moving unit 2272b in −Y-direction. This movement, as well as the weight of the lid 2267, may move the first moving units 2272a in −Y-direction while the first moving unit 2272a is in contact with the second moving unit 2272b.

The lid 2267 stops being lowered when coming in contact with the upper surface of the cassette Ca. The portion 41002 of FIG. 41 and the portion 43002 of FIG. 43 show the lid 2267 in this state, or stopped at the contact position. When the lid 2267 is stopped, the moving unit 2270c stops moving in −Y-direction. The first moving units 2272a, which are connected to the housing 2272e, also stop moving when the lid 2267 is stopped.

The second drive 2270d is driven to move the second moving unit 2272b in −Y-direction to compress the spring 2272c. The portion 41001 of FIG. 41 and the portion 43001 of FIG. 43 show the spring 2272c being compressed by the second moving unit 2272b in this state, or at the retracted position. In this state, the cassette gripper 226 transports the cassette Ca placed on the cassette receptacle 2271 while holding the cassette Ca with the lid 2267 under the force from the springs 2272c and the weight of the lid 2267.

As the second moving unit 2272b compresses the spring 2272c as described above, the moving unit 2270c under the compressing force can more easily be secured at the position corresponding to the contact position at which the lid 2267 is stopped (a second end of the drive 2270 in −Y-direction). Thus, the moving unit 2270c is less easily movable in +Y-direction. More specifically, this reduces movement of the lid 2267 away from the contact position (the upward movement of the lid 2267) under vibrations or other factors while the cassette gripper 226 grips and transports the cassette Ca. This reduces the likelihood that drug sheets or any separate drug pieces drop from the cassette Ca.

The springs 2272c eliminate a highly precise operation of the second drive 2270d for, for example, stopping the lid 2267 in response to coming in contact with the upper surface of the cassette Ca when the second drive 2270d is driven to lower the lid 2267. Thus, the lid 2267 can hold the cassette Ca without the second drive 2270d performing an operation with higher precision for stopping the lid 2267.

The springs 2272c each may have a length and a tension to cause the second moving unit 2272b compressing the spring 2272c to return to the position at which the second moving unit 2272b comes in contact with the first moving unit 2272a.

To move the lid 2267 at the position to hold the cassette Ca to the uppermost position or to the standby position, the main-cassette transporter controller 112 drives the second drive 2270d to move the moving unit 2270c in +Y-direction.

Modifications

The cassette gripper 226 may include the lid 2267 and the lifter 2268 for raising and lowering the lid 2267. More specifically, the lifter 2268 may be any device that can raise and lower the lid 2267. The device for operating the lifter 2268 (e.g., the movable units 2269 and the drive 2270) may be modified as appropriate for the structure of the lifter 2268.

For example, the lifter 2268 in the present embodiment includes a link assembly shown in FIG. 39 (a pantograph) used for, for example, a toy grabber, but may include any other link assembly that can raise and lower the lid 2267.

Also, the lifter 2268 may have a structure other than a link assembly. For example, the lifter 2268 may include a support rod that extends vertically to support the lid 2267 partially (e.g., at four corners of the lid 2267) in a slidable manner. The lifter 2268 with this structure can also raise and lower the lid 2267 along the support rod.

In this case, the length of the support rod is not changeable. Thus, when the lid 2267 is lowered from the uppermost position, the support rod protrudes from the lid 2267 in +Z-direction. During transportation of the cassette Ca, for example, the protruding portion of the support rod in one cassette gripper may hit (or interfere with) the first main cassette transporter 22a, the second main cassette transporter 22b, or the other cassette gripper. To avoid this, the lifter 2268 may be located under the lid 2267 as in the link assembly in the present embodiment and may be extendable and retractable in accordance with the vertical position of the lid 2267.

Cassette Holder

Structure of Cassette Holder

Figure 44:
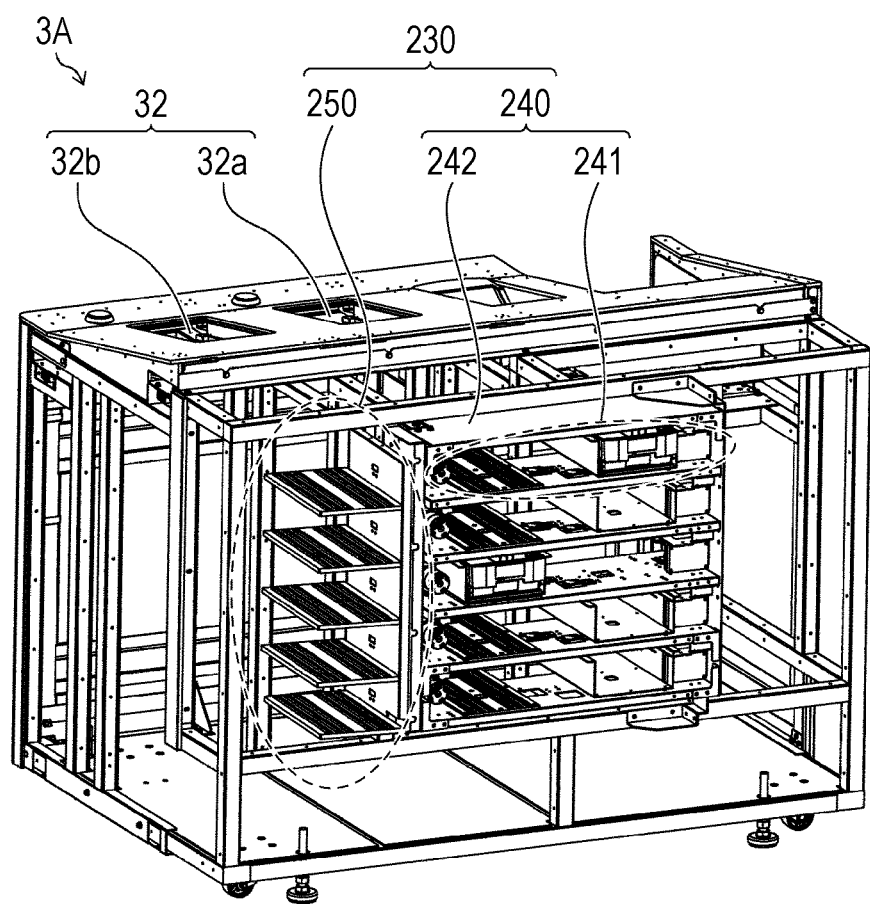
FIG. 44 is a view of a cassette holder showing its example structure.
Figure 45:
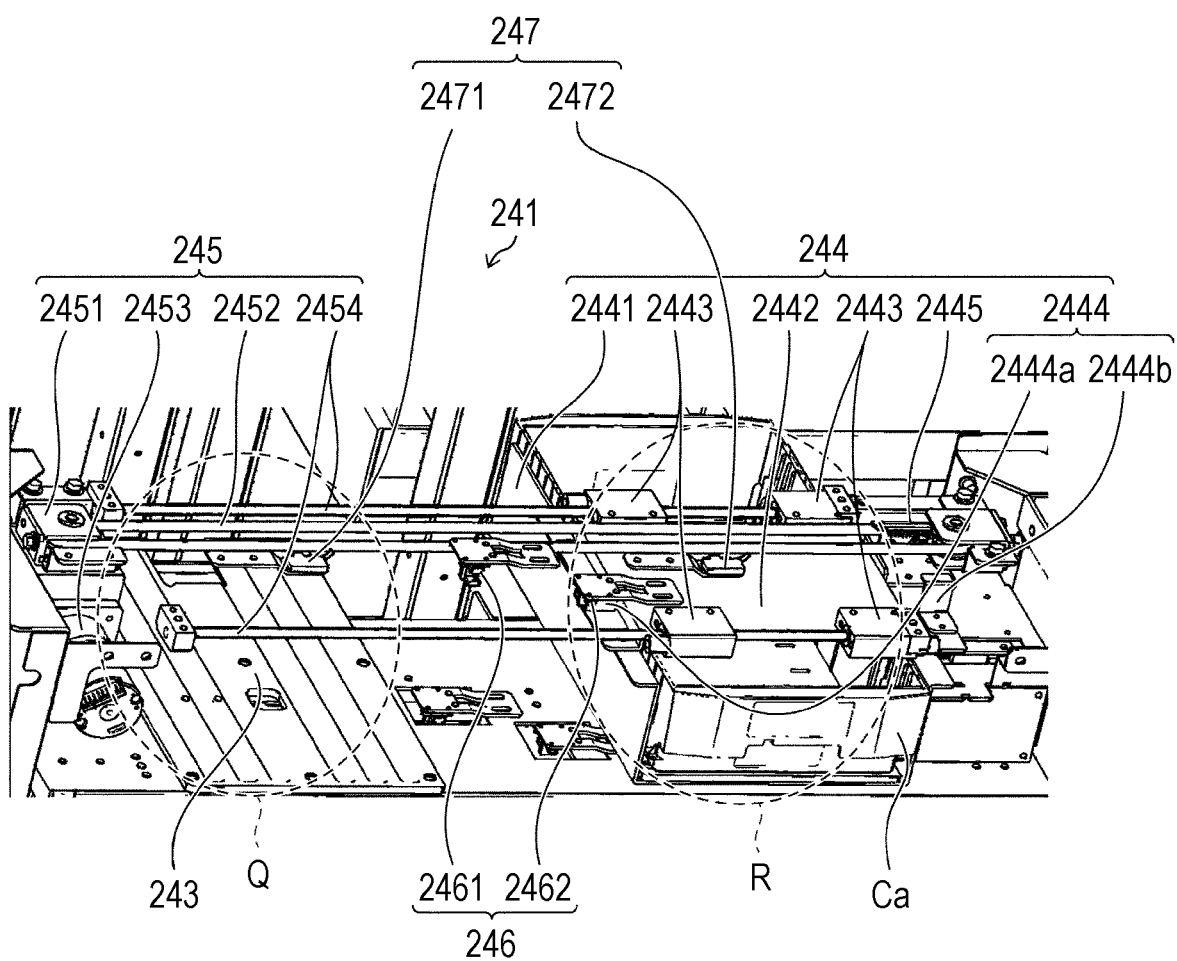
FIG. 45 is a view of a receiver unit included in the cassette holder showing its example structure.

The structure of the cassette holder 230 included in the main unit 2A will now be described. FIG. 44 is a view of the cassette holder 230 showing its example structure. FIG. 45 is a view of a receiver unit 241 included in the cassette holder 230 showing its example structure. To simplify the drawing, FIG. 44 does not show the internal structure of the picking unit 3A (the structure of the picking cassette transporter 35).

The cassette holder 230 is a temporary holder (buffer) for holding a cassette Ca transported from either the cassette shelf 21 or the drug receiver 32 in the picking unit 3A, similarly to the cassette holder 23 in the first embodiment. As shown in FIG. 44, the cassette holder 230 includes a main unit 240 and a sub-unit 250. The cassette holder 230 may hold a cassette Ca selected from any of a large cassette Ca1, a medium-sized cassette Ca2, a small cassette Ca3, and a cassette Ca4.

The main unit 240 includes multiple receiver units 241 for transporting and receiving cassettes Ca and a housing 242 storing the receiver units 241. The main unit 240 temporarily stores cassettes Ca. The main unit 240 is a cassette holder corresponding to the first cassette holder 23a (refer to FIG. 9) for transporting and receiving cassettes Ca to and from the first drug receiver 32a. The main unit 240 temporarily holds cassettes Ca during, for example, automated dispensing of drug sheets.

In the present embodiment, the main unit 240 includes five receiver units 241. In some embodiments, the main unit 240 may include a different number of receiver units 241 as appropriate for, for example, the dimensions of the main unit 2A or the picking unit 3A or the efficiency of automated dispensing of drug sheets. Each of such multiple receiver units 241 can hold a cassette Ca, thus enabling efficient dispensing of drug sheets. The main unit 240 may include a single receiver unit 241. In this case, the main unit uses less space.

As shown in FIG. 45, the receiver unit 241 temporarily holds a cassette Ca for transportation and reception between the main unit 2A and the first drug receiver 32a. The receiver unit 241 mainly includes a transporting cassette holder 243, a returning cassette holder (retracting unit) 244, a returning cassette mover 245, a cassette sensor 246, and a retracting unit sensor 247. The returning cassette mover 245 may be controlled by the main unit controller 11 or the picking unit controller 12.

In the receiver unit 241, the returning cassette holder 244 is at a retracting position R to which the returning cassette holder 244 is to be retracted in an initial state (at least holding no cassette Ca). When a cassette Ca is returned from the drug receiver 32, the returning cassette holder 244 moves from the retracting position R to a receiving position Q at which the returning cassette holder 244 transports or receives a cassette Ca to or from the picking unit 3A. The returning cassette holder 244 can thus receive a cassette Ca from the picking cassette transporter 35 in the picking unit 3A. After receiving the cassette Ca from the picking cassette transporter 35, the returning cassette holder 244 is retracted from the receiving position Q to the retracting position R. The receiving position Q is then unoccupied. The transporting cassette holder 243 can thus receive another cassette Ca from the main cassette transporter 22 in the main unit 2A. The cassette Ca held by the returning cassette holder 244 at the retracting position R is then returned by the main cassette transporter 22 to the cassette shelf 21. The retracting position R can be referred to as a returning position to return a cassette Ca to the cassette shelf 21.

The transporting cassette holder 243 is a receptacle to temporarily store a cassette Ca removed from the cassette shelf 21 and to be transported to the drug receiver 32. The transporting cassette holder 243 is at the receiving position Q.

The returning cassette holder 244 temporarily holds a cassette Ca to be returned from the drug receiver 32 to the cassette shelf 21. The returning cassette holder 244 is movable between the retracting position R and the receiving position Q as driven by the returning cassette mover 245.

The returning cassette holder 244 mainly includes a returned-cassette holder 2441, a top plate 2442, rail connectors 2443, sensor fixtures 2444a and 2444b, and a belt connector 2445.

The returned-cassette holder 2441 holds a cassette Ca returned from each picking unit 3. The returned-cassette holder 2441 can receive a cassette Ca. The returned-cassette holder 2441 is sized and shaped to allow the returning cassette mover 245 to move the returning cassette holder 244.

The top plate 2442 at least partially covers the upper surface of the returned-cassette holder 2441. The rail connectors 2443 connects the top plate 2442 to guide rails 2454 included in the returning cassette mover 245. The belt connector 2445 connects the top plate 2442 to a belt 2452 included in the returning cassette mover 245.

The sensor fixtures 2444a and 2444b are detected by the retracting unit sensor 247. The sensor fixture 2444a is detected by a second sensor 2472 included in the retracting unit sensor 247 when the returning cassette holder 244 is placed at the retracting position R. The sensor fixture 2444b is detected by a first sensor 2471 included in the retracting unit sensor 247 when the returning cassette holder 244 is placed at the receiving position Q. The sensor fixtures 2444a and 2444b are on the top plate 2442 to be detectable by the retracting unit sensor 247 when the returning cassette holder 244 is placed at the retracting position R or the receiving position Q.

The belt 2452 moves as a drive 2453 is driven. The belt connector 2445 connected to the belt 2452 also moves. This movement moves the top plate 2442 connected to the belt connector 2445 along the guide rails 2454 connected to the top plate 2442. Thus, the returned-cassette holder 2441 connected to the top plate 2442 also moves along the guide rails 2454. In this manner, the returning cassette holder 244 is movable between the retracting position R and the receiving position Q.

The returning cassette mover 245 moves the returning cassette holder 244 between the receiving position Q and the retracting position R. The returning cassette mover 245 mainly includes two pulleys 2451, the belt 2452, the drive 2453, and the guide rails 2454.

The pulleys 2451 rotate with a driving force generated by the drive 2453 to drive the belt 2452. The belt 2452 is suspended on the two pulleys 2451. The belt 2452 rotates between the pulleys 2451 as the pulleys 2451 rotate. The drive 2453 applies a driving force to the pulleys 2451 to rotate the belt 2452. The drive 2453 is, for example, a motor. The guide rails 2454 are suspended on the housing 242 in the main unit 240 to allow the returning cassette holder 244 to be movable between the receiving position Q and the retracting position R.

The cassette sensor 246 detects a cassette Ca. The main unit 240 includes, as the cassette sensor 246, a first cassette sensor 2461 and a second cassette sensor 2462. The first cassette sensor 2461 is located at a position in the housing 242 corresponding to the receiving position Q (position facing the transporting cassette holder 243) and detects a cassette Ca that is at the receiving position Q. The second cassette sensor 2462 is located at a position in the housing 242 corresponding to the retracting position R and detects a cassette Ca that is at the retracting position Q.

The first cassette sensor 2461 and the second cassette sensor 2462 input the detection result into the control unit 10. The control unit 10 determines whether any cassette Ca is at the receiving position Q or the retracting position R based on the detection result.

The retracting unit sensor 247 detects the returning cassette holder 244. The main unit 240 includes, as the retracting unit sensor 247, the first sensor 2471 and the second sensor 2472. The first sensor 2471 detects the returning cassette holder 244 that is at the receiving position Q. The second sensor 2472 detects the returning cassette holder 244 that is at the retracting position R. The first sensor 2471 and the second sensor 2472 are located to detect the sensor fixture 2444b or the sensor fixture 2444a in the housing 242. The first sensor 2471 and the second sensor 2472 form, for example, a light transmissive sensor including a light source for emitting light and a light detector for detecting the emitted light.

The first sensor 2471 and the second sensor 2472 input the detection result into the control unit 10. The control unit 10 determines whether the returning cassette holder 244 is at the receiving position Q or the retracting position R based on the detection result.

The sub-unit 250 is a cassette holder corresponding to the second cassette holder 23b shown in FIG. 9. The sub-unit 250 is used for, for example, dispensing or loading selected drug sheets as an interrupt during a picking operation or a loading operation in automated dispensing of drug sheets performed using the main unit 240. More specifically, the sub-unit 250 is a cassette holder for performing an operation different from the operation performed by the main unit 240 at the same time as the operation performed by the main unit 240. The sub-unit 250 may have the same structure as the main unit 240.

Operation of Cassette Holder

Figure 46:
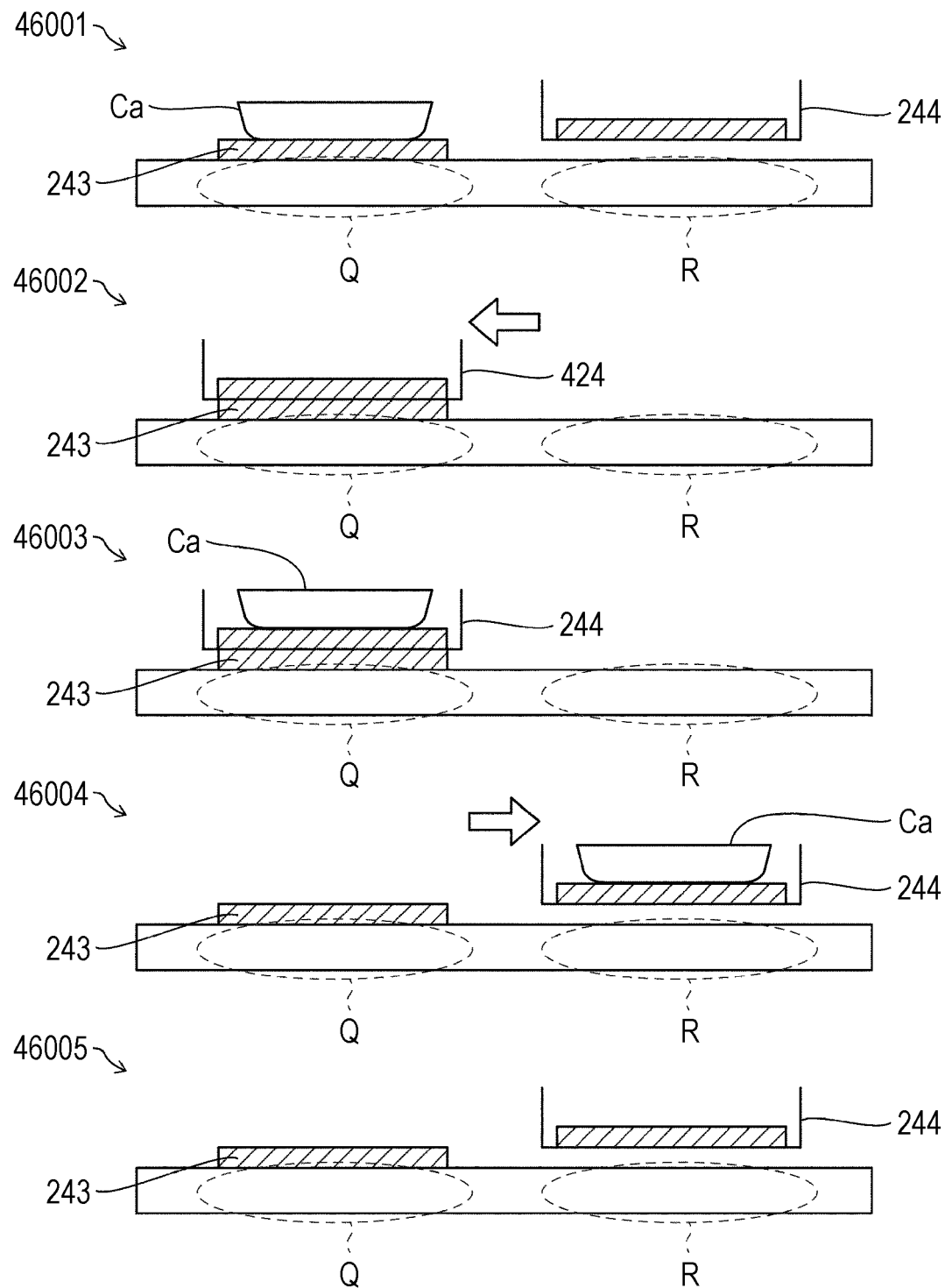
FIG. 46 is a diagram describing an example operation of the cassette holder.

An example operation of the cassette holder 230 included in the main unit 2A will now be described. FIG. 46 is a diagram describing an example operation of the cassette holder 230. At the start of the operation performed by the cassette holder 230, the returning cassette holder 244 is at the retracting position R.

As shown in the portion 46001 of FIG. 46, the main cassette transporter 22 transports a cassette Ca containing one or more drug sheets to be handled from the cassette shelf 21 to the cassette holder 230. The cassette Ca is then placed onto the transporting cassette holder 243 at the receiving position Q.

The cassette Ca placed on the transporting cassette holder 243 is transported by the picking cassette transporter 35 to the drug receiver 32. A picking operation is then performed on the cassette Ca. During the picking operation, the drive 2453 for the returning cassette mover 245 is driven to operate the pulleys 2451. This then rotates the belt 2452. As the belt 2452 rotates, the returning cassette holder 244 connected to the belt 2452 with the belt connector 2445 moves from the retracting position R to the receiving position Q as shown in the portion 46002 of FIG. 46.

After the picking operation, the picking cassette transporter 35 transports the cassette Ca from the drug receiver 32 to the receiving position Q of the cassette holder 230. As shown in the portion 46003 of FIG. 46, the returning cassette holder 244 is at the receiving position Q. The cassette Ca is thus placed on the returned-cassette holder 2441 in the returning cassette holder 244.

In response to the cassette Ca being placed on the returning cassette holder 244, the returning cassette mover 245 rotates the belt 2452 in the direction opposite to the rotating direction used for the transportation from the retracting position R to the receiving position Q. The returning cassette mover 245 thus moves (retracts) the returning cassette holder 244 from the receiving position Q to the retracting position R as shown in the portion 46004 of FIG. 46. As a result, the transporting cassette holder 243 at the receiving position Q can receive another cassette Ca transported from the cassette shelf 21.

As shown in the portion 46005 of FIG. 46, after the returning cassette holder 244 moves to the retracting position R, the cassette Ca held by the returning cassette holder 244 is returned to the cassette shelf 21 by the main cassette transporter 22. The same operation is repeated subsequently for automated dispensing of drug sheets of multiple drug types.

In the present embodiment, the cassette holder 230 includes the multiple receiver units 241. For example, the cassette holder 230 may include two receiver units 241 (a receiver unit 241X and a receiver unit 241Y). In this case, a cassette Ca is transported from the receiver unit 241X to the drug receiver 32. During a picking operation on the cassette Ca, the main cassette transporter 22 transports another cassette Ca from the cassette shelf 21 to the receiver unit 241Y that causes the other cassette Ca to be on standby. While the receiver unit 241X is receiving the cassette Ca after the picking operation, the main cassette transporter 22 transports another cassette Ca from the receiver unit 241Y to the drug receiver 32. In this manner, the multiple receiver units 241 improve the efficiency of the picking operation.

Fourth Embodiment

A drug station according to the present embodiment will be described focusing on its differences from the drug station 1A including the main unit 2A and the picking unit 3A shown in FIG. 31 described in the third embodiment.

Structure of Picking Unit

Figure 47:
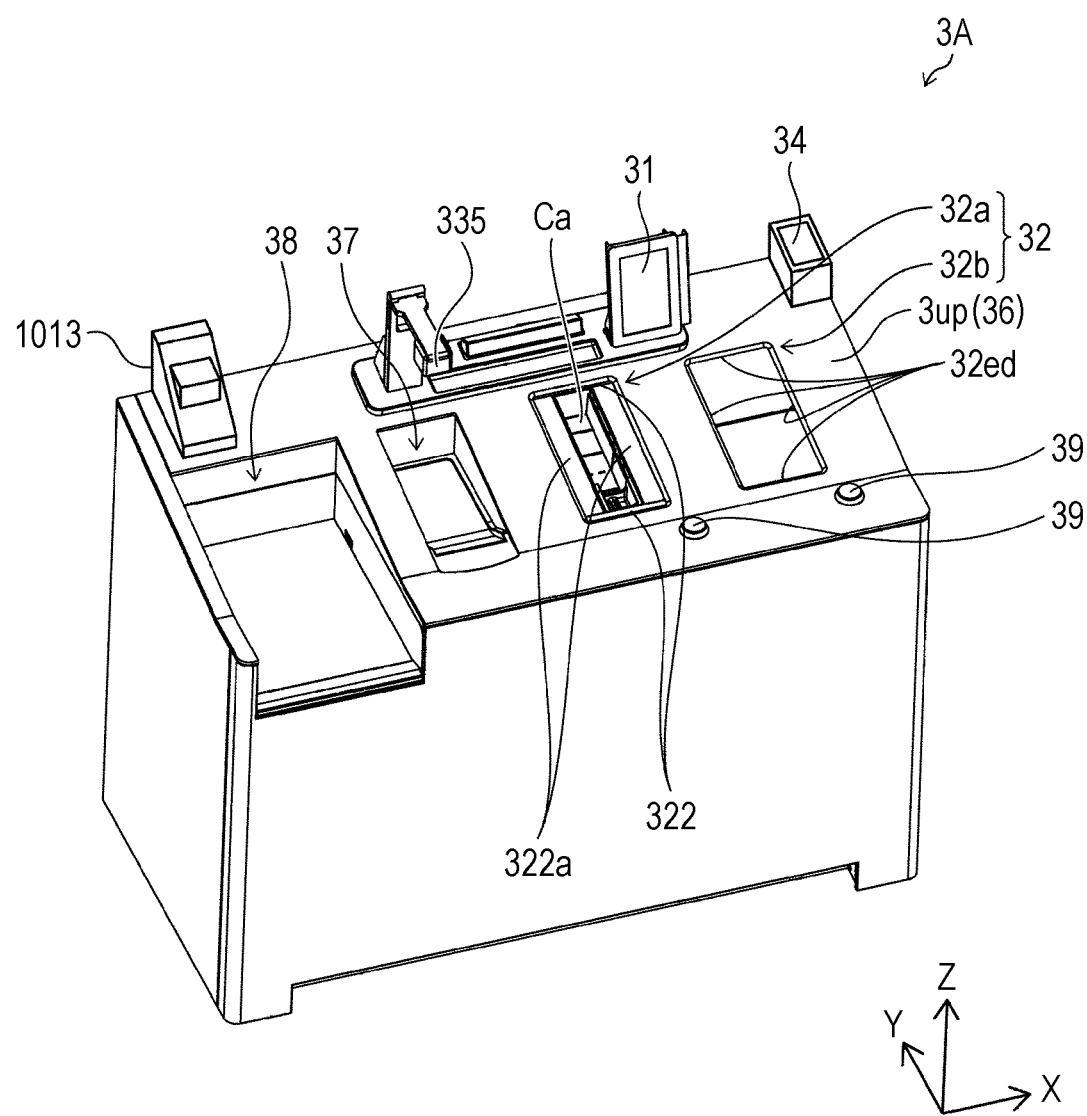
FIG. 47 is a view of the picking unit showing its example structure.

FIG. 47 is a view of the picking unit 3A showing its example structure. The barcode reader 34, which is located on the side surface of the picking unit 3A adjacent to the standing position of the user in FIG. 33, may be located on the upper surface 3up of the worktable 36 in the picking unit 3A in FIG. 47. This structure improves the efficiency of an operation for, for example, loading a drug into a cassette Ca placed on the drug receiver 32 after the barcode is read by the barcode reader 34. The printer 1013 may also be located on the upper surface 3up. In this case, the user can more easily access printed matter, such as journal data printed on a sheet, output from the printer 1013. Each picking unit 3 in the first embodiment may also include the barcode reader 34 and the printer 1013 arranged as described above.

Also, the second touchscreen 31 and the image sensor 335 in the picking unit 3A are hinged on the upper surface 3up in a manner tiltable toward the worktable 36. The second touchscreen 31 and the image sensor 335 are tilted toward the worktable 36 to allow opening and closing of the doors 25 of the main unit 2A (refer to FIGS. 31 and 48) at positions corresponding to the second touchscreen 31 and the image sensor 335. The printer 1013 is also installed on the upper surface 3up in a manner tiltable toward the worktable 36. The printer 1013 is tilted toward the worktable 36 to avoid being hit by the doors 25 when the closed doors 25 are open at an angle of up to about 180 degrees.

Storage of Drugs in Main Unit

Drugs are typically boxed before delivered to hospitals or pharmacies. For example, drug sheets (e.g., PTP sheets) may be packaged in units of several sheets (by pillow packaging), and then are further boxed for delivery. Cream tubes containing creams, eyedrops, or powdered drug packs containing powdered drugs (e.g., powdered herbal medicines) may be directly boxed for delivery.

Drugs storable in cassettes Ca in the main unit 2A are not limited to drugs in particular forms, such as drug sheets, cream tubes, eyedrops, or powdered drug packs (specifically, unboxed or unpackaged drugs). The cassettes Ca may also contain either packaged or boxed drugs. More specifically, the cassettes Ca may contain (1) boxes, (2) unboxed packages containing drugs, or (3) unpackaged drugs. In other words, a picking operation or a loading operation may be performed on boxed drugs or packaged drugs, other than the drugs in particular forms. Drugs herein refer to the drugs in particular forms, packages containing the drugs in particular forms, and boxes containing such packages. Also, the drugs in particular forms or the packages may also refer to individually packed drugs that have been packed by a drug packer, such as individually packed powdered drugs or tablets.

The main unit 2A storing unboxed or unpackaged drugs may place less workloads on the user performing a picking operation. The main unit 2A storing boxed or packaged drugs that are directly provided from drug manufacturers may place less workloads on the user performing a loading operation. Such boxed or packaged drugs can be managed in units of several packages or several pieces in cassettes Ca and are also storable in a manner shielded from light. In particular, boxed drugs managed without being unboxed are returnable to a party that has delivered the drugs. In other words, such drugs can be stored in the main unit 2A in a returnable form.

The main unit 2A may store each drug in a form set for each drug type (selected from forms (1) to (3) above). In this case, the control unit 10 (refer to FIG. 2) may specify, for example, the form of storage for each drug to be loaded, and may display the specified form of storage on the second touchscreen 31. This informs the user of the form of storage for each drug type.

The main unit 2 in the first embodiment may also store boxed or packaged drugs in addition to the drugs in particular forms.

Control in Main Unit

Figure 48:
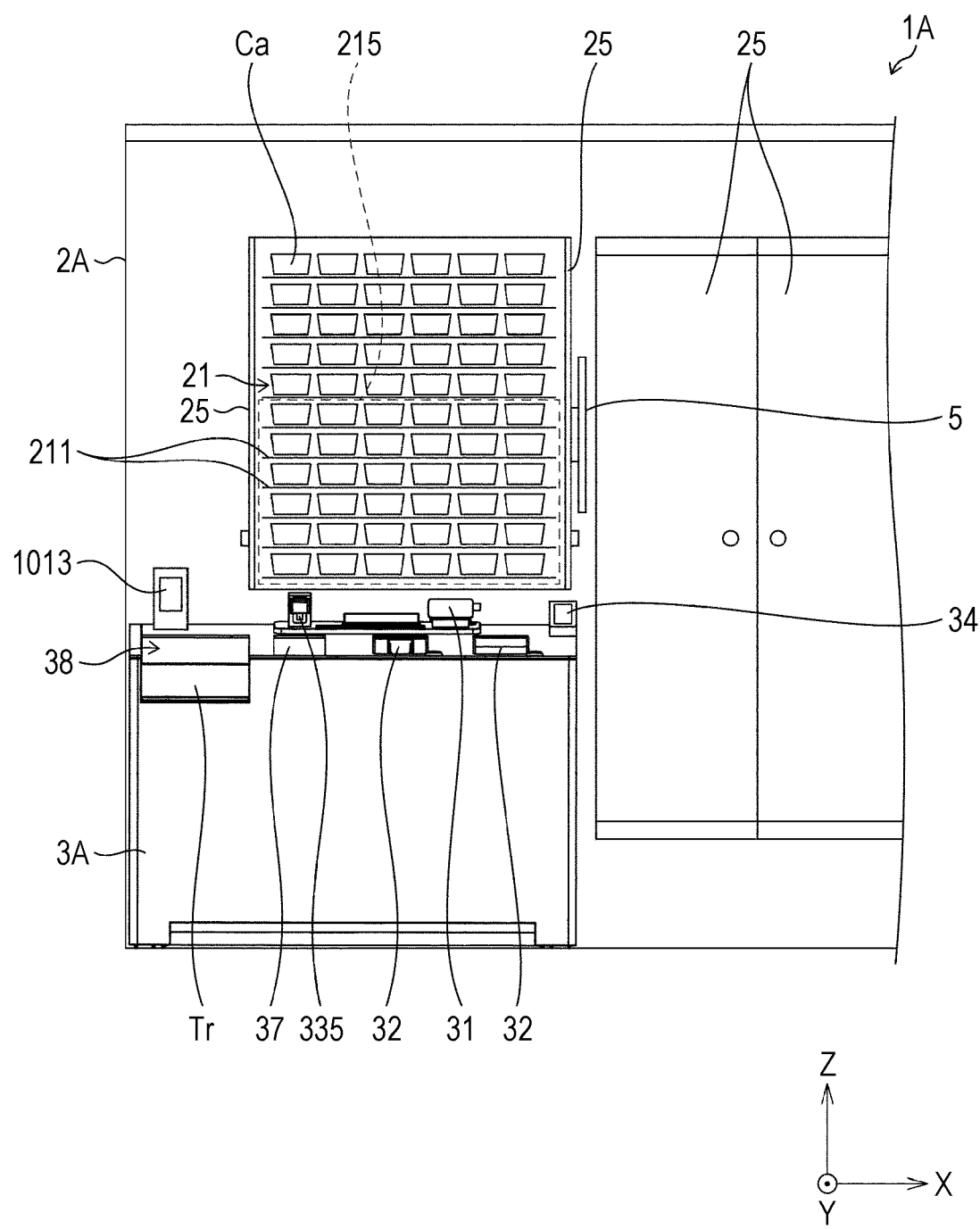
FIG. 48 is a front view of an example main unit and an example picking unit.

FIG. 48 is a front view of an example main unit 2A and an example picking unit 3A. For ease of explanation, the doors 25 corresponding to the position of the picking unit 3A are open in FIG. 48. In FIG. 48, the second touchscreen 31 and the image sensor 335 are tilted toward the worktable 36, whereas the printer 1013 is upright with respect to the worktable 36 (without being tilted toward the worktable 36).

As shown in FIG. 48, the main unit 2A may include a temporary transporting cassette holder 215. When the transporting cassette holder 243 (refer to FIGS. 44 and 45) holds a cassette Ca and thus cannot hold another cassette Ca, the temporary transporting cassette holder 215 can temporarily hold another cassette Ca to be transported to the transporting cassette holder 243. For example, any cassette receiving part in the cassette shelf 21 to allow the main cassette transporter 22 (refer to FIG. 2) to easily access the picking unit 3A can function as the temporary transporting cassette holder 215.

In the present embodiment, multiple cassette shelf plates 211 adjacent to the picking unit 3A corresponding to an upper position of the picking unit 3A each function as the temporary transporting cassette holder 215. More specifically, these cassette shelf plates 211 that allow easy access to the picking unit 3A each function as the temporary transporting cassette holder 215.

The cassette shelf plates 211 that each function as the temporary transporting cassette holder 215 store cassettes Ca containing drugs with higher frequencies of use in a normal drug dispensing operation (picking operation). When the user performs a loading operation, the main cassette transporter 22 preliminary retracts each cassette Ca with a higher frequency of use temporarily into a distant place (onto a cassette shelf plate 211 different from the temporary transporting cassette holder 215). The main cassette transporter 22 can thus use a space corresponding to the number of drugs (the number of drug types) handled in a single loading operation at a position easily accessed by the picking unit 3A. The drug station 1A can thus be prepared for the loading operation. In response to completion of the loading operation, the main cassette transporter 22 returns the cassette Ca with the higher frequency of use placed at the distant position to the temporary transporting cassette holder 215 (specifically, to the previous placement position of the cassette) during an idling time. When any cassette Ca is on the temporary transporting cassette holder 215, the main cassette transporter 22 returns the cassette Ca to the previous position and returns the cassette Ca with the higher frequency of use onto the temporary transporting cassette holder 215 (specifically, to the previous position).

For example, any cassette receiving part that allows the main cassette transporter 22 to easily access the picking unit 3A can function as the temporary transporting cassette holder 215. For example, when the drug station 1A is viewed from the front, a cassette receiving part in the cassette shelf 21 adjacent to the picking unit 3A in the horizontal direction (X-direction) may function as the temporary transporting cassette holder 215.

The drug station 1A has a bulk loading mode for loading a bulk of many drugs at a time. For example, the user may select the bulk loading mode when loading drugs delivered to a hospital or a pharmacy into the main unit 2A.

When the bulk loading mode is selected, the main unit controller 11 (refer to FIG. 2) specifies cassette receiving parts that each function as the temporary transporting cassette holder 215. The main unit controller 11 controls the main cassette transporter 22 to move cassettes Ca placed in the cassette receiving parts to unoccupied cassette receiving parts. A cassette receiving part that functions as the temporary transporting cassette holder 215 can thus temporarily hold a cassette Ca to be transported to the transporting cassette holder 243.

In response to the bulk loading mode being selected, the main unit controller 11 obtains information about drugs to be stored into the main unit 2A from the storage management system based on delivery data about the delivered drugs, and stores the obtained information into the memory 15. When finding no cassette Ca containing any drug indicated by the information obtained from the storage management system, the main unit controller 11 associates drug identification information about the drug with cassette identification information about an unoccupied cassette Ca.

In response to an input operation for starting loading drugs into the main unit 2A, the main unit controller 11 controls the main cassette transporter 22 to transport cassettes Ca containing the drugs to be loaded, sequentially from each cassette receiving part to the transporting cassette holder 243. The drugs to be loaded are indicated by the obtained information based on the delivery data. The picking unit controller 12 controls the picking cassette transporter 35 (refer to FIG. 2) to transport the cassettes Ca held on the transporting cassette holder 243 sequentially to the drug receiver 32. Also, the picking unit controller 12 transports each cassette Ca on which the loading operation has been complete to the returning cassette holder 244 (refer to FIGS. 44 and 45). The main unit controller 11 transports (returns) the cassette Ca to the cassette receiving part previously storing the cassette Ca.

In the above process, the main unit controller 11 determines whether the transporting cassette holder 243 can hold a cassette Ca when determining the transport destination of the cassette Ca. In the present embodiment, the main unit controller 11 determines whether the cassette Ca can be held by any of the multiple transporting cassette holders 243 (five in the example shown in FIGS. 44 and 45), or specifically determines whether any of the transporting cassette holders 243 becomes unoccupied. When determining that no transporting cassette holder 243 can hold a cassette Ca, the main unit controller 11 determines, as the transport destination of the cassette Ca, one of the cassette receiving parts in the cassette shelf 21 to be the temporary transporting cassette holder 215. The main unit controller 11 transports the cassette Ca to the cassette receiving part determined to be the transport destination.

The bulk loading mode may be selected, for example, on a bulk loading mode selection button on the loading screen image 20001 shown in FIG. 20. For example, in response to an input operation on the bulk loading mode button, the main unit controller 11 may obtain information, indicated by delivery data, about drugs to be loaded into the main unit 2A from the storage management system. The touchscreen controller 14 causes the obtained information to appear in the retrieval result display area A643 on the loading screen image 20001. Subsequently, in response to an input operation on the cassette move button A645, the main unit controller 11 controls the main cassette transporter 22 to start transporting the cassettes Ca containing the drugs to be loaded to the cassette holder 230 (refer to FIG. 44).

The drug station 1A with the functions described above may be expressed in the following forms. The drug station 1A (cassette transporting apparatus) includes the cassette shelf 21, the drug receiver 32, and the transporting cassette holder 243. When the transporting cassette holder 243 holds a cassette Ca in the drug station 1A, a part of the cassette shelf 21 that allows easy access by the transporting cassette holder 243 functions as the temporary transporting cassette holder 215. The temporary transporting cassette holder 215 temporarily holds a cassette Ca to be removed from a position different from the part of the cassette shelf 21 and to be transported to the transporting cassette holder 243. The transporting cassette holder 243 holding a cassette Ca includes, for example, multiple transporting cassette holders 243 each holding a cassette Ca.

For example, a loading operation can take much time for loading a bulk of many drugs into the cassette shelf 21, for example, for loading delivered drugs into the cassette shelf 21. For loading a bulk of many drugs into the cassette shelf 21, the main unit controller 11 sequentially transports cassettes Ca containing the drugs to be loaded to the transporting cassette holders 243. However, once the transporting cassette holders 243 cannot hold any cassettes Ca (e.g., each of the multiple transporting cassette holder 243 has already held a cassette Ca), the main unit controller 11 cannot transport any cassette until any of the transporting cassette holders 243 becomes unoccupied.

As described above, when the transporting cassette holders 243 cannot hold any cassettes Ca in the drug station 1A, a part of the cassette shelf 21 that allows easy access by the transporting cassette holders 243 can function as the temporary transporting cassette holder 215. The cassette Ca to be transported to the drug receiver 32 can thus be held temporarily near the transporting cassette holders 243. The drug station 1A can shorten the time for the cassette transportation to the transporting cassette holder 243, and reduces the likelihood that a cassette Ca to be transported cannot be held on any transporting cassette holder 243. The drug station 1A can aid the user in performing a loading operation more efficiently.

Also, the main unit controller 11 may control the main cassette transporter 22 to remove cassettes Ca from the cassette shelf 21 in the order of delivery of the drugs.

For drugs delivered to a hospital or a pharmacy, the storage management system receives sets of information about the drugs in the order of their delivery. The delivery data lists the sets of information in the order of their input. The user loads the drugs into the main unit 2A after checking the delivered drugs by referring to the printed matter representing the delivery data (a list of drugs delivered).

Thus, a loading waiting time occurs for the user from when the barcode on each drug checked by the user is read by the barcode reader 34 to when the cassette Ca containing the drug is removed from the cassette shelf 21 and transported to the drug receiver 32. The loading waiting time can be lengthy depending on the placement position of the cassette Ca in the cassette shelf 21.

In response to an input operation for starting loading the delivered drugs (e.g., an operation for selecting the bulk loading mode), the main unit controller 11 obtains information about the drugs to be stored into the main unit 2A based on the delivery data, and stores the information into the memory 15. The main unit controller 11 also obtains, from the storage management system, order information indicating the order in which sets of information have been input into the storage management system (the order of delivery), and stores the obtained information into the memory 15. When finding no cassette Ca containing any drug indicated by the information obtained from the storage management system, the main unit controller 11 associates drug identification information about the drug with cassette identification information about an unoccupied cassette Ca.

In response to an input operation for starting loading into the main unit 2A, the main unit controller 11 controls the main cassette transporter 22 to transport cassettes Ca containing the drugs to be loaded in the order indicated by the order information from the cassette shelf 21 to the transporting cassette holder 243. The picking unit controller 12 controls the picking cassette transporter 35 to transport each cassette Ca held on the transporting cassette holder 243 to the drug receiver 32 or to the standby position P2 (refer to FIGS. 11A to 11E and 12A to 12H) by following the process described above. When the cassette Ca is transported to the standby position P2, the picking unit controller 12 transports the cassette Ca from the standby position P2 to the drug receiver 32 by following the process described above.

The order of drugs indicated on the printed matter is the same as the order of input of the sets of information into the storage management system (the order indicated by the order information). The user checks the drugs in this order. The main unit controller 11 and the picking unit controller 12 can thus place each cassette Ca on the transporting cassette holder 243 or at the standby position P2 in the order in which the drugs have been checked. The picking unit controller 12 then transports each cassette Ca from the cassette holder 230 or the standby position P2 to the drug receiver 32 in the order in which the drugs have been checked. Thus, the main unit controller 11 and the picking unit controller 12 can shorten the time to transport each cassette Ca from the cassette shelf 21 and can shorten the time for the loading operation.

The drug station 1 according to the first embodiment may also have a part of the cassette shelf 21 functioning as the temporary transporting cassette holder 215. The drug station 1 according to the first embodiment may also transport the cassettes Ca stored in the cassette shelf 21 in the order of the input into the storage management system (in the order of the delivery) to the transporting cassette holder 243 and to the drug receiver 32. Transporting the cassettes Ca to the drug receiver 32 includes placing the cassettes Ca at the standby position P2 before transporting the cassettes Ca to the drug receiver 32.

Control in Picking Unit

Timing for Opening and Closing Shutter Between First Drug Receiver and Second Drug Receiver As shown in FIGS. 33 and 47, the picking unit 3A includes the drug receivers 32 including the first drug receiver 32a and the second drug receiver 32b. The picking unit controller 12 can transport cassettes Ca to both the first drug receiver 32a and second drug receiver 32b.

When one of the shutter 322 for the first drug receiver 32a and the shutter 322 for the second drug receiver 32b is open, the picking unit controller 12 maintains the other shutter 322 to be closed, instead of opening the other shutter 322. More specifically, the picking unit controller 12 opens one of the shutter 322 for the first drug receiver 32a and the shutter 322 for the second drug receiver 32b although cassettes Ca have reached both the first drug receiver 32a and the second drug receiver 32b. When, for example, selected drugs are dispensed or loaded (a selected dispensing operation or a selected loading operation is performed) as an interrupt during a picking operation, the picking unit controller 12 controls the shutters 322 to be open and closed in the manner described above. A loading operation independent of the picking operation may also be performed in the above manner.

When the first drug receiver 32a and the second drug receiver 32b are both open, the user can access two cassettes Ca and may select an incorrect cassette Ca from which or into which a drug is to be removed or loaded. Such an error can be reduced by opening one of the shutter 322 for the first drug receiver 32a and the shutter 322 for the second drug receiver 32b.

During a loading operation that is not a selected loading operation, for example, the picking unit controller 12 may transport cassettes Ca to both the first drug receiver 32a and the second drug receiver 32b. In this case, the picking unit controller 12 controls the shutters 322 to be open and closed in the manner as described above to alternately open and close the shutter 322 for the first drug receiver 32a and the shutter 322 for the second drug receiver 32b. The user can thus access the cassettes Ca transported to the first drug receiver 32a and the second drug receiver 32b alternately for an efficient loading operation.

The drug station 1 according to the first embodiment may also use the opening and closing timing of the shutters 322 described above.

Control for Opening Shutter with Barcode Reading

The picking unit controller 12 may open the shutter 322 after the barcode is read either once or twice by the barcode reader 34.

For a loading operation (including a selected drug loading operation), for example, the main unit controller 11 specifies a cassette Ca (cassette Ca containing a drug to be loaded) corresponding to drug identification information indicated by a barcode (e.g., a GS1 barcode) read by the barcode reader 34. The main unit controller 11 transports the specified cassette Ca to the cassette holder 230. The picking unit controller 12 transports, to the drug receiver 32, the cassette Ca transported to the cassette holder 230.

The shutter 322 is to be open after the first reading of the barcode. With the barcode read, the picking unit controller 12 transports the cassette Ca to the drug receiver 32 and then opens the shutter 322. Subsequently, when the barcode is read again, the picking unit controller 12 determines whether the drug identification information indicated by the barcode matches the drug identification information associated with the cassette Ca. The touchscreen controller 14 displays the determination result on the second touchscreen 31.

In response to viewing the determination result indicating a match between the two sets of drug identification information, the user loads the drug into the cassette Ca. In response to viewing the determination result indicating a mismatch between the two sets of drug identification information, the user checks whether the drug to be loaded into the cassette Ca is correct, without loading the drug into the cassette Ca.

In this manner, when the picking unit controller 12 opens the shutter 322 after the barcode is read once, the user can perform the loading operation efficiently. The appearing determination result allows the user to load the drug into the cassette Ca although the picking unit controller 12 opens the shutter 322 after the first reading of the barcode.

The shutter 322 is to be open after the second reading of the barcode. In this case, the picking unit controller 12 transports the cassette Ca to the drug receiver 32 and then waits for the barcode reader 34 to read the barcode again. When the barcode is read again, the picking unit controller 12 determines whether the drug identification information indicated by the barcode matches the drug identification information associated with the cassette Ca.

When the two sets of drug identification information match, the picking unit controller 12 opens the shutter 322. In this case, the user loads the drug into the cassette Ca. When the two sets of drug identification information do not match, the touchscreen controller 14 displays an image indicating the mismatch between the two sets of drug identification information. In this case, the user checks whether the drug to be loaded into the cassette Ca is correct, without loading the drug into the cassette Ca.

In this manner, when the shutter 322 is to be open after the second reading of the barcode, the picking unit controller 12 opens the cassette Ca after the two sets of drug identification information match. This reduces the likelihood of erroneous loading into the cassette Ca performed by the user.

In some embodiments, the picking unit controller 12 may open the shutter 322 after the second reading of the barcode without waiting for the determination result to appear. In this case, the touchscreen controller 14 may display the determination result on the second touchscreen 31 to prevent erroneous loading performed by the user.

The determination result may be provided to the user in any manner. The determination result may not appear on the second touchscreen 31 but may be provided by using an illumination pattern, or by turning on and off, for example, the tray close button (shutter closing button) 39 with an illuminator, or may be provided by using a sound. The drug station 1 according to the first embodiment may also use the opening and closing timing of the shutter 322 described above.

Control for Closing Shutter

As shown in FIGS. 33 and 47, the picking unit 3A includes the tray close buttons 39. Each tray close button 39 may include the illuminator (e.g., a light-emitting diode, or an LED). The picking unit controller 12 illuminates the tray close button 39 to inform the user that the shutter 322 is to be closed. In this case, the illuminating tray close button 39 illuminates to inform the user of the time to close the shutter 322.

The picking unit controller 12 disables an input operation (pressing operation) on the tray close button 39 for closing the shutter 322 received while the tray close button 39 is off. Thus, the shutter 322 remains open although the user accidentally presses the tray close button 39 while the shutter 322 is open.

During a picking operation (or during an automated dispensing operation), the picking unit controller 12 illuminates the tray close button 39 after, for example, receiving a pressing operation on all the checkboxes included in the supplementary information display area B15 in the description screen image 24002 (refer to FIG. 24). The picking unit controller 12 turns off the tray close button 39 when the shutter 322 is closed after receiving a pressing operation on the tray close button 39.

During a loading operation (including a selected loading operation), for example, the picking unit controller 12 illuminates the tray close button 39 when the shutter 322 is open, and turns off the tray close button 39 when the tray close button 39 is pressed and the shutter 322 is closed.

The user performs operations while viewing such various screen images appearing on the second touchscreen 31. During a picking operation, in particular, the user performs operations while viewing information about each drug to be removed on the second touchscreen 31, including the quantity of each drug to be removed and supplementary information (appended information) about each drug. The user tends to concentrate on the information appearing on the second touchscreen 31. Thus, the user may not notice that the tray close button 39 is illuminating (specifically, the tray close button 39 can be pressed) after an input operation is performed on all the checkboxes. In this case, the user may not close the shutter 322 in a timely manner when the shutter 322 can be closed. This may lower the operational efficiency.

Figure 49:
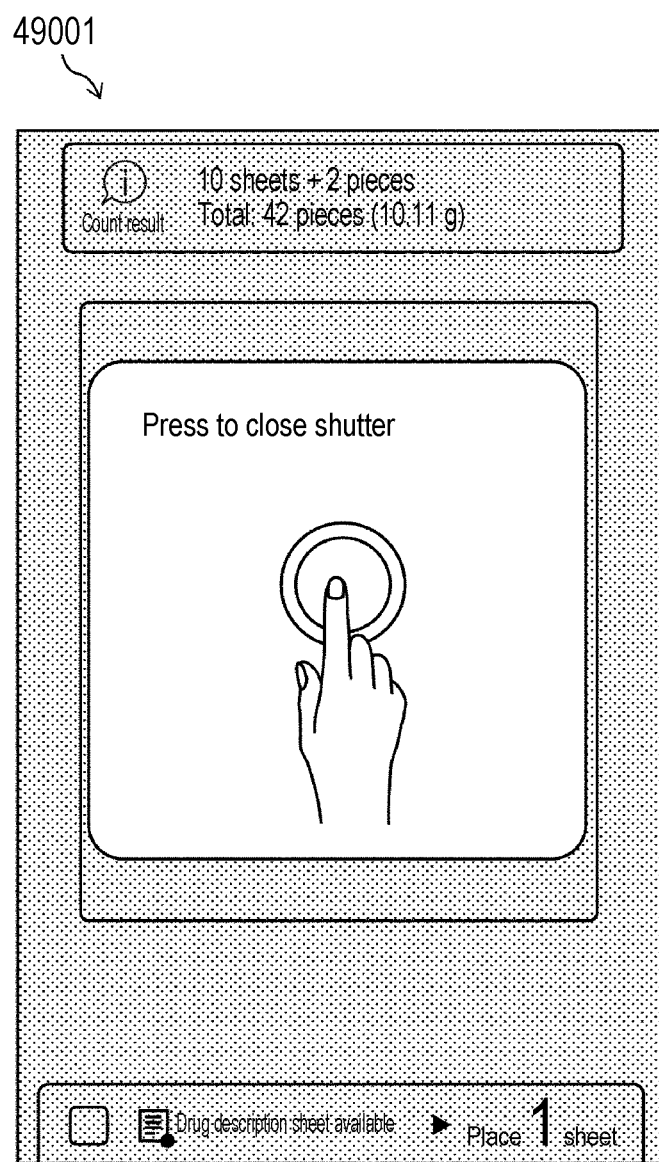
FIG. 49 is a diagram of an example guide screen image.

In the present embodiment, the touchscreen controller 14 displays a guide screen image 49001 on the second touchscreen 31 as shown in FIG. 49 for prompting the user to close the shutter 322. FIG. 49 is a diagram of an example guide screen image 49001. For example, after an input operation on all the checkboxes has been received, the touchscreen controller 14 displays the guide screen image 49001. The touchscreen controller 14 can thus inform the time to close the shutter 322. Thus, the touchscreen controller 14 allows the user to press the tray close button 39 in a timely manner. This reduces the likelihood that the operational efficiency decreases during a picking operation.

Modifications of Control for Closing Shutter

The tray close button 39 may receive an input operation on each checkbox in the supplementary information display area B15, in addition to closing the shutter 322. In this case, the tray close button 39 is simply pressed to enter an input operation on each checkbox appearing on the second touchscreen 31, without separately receiving an input operation on each checkbox. The user can thus perform the input operation in a simpler manner.

For multiple checkboxes appearing on the second touchscreen 31, for example, the user may feel troublesome to perform an input operation on each checkbox. This structure allows the user to simply press the tray close button 39 to select each checkbox.

However, in response to a pressing operation on the tray close button 39 performed the number of times exceeding the number of checkboxes appearing on the second touchscreen 31, the picking unit controller 12 may stop entering such an input operation on the checkboxes and use the input operation for closing the shutter 322. In this case, the shutter 322 may be closed by the user performing a pressing operation on the tray close button 39 the number of times exceeding the number of checkboxes without intending to cause the picking unit controller 12 to close the shutter 322. After the shutter 322 is closed, the picking unit controller 12 may transport a cassette Ca to the cassette holder 230 (in other words, may start a returning operation to the main unit 2A). The target cassette Ca may be later to be transported from the main unit 2A to the drug receiver 32.

In the present embodiment, the picking unit controller 12 waits for an input operation for closing the shutter 322 after receiving an input operation on the checkboxes appearing on the second touchscreen 31 with the tray close button 39. The picking unit controller 12 closes the shutter 322 in response to a pressing operation on the tray close button 39 after receiving an input operation for closing the shutter 322 on a portion other than the tray close button 39. In other words, after receiving a pressing operation the number of times exceeding the number of checkboxes, the picking unit controller 12 disables such a pressing operation on the tray close button 39 until receiving an input operation for closing the shutter 322.

The touchscreen controller 14 displays a screen image for receiving an input operation for closing the shutter 322 on the second touchscreen 31 after receiving an input operation on the checkboxes appearing on the second touchscreen 31 with the tray close button 39. In response to an input operation performed by the user on the screen image, the picking unit controller 12 enables the function of the tray close button 39 for closing the shutter 322.

This prevents the shutter 322 from being closed when the user presses the tray close button 39 the number of times exceeding the number of checkboxes without intending to close the shutter 322. This thus reduces the likelihood that the operational efficiency decreases when the user unintentionally closes the shutter 322.

Also, the user may perform an input operation on the checkboxes with the tray close button 39 without counting the number of times to press the tray close button 39. The user can thus perform the input operation in a simpler manner.

Control for Opening Shutter for Loading Next Drug

As described in the first embodiment, the picking unit controller 12 determines whether the quantity of drug sheets specified by prescription data has been removed from a cassette Ca based on an image of the drug sheets captured by the image sensor 335 and the weight of the drug sheets measured by the measuring unit 336 (refer to FIG. 2).

After determining that the prescribed quantity of drugs has been removed, the picking unit controller 12 enables a pressing operation for closing the shutter 322 on the tray close button 39. In some embodiments, the picking unit controller 12 may enable the pressing operation before determining that the prescribed quantity of drugs has been removed (before the determination). In this case, the picking unit controller 12 can close the shutter 322 in response to a pressing operation on the tray close button 39 performed before the determination. The picking unit controller 12 can transport a cassette Ca from which a drug has been removed from the drug receiver 32 to the main unit 2A and can call another cassette Ca containing a next drug (next cassette Ca) onto the drug receiver 32. This improves the operational efficiency in the picking operation.

To perform the above determination, the picking unit controller 12 waits for the count result output from the measuring unit 336. For the measuring unit 336 that may be a load cell, the picking unit controller 12 waits for the count result until the operation of the load cell is stabilized. To enable the pressing operation before the determination, the picking unit controller 12 can close the shutter 322 in response to a pressing operation on the tray close button 39 without waiting for the output of the count result. The picking unit controller 12 may also close the shutter 322 in response to the pressing operation without waiting for the determination result output after receiving the count result.

The user who has experienced the picking operation repeatedly may be less likely to remove an erroneous quantity of drug from a cassette Ca. Removing an erroneous quantity of drug is also unlikely when, for example, no separate drug pieces are to be removed from a cassette Ca (when multiple drug sheets alone are to be removed from a cassette Ca) or a drug in a form other than a drug sheet with no separate drug pieces (e.g., a cream, an eyedrop, or a powdered drug) is to be removed from a cassette Ca. In this case as well, the pressing operation may be enabled before the determination performed by the picking unit controller 12.

However, the picking unit controller 12 may determine that a drug in the prescribed quantity has not been removed from the cassette Ca. In this case, the touchscreen controller 14 displays the determination result on the second touchscreen 31. However, the user may press the tray close button 39 without viewing the information. In this case, the picking unit controller 12 first closes the shutter 322 and then transports the cassette Ca to the main unit 2A. More specifically, despite the determination that the drug in the prescribed quantity has not been removed from the cassette Ca, the picking unit controller 12 may return the cassette Ca on the drug receiver 32 to the main unit 2A and may call a next cassette Ca to the drug receiver 32.

The main unit controller 11 and the picking unit controller 12 may recall the cassette Ca returned to the main unit 2A to the drug receiver 32 in response to an input operation performed by the user. The user can thus recall, to the drug receiver 32, the cassette Ca containing the drug with the determination indicating that the prescribed quantity of drug has not been removed and can check whether the correct quantity of the drug has been placed on the transportation tray Tr.

For example, the picking unit controller 12 stores the above determination result with prescription data in the memory 15. The user places the transportation tray Tr containing the drug to be determined as described above onto the tray support 38, and reads the barcode for the drug with the barcode reader 34. The picking unit controller 12 determines whether the drug with the barcode is the drug with the above determination based on the read barcode and the determination result stored in the memory 15. The barcode may be replaced by other input information that can identify the drug, such as the drug name. When the drug with the barcode is determined to be the drug with the above determination, the main unit controller 11 and the picking unit controller 12 specify the cassette Ca to be recalled, and transports the cassette Ca from the main unit 2A to the drug receiver 32.

The pressing operation enabled before the above determination and the pressing operation enabled after the prescribed quantity of drug has been removed may be switched selectively by, for example, the user. These two capabilities may also be set in accordance with, for example, the drug type, the quantity of drug to be dispensed, or whether the drug quantity includes separate drug pieces.

Example Screen Image on First Touchscreen

An example screen image to appear on the first touchscreen 5 will now be described below. FIG. 50 is a diagram of an automated dispensing screen image 50001 as another example of the automated dispensing screen image 17001 shown in FIG. 17. As shown in FIG. 50, the automated dispensing screen image 50001 differs from the automated dispensing screen image 17001 in that the dispensing list display area A20 includes a drug number field in addition to the entry number field, the patient name field, the status field, the waiting time field, and the other machine preparation field.

The drug number field displays the number of drugs of different types (different drugs) to be placed on a single transportation tray Tr. The control unit 10 calculates the number of drugs of different types based on prescription data. The drug number field allows the user to determine the number of drugs of different types to be placed on the transportation tray Tr for each patient.

At the drug station 1A, the user replaces the transportation tray Tr on the tray support 38 with an empty transportation tray Tr when the dispensing of drugs onto the transportation tray Tr is complete. The touchscreen controller 14 displays the tray removal screen image 24003 (refer to FIG. 24) on the second touchscreen 31 at the time when the transportation tray Tr is to be replaced. This informs the user of the time to replace the transportation tray Tr. The drug number field on the first touchscreen 5 as well can inform the time to replace the transportation tray Tr.

Also, the user may erroneously intend to replace the transportation tray Tr receiving fewer types of drugs than to be actually placed on the transportation tray Tr. For example, the user may erroneously intend to replace the transportation tray Tr after a single type of drug is placed on the transportation tray Tr when two types of drugs are actually to be placed on the transportation tray Tr.

In this case, the second touchscreen 31 does not display the tray removal screen image 24003 at the time when the user intends to replace the transportation tray Tr. However, the user may tend not to easily notice the error although the second touchscreen 31 displays information for dispensing the next drug (the first confirmation screen image 22001 or the second confirmation screen image 22002; refer to FIG. 22) without displaying the tray removal screen image 24003. The user may also determine that the first confirmation screen image 22001 or the second confirmation screen image 22002 may be appearing erroneously.

Figure 51:
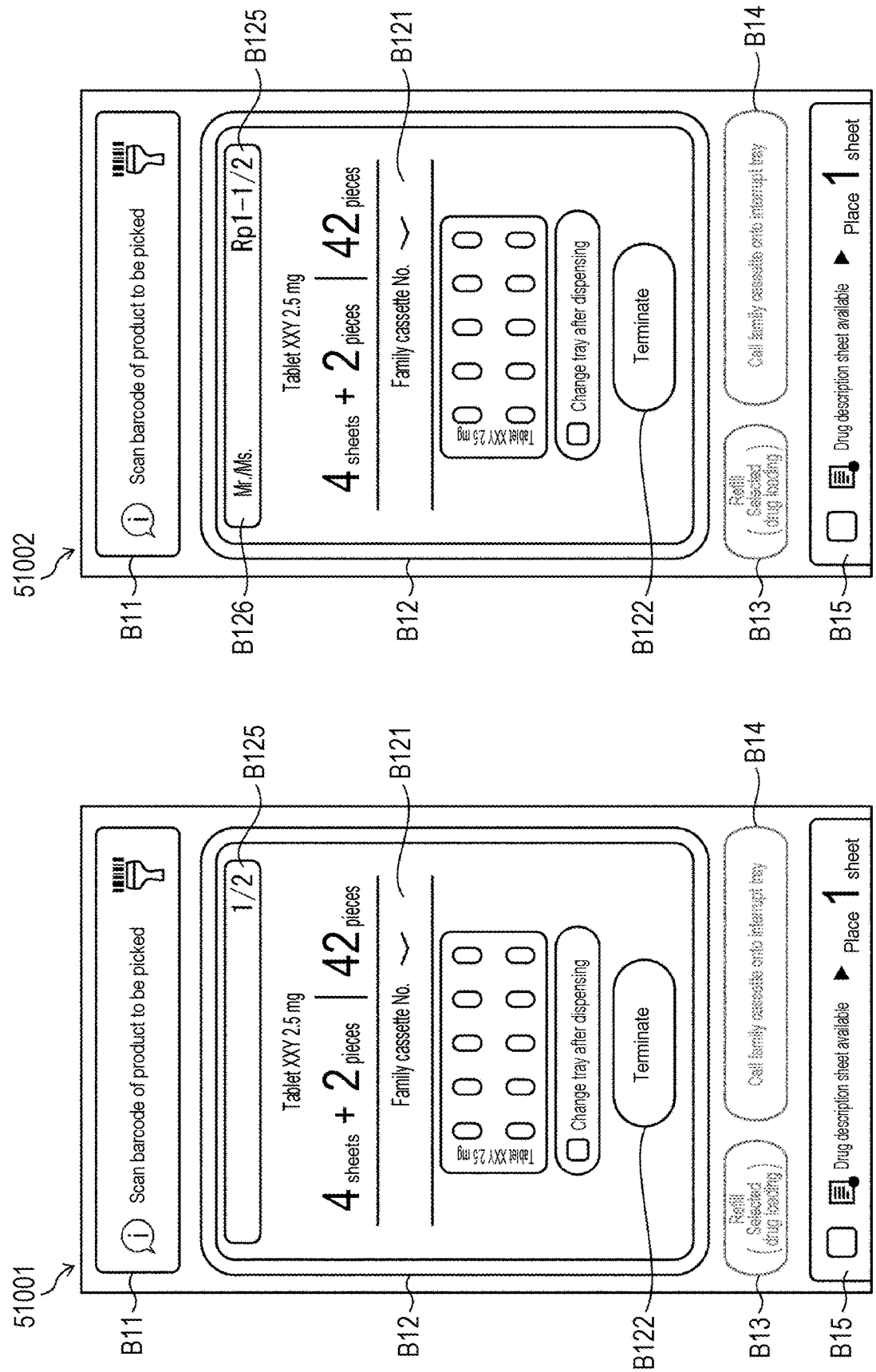
FIG. 51 is a diagram of other example first confirmation screen images.

The drug number field allows the user to determine the number of drugs of different types to be placed on the transportation tray Tr. The user viewing the drug number field and the transportation tray Tr can thus more easily notice the above error. As described below, the touchscreen controller 14 may display an operation number display area B125 on the second touchscreen 31 as shown in FIG. 51 to reduce the likelihood of the above error by the user.

Example Screen Image on Second Touchscreen

An example screen image to appear on the second touchscreen 31 will now be described. The example will be described below using the drug station 1A, but may also be applicable to the drug station 1.

Another Example of First Confirmation Screen Image: Displaying Operational Procedure FIG. 51 shows first confirmation screen images 51001 and 51002 as other examples of the first confirmation screen image 22001. The first confirmation screen image 51001 is an example screen image for uncertified users (technicians), whereas the first confirmation screen image 51002 is an example screen image for qualified users (pharmacists). Unlike the first confirmation screen image 22001, the first confirmation screen images 51001 and 51002 in the illustrated example each include the second display area B12 with no confirm button B123.

For Uncertified Users

For an uncertified user, the picking unit controller 12 displays the first confirmation screen image 51001. The memory 15 prestores each user ID and the status of each user either as an uncertified or qualified user in a manner associated with each other. The picking unit controller 12 determines whether the user is either uncertified or qualified based on login information input by the user when using the picking unit 3A.

The second display area B12 included in the first confirmation screen image 51001 includes the operation number display area B125 for displaying the number of picking operations on a single transportation tray Tr. The operation number display area B125 displays, for example, the total number of picking operations to be performed on a single transportation tray Tr and the current number of picking operations performed on the single transportation tray Tr. More specifically, the operation number display area B125 displays the total number of types of drugs that can be contained in a single transportation tray Tr and the number of types of drugs placed on the transportation tray Tr through the current picking operation.

In the example shown in FIG. 51, the operation number display area B125 displays 1/2, which represents the number of picking operations performed on the single transportation tray Tr, out of the total number of picking operations to be performed on the single transportation tray Tr. In this case, the operation number display area B125 indicates that the first picking operation is currently being performed, out of all the two picking operations to be performed on the single transportation tray Tr. More specifically, the operation number display area B125 indicates that the picking operation is currently being performed for the first type of drug out of all the two types of drugs to be placed onto the single transportation tray Tr.

This informs the user of the total number of picking operations to be performed on the single transportation tray Tr, and also the positioning of the current picking operation, out of all the picking operations to be performed. The user can thus notice the overall procedure of the picking operations on the single transportation tray Tr.

For Qualified Users

For a qualified user, the picking unit controller 12 displays the first confirmation screen image 51002.

The second display area B12 included in the first confirmation screen image 51002 includes a patient name display area B126 for displaying a patient name, in addition to the operation number display area B125. Also, the operation number display area B125 displays, for example, the total number of picking operations for a single recipe (Rp), and the current number of picking operations performed for the recipe. A recipe represents information indicating the type of one or more drugs, the quantity (dosage), and the dosing period (or the total dosage) defined for each dosage specifying the number of doses and the dosing times per day (corresponding to a classification allocated at the time of prescription; e.g., three times a day after every meal or twice a day after breakfast and dinner). For a single patient with multiple dosages (or recipes), each recipe has a recipe number.

In the example shown in FIG. 51, the operation number display area B125 displays the recipe number and Rpt-1/2, which represents the positioning of the current picking operation for the single recipe, out of the total number of picking operations to be performed for the single recipe. In this case, the operation number display area B125 indicates that the first picking operation is currently being performed for the recipe number of 1 (Rp1), out of all the two picking operations to be performed for the single recipe. More specifically, the operation number display area B125 indicates that the picking operation is currently being performed for the first type of drug, out of all the two types of drugs included in the single recipe with the recipe number of 1.

For any transportation tray Tr to receive drugs per recipe number, the total number of picking operations for the single recipe is the total number of picking operations for the single transportation tray Tr and is also the total number of different types of drugs to be placed on the transportation tray Tr. Also, the positioning of the current picking operation for the single recipe is the positioning of the current picking operation on the single transportation tray Tr. This information indicates the positioning of the current drug, out of all the different types of drugs to be placed on the transportation tray Tr.

This informs the user of the total number of picking operations to be performed on the single transportation tray Tr, as well as the positioning of the current picking operation, out of all the picking operations to be performed. The user can notice the overall procedure of the picking operations on the single transportation tray Tr. However, drugs may not be placed onto each transportation tray Tr under each recipe number.

For any qualified user performing a picking operation, the patient name and the positioning of the picking operation based on each recipe as described above allow the user to check drugs to be placed onto the transportation tray Tr per recipe. This allows a picking operation to aid a final inspection that follows the picking operation.

Supplementary Information

When the first confirmation screen image 51001 or 51002 appears, the operation number display area B125 and/or the patient name display area B126 also appears on, for example, the second confirmation screen image 22002 and the first determination screen image 24001. Also, the operation number display area B125 and/or the patient name display area B126 also appears on the background of the forced termination accept screen image 23001, and on the third confirmation screen image 23002, the description screen image 24002, and the second determination screen image 25001.

Third Determination Screen Image

Figure 52:
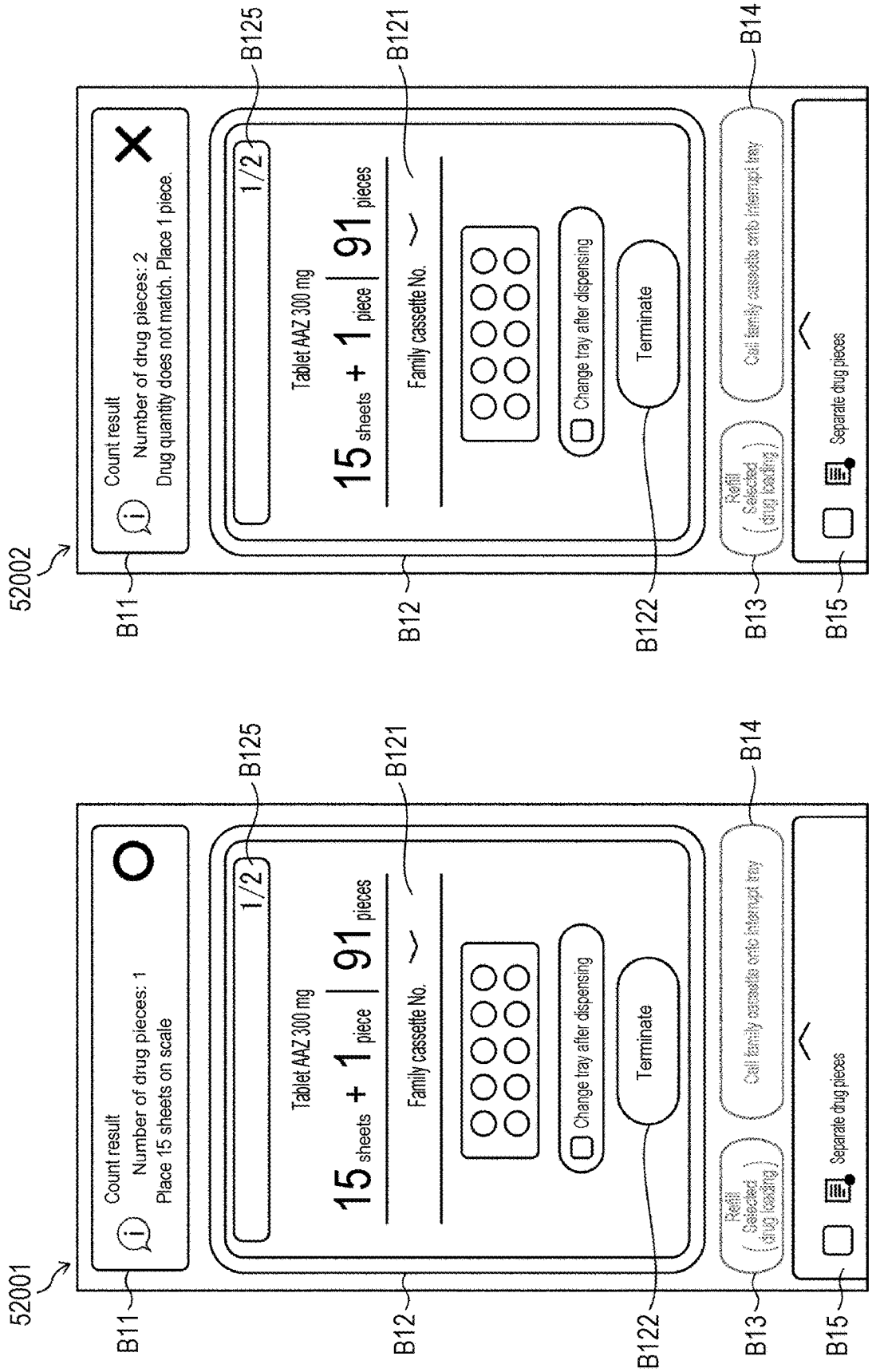
FIG. 52 is a diagram of example third determination screen images.

FIG. 52 is a diagram of an example third determination screen image 52001 and an example third determination screen image 52002. FIG. 52 is a diagram of example screen images for an uncertified user. The third determination screen image 52001 may include the second display area B12 including the patient name display area B126, similarly to the first confirmation screen image 51002 in FIG. 51.

The third determination screen images 52001 and 52002 each show a determination result indicating whether the prescribed number of separate drug pieces has been removed from a cassette Ca. The picking unit controller 12 obtains the determination result based on the count result obtained by analyzing the image containing the separate drug pieces captured by the image sensor 335. The touchscreen controller 14 switches the screen image from the second confirmation screen image 22002 to the third determination screen image 52001 or 52002 on the second touchscreen 31 based on the determination result.

The third determination screen image 52001 is an example screen image appearing when the picking unit controller 12 determines that the prescribed number of separate drug pieces has been removed from the cassette Ca. The touchscreen controller 14 displays the count result on the first display area B11 on the third determination screen image 52001. In the example shown in FIG. 52, the prescribed number of separate drug pieces (number of drug pieces) is 1, and the count result indicates Number of drug pieces: 1. The touchscreen controller 14 displays the circle sign image in the first display area B11 as the determination result image indicating that the prescribed quantity of separate drug pieces has been removed from the cassette Ca. The touchscreen controller 14 further displays, in the first display area B11, a message associated with the next operational procedure (a message prompting the user to place the prescribed quantity of drug sheets onto the tray support 38 (scale) in the example shown in FIG. 52).

The third determination screen image 52002 is an example screen image appearing when the picking unit controller 12 determines that the prescribed number of separate drug pieces has not been removed from the cassette Ca. The touchscreen controller 14 displays, together with the count result (Number of drug pieces: 2 in FIG. 52), the cross sign image in the first display area B11 on the third determination screen image 52002 as the determination result image indicating that the prescribed quantity of separate drug pieces has not been removed from the cassette Ca. The touchscreen controller 14 further displays, in the first display area B11, a message prompting the user to place the prescribed quantity of separate drug pieces onto the drug receptacle 37.

In this manner, the above count result and the above determination result for the separate drug pieces also allow the user to determine whether the prescribed quantity of drugs has been removed from the cassette Ca quantitatively and intuitively.

Another Example of First Confirmation Screen Image and Description Screen Image

Figure 53:
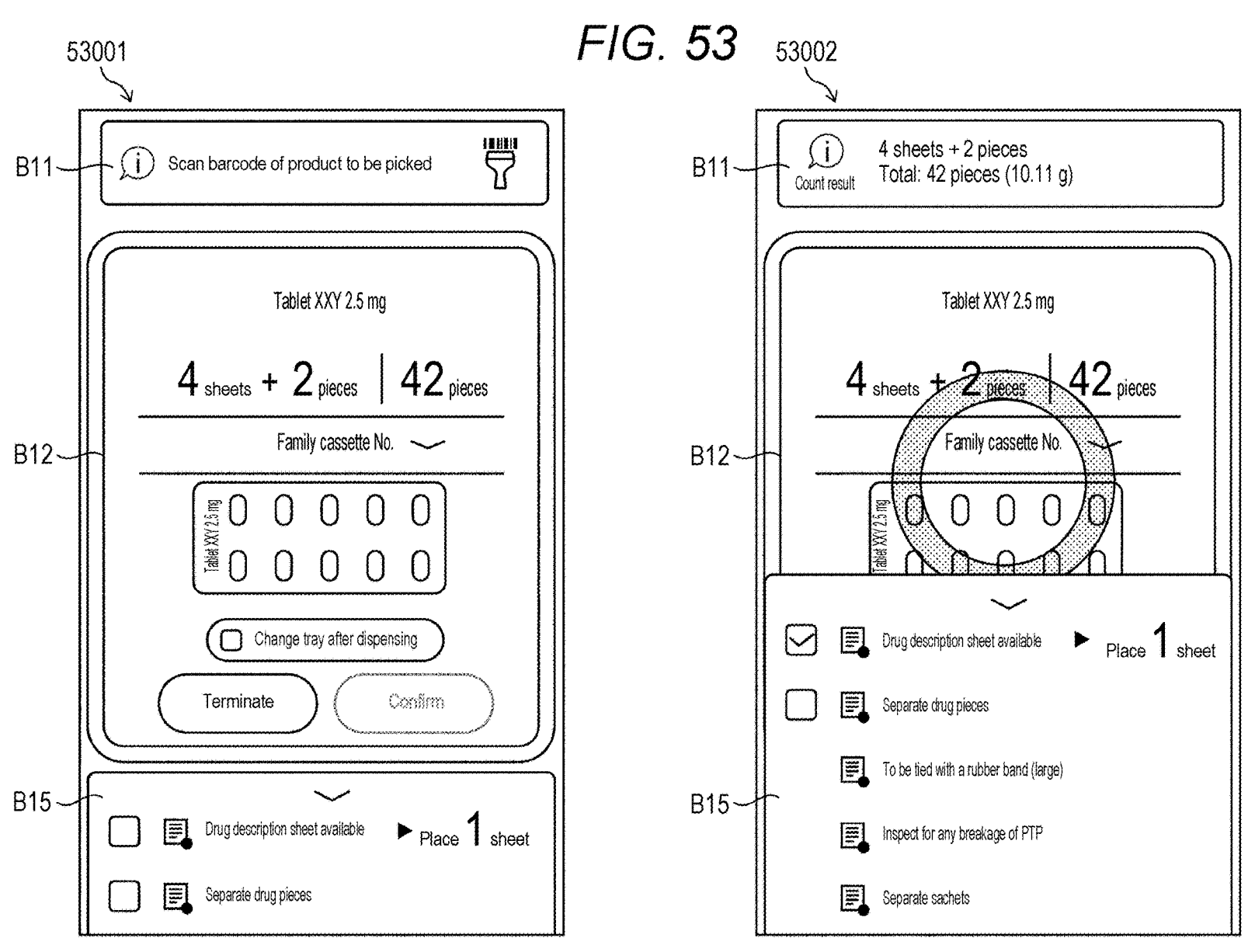

FIG. 53 is a diagram of a first confirmation screen image 53001 as still another example first confirmation screen image 22001, and a description screen image 53002 as still another example description screen image 24002. The first confirmation screen image 53001 and the description screen image 53002 shown in FIG. 53 may also display the operation number display area B125 and/or the patient name display area B126 and may not display the confirm button B123 in the same manner as in FIGS. 51 and 52.

In the second embodiment, the supplementary information display area B15 is minimized in the first confirmation screen image 22001. Subsequently, in response to an input operation (e.g., an upward swipe operation) in the supplementary information display area B15 on the first determination screen image 24001, the touchscreen controller 14 maximizes the supplementary information display area B15 in the description screen image 24002. The supplementary information display area B15 may be maximized at timing other than in response to an input operation in the supplementary information display area B15. When the picking unit controller 12 determines that the prescribed quantity of drugs to be dispensed has been removed from the cassette Ca, the touchscreen controller 14 may first display the circle sign image as the image determination result and then maximize the supplementary information display area B15.

In the present embodiment, the touchscreen controller 14 displays, selectively from all items of supplementary information appearing in the supplementary information display area B15, items of supplementary information that are particularly useful for the user in placing drugs onto the transportation tray Tr (useful supplementary information) on the first confirmation screen image 53001. The touchscreen controller 14 displays useful supplementary information alone in the supplementary information display area B15 at least until the circle sign image appears on the first confirmation screen image 53001 as the determination result. The user can notice such useful supplementary information.

Items of useful supplementary information may be specified in advance depending on the type of each drug or depending on each patient. For example, an item of supplementary information may be a notice not to split a drug sheet into a single packed drug piece. For example, a patient may mistakenly recognize a single packed drug piece as a tablet or any other unpacked drug piece, and may mistakenly swallow the drug piece without unpacking. This item of supplementary information is useful for this patient. In this manner, an item of useful supplementary information may be specified for each patient to reduce the likelihood of such an accident.

Subsequently, when the picking unit controller 12 determines that the prescribed quantity of drugs to be dispensed has been removed from the cassette Ca, the touchscreen controller 14 may display the supplementary information display area B15 on the description screen image 24002 (refer to FIG. 24) in a maximized manner. In response to an input operation in the supplementary information display area B15, the touchscreen controller 14 may maximize the supplementary information display area B15.

As described in the second embodiment, the touchscreen controller 14 may display the supplementary information display area B15 in an enlarged manner to cause the confirm button B123 to be invisible. The touchscreen controller 14 then displays the supplementary information display area B15 in an enlarged manner to cause the confirm button B123 to be invisible independently of the number of items of supplementary information to appear in this area. The touchscreen controller 14 may display the supplementary information display area B15 in an enlarged manner although a small number of items of supplementary information are to appear in the area. In this case, the touchscreen controller 14 may display a blank image in the part of the supplementary information display area B15 excluding the supplementary information to cause the confirm button B123 to be invisible.

When, for example, the terminate button B122 appears and the confirm button B123 does not appear as shown in FIGS. 51 and 52, the touchscreen controller 14 displays the supplementary information display area B15 in an enlarged manner to cause the terminate button B122 to be invisible.

The touchscreen controller 14 may display the description screen image 53002 instead of the description screen image 24002. The description screen image 24002 includes checkboxes for all items of supplementary information included in the supplementary information display area B15. In this case, the touchscreen controller 14 cannot switch the screen image to a subsequent screen image until receiving an input operation on all the checkboxes for the items of supplementary information.

The supplementary information display area B15 on the description screen image 53002 may have a checkbox for each item of useful supplementary information alone and may not have a checkbox for any other item of supplementary information. In this case, the touchscreen controller 14 switches the screen image to the next screen image in response to an input operation on the checkbox for each item of useful supplementary information.

The description screen image 53002 allows the user to check useful supplementary information in a more reliable manner and allows the user to decide whether to check other supplementary information. This improves the operational efficiency in the picking operation.

Implementations Using Software

The control blocks of the control unit 10 (in particular, the components of the main unit controller 11, the components of the picking unit controller 12, the transporter controller 13, and the touchscreen controller 14) may be implemented by logic circuits (hardware) included in integrated circuits (IC chips) or may be implemented by software.

When using software for implementing each function, the control unit 10 includes a computer for executing instructions included in a software program. The computer includes, for example, one or more processors and a computer-readable recording medium storing the program. The processor in the computer reads the program from the recording media and executes the program to achieve the aspects of the present invention. The processor is, for example, a central processing unit (CPU). The recording medium may be a non-transitory tangible medium, such as a read-only memory (ROM), a tape, a disk, a card, a semiconductor memory, or a programmable logic circuit. The computer may additionally include a random-access memory (RAM) for expanding the program. The program may be provided through any transmission medium that can transmit the program to the computer (e.g., a communication network or a broadcast wave). One aspect of the present invention may be a data signal superimposed on a carrier wave representing the program through electronic transmission.

APPENDIX

The embodiments disclosed herein should not be construed to be restrictive, but may be modified within the spirit and scope of the claimed invention. The technical features disclosed in the embodiments may be combined in other embodiments within the technical scope of the invention.

The invention claimed is:

1. A cassette handling apparatus for transporting and receiving a cassette to and from a drug handling apparatus, the drug handling apparatus including a drug receiver for removing a drug from a cassette or loading a drug into the cassette, the cassette handling apparatus comprising:
   a cassette shelf configured to store a plurality of cassettes;
   at least one transporting cassette holder configured to temporarily hold a cassette removed from the cassette shelf and to be transported to the drug receiver;
   at least one returning cassette holder configured to temporarily hold the cassette received from the drug receiver and to be returned to the cassette shelf; and
   a cassette transporter configured to transport the cassette between the cassette shelf and the at least one transporting cassette holder, and between the cassette shelf and the at least one returning cassette holder,
   wherein
   the at least one transporting cassette holder includes a plurality of transporting cassette holders,
   the at least one returning cassette holder includes a plurality of returning cassette holders,
   the plurality of transporting cassette holders and the plurality of the returning cassette holders are disposed in proximity to the drug receiver in the cassette transporter,
   the cassette transporter is configured to transport, within the cassette transporter, the cassette on the at least one transporting cassette holder or on the at least one returning cassette holder to the drug receiver,
   the drug receiver includes a slot configured to allow a user to access to the cassette placed on the cassette transporter below the slot, and
   the slot is disposed at a position to not allow the cassette, when being transported to the at least one transporting cassette holder or the at least one returning cassette holder, to pass through the slot.

2. The cassette handling apparatus according to claim 1, wherein
   each of the at least one transporting cassette holder and the at least one returning cassette holder is a receptacle configured to receive the cassette, and
   the receptacle operates in a switchable manner to be the at least one transporting cassette holder or to be the at least one returning cassette holder.

3. The cassette handling apparatus claim 1, wherein
   the cassette shelf stores the plurality of cassettes in a matrix, and
   the cassette transporter is configured to
      draw a cassette from the cassette shelf and then place the cassette onto the at least one transporting cassette holder, and
      draw the cassette placed on the at least one returning cassette holder and then return the cassette to the cassette shelf.

4. The cassette handling apparatus according to claim 1, wherein
   the cassette shelf includes a first cassette shelf configured to store a plurality of cassettes along a first vertical plane, and a second cassette shelf configured to store a plurality of cassettes along a second vertical plane different from the first vertical plane,
   the cassette transporter includes a cassette gripper configured to draw a cassette from the cassette shelf or from the at least one returning cassette holder and grip the drawn cassette, and
   the cassette gripper is configured to
      rotate about a rotation axis extending vertically to be movable toward the first cassette shelf or toward the second cassette shelf, and then
      draw a cassette from the first cassette shelf or from the second cassette shelf.

5. The cassette handling apparatus according to claim 1, wherein
   the cassette transporter includes a plurality of cassette grippers each configured to draw a cassette from the cassette shelf or from the at least one returning cassette holder and grip the drawn cassette, and
   the plurality of cassette grippers are movable without hitting one another.

6. The cassette handling apparatus according to claim 1, wherein
   the cassette transporter is configured to transport, based on prescription data associated with administration to a patient, a cassette containing a drug indicated by the prescription data to the at least one transporting cassette holder.

7. The cassette handling apparatus according to claim 1, wherein
   two of the plurality of transporting cassette holders and two of the plurality of returning cassette holders constitute one cassette holder for temporarily holding the cassette,
   the cassette holder is provided so as to correspond one to one to the drug receiver, and in the cassette holder, the two of the plurality of transporting cassette holders and the two of the plurality of returning cassette holders are disposed along a vertical direction.

8. The cassette handling apparatus according to claim 1, wherein
the slot has a dimension smaller than a corresponding dimension of the cassette when the cassette is placed below the slot for the user's access, and
the smaller dimension of the slot makes the cassette incapable of passing from below through the slot in a vertical direction.

* * * * *